US008260647B2

(12) United States Patent
Scott et al.

(10) Patent No.: US 8,260,647 B2
(45) Date of Patent: Sep. 4, 2012

(54) DELIVERY OPERATIONS INFORMATION SYSTEM AND METHODS OF USE

(75) Inventors: Gale R. Scott, Louisville, KY (US); Charles V. Fisher, Manchester, NH (US)

(73) Assignee: United States Postal Service, Washington, DC (US)

( * ) Notice: Subject to any disclaimer, the term of this patent is extended or adjusted under 35 U.S.C. 154(b) by 1082 days.

(21) Appl. No.: 11/208,232

(22) Filed: Aug. 19, 2005

(65) Prior Publication Data

US 2006/0184406 A1 Aug. 17, 2006

Related U.S. Application Data

(60) Provisional application No. 60/706,510, filed on Aug. 8, 2005, provisional application No. 60/602,592, filed on Aug. 19, 2004.

(51) Int. Cl.
*G06Q 10/00* (2012.01)
(52) U.S. Cl. ...................... 705/7.13; 705/7.16
(58) Field of Classification Search ............... 705/7.13, 705/7.16
See application file for complete search history.

(56) References Cited

U.S. PATENT DOCUMENTS

| | | |
|---|---|---|
| 3,845,289 A | 10/1974 | French |
| 4,336,589 A | 6/1982 | Smith et al. |
| 5,216,612 A | 6/1993 | Cornett et al. |
| 5,794,213 A | 8/1998 | Markman |
| 5,804,810 A | 9/1998 | Woolley et al. |
| 5,897,629 A | 4/1999 | Shinagawa et al. |
| 5,907,490 A | 5/1999 | Oliver |
| 5,918,219 A | 6/1999 | Isherwood |
| 6,216,109 B1 | 4/2001 | Zweben et al. |
| 6,292,709 B1 | 9/2001 | Uhl et al. |
| 6,298,337 B1 | 10/2001 | Kubatzki et al. |
| 6,394,278 B1 | 5/2002 | Reed |
| 6,401,079 B1 | 6/2002 | Kahn et al. |
| 6,411,891 B1 | 6/2002 | Jones |
| 6,571,213 B1 | 5/2003 | Altendahl et al. |
| 6,574,605 B1 | 6/2003 | Sanders et al. |
| 6,600,418 B2 | 7/2003 | Francis et al. |
| 6,610,955 B2 | 8/2003 | Lopez |
| 6,671,698 B2 | 12/2003 | Pickett et al. |
| 6,763,299 B2 | 7/2004 | Jones |
| 6,763,300 B2 | 7/2004 | Jones |
| 6,795,823 B1 | 9/2004 | Aklepi et al. |
| 6,823,315 B1 | 11/2004 | Bucci et al. |
| 6,850,895 B2 | 2/2005 | Brodersen et al. |
| 6,859,722 B2 | 2/2005 | Jones |

(Continued)

OTHER PUBLICATIONS

Green, Thom et al. "Delivery Operations Information System" Indiana State Association of Letter Carriers 104 Annual State Convention Indianapolis, May 30-1, 2003.*

(Continued)

*Primary Examiner* — Mark Fleischer
(74) *Attorney, Agent, or Firm* — Finnegan, Henderson, Farabow, Garrett & Dunner, LLP

(57) ABSTRACT

The present invention provides a system for managing information related to a delivery service provider and systems of using such a system. The system and systems provided herein allow a delivery service provider to coordinate with efficiency the volume of mail or packages to be delivered with the carrier resources available to deliver them. In accordance with one aspect of the invention, the delivery operation information system tracks quantities of articles, schedules their distribution, and schedules and tracks the work force that distributes the articles.

16 Claims, 128 Drawing Sheets

U.S. PATENT DOCUMENTS

| | | | |
|---|---|---|---|
| 6,904,359 B2 | 6/2005 | Jones | |
| 6,912,398 B1 | 6/2005 | Domnitz | |
| 6,918,089 B2 | 7/2005 | Uchida et al. | |
| 7,035,856 B1 | 4/2006 | Morimoto | |
| 7,085,775 B2 | 8/2006 | Short, III et al. | |
| 7,113,923 B1 | 9/2006 | Brichta et al. | |
| 7,116,230 B2 | 10/2006 | Klowak | |
| 7,139,720 B1 | 11/2006 | Foell et al. | |
| 7,233,919 B1 | 6/2007 | Braberg et al. | |
| 7,251,612 B1 | 7/2007 | Parker et al. | |
| 7,313,530 B2 | 12/2007 | Smith et al. | |
| 7,343,316 B2 | 3/2008 | Goto et al. | |
| 7,363,319 B2 * | 4/2008 | Cappellini | 1/1 |
| 7,676,404 B2 | 3/2010 | Richard et al. | |
| 2001/0047285 A1 | 11/2001 | Borders et al. | |
| 2002/0019759 A1 * | 2/2002 | Arunapuram et al. | 705/7 |
| 2002/0069144 A1 | 6/2002 | Palardy | |
| 2002/0082889 A1 | 6/2002 | Oliver | |
| 2002/0135802 A1 | 9/2002 | Perez et al. | |
| 2002/0184148 A1 | 12/2002 | Kahn et al. | |
| 2003/0120538 A1 | 6/2003 | Boerke et al. | |
| 2003/0225587 A1 | 12/2003 | Mueller | |
| 2004/0010437 A1 | 1/2004 | Kiran et al. | |
| 2004/0019542 A1 | 1/2004 | Fuchs et al. | |
| 2004/0030572 A1 * | 2/2004 | Campbell et al. | 705/1 |
| 2004/0030604 A1 * | 2/2004 | Young | 705/26 |
| 2004/0064326 A1 | 4/2004 | Vaghi | |
| 2004/0065598 A1 | 4/2004 | Ross et al. | |
| 2004/0078257 A1 | 4/2004 | Schweitzer et al. | |
| 2004/0117108 A1 | 6/2004 | Nemeth | |
| 2004/0117196 A1 | 6/2004 | Brockman et al. | |
| 2004/0176962 A1 | 9/2004 | Mann et al. | |
| 2004/0211709 A1 | 10/2004 | Hanson et al. | |
| 2004/0225546 A1 | 11/2004 | Oberdorfer et al. | |
| 2004/0243664 A1 | 12/2004 | Horstemeyer | |
| 2004/0260591 A1 | 12/2004 | King | |
| 2005/0080636 A1 | 4/2005 | Markwitz et al. | |
| 2005/0131645 A1 | 6/2005 | Panopoulos | |
| 2005/0131745 A1 | 6/2005 | Keller et al. | |
| 2005/0171835 A1 | 8/2005 | Mook et al. | |
| 2005/0251330 A1 | 11/2005 | Waterhouse et al. | |

OTHER PUBLICATIONS

Dick Blick Art Materials Shipping Information, Dick Blick Holdings, Inc., retrieved from <http://www.dickblick.com/customerservice/shipping>, archived Jun. 5, 2002.

Rylander, Carole Keeton, Local Government Assistance Budget Manual, May 2001, retrieved from <http://window.state.tx.us/lga/budget/ch4.html>.

United States Parcel Service—Destination Map, Feb. 2003, retrieved from <http://www.theservices.org/upsmap.htm>.

Associated Press, "Overtime Stalls Talks," Aug. 23, 2000, Philadelphia Daily News.

Associated Press, "Space Shuttle on a Tight Schedule for June Launch," Nov. 23, 1987, Miami Herald.

Diddlebock, Bob; "Pay for Performance Demand Unique to US West;" Aug. 26, 1998; Knight-Ridder Tribune Business News.

Drury, Allan, "Labor's Day—After a Decade of Relative Acquiescence, Unions are Finding Their Voice and Raising It in Discontent Across Maine," Sep. 3, 2000, Maine Sunday Telegram.

Gere Jr., William S., "Heuristics in Job Shop Scheduling," Nov. 1966, Management Science, vol. 13, No. 3, pp. 167-190.

Healy, Tim; "Fierce Fight Brewing Over Mandatory Overtime;" Feb. 9, 1990; Seattle Times.

Hirschman, Carolyn; "Overtime Overload;" Dec. 20000; HR Magazine; vol. 45, Issue 12; pp. 84-95.

Kanaley, Reid, "Verizon Strike Ends With Agreement After 18 Days of Discord," Aug. 24, 2000, Knight-Ridder Tribune Business News.

Hungary Regulations: Labour Law, Dec. 21, 1998, EIU ViewsWire.

Lewis, Diane E., "Verizon Strikers' Focus on Required Overtime Echoes Labor Complaints At Other Companies," Aug. 15, 2000, Boston Globe.

McKay, Jim, "Verizon to Focus on Customer Service Now That Strike Is Over," Aug. 25, 2000, Knight-Ridder Tribune Business News.

"Verizon and CWA in Mid-Atlantic Region Reach Agreement on New Contract," Aug. 23, 2000, PR Newswire.

Srinivasan, Kalpana, "Required Overtime Still an Issue With Verizon Workers on Strike in the Mid-Atlantic States," Aug. 23, 2000, Intelligencer Journal.

Final Office Action issued in Co-Pending U.S. Appl. No. 11/207,969, dated Jul. 30, 2007.

Final Office Action issued in Co-Pending U.S. Appl. No. 11/207,969, dated Nov. 14, 2006.

Office Action issued in Co-Pending U.S. Appl. No. 11/207,969, dated Jan. 8, 2009.

Office Action issued in Co-Pending U.S. Appl. No. 11/208,383, dated Jan. 23, 2008.

Final Office Action issued in Co-Pending U.S. Appl. No. 11/208,383, dated Oct. 15, 2008.

Office Action issued in Co-Pending U.S. Appl. No. 11/207,551, dated Jan. 8, 2008.

Final Office Action issued in Co-Pending U.S. Appl. No. 11/207,551, dated Oct. 23, 2008.

Office Action issued in Co-Pending U.S. Appl. No. 11/207,551, dated Jul. 8, 2009.

Office Action issued in Co-Pending U.S. Appl. No. 11/207,551, dated Jan. 13, 2010.

Office Action issued in Co-Pending U.S. Appl. No. 11/207,908, dated Dec. 24, 2009.

Office Action issued in Co-Pending U.S. Appl. No. 11/207,969, dated Dec. 24, 2009.

Office Action issued in Co-Pending U.S. Appl. No. 11/207,982, dated Dec. 28, 2009.

Office Action issued in Co-Pending U.S. Appl. No. 11/207,969, dated Apr. 16, 2008.

Office Action issued in Co-Pending U.S. Appl. No. 11/208,383, dated Oct. 22, 2009.

Office Action issued in Co-Pending U.S. Appl. No. 11/207,927, dated Dec. 28, 2009.

Office Action issued in Co-Pending U.S. Appl. No. 11/207,551, dated May 14, 2010.

Office Action issued in Co-Pending U.S. Appl. No. 11/207,908, dated Jun. 23, 2010.

Office Action issued in Co-Pending U.S. Appl. No. 11/207,927, dated Jun. 18, 2010.

Office Action issued in Co-Pending U.S. Appl. No. 11/207,927, dated Nov. 24, 2010.

Office Action issued in Co-Pending U.S. Appl. No. 11/207,969, dated Jun. 21, 2010.

Office Action issued in Co-Pending U.S. Appl. No. 11/207,982, dated Jun. 22, 2010.

Office Action issued in Co-Pending U.S. Appl. No. 11/208,383, dated Oct. 13, 2010.

Office Action issued in Co-Pending U.S. Appl. No. 11/207,551, dated Feb. 2, 2011.

Office Action issued in Co-Pending U.S. Appl. No. 11/207,551, dated Oct. 20, 2010.

Office Action issued in Co-Pending U.S. Appl. No. 11/208,383, dated Mar. 22, 2011.

Office Action issued in Co-Pending U.S. Appl. No. 11/207,551, dated May 10, 2011.

International Search Report for corresponding PCT Application No. PCT/US05/29607, dated Feb. 15, 2006.

Green et al., "Delivery Operations Information System," *Indiana State Association of Letter Carriers*, 104th *Annual State Convention, Indianapolis,* May 31, 2003.

Donahoe, Optimizing Delivery at the US Postal Service, <www.postalproiect.com>.

United States Postal Service, 2000 Comprehensive Statement on Postal Operations, table of contents, excerpt, and index.

United States Postal Service, 2001 Comprehensive Statement on Postal Operations, table of contents, excerpt, and index.

United States Postal Service, 2002 Comprehensive Statement on Postal Operations, table of contents, excerpt, and index.

United States Postal Service, 2003 Comprehensive Statement on Postal Operations, table of contents, excerpt, and index.

United States Postal Service, 2004 Comprehensive Statement on Postal Operations, table of contents, excerpt, and index.

Accenture, 2000 News Archive, U.S. Postal Service Looks to Accenture to Construct Digital Foundation for Postal Operations, downloaded from <www.accenture.com> on Apr. 5, 2006.

Shifrin, Postal Service Seeks to Deliver Via IT, Washington Technology, downloaded from <www.washingtontechnology.com> on Apr. 5, 2006.

Mann et al., RFID Applications for Postal Operations, <www.postalproiect.com> pp. 2-5.

Vogel, USPS-FedEx Agreement Delivers First-Class Service, <www.postalproiect.com> pp. 2-3.

Pedersen et al., Lean Production in Post Danmark A/S, <www.postalproiect.com> pp. 2-3.

Bisback et al., Enhancing Products and Increasing Strategic Growth, <www.postalproject.com> pp. 2-3.

Moran et al., High Performance Posts and Supply Chain, <www.postalproject.com> pp. 2-5.

Devlin et al., Resource Planning for Posts, <www.postalproject.com> pp. 2-3.

Bentz et al., Maximizing Fleet Effectiveness, <www.postalproject.com> pp. 2-5.

United States Postal Service, Overview of the Software Release Notes on Version 2.0.2 Through 3.2 for the Delivery Operations Information System (DOIS) Business Solution, pp. 1-5.

United States Postal Service, Clockring Discrepancies Button.

United States Postal Service, DOIS version 2.7.1 Reference Guide, Summer 2002, pp. 1-19.

United States Postal Service, DOIS version 3.0 Reference Guide (District and Area Approvers), Summer 2002, pp. 1-11.

United States Postal Service, DOIS version 3.0 Reference Guide, Summer 2002, 36 pages.

United States Postal Service, Delivery Operations Information System (DOIS), DOIS version 2.5 Release Notes, Nov. 6, 2001, pp. 1-4.

United States Postal Service, Delivery Operations Information System (DOIS), DOIS version 2.7 Release Notes, Mar. 7, 2002, pp. 1-2.

United States Postal Service, Delivery Operations Information System (DOIS), DOIS version 2.7.1 Release Notes, May 31, 2002, pp. 1-3.

United States Postal Service, Delivery Operations Information System (DOIS), DOIS version 3.0 Release Notes, Jul. 22, 2002, pp. 1-16.

United States Postal Service, Delivery Operations Information System (DOIS), DOIS version 3.1 Release Notes, Jan. 21, 2003, pp. 1-3.

United States Postal Service, Delivery Operations Information System (DOIS), DOIS version 3.2 Release Notes, May 30, 2003, pp. 1-3.

United States Postal Service, Software Release Information, Version 2.0.1, pp. 1-11.

United States Postal Service, Software Release Information, Version 2.2, pp. 1-2.

United States Postal Service, DOIS version 3.0 Webcast training materials, including printout of slides and multimedia CD.

United States Postal Service, DOIS version 2.7.1 Webcast training materials, including printout of slides and multimedia CD.

* cited by examiner

Workload Status

| Routes | Other |

| Route List/Status | | |
|---|---|---|
| Route | Carrier | +/- |
| | | |

Total Est. Overtime: ertimeNbr

Total Est. Undertime: ertimeNbr

| Route Vacancies | | | |
|---|---|---|---|
| Route | Hours | Planned | Type |
| | | | |

*FIG. 9*

Carrier Information List

Route _____  Duration of Assistance [0:00] ▲▼  View Unscheduled Carriers [X]

Unscheduled Carrier Information

| Carrier Name | Empl Type | Days Cased | Last Date Cased | Days Carried | Last Date Carried | OTDL Status | OT Hours | OT Opps | Hrs Week to Date |
|---|---|---|---|---|---|---|---|---|---|
| * | | | | | | | | | |

Help   Record Overtime Exception   OK   Cancel

Work Hour Discrepency

Service Day: [cboDate ▼]

Employee Name: [cboEmployee ▼]

[Help] [Print Preview] [Cancel]

*FIG. 18*

Create Vacancy - 3971

Carrier Name: [cboCarrier Name ▼]
Vacancy Type: [cboVacancy Type ▼]

● Full Day         Section [cboSection ▼]
○ Partial Day      Absence Hours: [0:00]

Date From: [01/01/1700]    Date To: [01/01/1700]

[Help]              [Save]    [Close]

*FIG. 19*

Miscellaneous Route Details

Miscellaneous Route: [cboMiscW ▼]     [Display]

Type:          WA Description

Misc Route Schedule Information

Base Hrs:   HH.MM

Carrier:    Weisenberg, Eric     [Assign..]   [Remove]

Misc Route Auxiliary Assistance

| Work Assignment Sections | |
|---|---|
| Assigned To | Duration |
| * | |

Total Assistance.   HH.MM

[Assign Assistance]
[Delete Assistance]

[Help]                                      [Close]

Record Overtime Exception

OTDL Carrier: cboOTDLCarrier

Exception Date: 01/01/1700    Hours: 4:00    ☑ Opportunity

Reason:

Help    Save    Close

FIG. 25

Adjust Leave/Office Time

Date: 01/01/1700

Carrier: cboCarrier

Adjustment: 0:00

Help    Save    Close

Weekly Schedule

| | Saturday | Monday | Tuesday | Wednesday | Thursday | Friday |
|---|---|---|---|---|---|---|
| Type | Carrier Name | | | | | |

Regular Route Status

View Current Week

Base: XX
Budget:
Projected:
Scheduled:

Print Preview | Create Vacancy | Assign Replacement... | Route Warnings... | Close

FIG. 42

Assign Carriers

Assignment Details
Route: 10001
Section: cboSection
Date From: 01/01/2000
Date To: 01/01/2000

Available Carriers - Mon, 01/Feb/1999

Scheduled Regulars | Flexible Carriers | Regulars with Scheduled Day Off

| Carrier Name | Type | Assigned Route | Scheduled Start Time | Date Last Cased | Date Last Carried | Days Cased Route | Days Carried Street |
|---|---|---|---|---|---|---|---|
| * | | | | | | | |

Help | OK | Cancel

Regular Work Assignments

Assignments

| Carrier | Assignment Type | Route | Submitted | Sat | Sun | Mon | Tue | Wed | Thu | Fri | Schedule If NS | Replace Existing | Auto Submit |
|---------|----------------|-------|-----------|-----|-----|-----|-----|-----|-----|-----|----------------|------------------|-------------|

New
Edit
Delete

Service Week Start Date:

Submit

Help
Close

FIG. 51

Overtime Desired List (OTDL)

Year - Quarter: [cboYearQuar ▼]    [Display]

| OTDL | | |
|---|---|---|
| Employee Name | OTDL Status | Removal Date |
| | | |

[New]

[Remove]

[Roll In OTDL]

[Save]    [Close]

Route Base Information Maintenance

Route Number: [cboRouteNu ▼]  [Display]

General Information | Travel Information

Type of Route
- ○ Residential
- ○ Business
- ○ Mixed

Type of Delivery
- ○ Foot        ○ Park and Loop
- ○ Dismount    ○ Other
- ○ Curbline Motorized ☐ Auxiliary
☐ Saturday Non-Delivered Mail

Schedule
| | Daily | Saturday |
|---|---|---|
| Begin: | 12:00 AM ▲▼ | 12:00 AM ▲▼ |
| Leave: | 12:00 AM ▲▼ | 12:00 AM ▲▼ |
| Return: | 12:00 AM ▲▼ | 12:00 AM ▲▼ |
| End: | 12:00 AM ▲▼ | 12:00 AM ▲▼ |

Last Inspection Date: _____

Base Times
- Office Time: _____
- Street Time: _____
- Total Time: _____
- Router Time: _____
- *Fixed Office Time: 0:00 ▲▼

Percent To Standard
- Percent To Standard: ___ %

Carrier Information
- Regular Carrier:
- Hire Date:
- Date Assigned to Route:
- Replacement Carrier:

Last Adjustment Date: _____

Mail Volume  AM  PM
- Letter Volume:
- Flat Volume:
- Total Volume:
- DPS Percent: ___ %
- Base Parcels:

Possible Deliveries
- Base PDs:
- Current PDs:

[Save]   [Close]

* Fixed Office Time includes Line Items 14, 15, 16, 18, 19, 20, 21.

Non-Delivery Point Maintenance

Route Number: cboRouteNu ▷     [Display]

[New] [Edit] [Delete] [Close]

| Non-Delivery Point Code | Location | Street Corner | Daily Arrival | Sat. Arrival | Hol. Arrival | 1) | 2) | 3) | 4) |
|---|---|---|---|---|---|---|---|---|---|
| * | | | | | | | | | |

*3999 Data Transfer*

Records on Mainframe
| Route Number | Data Capture Date | Street Analysis Type |
|---|---|---|
| * | | |

Transfer to Workstation

Records on Workstation
| Route Number | Data Capture Date | Street Analysis Type |
|---|---|---|
| * | | |

Select All

Transfer to Mainframe

Close

1038 C Data Capture and Maintenance

Date: cboDate    RouteNumber: cboRouteNu    [Display]

Tabs: Volume Capture | Prior Day/Non-Del | Router Volume | Line Items | Clockrings Enter/Edit: ☐ AM  ☐ PM

| | AM | PM | Carrier Marked-Up | CFS |
|---|---|---|---|---|
| 1. Letter Size | ☐ | ☐ | ☐ | ☐ |
| 2. Mail of All Other Sizes | ☐ | ☐ | ☐ | ☐ |
| 3. Accountable and Signature Mail | | | | |
|    Registered/Certified | ☐ | ☐ | ☐ | |
|    COD/Customs | ☐ | ☐ | ☐ | |
|    Postage Dues | ☐ | ☐ | ☐ | |
|    Express Mail | ☐ | ☐ | ☐ | |
| 5. All Parcel Post over 2lbs | ☐ | ☐ | ☐ | ☐ |

[Next Route]  [Save]  [Close]

*FIG. 65*

Maintain Carrier Route Assignments

Carriers Assigned to Unit

| Name | Type | Rte Asgnmt |
|------|------|------------|
| * | | |

[New] [Edit] [Delete]

Carrier Information

Employee
- Emp ID:
- Last:
- First:
- Initial:
- Fin #
- Pay Loc:
- Seniority Date:
- Hire Date:
- Emp Type: cboEmpTyp
- Des Act:

Work Assignment
- Type: cboAsgnmtType
- Rte ZIP Code: cboRteZip
- Route Nbr:

[New...] [Delete]

Regular Routes Covered

| Rte ZIP | Rte Nbr |
|---------|---------|
| * | |

[Save] [Close]

Define Adjustment

Adjustment Type
Type: cboAdjustmentType

Week of Inspection
Start Date: 01/01/1700
End Date:

Random Lot Selection

Define Routes to Adjust
ZIP Code: cboZipC

Routes In ZIP Code
| Route | Regular Carrier |
|---|---|
| * | |

Routes To Adjust
| Route | Regular Carrier |
|---|---|
| * | |

Help    OK    Cancel

Random Timecard Analysis - Summary

Analysis Status:     text 10 chars

| Week Number | Original Week | Weeks to use in analysis | Abnormal Conditions |
|---|---|---|---|
| # | mm/dd/yyyy | 01/01/1700 | text 40 characters |
| # | mm/dd/yyyy | 01/01/1700 | text 40 characters |
| # | mm/dd/yyyy | 01/01/1700 | text 40 characters |
| # | mm/dd/yyyy | 01/01/1700 | text 40 characters |
| # | mm/dd/yyyy | 01/01/1700 | text 40 characters |
| # | mm/dd/yyyy | 01/01/1700 | text 40 characters |
| # | mm/dd/yyyy | mm/dd/yyyy | text 40 characters |

[Abnormality Check]  [Submit]  [Analysis Detail...]  [Comments...]  [Reset All]  [Close]

DPS Volume Impact

| | DPS % | | Avg Volume | | Office Times | | |
|---|---|---|---|---|---|---|---|
| Route | Current | Base | Change | DPS | Base/1840 | Base | Impact | Adjusted |

[Update Office Times] [Close]

*FIG. 93*

Add/Remove Delivery Points

Route Number: [cboRou ▾]    [Display]

Add or Remove Delivery Points
- ● Add Deliver Points to Route
- ○ Remove Delivery Points from Route

Delivery Pts to Add/Remove  [ 0 ]

NOTE:
- Office Time/Delivery is determined using the most recent 1840 information.
- Street Time /Delivery is determined using the most recent 3999 information.

Office Time
- # Delivery Pts. To Add/Remove
- Office Time Per Delivery
- Office Time to Add/Remove
- Office Time
- Office Time to Add/Remove
- Modified Office Time

Street Time
- # Delivery Pts to Add/Remove
- Street Time Per Delivery
- Street Time to Add/Remove
- Street Time
- Street Time to Add/Remove
- Modified Street Time

[Save]   [Close]

1840 - Summary of Count and Inspection

Week of Inspection Start Date

○ Route Number: [cboRouteNum ▽]

○ T-6/Replacement Carrier Name [cboCarrier]

[Help]  [Print Preview]  [Cancel]

Delivery Operations Information System [DOIS]

File  Application  Options  Window  Help

Weekly Schedule

View Current Week

Absence List

| Type | Carrier Name | Saturday 08/07/1999 | Monday 08/09/1999 | Tuesday 08/10/1999 | Wednesday 08/11/1999 | Thursday 08/12/1999 | Friday 08/13/1999 |
|---|---|---|---|---|---|---|---|
| PTF | APKARIAN, R D | NS | | | | | |
| REG | ARSENAULT, R C | SL | NS | | | | LLD |
| REG | BIRD, F W | | | NS | | | |
| REG | CARKHUFF, J M | | | | NS | NS | NS |
| REG | CONWAY, W A | | | NS | | NS | NS |
| REG | DEFELICE, J J | NS | AL | AL | AL | AL | AL |
| T-6 | DORNHEIM, D R | | NS | NS | NS | SL | NS |
| T-6 | DOXTER, B R | | NS | NS | NS | NS | |
| REG | DUDLEY, M C | | NS | NS | | SL | NS |
| PTF | DUFFY, B J | | | | | DL | |
| REG | GEORGE JR, M P | DL | DL | DL | DL | AL | |
| REG | GREEN, M D | | AL | AL | AL | | |
| REG | GUTHRIE, W J | | | | | | |
| PTF | GUY, P C | | | | | | |
| REG | HERNANDEZ, N | | | | | NS | |
| PTF | LAJOIE, R R | SL | SL | | | | |
| PTF | LIBBY, D M | NS | | | | | |
| REG | MANDEVILLE, B H | NS | | | | | |
| REG | MANNING, J W | AL | | | NS | | NS |
| REG | MCKAY, D K | | | | | NS | NS |

| Base: 157 | Budget | 122 | 122 | 122 | 122 | 122 |
|---|---|---|---|---|---|---|
| | Projected | 133 | 133 | 133 | 133 | 133 |
| | Scheduled | | | | | |

Print Preview    Create Vacancy...    Assign Replacement...    Route Warnings...    Close

RESTRICTED INFORMATION

| | | Delivery Operations Information System [DOIS] | | | | | |
|---|---|---|---|---|---|---|---|
| File | Application | Options | Window | Help | | | |

Weekly Schedule

| View Current Week | | | | Regular Route Status | | | |
|---|---|---|---|---|---|---|---|
| Route | Regular Carrier | Saturday 08/07/1999 | Monday 08/09/1999 | Tuesday 08/10/1999 | Wednesday 08/11/1999 | Thursday 08/12/1999 | Friday 08/13/1999 |
| 20001 | CARKHUFF, J M | | | | | | |
| 20002 | ARSENAULT, R C | DUDLEY, M C | <VACANT> | | <VACANT> | <VACANT> | <VACANT> |
| 20003 | BIRD, F W | MANNING, J W | MANNING, J W | MANNING, J W | MANNING, J W | <VACANT> | MANNING, J W |
| 20004 | CARKHUFF, J M | <VACANT> | <VACANT> | <VACANT> | <VACANT> | THORNER, R F | DUFFY, B J |
| 20005 | CONWAY, W A | GREEN, M D | APKARIAN, R D | APKARIAN, R D | APKARIAN, R D | APKARIAN, R D | DUFFY, B J |
| 20006 | DEFELICE, J J | THOMPSON, W | LAJOIE, R R | Quick Assign | LAJOIE, R R | LAJOIE, R R | LAJOIE, R R |
| 20007 | DUDLEY, M C | DOXTER, B R | MCKAY, D K | Assignment Details | MCKAY, D K | MCKAY, D K | MCKAY, D K |
| 20008 | ROBILLARD, E C | | | Create Vacancy | | | |
| 20009 | CONWAY, W A | | <VACANT> | Show | <VACANT> | ✓Regular Routes | <VACANT> |
| 20010 | BIRD, F W | DUFFY, B J | | | | Miscellaneous Routes | GUY, P C |
| 20011 | LIBBY, D M | THORNER, R F | | THORNER, R F | | Carrier Work Status | |
| 20012 | WORMEL, D R | | | | | Absence List | |
| 20013 | MANDEVILLE, B H | <VACANT> | | ARSENAULT, R | ARSENAULT, R | Sunday | THORNER, R F |
| 20014 | MRACEK, W R | | DUFFY, B J | | | Vacant Routes | ARSENAULT, R C |
| 20015 | | <VACANT> | | <VACANT> | <VACANT> | | DOXTER, B R |
| 20016 | GUTHRIE, W J | | | | | | <VACANT> |
| 20017 | | <VACANT> | <VACANT> | <VACANT> | <VACANT> | <VACANT> | BIRD, F W |
| 20018 | STOLPE, T P | BIRD, F W | BIRD, F W | BIRD, F W | BIRD, F W | BIRD, F W | STOLPE, T P |
| 20019 | | MCKAY, D K | STOLPE, T P | STOLPE, T P | STOLPE, T P | <VACANT> | |

| Base: 157 | Budget | 122 | 122 | 122 | 122 | 122 | 122 |
| | Projected | 133 | 133 | 133 | 133 | 133 | 133 |
| | Scheduled | | | | | | |

Print Preview  Create Vacancy...  Assign Replacement...  Route Warnings...  Close

RESTRICTED INFORMATION

FIG. 130

Edit Installation

- Finance Number: 139139
- City: LONG BEACHES
- State: CALIFORNIA
- Installation Name: LONG BEACHES

[Help] [OK] [Cancel]

*FIG. 133*

Edit Facility

- Type: STATION
- Finance Number: 139139
- City: LONG BEACH
- State: CALIFORNIA
- ZIP Code: 90807-0807
- Name: LB BIXBY STA

[Help] [OK] [Cancel]

FDB Facility ID:
FDB Name:
FDB Address 1:
FDB Address 2:
FDB City:
FDB State:
FDB ZIP:
FDB Finance Number:
FDB Sub Type:

[Browse FDB]

Edit Facility

| Field | Value |
|---|---|
| Type: | STATION |
| Finance Number: | 501008 |
| City: | BURLINGTON |
| State: | VERMONT |
| ZIP Code: | 05401-9700 |
| Name: | PINE & SOUTH STA |

[Help]   [OK]   [Cancel]

FDB Facility ID:
FDB Name:
FDB Address 1:
FDB Address 2:
FDB City:
FDB State:
FDB ZIP:
FDB Finance Number:
FDB Sub Type:

[Browse FDB]

FIG. 140

Facility Selection

Select correct row for the facility from the FDB grid

| Type | Finance Number | City | Sta | ZIP Code | FDB Name |
|---|---|---|---|---|---|
| MAIN_PO | 501008 | BURLINGTON | VT | 054019998 | BURLINGTON |
| STATION | 501008 | BURLINGTON | VT | 054019712 | BURLINGTON CHAMPLAIN STATION |
| STATION | 501008 | BURLINGTON | VT | 054019713 | BURLINGTON NORTH STATION |
| STATION | 501008 | BURLINGTON | VT | 054019991 | PINE ST STATION |
| BRANCH | 501008 | BURLINGTON | VT | 054019998 | BURLINGTON (FUTURE USE) |
| BRANCH | 501008 | SOUTH BURLINGTON | VT | 054039998 | SOUTH BURLINGTON |
| BRANCH | 501008 | WINDOSKI | VT | 054049998 | WINDOSKI |
| STATION | 501008 | BURLINGTON | VT | 054019844 | BURLINGTON DU |

[Help]   [Select]   [Cancel]

FIG. 141

Edit Facility

| | |
|---|---|
| Type: | STATION |
| Finance Number: | 501008 |
| City: | BURLINGTON |
| State: | VERMONT |
| ZIP Code: | 05401-9700 |
| Name: | PINE & SOUTH STA |

[Help] [OK] [Cancel]

| | |
|---|---|
| FDB Facility ID: | 001377555 |
| FDB Name: | PINE ST STATION |
| FDB Address 1: | 320 PINE ST |
| FDB Address 2: | |
| FDB City: | BURLINGTON |
| FDB State: | VT |
| FDB ZIP: | 054019991 |
| FDB Finance Number: | 501008 |
| FDB Sub Type: | STATION |

[Browse FDB]

FIG. 142

System Administration Workbench

- ☐ Maintain User Profile
- ☐ Maintain District Organization
- ☐ Maintain 52 Day Implementation Plan
- ☐ MSP Label Request Status
- ☐ District Reports ☐ Change District    [Close]

FIG. 143

AM Standard Operating Procedure Certification Status

AM SOP Certification Status

- ☐ IOP Implemented:
- ☐ Case Configuration Complemented:
- ☐ Unit Layout Approved:
- ☐ Carrier Schedule Approved TOP Audit Results in the Delivery Section:
TOP Audit Results Overall:

- ☐ AM SOP Certification Complete:

☐ Area Review:

Unit Pass Review  ● Yes  ○ No

[ Save ]  [ Close ]

*FIG. 146*

Capture Mail Volumes - Manual

Capture Mail Volumes

Date: 02/05/2004
Category: AM Available
Units: Pieces
Source: Withdrawal   Arrival Time: 7:30 AM

[Display]

Mail Volumes - AM Available

| Route | Letters (Pcs) | Flats (Pcs) | Seq Ltrs (Sets) | Seq Flts (Sets) | Parcels | DPS (Pcs) | Caseable Automated Letters | Caseable Automated Flats |
|---|---|---|---|---|---|---|---|---|
| 10001 | 0 | 805 | 0 | 0 | 0 | 1,269 | 550 | 206 |
| 10002 | 0 | 805 | 0 | 0 | 0 | 1,151 | 472 | 219 |
| 10004 | 56 | 460 | 0 | 0 | 0 | 411 | 772 | 193 |
| 10005 | 113 | 1,868 | 0 | 0 | 0 | 2,687 | 605 | 307 |
| 10006 | 113 | 1,696 | 0 | 0 | 0 | 2,330 | 710 | 315 |
| Totals: | 4,294 | 58,581 | 0 | 0 | 0 | 60,992 | 33,652 | 8,433 |

[Save] [Close]

FIG. 148

Capture Mail Volumes - Manual

Date: 02/05/2004
Category: AM Available
Units: Pieces
Source: Roll-In

[Roll-In Previous Day]

Mail Volumes – AM Roll In

[Save] [Close]

Maintain Dispatch Information

Scheduled Dispatch Information

| Dispatch | AM Dispatch | Arrival Time | % of AM Total Mail | DPS | Automated Letters | Automated Flats |
|---|---|---|---|---|---|---|
| 1 | Y | 8:15AM | 40 | Y | N | N |
| 2 | Y | 9:45AM | 60 | N | Y | Y |
| 3 | N | 12:30PM | 0 | N | N | N |

Total: 100

[New] [Remove Last]

[Save] [Close]

FIG. 155

Detailed Route Volume

Route Number: 01008 ▷    [Display]

| Source | AM Dispatch | Time | Scheduled | Letter (Pcs) | Flats (Pcs) | Seq Ltrs. (Sets) | Seq Flts. (Sets) | Parcels | Dps (Pcs) | Caseable Auto-Ltrs | Caseable Auto-Flats |
|---|---|---|---|---|---|---|---|---|---|---|---|
| Roll-in | Y |  24:00 |   | 20 | 104 | 0 | 0 | 0 | 0 | 0 | 0 |
| Trip 1 | Y | 3:50 | Y | 0 | 0 | 0 | 0 | 0 | 400 | 245 | 52 |
| Trip 2 | Y | 4:30 | Y | 0 | 0 | 0 | 0 | 0 | 0 | 0 | 0 |
| Withdrawl | Y | 6:50 |   | 50 | 564 | 0 | 0 | 0 | 0 | 0 | 0 |
| Withdrawl | N | 10:30 |   | 25 | 305 | 0 | 0 | 0 | 0 | 0 | 0 |
| Trip 3 | N | 12:30 | Y | 75 | 0 | 0 | 0 | 0 | 0 | 0 | 0 |
| Totals |  |  |  | 170 | 973 | 0 | 0 | 0 | 400 | 245 | 52 |

[Print]    [Save]    [Cancel]

Capture Daily Dispatch Information                    ☒

Date: 03/15/2004

Units: Pieces

[Display]

Dispatch Trips

| Trip | AM Dispatch | Time | LTRS. (pcs) | Caseable Auto Letters | Caseable Auto Flats | Unit Dist Ltrs | Unit Dist Flats | Unit Dist Parcels |
|---|---|---|---|---|---|---|---|---|
| 1 | Y | 3:50 | 0 | 20,032 | 7,845 | 5,974 | 500 | 20 |
| 2 | Y | 4:30 | 60,683 | 0 | 0 | 7,890 | 287 | 15 |
| 3 | N | 6:50 | 0 | 0 | 0 | 10,895 | 849 | 2 |
| Totals: | | | 60,683 | 20,032 | 7,845 | 24,759 | 1,636 | 37 |

DPS volume arrived on Dispatch: 2

Caseable Automated Letters Arrived on Dispatch: 1

Caseable Automated Flats Arrived on Dispatch: 1

[Record Dispatch Trip]

[Remove Dispatch Trip]

[Save]  [Cancel]

FIG. 156

Record Dispatch Trip                    ☒

Dispatch Trip Details

AM Dispatch: YES    Trip: 4    Arrival Time: 13:30

Unit Distribution

Units: Feet

Letters: [    ]

Flats: [    ]

Parcels: [    ]

[Save]  [Close]

FIG. 157

UNIT DISTRIBUTION VOLUME FEEDBACK REPORT
Delivery Unit: 1234501
Begin Date: 02/07/2004
End Date: 02/13/2004
Service Week: 05

RESTRICTED INFORMATION

| Day | Trip | AM? | Arrival Time | | | Unit Distribution % | | | Unit Distribution Volume | | | Automated | | |
|---|---|---|---|---|---|---|---|---|---|---|---|---|---|---|
| | | | Schd. | Actual | Var. | Schd. | Actual | Var. | Letters | Flats | Parcels | DPS | LTRS | FLTS |
| Saturday 02/07/04 | 1 | Y | 3:30 | 3:50 | 0:20 | 85% | 72% | 13% | 6,743 | 234 | 23 | 0 | 20,032 | 7,845 |
| | 2 | Y | 4:40 | 4:30 | 0:10 | 15% | 28% | -13% | 2,335 | 400 | 23 | 65,642 | 0 | 0 |
| | Total: | | | | | | | | 9,078 | 634 | 46 | 65,642 | 20,032 | 7,845 |
| Sunday 02/08/04 | 1 | Y | 3:50 | 3:30 | 0:20 | 85% | 100% | -15% | 8,755 | 250 | 45 | 0 | 19,445 | 0 |
| | Total: | | | | | | | | 8,755 | 250 | 45 | 0 | 19,445 | 0 |
| Monday 02/09/04 | 1 | Y | 3:20 | 3:30 | 0:10 | 85% | 44% | 41% | 4,567 | 250 | 34 | 0 | 12,357 | 6,335 |
| | 2 | Y | 4:40 | 4:40 | 0:00 | 15% | 25% | -10% | 2,335 | 400 | 23 | 53,455 | 0 | 0 |
| | Unschd | | | 7:15 | | | 32% | -32% | 3,355 | 150 | 7 | 0 | 0 | 0 |
| | Total: | | | | | | | | 10,257 | 800 | 64 | 53,455 | 12,357 | 6,335 |
| Tuesday 02/10/04 | 1 | Y | 3:30 | 3:30 | 0:00 | 85% | 70% | 15% | 4,567 | 245 | 54 | 0 | 20,032 | 7,845 |
| | 2 | Y | 4:30 | 4:40 | 0:10 | 15% | 30% | -15% | 1,643 | 400 | 63 | 63,683 | 0 | 0 |
| | Total: | | | | | | | | 6,210 | 645 | 117 | 60,683 | 20,032 | 7,845 |
| Wednesday 02/11/04 | 1 | Y | 4:00 | 3:30 | 0:30 | 85% | 55% | 30% | 4,557 | 245 | 23 | 0 | 18,535 | 5,432 |
| | 2 | Y | 4:30 | 4:40 | 0:10 | 15% | 45% | -30% | 3,578 | 400 | 21 | 45,632 | 0 | 0 |
| | Total: | | | | | | | | 8,145 | 645 | 44 | 45,632 | 18,535 | 5,432 |
| Thursday 02/12/04 | 1 | Y | 4:00 | 3:30 | 0:30 | 85% | 55% | 30% | 4,567 | 245 | 12 | 0 | 18,535 | 5,432 |
| | 2 | Y | 4:30 | 4:40 | 0:10 | 15% | 45% | -30% | 3,578 | 400 | 4 | 45,632 | 0 | 0 |
| | Total: | | | | | | | | 8,145 | 645 | 16 | 45,632 | 18,535 | 5,432 |
| Friday 02/13/04 | 1 | Y | 4:00 | 3:30 | 0:30 | 85% | 55% | 30% | 4,567 | 245 | 65 | 0 | 18,535 | 5,432 |
| | 2 | Y | 4:30 | 4:40 | 0:10 | 15% | 45% | -30% | 3,578 | 400 | 2 | 45,632 | 0 | 0 |
| | Total: | | | | | | | | 8,145 | 645 | 67 | 45,632 | 18,535 | 5,432 |

| Weekly Totals | |
|---|---|
| Unit Distribution Letters: | 28,735 |
| Unit Distribution Flats: | 4,264 |
| Unit Distribution Parcels: | 399 |
| DPS: | 315,676 |
| Automated Caseable Letters: | 127,471 |
| Automated Caseable Flats: | 38,321 |

GENERATED BY: SETH
MAIN OFFICE 1234501

UNIT VOLUME FEEDBACK REPORT
Delivery Unit: 1234501
Begin Date: 02/07/2004
End Date: 02/13/2004
Service Week: 06

RESTRICTED INFORMATION

| Route # | Scheduled Start Time | | Sat. 02/07/2004 | | | | Mon. 02/09/2004 | | | | Tues. 02/10/2004 | | | | Wed. 02/11/2004 | | | | Thu. 02/12/2004 | | | | Fri. 02/13/2004 | | | |
|---|---|---|---|---|---|---|---|---|---|---|---|---|---|---|---|---|---|---|---|---|---|---|---|---|---|---|
| | Sat. | Mon.-Fri. | 80% Time | Actual % | 100% Flats Time | | 80% Time | Actual % | 100% Flats Time | | 80% Time | Actual % | 100% Flats Time | | 80% Time | Actual % | 100% Flats Time | | 80% Time | Actual % | 100% Flats Time | | 80% Time | Actual % | 100% Flats Time | |
| 01001 | 7:30 | 7:30 | 8:15 | 86 | 9:00 | | 8:15 | 89 | 9:30 | | 8:15 | 83 | 9:50 | | 8:15 | 83 | 9:30 | | 8:15 | 88 | 9:10 | | 8:55 | 89 | 9:00 | |
| 01002 | 7:30 | 7:30 | 8:10 | 89 | 9:15 | | 8:15 | 81 | 9:50 | | 8:15 | 86 | 9:10 | | 8:15 | 86 | 9:50 | | 8:15 | 83 | 9:30 | | 8:15 | 81 | 9:15 | |
| 01003 | 7:30 | 7:30 | 8:00 | 81 | 9:10 | | 8:10 | 93 | 8:30 | | 8:15 | 89 | 9:30 | | 8:15 | 90 | 8:30 | | 8:10 | 86 | 9:50 | | 8:35 | 93 | 9:10 | |
| 01004 | 7:30 | 7:30 | 8:30 | 93 | 9:30 | | 8:00 | 92 | 9:10 | | 8:15 | 81 | 8:30 | | 8:15 | 80 | 9:00 | | 8:00 | 89 | 8:30 | | 8:15 | 80 | 9:30 | |
| 01005 | 7:30 | 7:30 | 8:30 | 83 | 10:10 | | 8:30 | 83 | 9:30 | | 8:15 | 93 | 8:30 | | 8:15 | 89 | 9:15 | | 8:30 | 81 | 9:50 | | 8:25 | 97 | 10:10 | |
| 01006 | 7:30 | 7:30 | 8:15 | 86 | 9:00 | | 8:30 | 86 | 9:50 | | 8:15 | 90 | 8:30 | | 8:15 | 81 | 9:10 | | 8:30 | 93 | 9:10 | | 8:15 | 90 | 8:30 | |
| 01007 | 7:30 | 7:30 | 8:15 | 90 | 8:45 | | 8:15 | 90 | 8:30 | | 8:10 | 80 | 9:55 | | 8:15 | 93 | 9:30 | | 8:15 | 90 | 9:00 | | 8:15 | 80 | 8:30 | |
| 01008 | 7:30 | 7:30 | 7:30 | 80 | 8:00 | | 8:15 | 80 | 9:50 | | 8:00 | 89 | 10:00 | | 8:10 | 88 | 10:10 | | 8:15 | 80 | 9:15 | | 8:10 | 89 | 9:55 | |
| 01009 | 7:30 | 7:30 | 7:30 | 100 | 7:30 | | 7:30 | 97 | 9:10 | | 8:30 | 81 | 9:15 | | 8:30 | 87 | 9:00 | | 7:30 | 89 | 9:10 | | 8:00 | 81 | 9:00 | |

| Delivery Unit Average | Average Start Time | | Sat. 02/07/2004 | | | Mon. 02/09/2004 | | | Tues. 02/10/2004 | | | Wed. 02/11/2004 | | | Thu. 02/12/2004 | | | Fri. 02/13/2004 | | |
|---|---|---|---|---|---|---|---|---|---|---|---|---|---|---|---|---|---|---|---|---|
| | Sat. | Mon.-Fri. | 80% Time | 100% Flats Time | | 80% Time | 100% Flats Time | | 80% Time | 100% Flats Time | | 80% Time | 100% Flats Time | | 80% Time | 100% Flats Time | | 80% Time | 100% Flats Time | |
| 1234501 | 7:30 | 7:30 | 8:06 | 7 | 8:55 | 8 | 8:11 | 8 | 9:18 | 9 | 8:14 | 9 | 9:23 | 9 | 8:12 | 9 | 9:19 | 9 | 8:11 | 8 | 9:16 | 9 | 8:20 | 9 | 9:13 | 9 |
| Non-Compliance Totals: | | | | | | | 1 | | | | 0 | | | | 0 | | | | 2 | | | | 3 | | | |
| Unscheduled Trips: | | | | 1 | | | 2 | | | | 1 | | | | 0 | | | | 2 | | | | 4 | | | |
| Trips Late by > 15 Min: | | | | | | | | | | | | | | | | | | | | | | | | | | |

4/9/2004 10:08AM

GENERATED BY: SETH
MAIN OFFICE, 1234501

*FIG. 159*

RESTRICTED INFORMATION

ROUTE DETAIL VOLUME FEEDBACK REPORT
Delivery Unit: 1234501
Route Number: 01008
Scheduled Start Time: Sat. 7:30    Mon.-Fri 7:30
Service Date: 02/07/2004
Service Week: 06

AM

| Source | Time | Letter (Pcs) | Flats (Pcs) | Seq. Ltrs. (Sets) | Seq. Flts. (Sets) | Parcels | DPS (Pcs) | Caseable Automated Letters | Caseable Automated Flats | % Available Caseable Mail | % Available Caseable Flats |
|---|---|---|---|---|---|---|---|---|---|---|---|
| Roll-in | - | 20 | 104 | 0 | 0 | 0 | 0 | 0 | 0 | 8% | 12% |
| Trip 1 | 3:50 | 0 | 0 | 0 | 0 | 0 | 400 | 625 | 0 | 47% | 12% |
| Trip 2 | 4:30 | 0 | 0 | 0 | 0 | 0 | 0 | 0 | 54 | 50% | 18% |
| Withdrawal | 4:40 | 58 | 421 | 0 | 0 | 0 | 0 | 0 | 0 | 80% | 66% |
| Withdrawal | 6:50 | 25 | 300 | 0 | 0 | 0 | 0 | 0 | 0 | 100% | 100% |
| AM Totals: | | 103 | 825 | 0 | 0 | 0 | 400 | 625 | 54 | | |

80% Caseable Mail available at: 4:40
100% Caseable Flats available at: 6:50

PM

| Source | Time | Letter (Pcs) | Flats (Pcs) | Seq. Ltrs. (Sets) | Seq. Flts. (Sets) | Parcels | DPS (Pcs) | Caseable Automated Letters | Caseable Automated Flats |
|---|---|---|---|---|---|---|---|---|---|
| Roll-in | - | 25 | 10 | 0 | 0 | | | | |
| Withdrawal | 14:15 | 50 | 0 | 300 | 60 | | | | |
| Withdrawal | 16:30 | 255 | 10 | 0 | 0 | | | | |
| Withdrawal | 16:40 | 25 | 5 | 0 | 0 | | | | |
| PM Totals: | | 355 | 25 | 300 | 60 | | | | |

| | Letter (Pcs) | Flats (Pcs) | | | Parcels | DPS (Pcs) | Caseable Automated Letters | Caseable Automated Flats |
|---|---|---|---|---|---|---|---|---|
| DAILY TOTALS: | 850 | 300 | 0 | | 400 | 625 | 354 | 60 |

FIG. 160

3/29/2004 4:16PM
GENERATED BY: SETH
MAIN OFFICE, 1234501

Route Details

Route: 20001

Workload Management

- ☐ Accountables Over Base
- ☐ Collating
- ☐ Full Coverage
- ☑ Growth
- ☑ Parcels Over Base Variable Projections
- ☐ AM Ofc
- ☑ Street
- ☐ PM Office Mail Volume
- Curtail Mail
- Delay Mail

| Description | Time | Category | Comment |
|---|---|---|---|
| Standard AM Ofc | 2:50 | AM Ofc | |
| Standard Street | 5:30 | Street | |
| Variable Street | 0:30 | Street | Construction Deviation |
| Growth | 0:10 | Street | |
| Parcels Over Base | 0:10 | Street | |
| Standard PM Ofc | 0:20 | PM Ofc | |

Total Projected Time: 9:30    [Adjust Proj]

Assignments

| Asgn | Carrier | AM Ofc | Street | PM Ofc | OT |
|---|---|---|---|---|---|
| Primary | Davis, JE | 1:30 | 6:20 | 0:20 | 0:10 |
| Ofc Aux | Phelps, B | 0:30 | 0:00 | 0:00 | 0:00 |

[Assign] [Remove]

Approved Carrier OT: 0:10

3996 Tracking

Requested Time: 2:00    ☐ Disapproved
Approved Route Time: 1:30

[Help]  [Save]  [Cancel]

*FIG. 161*

Route Projection Adjustment

Description: Variable Street
Category: Street
DOIS Projection: 0:00
User Adjustment: 0:00      Comment: Construction Deviation
Approved Projection: 0:30

[Help]        [OK]  [Cancel]

FIG. 162

Assignment Details

Route                20001
Assignment Type    Office ▽

[Help]  [OK]  [Cancel]

FIG. 163

Assignment Details

Route                20001
Assignment Type    AM Ofc Aux
Duration Hrs        1:20

[Help]  [OK]  [Cancel]

Unit Projection Adjustment Set-up

Standard Projection Increases

Automated Inclusion

| | | |
|---|---|---|
| Accountables Over Base | ☐ | 0:02  Per Seq Set when >= 2 |
| Collecting | ☐ | 0:01 |
| Full Coverage | ☐ | 0:01 |
| Growth | ☐ | |
| Parcels Over Base | ☐ | 0:02  First Full Seq Set |

[Save] [Cancel]

*FIG. 166*

DELIVERY OPERATIONS INFORMATION SYSTEM AND METHODS OF USE

PRIORITY

Under provisions of 35 U.S.C. §119(e), this Application claims the benefit of U.S. Provisional Application No. 60/602,592, filed Aug. 19, 2004, and U.S. Provisional Application No. 60/706,510, filed Aug. 8, 2005, both of which are entitled "Delivery Operations Information System," and both of which are incorporated herein in their entirety by reference.

DESCRIPTION OF THE INVENTION

1. Field of the Invention

The present invention generally relates to the field of tracking quantities of mail for delivery, monitoring their distribution, and scheduling and tracking the work force that distributes the mail. More particularly, the invention relates to a system and method for tracking mail volumes and distribution, and tracking and scheduling a mail carrier work force.

2. Background of the Invention

The United States Postal Service (USPS™) is an independent establishment of the United States government that provides mail delivery and other services to the public. The USPS™ is widely recognized as a safe and reliable means for sending and receiving mail and other items. With the advent and steady growth of electronic commerce, the physical mail stream will increasingly be utilized for sending and receiving packages and other items. Accordingly, providers of delivery service such as the USPS™ will continue to require better systems and methods to meet the increasing demand for faster, more efficient and reliable delivery of mail and other deliverable packages.

Currently, the USPS™ has the enormous task of assigning, and optimizing, delivery routes for hundreds of thousands of mail carriers who daily deliver approximately 617 million pieces of mail to about 141 million delivery points throughout the nation. The previous delivery operations system was challenged by inefficiencies, outdated technology, and compliance with federal mandates and unionized labor rules. For example, some carriers were obligated to work overtime in order to complete their assigned delivery routes, while others were paid for a full eight-hour shift although they could finish their delivery routes in less than eight hours, with time to spare.

A study of existing delivery operations systems used by the USPS™ identified several deficiencies: the existing system was DOS-based, making it difficult for a supervisor to interface with the necessary applications to properly perform the job; disparate legacy systems from the 1980's were redundant and could not effectively communicate; and supervisors and route examiners did not use the same system and so could not effectively share information.

Thus, new methods are needed to maximize on-time and profitable delivery of the mail while complying with federally required mandates and labor contract rules. There is a need for a delivery operation information system that allows a mail carrier supervisor to access, analyze, and act on data in near real time so that the supervisor can make sound business decisions on what needs to be done for that day. In addition, there is a need for a system that provides a supervisor with the ability to analyze operations to identify and address issues in his or her delivery unit, or with individual routes or individual carriers. There is also a need for a system that allows for long-range planning, such as for example a week, a month, or a year, and for a system that allows for a streamlined route inspection and adjustment process to provide current update of critical information to the route assignment process.

SUMMARY OF THE INVENTION

The present invention provides a system for managing information related to a delivery service provider such as the USPS™ and methods of using such a system. The system and methods provided herein allow a delivery service provider to coordinate with efficiency the volume of mail or packages to be delivered with the carrier resources available to deliver them. In accordance with one aspect of the invention, the delivery operation information system tracks quantities of articles, schedules their distribution, and schedules and tracks the work force that distributes the articles. These articles can include, but are not limited to, mail such as letters, flat mail, bulk mail, parcels, and other packages. The terms articles, mail and packages are used interchangeably throughout the specification. It is understood that such terms are intended to include any item that is deliverable by air or surface transportation.

In accordance with an exemplary embodiment of the invention, a method is provided for managing delivery of articles. The method comprises developing a first database that identifies routes for delivery of articles, developing a second database that identifies the volume of articles to be delivered along each route, developing a third database that identifies the total estimated work time for completing any identified routes, developing a fourth database that identifies carriers assigned and assignable to all or portions of the routes, and the availability of the carriers, and providing display screens selectively showing the data from the first, second, third, and fourth databases to permit assignment of the carrier to the routes.

In accordance with another exemplary embodiment of the invention, a system is provided for managing delivery of articles. The system comprises a first database that identifies routes for delivery of articles, a second database that identifies the volume of articles to be delivered along each route, a third database that identifies the total estimated work time for completing any identified routes, and a fourth database that identifies carriers assigned and assignable to all or portions of the routes, and the availability of the carriers. The system also includes a display screen for selectively showing data from the first, second, third, and fourth databases to permit assignment of the carrier to the routes.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIGS. 9-166 illustrate a series of screen shots of exemplary systems of the present invention.

DETAILED DESCRIPTION

The present invention provides a delivery operations information system for a delivery service provider such as the USPS™ and methods of using such a system. The delivery operations information system (DOIS) and methods provided herein allow a delivery service provider to coordinate with efficiency the volume of mail or packages to be delivered with the carrier resources available to deliver them. For example, DOIS can allow a postal supervisor to glance at a computer screen and see a quick visual snapshot of information, such as for example daily mail volume for individual mail routes, carrier shift schedules, whether a carrier will have spare time in his shift due to the day's mail volume, which carriers have the day off, and which carrier has requested overtime. Based on this information, the system can provide an accurate and reliable automated method for matching up mail loads with available carriers. Accordingly, DOIS can serve as a high-tech matchmaking service, using data to match up workload with available carriers rather than guesswork. By managing capacity and demand, use of DOIS can result in improved resource allocation, lower labor costs, and improved reliability and higher quality mail service.

The delivery operations information system of the present invention comprises a software application that combines client/server technology with highly integrated applications, including one or more software components, a central repository, a graphical user interface, and a standard platform that can scale with changing demands. The mainframe back-end captures large amounts of information about mail volume, delivery routes and inspections, carrier schedules, time and attendance, and budget. DOIS provides a software application that feeds data from multiple sources into the central repository, so that users of the system such as managers or supervisors can quickly view critical data, such as for example the amount of mail scheduled to arrive at a facility, and adjust carrier workloads to meet the demand.

Figure 1:
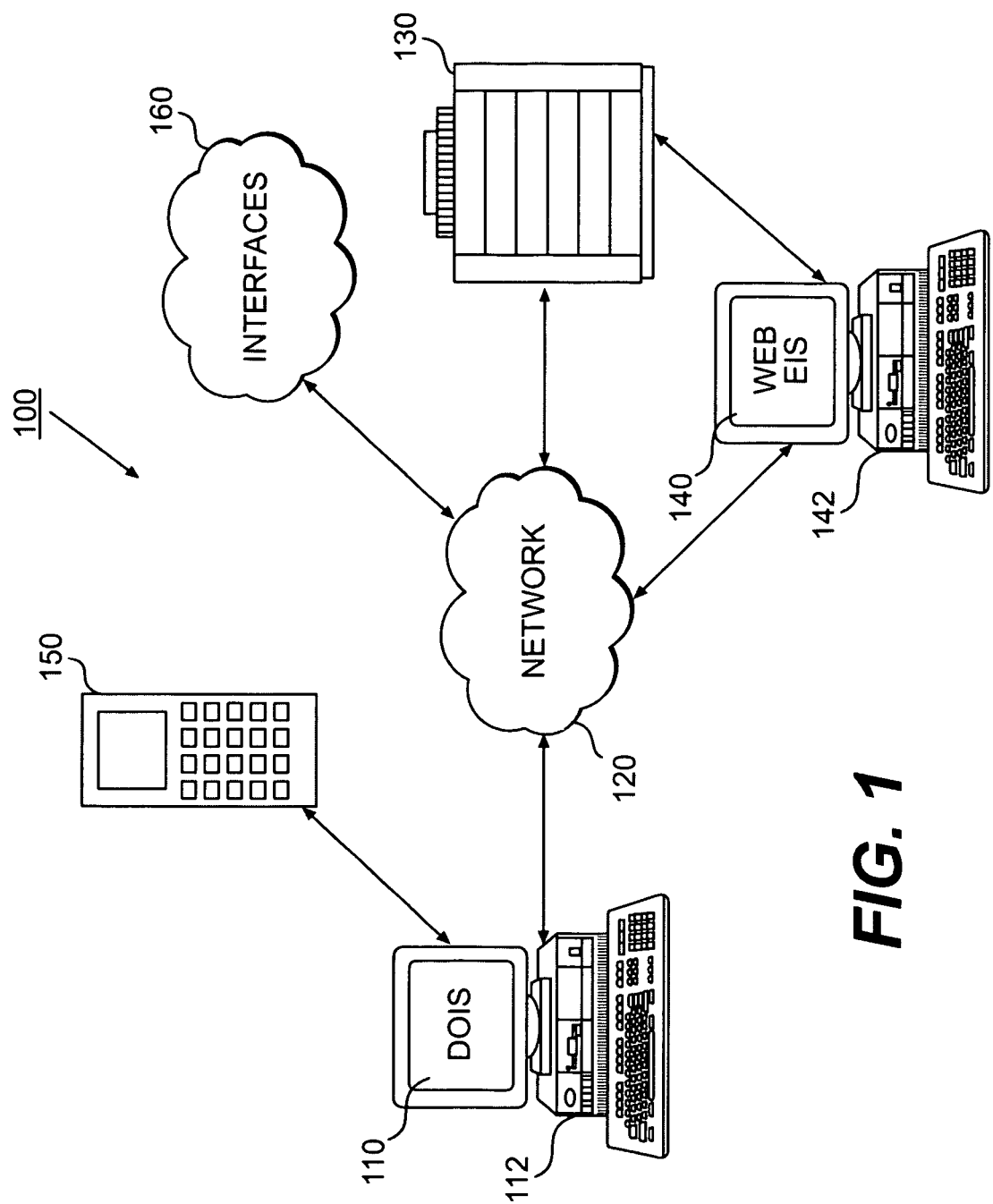
FIG. 1 illustrates a diagram of an exemplary embodiment of a delivery operations information system of the present invention.

FIG. 1 illustrates an exemplary embodiment of a delivery operations information system (DOIS) 100 of the present invention. The DOIS application 110 may run on a delivery unit computer or workstation 112 as shown, which can be connected to a network 120 for sharing data with a mainframe 130. The network can be a local area network (LAN) or a wide area network (WAN), such as for example a Postal Routed Network (PRN) or a Managed Network Services (MNS) of the USPS™. The mainframe 130 can be used to store data and can communicate with a web-based server 140, such as for example Web Enterprise Information System (WebEIS) of the USPS™, that can be run from a manager's computer 142. The mainframe 130 can communicate either directly with the web-based server 140 or through the network 120. Data may be collected and transferred between the DOIS application 110 and a data collection device (DCD) 150, as shown. Further, the network 120 may also interact with one or more database interfaces 160. Exemplary databases useful for interfacing with the present system include, for example, Address Management System (AMS), National Budget System (NBS), Time and Attendance Collection System (TACS), and Web End of Run (WebEOR) of the USPS™. It is understood, of course, that FIG. 1 merely illustrates an example of the technical architecture of the present invention.

In one embodiment of the invention, the delivery operation information system 100 can be a client-server software application, with data being stored on one or more of a client or a mainframe. The client(s) and mainframe(s) of the system can be connected via a local area network or a wide area network, as previously described. It is understood, of course, that data may be transferred in both directions. For example, a database of route records may be maintained on the mainframe 130, and a workstation user can transfer route data between the mainframe 130 and the workstation 112.

The client can be, in one embodiment, a Windows-based PC or laptop and further can be located in the delivery unit. A user may have his own PC, or a number of users may share a PC. As illustrated in FIG. 1, the PC can receive data from the data collection device 150 either via a wireless connection or a physical connection. The PC in one embodiment can have about 128 mB of RAM. The mainframe 130 can be in one embodiment IBM or Amdahyls (e.g., AMDHL 2000 Model 2128E, and AMDHL 2000 Model 2158E). A middleware, for example Shadow (NEON Systems Inc.), may run on the mainframe 130, allowing the mainframe 130 to act as a server. It is to be understood that this description of the architecture of the system is exemplary. Those skilled in the art would understand that other suitable architectures could also be used, such as servers replacing the NEON middleware product.

A separate version of a DOIS application 110 may be provided by the present invention for use with a laptop computer. The laptop version may include many of the same features, but is not as comprehensive. Certain functions, therefore, may be left out of the laptop version.

The system 100 described herein, in one embodiment, can allow connectivity to other applications, such as for example Form Flow software or Microsoft Excel. In another embodiment, the system can allow connectivity to other databases, such as for example legacy postal service databases. Further, it is understood that the present software application can work with utilities other than those already mentioned, and that the DOIS software application may include one or more additional software components for implementing the following management functions.

As illustrated in FIG. 1, the system 100 may also allow connectivity to a data collection device (DCD) 150, and may, in one embodiment, provide instructions as to how to configure the DCD for different functions such as, for example, a route inspection, mail volume recording, or street management. A DCD may be used, for example, in counting mail, tracking mail, and tracking the movements of carriers.

In one aspect of the embodiment, DOIS can comprise a web page that can be viewed online and allow users to view the system status. For example, the web page may inform the user of the system's availability, and whether the system is fully functional, slow, or unavailable. This can be achieved, for example, by tracking the length of time it takes for DOIS to return a communication sent from the web page. The system's availability may be indicated, for example, by an easily viewable symbol such as a traffic light having a signal that is green when the system is fully functional, yellow when the system is slow, and red when the system is unavailable. The system status can be updated by refreshing the web page.

In another aspect, the DOIS website can provide additional online support for the user, such as for example a "Tip of the Day," or the ability to reset system passwords or view certain information online. In yet another aspect, each of the system's windows can include a help button. The help button is window-sensitive and includes extensive online help, including a brief description of the purpose of the window.

Turning now to methods for using DOIS, a user of the delivery operations information system may be, for example, a mail carrier ("carrier"), a delivery unit supervisor, a system administrator, a district, area or national manager. Each user can be assigned a profile and a unique identifier or username, and must log on with a password, which may be changed, to the secure system of the present invention in order to gain access to the delivery operations information system 100. In an exemplary embodiment, only authorized users may access the system 100. The system 100 may recognize and allow access, for example, only to those users whose profiles have been stored in the system.

In one embodiment, a user may only have access to limited information and/or operations of the system 100. For example, a delivery unit supervisor may assign a carrier to a delivery route in his or her district, or may modify a delivery route in that district, but may not assign a carrier to a delivery route outside that district or modify a delivery route outside that district. In some embodiments, only a local or district manager may modify a delivery route in any particular district. Thus, the system 100 may be configured to allow selective users access to some, but not all of the functions of the system 100.

With the system 100 of the present invention, a system administrator or another authorized user may maintain user profiles, district organizations, and 52-day implementation plans (i.e., calendars of events that must take place in order to meet contractual requirements). For example, a user may add an activity to a 52-day plan. A system administrator or other authorized user may view the profiles of other users, including, for a given ID and user name, the user's primary delivery unit and class (e.g., supervisor, manager, system administrator, etc.). The system administrator or other authorized user may also create a new profile for a user or a new user class (e.g., supervisor, manager, route inspector, etc.) and the delivery unit for that particular user class.

A system administrator or another authorized user may further use the DOIS 100 to view a district organization as a tree format, edit, reassign, delete, and/or add to the district, its facilities, and its management areas. A system administrator or other authorized user may also add a new post office operation area or a new installation (e.g., an individual building or multiple facilities), and may assign a finance number, city, and state to the new installation. A system administrator or other authorized user may also add a new delivery unit. A system administrator or other authorized user may also assign an existing ZIP code™ to that district.

Figure 2:
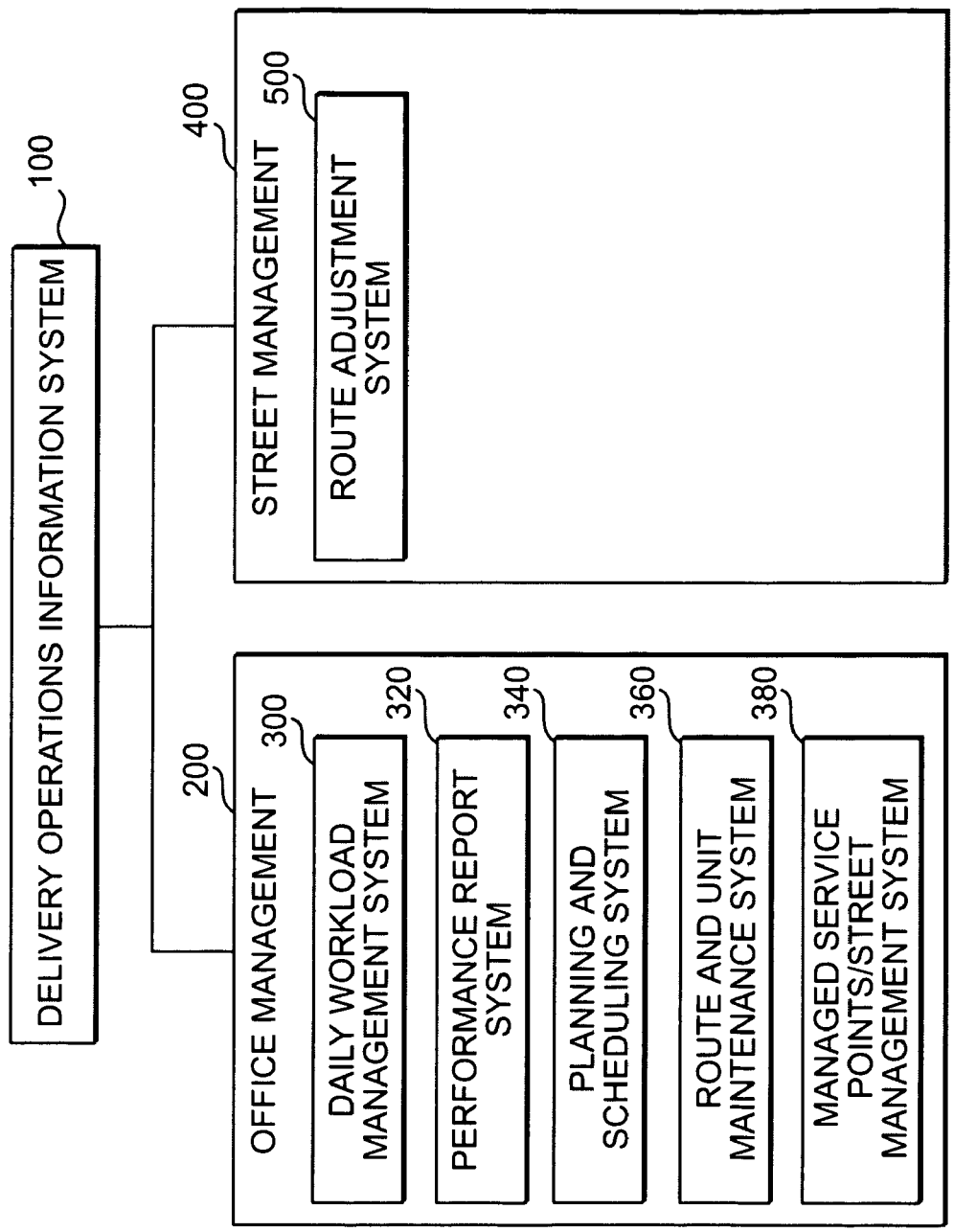
FIG. 2 illustrates a diagram of particular subcomponents of a delivery operations information system of the present invention.

As shown in FIG. 2, the delivery operations information system 100 of the present invention comprises two basic operational units: office management 200 and street management 400. Office management 200 can include several functions such as a daily workload management system 300, a performance reports system 320, a planning and scheduling system 340, a route and unit maintenance system 360, and a managed service points and street management system 380. Street operations 400 can include functions such as a route adjustment system 500.

In general, DOIS can include a database comprising information regarding individual carriers, delivery units, routes, and mail volumes. An individual user of DOIS, or of the daily workload management system, performance reports system, planning and scheduling system, route and unit maintenance system, managed service points and street management system, or route adjustment system, may have access to some or all of this information.

For each carrier the DOIS database can include the carrier's status (e.g., regular carrier, part-time carrier, transitional employee (TE) carrier, casual carrier, utility carrier, or substitute carrier), the carrier's assigned route (or whether the carrier is currently unassigned) and the date the carrier was assigned to that route, the hours worked to date by that carrier and whether the carrier is on an overtime desired list (OTDL), the carrier's delivery unit, and the carrier's prior performance reports. The database can also provide for each carrier the number of days the carrier has physically worked on a particular route, the last day the carrier worked a particular route, the days the carrier worked on a particular route in the office, and the last day the carrier worked on a particular route on the street.

The overtime desired list can comprise a list of carriers desiring overtime. In one embodiment, the OTDL can include the identities of the carriers on the list, as well as a record of overtime offered to each carrier on the OTDL, overtime worked by each carrier on the OTDL, and overtime refused by each carrier on the OTDL, including any reasons for refusal of overtime.

For each route, the DOIS database can include information, such as for example the route (e.g., the path traveled, and whether the route is a full or auxiliary route), the overall time for the route (and whether the route is over or under eight hours on a given day, based on the calculated workload), the travel time for the route, the route type (e.g., combination, collection, or relay), the route environment (e.g., residential, business, or mixed), the type of delivery (e.g., foot, dismount, curb line motorized, park and loop, etc.), the clock rings (e.g., reporting time, leave time, return time, end time), previous inspections (e.g., date(s) of previous inspections, findings of previous inspections), the projected mail volume for one or more delivery times per day (e.g., a morning delivery and an afternoon or evening delivery), whether mail is delivered to that route on particular days (e.g., weekends, Saturdays, Sundays, holidays), the fixed office time for the route, the managed service points for the route, the non-delivery points for the route (e.g., park points, relay points, collection boxes), and the carrier assigned to the route.

For each delivery unit, the DOIS database can include information, such as for example the carriers assigned to the delivery unit, the routes serviced by the delivery unit, and the supervisor of the delivery unit.

DOIS can also include information such as the projected or actual mail volume, optionally by route, for a particular day, week, month, or year. It is understood that the term mail may include, for example, letters, magazines, postcards, or parcels, and may be shipped by, for example, air or surface. Mail volume may be measured by individual pieces or in linear measurements. For instance, mail volume data may be collected by scanning individual pieces of mail and maintaining a count of the pieces. Alternately, stacked mail may be measured using a ruler or yardstick. With DOIS, a user may view the mail volume by category such as, for example, first class letter mail, first class flat mail, parcels, etc, and may view running totals.

DOIS can also provide advance notice of the amount of mail a sorting facility will be sending to a delivery unit. This advance notice would allow the delivery unit to plan ahead for incoming mail volume. In situations where mail is received by individual offices such as for example post offices or courier offices, from a central sorting facility, a user may record the amount of mail that comes in for each delivery from the sorting facility, and the time of the delivery so as to track inflow of mail. In one embodiment, a user may modify a mail volume value from a projected mail volume value to a measured mail volume value after mail is received from a central sorting facility. The system 100, in one embodiment, can allow a user to capture mail volumes manually or by uploading data stored in a DCD 150. For example, a carrier may use a DCD 150 to enter the mail volume by route as he or she counts the amount of mail to be delivered for that route for that day.

DOIS can further provide a list of route vacancies, which occur when a route is not covered by an individual carrier, including planned vacancies and vacancies that occur on a particular day as a result of a call-in (i.e., a carrier announces an unscheduled absence). A DOIS user may create a vacancy by documenting a carrier's leave request, and may record whether the leave is, for example, sick leave or annual leave, and whether a full or partial day of leave is requested. For a partial day, the user may further record the number of hours of leave taken. The user may also identify a date range for a carrier's multi-day leave. In one embodiment, the system may print an appropriate leave form automatically upon saving vacancy information.

While in DOIS, a user may change the information retrieved from one delivery unit to another, or one delivery facility to another, without logging out of the system. DOIS can also serve as a message broadcasting system. For instance, a national manager may be able to place a message onto the system so that users will receive a notification on the screen after logging into the system. In one embodiment, DOIS can provide online forms for work-related accidents, or include applications for mail holding and parcel redelivery.

DOIS can provide a method for managing delivery of articles by developing a first database that identifies routes for delivery of articles, developing a second database that identifies the volume of articles to be delivered along each route, developing a third database that identifies the total estimated work time for completing any identified routes, developing a fourth database that identifies carriers assigned and assignable to all or portions of the routes, and the availability of the carriers, and providing display screens selectively showing the data from the first, second, third, and fourth databases to permit assignment of the carrier to the routes.

Also provided is a system for managing delivery of articles comprising a first database that identifies routes for delivery of articles, a second database that identifies the volume of articles to be delivered along each route, a third database that identifies the total estimated work time for completing any identified routes, and a fourth database that identifies carriers assigned and assignable to all or portions of the routes, and the availability of the carriers. The system also includes a display screen for selectively showing data from the first, second, third, and fourth databases to permit assignment of the carrier to the routes.

Figure 147:
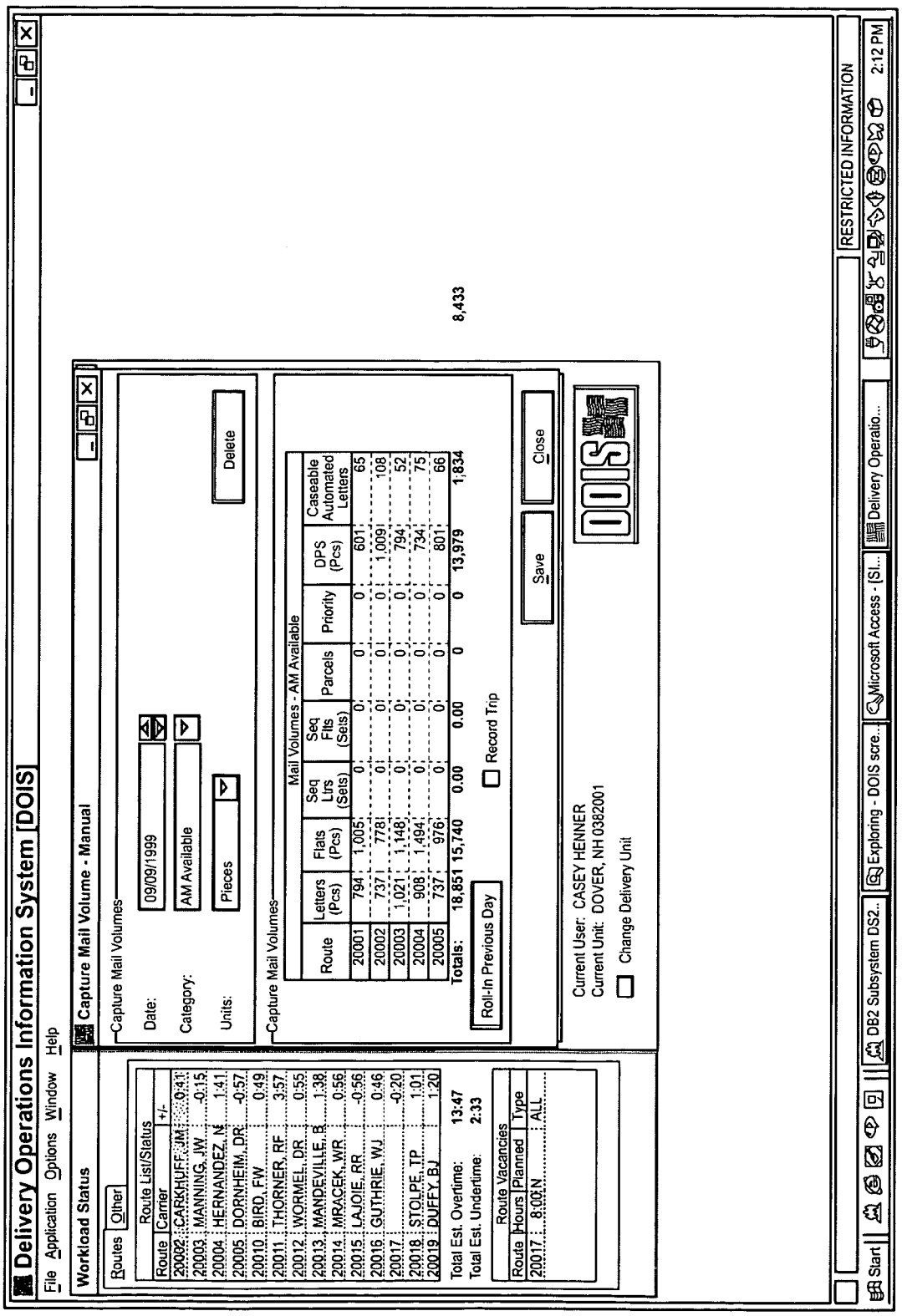

As described, DOIS can provide a user with the ability to view multiple display screens or windows at the same time, so that a user can analyze data from different information databases to formulate a business decision. For example, as shown in FIG. 147, a user can view a Workload Status window alongside a Capture Mail Volume-AM Window to determine which carriers do not have a full day's worth of work based on the mail volume for that route to which the carrier is assigned. The user can also view the availability of the carrier, and from this information assign carriers to routes, or portions of routes, balancing the assignments in order to meet the mail volume demand and satisfy the work capacity of the carriers. For instance, a user can assign a route or segment of a route to a carrier who is in proximity to that route or segment, in order to help balance out the workload.

Particular features of the office management 200 and street management 300 functions of DOIS are discussed in greater detail below.

Daily Workload Management System

Figure 3:
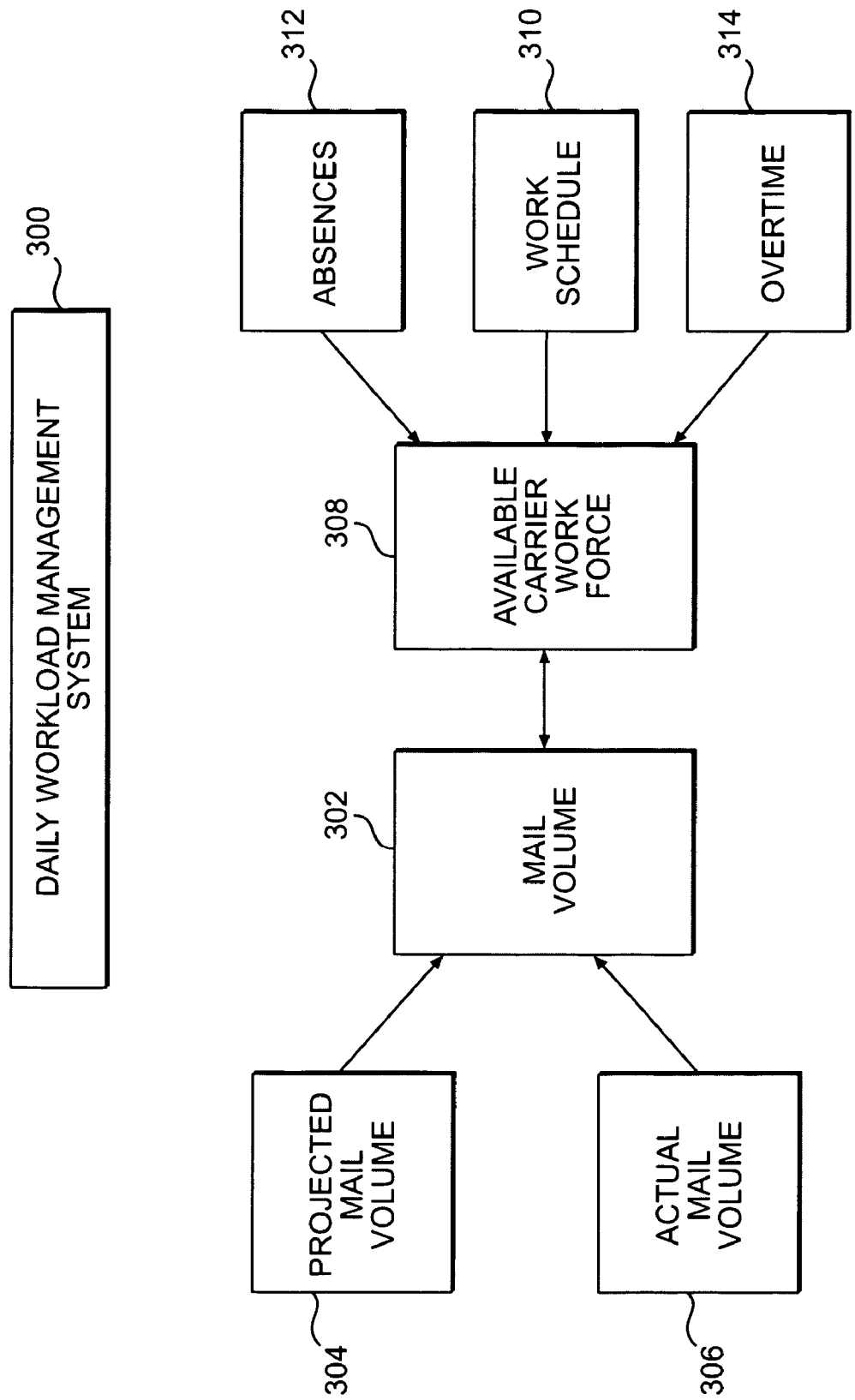
FIG. 3 illustrates a diagram of an exemplary embodiment of a daily management workload system of the present invention.

As shown in FIG. 2, the delivery operations information system 100 of the present invention can include two main functional components: an office management module 200 and a street management module 400. Within the office management module 200, a daily workload management system 300 can be provided. As depicted in FIG. 3, the daily workload management system 300 can provide a mechanism for coordinating mail volume 302 with a carrier work force 308. In general, the mail volume 302 can comprise data for projected mail volume 304 as well as actual mail volume 306. Factors such as, for example, a carrier's expected work schedule 310, expected and unexpected absences 312, and number of carriers requesting overtime 314 may be included in assessing the available carrier work force 308.

In an exemplary embodiment, the daily workload management system 300 can allow a user to view, enter, or modify one or more carriers, delivery units, routes, and absences for a particular date. A user may also view, enter, or modify the projected or actual mail volume for a particular date. This date may be the current date, the previous day, the following day or, for example, any day of the following week, month, or year.

With the daily workload management system 300, a user may also adjust a carrier's start or end time in the event of, for example, a supervisor's service or safety talk with the carrier. For example, if a supervisor spends twenty minutes giving a talk, the carrier's route time may be adjusted by twenty minutes. In one embodiment, a user may adjust a carrier's route time in the event of a deviation from a planned route due to, for example, construction along that route. A user may also adjust a carrier's schedule if that carrier starts earlier or later than planned. In one embodiment, a user may input time added to a carrier's original route when the carrier is providing assistance to another route. Thus, a user may change a carriers' begin time for a given day, as well as a carrier's regular scheduled start time.

The daily workload management system 300 may also allow a user to view, enter, or modify the projected or actual mail volume for a particular route. The mail volume for a particular route may be projected based on historical data (e.g., mail volumes recorded the previous day, week, month, or year, or, for example, an average of the mail volume recorded for that day in, for example, the previous years).

A user may also use the daily workload management system 300 to compare actual mail volume to projected mail volume, or mail volume from a previous historical period such as the same period last year (SPLY). The SPLY function of the daily workload management system 300 can permit the user to assess the effect of anomalies, such as those due to Weather conditions (e.g., a heavy snowstorm) or unusual traffic congestion, and to plan the workload for the future. In one aspect of the system 300, a user may "roll in" undelivered mail from an earlier period, such as for example the previous day or earlier in the same day. In another aspect of the system 300, a user may record a special event, such as for example a heavy snow storm, so that other users viewing data for that day at a later time will be alerted to the special event.

The system 300 can also provide a list of route vacancies, which occur when a route is not covered by an individual carrier, including planned vacancies and vacancies that occur on a particular day as a result of a call-in. A user may use the daily workload management system 300 to manage workload by, for example, creating a vacancy by documenting a carrier's leave request. A user may also choose a carrier's name, for example, using a drop-down list, and then create a vacancy type such as sick leave or annual leave. In some embodiments a user may indicate whether the carrier is taking a full or partial day of leave and, for a partial day, may further record the number of hours of leave taken. A user may also identify a date range for a carrier's multi-day leave. In some embodiments, the system 300 may print an appropriate leave form automatically upon saving vacancy information.

A user may then use the daily workload management system 300 to assign assistance from scheduled and unscheduled carriers. For example, a user may specify the duration of the assistance, as well as whether the assistance will apply to an entire route or only to a portion of the route. A user may request assistance from an unscheduled carrier if such assistance is needed, for example, to cover a full route. A user can also view the total overtime and under time for the total of the delivery unit's routes, and can reassign workload so that the total overtime and total under time equal, or approach, zero.

In one embodiment, a user may view a summary of a particular carrier's assignment for the day, including the route the carrier is assigned to, and the carrier's expected total work time for the daily assignment. The daily workload management system 300 may also allow a user to generate a report of a carrier's performance, including, for example, work hours over a period of time, and any difference from the hours expected.

With the daily workload management system 300, a user may also generate a workload status report which may provide information for one, some, or all of the routes and assignments made for a given day. The report may include the identity of the route, the name of the carrier, the status of the carrier, the type of carrier, the demonstrated performance of the carrier, the volume the carrier has for the day, projections based on the carrier's workload, the carrier's leave time, projections of the carrier's return time, and projections of the carrier's total time for the day. The report may also identify deviations from expected data, and may provide a comparison to historical values.

The daily workload management system 300 also can allow a user to view and/or edit details of regular and city routes, including, for example, the base route information, including office time, street time, how many deliveries the carrier has, the carrier's begin time, leave time, and return time. These routes may be, for example, combination routes, collection routes, and relay routes. The user may also divide a route up into smaller segments (e.g., by time or distance) that can be given to other carriers for delivery. The user may view or modify delivery instructions, or a form specifying delivery instructions, as described above.

A user may also produce a report displaying the carrier's revised route with the daily workload management system 300. Such a report may be printed either by carrier or by route for a given date. It is understood that the report may be printed with or without route times.

With the daily workload management system 300 of the present invention, a user may elect to "pivot" a route by reassigning a portion of that route. In some embodiments, the system 300 can allow the user to pivot by section (a given street or portion thereof on the route) or duration (the time to deliver the section). The system may also allow the user to pivot the route by business deliveries or residential deliveries.

In some embodiments, the user may choose a pivot option, for example, by section, and then select a number of sections (e.g., one, two, ten, or twenty sections). Alternatively the user may pivot by duration (e.g., one-hour, two-hour, or three-hour increments). In one embodiment, the system 300 may break down the route being pivoted into every delivery, and the mode and method of delivery for all the streets can be broken down into individual sections or logical groups. The system 300 can give the user start and end times, and determine how long it takes to deliver each logical group, the type of delivery (e.g., business or residential), and the delivery method (e.g., mounted or park and loop).

The user may also be able to fill out reports and/or forms with the daily workload management system 300. In one embodiment, a report and/or form may be generated which lists key information about a given route including, for example, the carrier assigned, the replacement carrier, relay points, the number of deliveries on each relay point, park points, where the carrier goes to lunch, and how the carrier travels back and forth to lunch. In another embodiment, a report and/or form may be generated which lists a revised carrier or revised route assignment which may, for example, ensure recipients will get their mail or deliveries at the same approximate time each day.

In one embodiment, a method is provided for daily management of the delivery of articles over routes. The method comprises developing a first database that identifies routes for delivery of articles, developing a second database that identifies the volume of articles to be delivered along each route, and developing a third database that identifies a set of carriers and the carriers' availability and workload capacity, wherein workload capacity comprises a total number of available work hours for that carrier. Next, an estimated work time is determined for completing the identified routes. Display screens are provided to selectively show the data from the first, second, and third databases. A user can then assign carriers to routes, while also determining a variance between the estimated work time for completing the identified routes and the available work hours for the carrier or carriers assigned to each route. If needed, the user can adjust the assignment of carriers such that the variance for each of the route approaches zero.

A system can also be provided for daily management of the delivery of articles over routes. The system can include a first database that identifies routes for delivery of articles, a second database that identifies the volume of articles to be delivered along each route, and a third database that identifies a set of carriers and the carriers' availability and workload capacity, wherein workload capacity comprises a total number of available work hours for that carrier. The system can further include a component for determining an estimated work time for completing the identified routes, a display screen for selectively showing the data from the first, second, and third databases, a component for assigning carriers to routes, and a component for determining a variance between the estimated work time for completing the identified routes and the available work hours for the carrier or carriers assigned to each route, as well as component for adjusting the assignment of carriers such that the variance for each of the routes approaches zero.

In one exemplary method for using the present invention, a supervisor makes an assessment of the mail volume to be delivered on a particular day. The supervisor can then enter this information into the Capture Mail Volume-Manual feature of the system. Next, the supervisor can view the Workload Status window to view the list of carriers that don't have a full day's worth of work, based on mail volume. This status can be indicated by a numerical value, as shown in FIG. 147.

Determination of the estimated work hours for each carrier can be calculated by taking into account several factors. For example, after the mail volume for a particular route has been estimated, a numerical calculation is made to determine the estimated office time for that carrier assigned to that route for that day. The calculation can include rates for letters and rates for flats (i.e., non-letter sized flat pieces of mail such as for example magazines) per minute. For instance, a typical rate can be eighteen letters/minute and 8 flats/minute. These numbers, combined, reflect the sorting time that is allocated to that carrier. Bundle up time can also be included into this total. For instance, a typical bundle up rate of 70 pieces of mail/minute can be applied to the mail volume to determine that carrier's bundle up time. The combined sorting and bundle up time can then be multiplied by a percent to standard factor. This factor reflects a carrier's demonstrated ability, which has been calculated based on previous performance statistics. A normal carrier would have a 100% standard, while a faster carrier would have a lower percentage factor since he would likely be able to do the same amount of work but in less time. The system captures this efficiency and reflects this in the percent to standard factor for that carrier. Fixed office time, such as for collecting signatures from customers and signing for deliveries, as well as other miscellaneous time, can be factored into the carrier's estimated work hours as well.

The system is configured to know how much time it should take to complete any given route. The route time can be a fixed or standard time, based on inspection or by timing each activity. So, after determining a carrier's estimated work hours, it is possible for a supervisor using DOIS to view the route assignments for the day and also see which carriers are over or under their expected work hours based on the estimated work hours calculated for that day. The supervisor can also view the availability of the carriers. Using DOIS, a supervisor can then make assignments so that the total estimated overtime and under time for the carriers approaches zero. That is, the supervisor can make route assignments to carriers so that no carrier is over his expected work hours and no carrier is under his expected work hours for that day.

After the supervisor has made the adjustments, he can advise the carrier of the changes and print out a Workload Status Report that notes what the new assigned routes will be for each carrier. This report would tell the carrier which routes they need to cover for that day.

Performance Reports System

Figure 4:
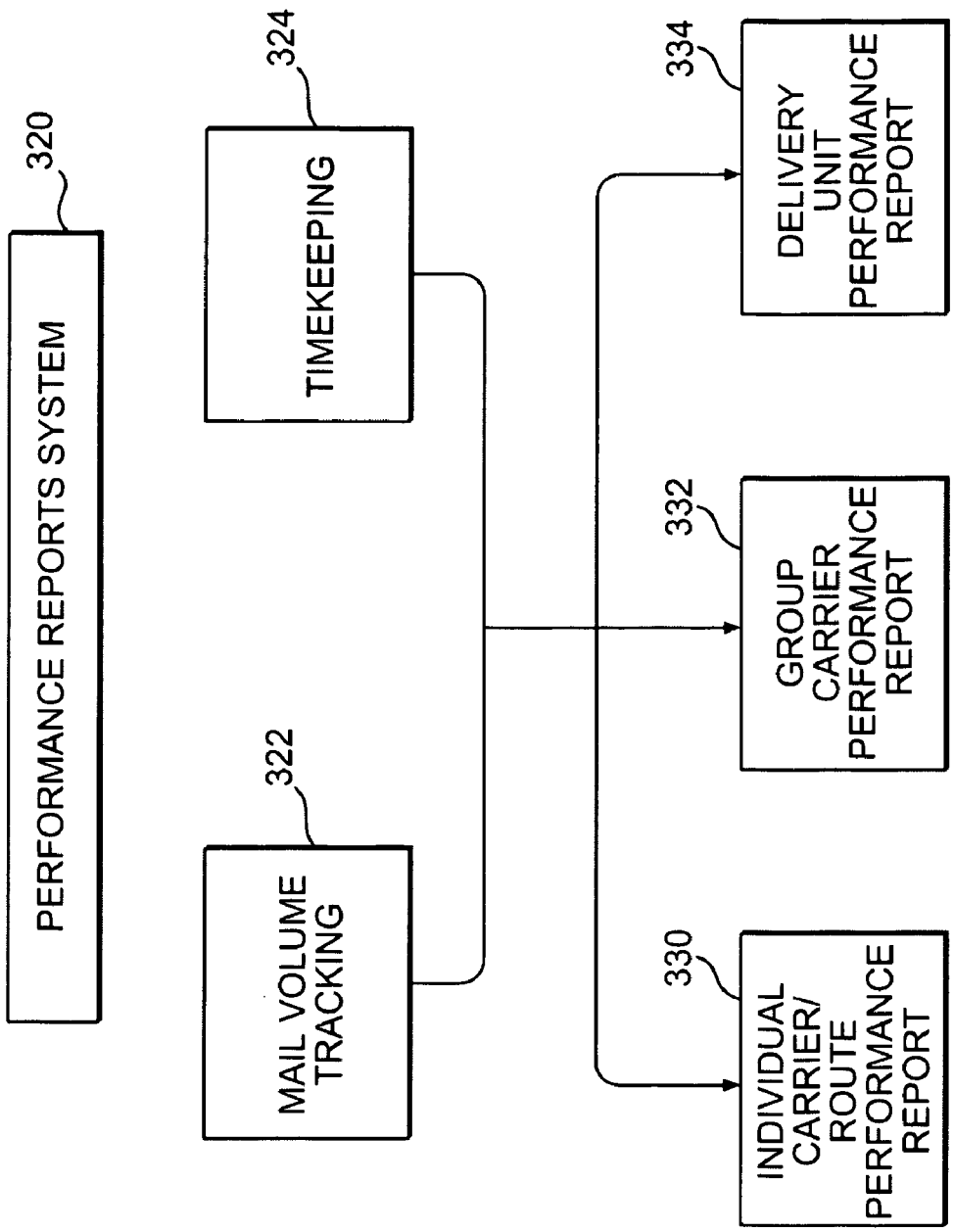
FIG. 4 illustrates a diagram of an exemplary embodiment of a performance reports system of the present invention.

The office management module 200 of DOIS can also include a performance reports system 320. As generally illustrated in FIG. 4, the system 320 can pull together data, such as for example mail volume from a mail volume tracking system 322 and time worked from a timekeeping system 324 to generate a number of reports. The performance reports system 320 can allow a user to, for example, view, generate, or modify individual carrier/route, group, and delivery unit performance reports 330, 332, 334, and to view and edit performance forms. For example, the user may view, generate, or modify, the performance report for a given period of time for a particular carrier, a particular route, a delivery unit, all carriers, regular carriers, substitute carriers, or part-time carriers.

A performance report may typically comprise a graphical representation, such as for example a bar graph or trend graph. The performance reports enable a supervisor or manager to determine how close actual performance is to budgeted or projected performance. The reports also enable a user to determine how close actual performance is to projected performance. Further, it is possible using the reports to compare what happened yesterday with what is happening today. With this information, a user may elect to change one or more aspects of the delivery process to meet or exceed the desired expectations.

The individual and delivery unit performance reports may, for example, reflect performance of an individual carrier or group of carriers over the course of a day, week, month, or year. As used herein, a week may denote a "service week," which runs from Saturday through Friday, or may be defined with the system 320 to include any consecutive set of days. A "month" may denote a calendar month. If the calendar year chosen is not yet complete, the system 320 can provide all of the collected data up to that point in time.

The performance reports system 320 can provide performance reports, including late-leaving/late-returning reports that can be used in conjunction with the time keeping system to determine whether a carrier left on time and returned on time as projected. The system 320 may also generate an absence analysis that identifies a carrier's leave taken by, for example, a pay period for a given year. The user may also print a dispatch feedback report or a statistics worksheet for a given week.

With the system 320 provided, a user can generate a report such as a route/carrier daily performance report which compares a supervisor's projections from the previous day to the carriers' actual clock rings to determine and display any variance between the two. What is meant by a clock ring is a registration event on a time clock of a start or end point. For example, the carrier may have four clock rings per days, such as, e.g.: (1) when he begins work; (2) when he leaves the office to begin his route; (3) when he returns from his route to the office; and (4) when he leaves the office for the day. However, any known method can be used to calculate and record each carrier's total time worked.

Another type of report that can be generated using the performance reports system 320 is a unit daily performance report and unit weekly performance graph consolidate the unit's performance on a daily and weekly basis, respectively, based on a number of performance factors, such as individual carrier performance and the amount of mail that was delivered. The dispatch feedback report lists the amount of mail volume (in terms of percent of the delivery unit's total mail volume for a day) coming in from its sorting facility. Tracking the percent of the daily mail volume arriving in each delivery unit from the sorting facility allows a supervisor to improve the delivery unit's mail flow.

In one embodiment, a method is provided for managing delivery of articles comprising developing a first database that identifies an actual amount of delivery resources used by a client for a predetermined period, developing a second database that identifies a budgeted, scheduled or projected amount of delivery resources to be used for the period, providing display screens selectively showing the data from the first and second databases, comparing the actual amount of delivery resources used versus the budgeted, schedule or projected amount of delivery resources to be used for the period, and generating a report based on the comparison between the actual amount of delivery resources used versus the budgeted, schedule or projected amount of delivery resources to be used for the period.

A system for managing delivery of articles can also be provided. The system can include a first database that identifies an actual amount of delivery resources used by a client for a predetermined period, a second database that identifies a budgeted, scheduled or projected amount of delivery resources to be used for the period, a display screen for showing selective data from the first and second databases, a component for comparing the actual amount of delivery resources used versus the budgeted, schedule or projected amount of delivery resources to be used for the period, and a component for generating a report based on the comparison between the actual amount of delivery resources used versus the budgeted, schedule or projected amount of delivery resources to be used for the period.

Planning and Scheduling System

Figure 5:
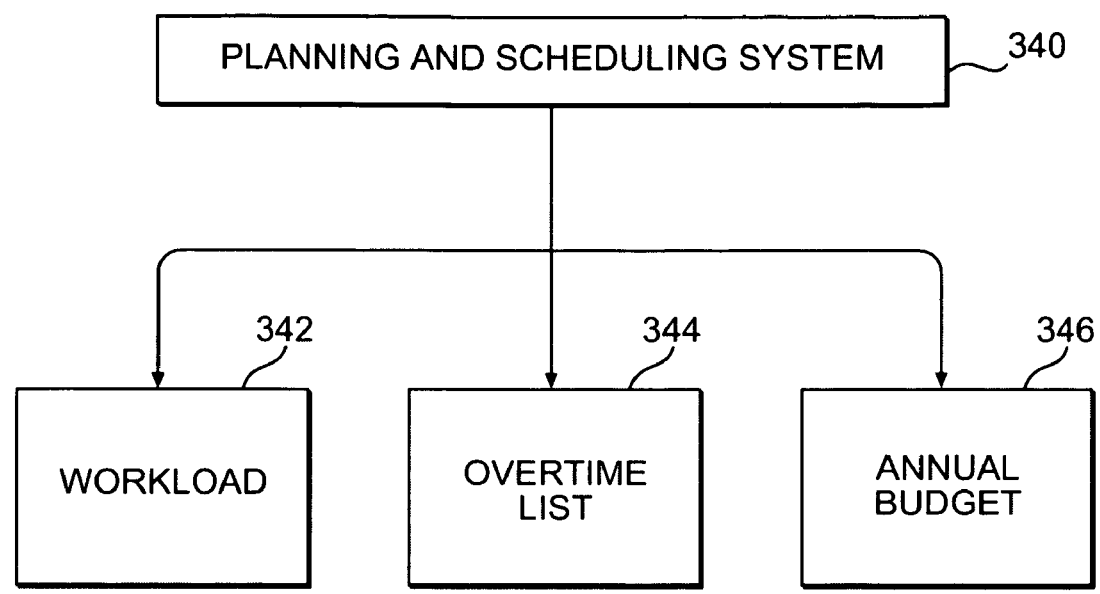
FIG. 5 illustrates a diagram of an exemplary embodiment of a planning and scheduling system of the present invention.

Another component of the office management module 200 of DOIS is a planning and scheduling system 340. As generally depicted in FIG. 5, the planning and scheduling system 340 of the present invention can permit a user to manage scheduling of, for example, a workload 342, an overtime desired list (ODTL) 344, and an annual budget 346, on a weekly basis. In one embodiment, a user may override overtime calculations that were not performed, or performed incorrectly, by the planning and scheduling system. The planning and scheduling system 340 allows users to schedule carriers' work schedules for the next following week, while taking into consideration budget factors and managing overtime rules.

With the planning and scheduling system 340 of DOIS, a user may view projected workload 342 based on volume from another historical period, such as the previous year, and may assess the effect of a particular event, such as a heavy snowstorm, during that period. A user may also view, generate, edit, or print a weekly schedule report for the current week or another week such as for example the following week. This weekly schedule may account for projected mail volume during the selected week. The weekly schedule report can include the names of regular carriers and the routes to which they are assigned. The weekly schedule report may also include the day-to-day schedule of a particular carrier. Additional information about carriers and/or routes may also be present in the weekly schedule report.

The planning and scheduling system 340 may also allow a user to view or modify assignment details for a given route number, such as the particular section that is assigned to a carrier, and whether it is an office or street section. If a carrier assigned to a particular route is absent, or on leave, the user can assign another carrier to the route for the duration of the first carrier's absence. In one embodiment, a user may select a route and assign a carrier to that route. A user may also assign overtime hours to a carrier, which may be scheduled before or after a carrier's regular shift. A user of the system 340 may modify a carrier's assignments for a particular week. For example, a user may reassign a carrier to a route that the carrier has requested or may remove a carrier from a route. The planning and scheduling system may, in one embodiment, warn a user that the system has detected overlapping or conflicting assignments.

The planning and scheduling system 340 may also warn the user that a particular assignment will place an employee into "penalty overtime." Penalty overtime, in one embodiment, may be defined as total working time of more than ten hours a day, or more than four days of overtime in a week. A user, in one embodiment, may authorize or reject an assignment, following the system's warning.

The system 340 can provide a method of managing an overtime desired list (ODTL) 344. A user may generate a new OTDL or modify an existing one. For example, a user may add a carrier to or remove a carrier from the OTDL. If a carrier was removed from the overtime desired list, the system 340 can be configured to display the date of removal. A user may also use the system 340 to generate a new OTDL for a different time period, such as for example a new quarter, but may also roll in an overtime list from the previous quarter in order to avoid re-entering the entire list.

The system 340 may allow a user to display a list of each carrier that desires overtime and to track overtime hours and opportunities for overtime hours by each employee on the overtime desired list. A user may view each carrier's overtime status, including the amount of overtime that that carrier is willing to work. A user may also identify employees who have refused overtime on a given day, and the reasons for their refusal. A user may select a period of time (such as for example a year quarter) and display information for all carriers desiring overtime for that period. A user may also track overtime by carrier by quarter.

In some embodiments, the planning and scheduling system 340 can provide a warning when a route exceeds a predetermined threshold amount and/or occurrence of overtime. This warning would indicate to a supervisor that he should investigate whether the route requires permanent assistance or should be divided. In one embodiment, a user, such as for example a national supervisor, may change the threshold and accordingly, adjust the route.

The system 340 may also allow a user to manage an annual budget 346. A user with the appropriate authorization may also view, edit, modify, or record a delivery unit's budget by week. A user may also, for example, display a weekly summary by month or a daily summary by week. The planning and scheduling system 340 can also allow the user to allocate a weekly budget or display budget details. A user may also break down the budget by day, month, or fiscal year, to plan for work hours and mail volume. Budget can be represented in terms of total work hours provided to a particular unit, for that given period of time. The budgeted hours represent a restriction or maximum threshold on the total work hours that can be allocated for any given unit for that work period. Accordingly, a supervisor can use DOIS to allocate resources so that demand is met while also keeping within the budgeted work hours restriction. Further, the system 340 can allow the user to compare the budgeted hours against the carrier's actual hours, and the budgeted hours against the scheduled hours. The actual hours worked can also be compared with the projected hours to have worked.

In one embodiment, a method is provided for managing delivery of articles to locations along routes over a plurality of days. The method can comprise the steps of developing a first database that identifies routes for delivery of the articles, developing a second database that identifies regularly scheduled carriers, assigning carriers to the routes in response to the data from the first and second databases, providing display screens selectively showing the carriers assigned to the routes and showing the number of hours projected for those carriers to complete those routes over the plurality of days, developing a third database that identifies the assignments and projected hours, developing a fourth database that identifies budgeted work hours for the carriers, and providing display screens selectively showing data from the third and fourth databases in a form that permits comparison of the hours projected and hours budgeted for the delivery of the articles along the routes over the plurality of days.

Also provided is a system for managing delivery of articles to locations along routes over a plurality of days. The system can comprise a first database that identifies routes for delivery of the articles, a second database that identifies regularly scheduled carriers, a component for assigning carriers to the routes in response to the data from the first and second databases, a component for selectively showing on a display screen the carriers assigned to the routes and showing the number of hours projected for those carriers to complete those routes over the plurality of days, a third database that identifies the assignments and projected hours, a fourth database that identifies budgeted work hours for the carriers, and a display screen for selectively showing data from the third and fourth databases in a form that permits comparison of the hours projected and hours budgeted for the delivery of the articles along the routes over the plurality of days.

Route and Unit Maintenance System

Figure 6:
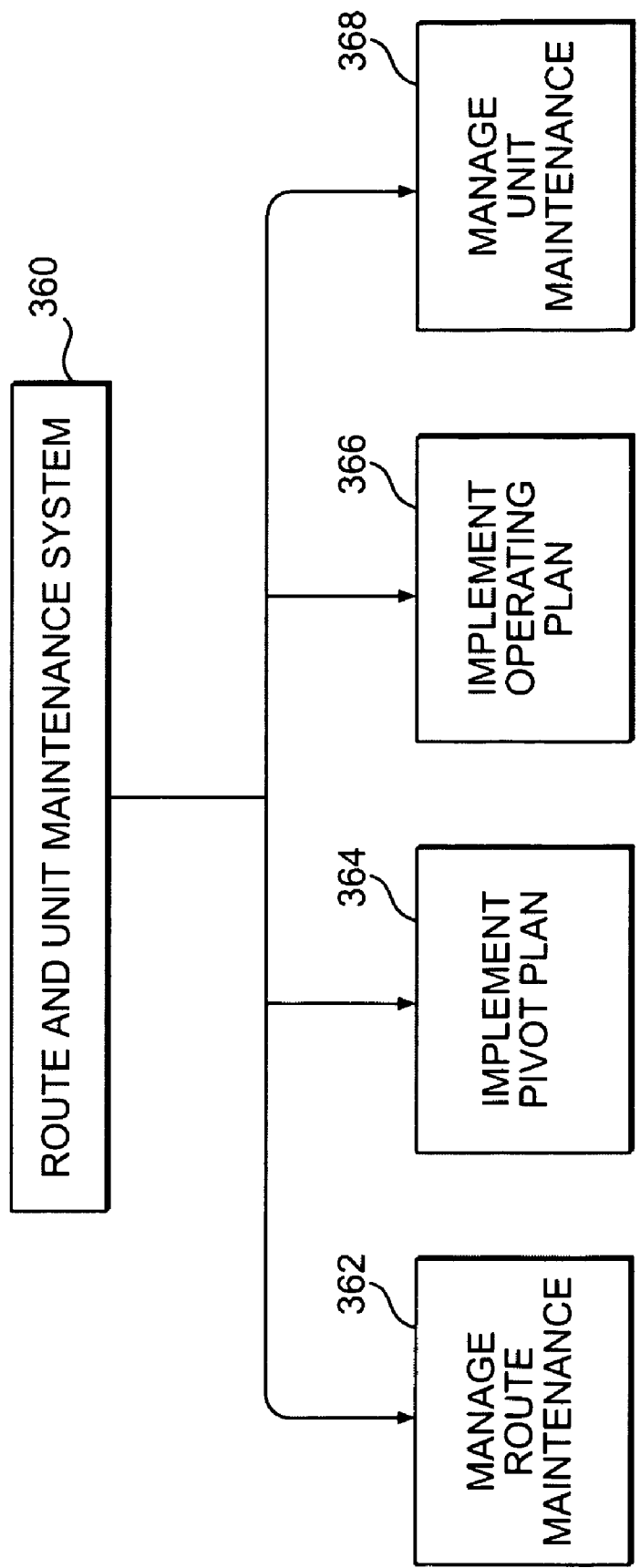
FIG. 6 illustrates a diagram of an exemplary embodiment of a route and unit maintenance system of the present invention.

The office management module 200 of DOIS can also include a route and unit maintenance system 360. As generally depicted in FIG. 6, the route and unit maintenance system 360 can provide several functions, such as for example it can allow a user to manage route maintenance 362, implement a pivot plan 364, implement an operating plan 366, and manage unit maintenance 368. In addition, the system 360 can generate reports and forms, including information relating to route base information maintenance, pivot plan maintenance, non-delivery point maintenance, data capture and transfer, and mail volume.

In an exemplary embodiment, the system 360 can manage route maintenance 362 and can list all of the routes stored on the mainframe. A user can select certain of those routes to be downloaded to the workstation. With the route and unit maintenance system 360, a user may view information for a particular route, including the type of route (e.g., residential, business, mixed), the type of delivery (e.g., foot, dismount, curb line motorized, park and loop, etc.), whether the route is a full route or auxiliary, and whether or not the route has Saturday delivery. The user may also view the route's begin time, leave time, return time, and end time on a daily basis, and the route's last inspection date and statistics, and fixed office time (the amount of fixed office time that has been established for the route, which is not driven by workload). The user may further view morning and evening mail volume information, percent-to-standard, and carrier information such as the regular carrier assigned to the route, the carrier's hire date, the date the carrier was assigned to the route, and the replacement carrier, if any. A user may also see if a route is pending special inspection, or may view or enter inspection information.

A user of the route and unit maintenance system 360 may also view and adjust information related to a route, for example, travel times and begin times. A user may modify the step-by-step travel pattern a carrier follows to deliver a route. A user may further remove a route from a delivery unit. This might be done, for example, when a new ZIP code™ is created and routes are therefore moved to a new unit. A user may assign or edit one or more of the following fields: route number, its ZIP code™, type (e.g., collection route, relay route, or combination route), base hours, daily begin tour time and Saturday begin tour time. A user may set the time when a carrier is predicted to drop mail in the first delivery box of a route.

The route and unit maintenance system 360 can also allow a user to create a pivot plan 364 and logical groups, or assign route break locations. That is, the route can be broken up into a series of logical segments. The system 360 takes the step-by-step travel pattern a carrier follows to deliver a route and combines that information with an interfacing Address Management System (AMS) database to identify the address of every delivery on a particular route, and then splits those deliveries into logical groups. Once the user creates logical groups of addresses, the system 360 can assign an amount of time for delivery, a travel pattern, a delivery method, possible points for mail delivery (e.g., number of houses), the carrier's expected enter time and exit time for a particular logical group, and his first delivery. A block with no breaks can be considered a sector segment. Sector segments are already set up in the AMS database and are linked together by the user to create a logical group.

A user of the system 360 may identify all of the routes in close proximity to the route being pivoted, so that the user can reassign a section to another carrier having a proximate route, and therefore lessen the time it takes to assist the carrier with the route section. A user may also view, create, or modify non-delivery points, such as for example park points (where a carrier parks and makes a loop on foot), relay points (where the carrier returns to the vehicle between multiple loops), and collection boxes (where carriers pick up mail to be processed).

The route and unit maintenance system 360 can also allow a user to integrate an operating plan 366 to coordinate mail sent between a post office and a sorting facility. The system 360 can update information regarding when deliveries will arrive from the sorting facility and how much mail will be in each delivery. A user may view a list of dispatches (deliveries from the sorting facility, as discussed above), their arrival time, and the percentage of the day's mail that is expected from the plant. A user may manually enter or edit mail volume information. The mail volume can be broken down by route and day, and can be identified by morning or evening volume. The system can break down mail volume by type of mail. A user may print a one-day office mail count for an individual carrier. A user may measure the impact the automated DPS sorter has on the total number of letters the carrier has to sort, so that the saved time can be subtracted from a carrier's allowed sorting time. A user may view, for example, by ZIP code™ or by route, the impact of having DPS sorted mail.

A user may designate a threshold for one or more types of mail. If the mail volume of a type of mail exceeds the entered threshold (which is entered as a percentage), the system highlights the mail volume field to alert the user of a possible mistake. The highlighting may include turning the field yellow, bolding it, flashing it, or another method to draw the user's attention.

A user of the system 360 may also manage unit maintenance 368, as represented in FIG. 6. For example, a user can view route information relevant to a particular delivery unit (e.g., a route inspection, a minor adjustment, etc.) over a period of time, type of route, start date, end date, route status, and date implemented. A user may view a list all carriers, their type, and their assignment. Carriers can be added, edited, or deleted using the system 360. For example, a substitute carrier may be added. When a user adds a carrier, he or she may enter information for that individual carrier into the system 360.

Further, a user of the route and unit maintenance system 360 of the present invention may designate a threshold of overtime and under time he or she wants to be alerted to. For example, if a user selects to view thirty minutes, only routes that have 30 minutes or more of overtime or under time will be displayed. A user may also view or enter vehicle odometer readings at various points in a carrier's workday, for example, upon reporting to the office, leaving the office, making a first delivery, etc. during an inspection period. The system may also display a carrier's volume of mail for a given date and route number during an inspection period.

In one embodiment, a method is provided for managing delivery of articles. The method comprises the steps of developing a database that identifies routes for delivery of articles, including characteristics of the routes, providing a display screen selectively showing the routes for delivery and the characteristics, using the display screen to modify the characteristics of a delivery route, and saving the modification to the database.

A system for managing delivery of articles can also be provided. The system can include a database that identifies routes for delivery of articles, including characteristics of the routes, a display screen for selectively showing the routes for delivery and the characteristics, a component for modifying the characteristics of a delivery route, and a component for saving the modification to the database.

Thus, the route and unit maintenance system allows a user to make permanent prospective adjustments to the assignment of routes to carriers, and to the manner in which a carrier travels to and from a route. In one example, the user can break up a route into a series of logical segments, then assign segments of the routes to carriers so that each carrier has approximately eight hours of work. This feature allows the user to level off the workload. It is contemplated that this system 360 can be implemented on an as-need basis to provide a permanent change to the route assignment.

Managed Service Points and Street Management System

Figure 7:
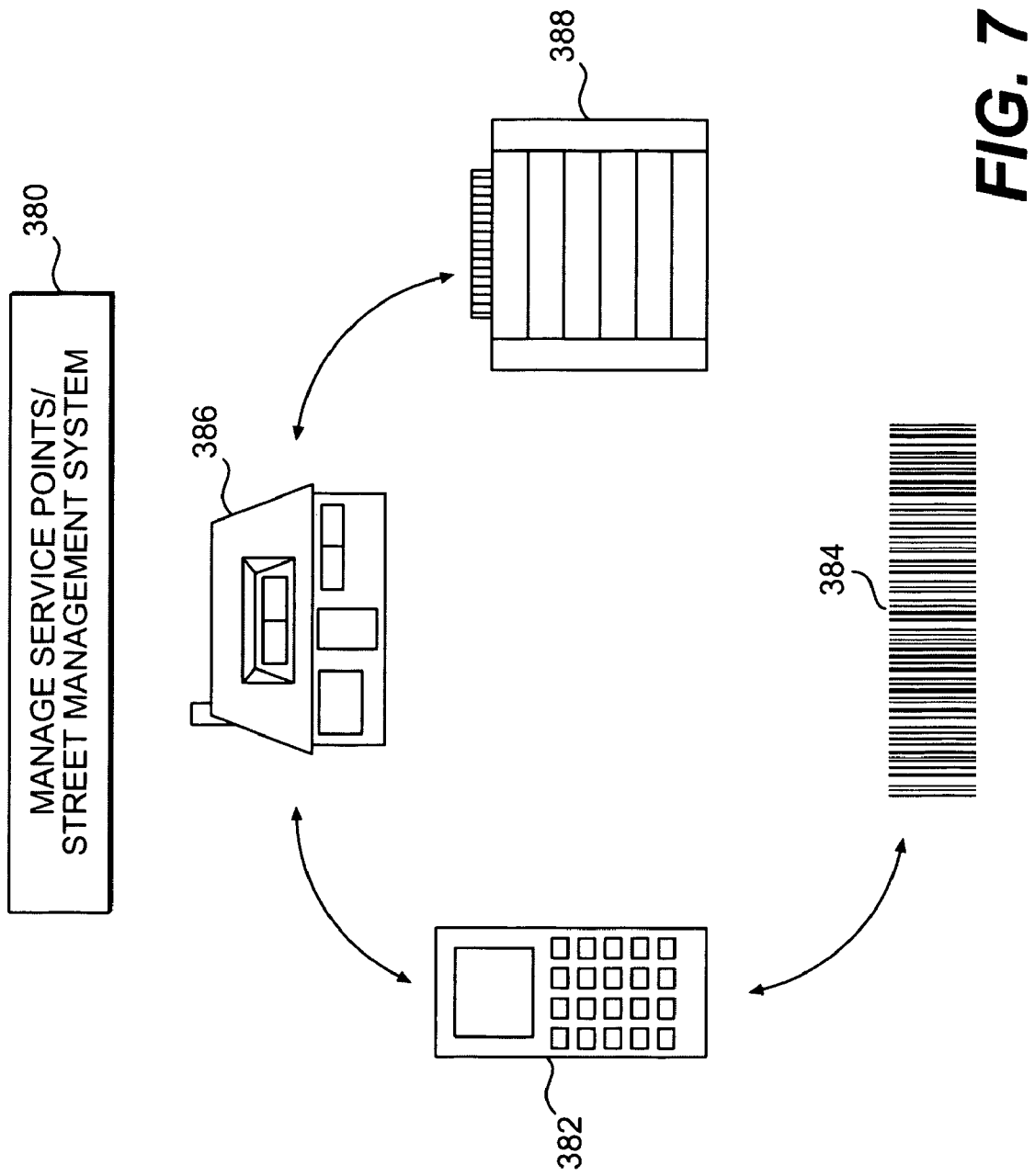
FIG. 7 illustrates a diagram of an exemplary embodiment of a managed service points and street management system of the present invention.

Another feature of the office management module 200 of DOIS is the managed service points and street management system 380, which can allow a supervisor to track a carrier's progress through the use of barcodes placed at various points along a routes (e.g., in mailboxes or collection boxes). As depicted in FIG. 7, carriers can carry a mobile data collection device (DCD) 382 or other handheld interfacing device for collecting information. The use of mobile technology can allow the tracking of mail in the field through signature and delivery confirmations. In addition, when a carrier reaches a managed service point (MSP), he or she can scan an MSP barcode label 384 with a mobile handheld interfacing device, and the system 380 can record the time the carrier was at that location. Once back at the postal facility 386, the mobile data collection device 382 can be docked, and the information may be viewed and analyzed by a supervisor, who can then can determine how long it takes a carrier to reach different delivery points, and can quickly rectify inefficiencies. Further, the system 380 enables a user to maintain consistency in terms of the delivery time for a particular location on a route, by monitoring the window of time in which a carrier reaches an MSP location over a given period of time.

In one embodiment, MSP barcode labels 384 are secure. For example, it is contemplated that all MSP barcode labels 384 must be generated by an authorized user or facility of the system 380. Further, a new MSP label 384 may only be requested by an authorized user, such as for example a supervisor. In another embodiment, a new MSP label 384 may only be approved by an authorized user, such as for example a system administrator.

The managed service points and street management system 380 of the present invention may also share data with other applications, such as for example the mail volume collected by a supervisor, the time and attendance recorded with Time and Attendance Collection System (TACS), the Address Management System (AMS), and scanned data from mail carriers.

In one embodiment, a method is provided for managing delivery of articles. The method comprises the steps of providing a set of scannable barcode labels corresponding to unique addressable locations on a delivery route, providing a database of recorded time entries, each entry corresponding to a scanning event of a barcode label, and tracking a movement of a carrier by analyzing a series of recorded time entries for the delivery route.

A system for managing delivery of articles can also be provided. The system can comprise a set of scannable barcode labels corresponding to unique addressable locations on a delivery route, a database of recorded time entries, each entry corresponding to a scanning event of a barcode label, and a component for tracking a movement of a carrier by analyzing a series of recorded time entries for the delivery route.

Route Adjustment System

Figure 8:
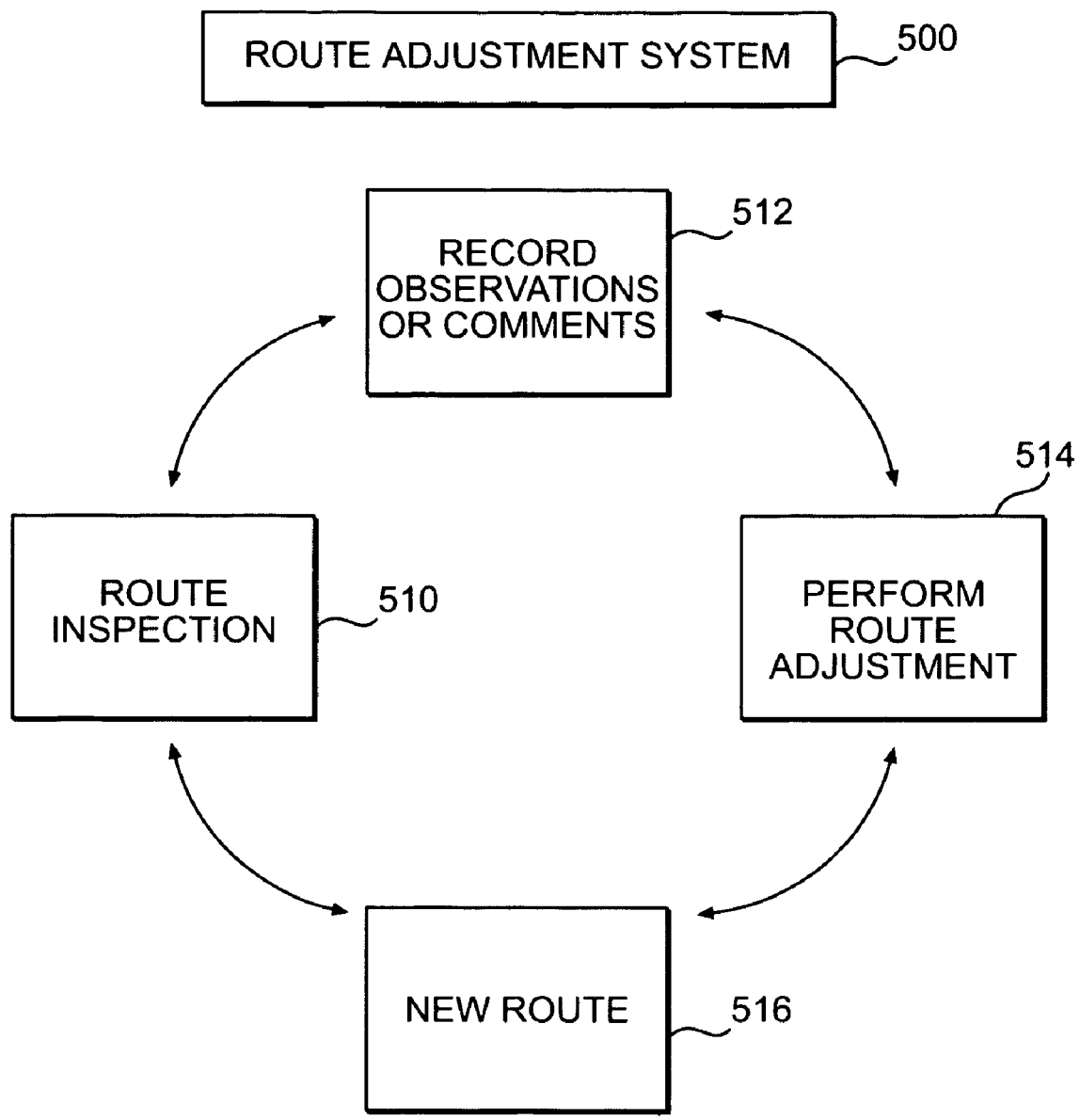
FIG. 8 illustrates a diagram of an exemplary embodiment of a route adjustment system of the present invention.

As depicted in FIG. 2, DOIS can also include a second module for street management 400, which can include a route adjustment system 500. In one embodiment of the present invention, the route adjustment system 500 provides for route inspections and adjustments as depicted in FIG. 8. The route adjustment system 500 can allow a user to view, edit, or record examiner observations and comments 512 after a physical inspection of the route 510. A user may also view a route inspection summary in week or day view by date using the route adjustment system 500. The route adjustment system 500 of the present invention allows the user to redefine the route itself, allowing permanent changes to the physical parameters which define the route. This can be performed after an inspection has been made, or after a minor adjustment has been made and approval is given to make the adjustment permanent.

A user may also use the route inspections and adjustments system 500 to perform a route adjustment 514. With this route adjustment system 500, a user may create a new route 516. The new route can be automatically provided with a new route number via the address management system (AMS). The user can also make adjustments to the new route with the route adjustment system 500, as shown in FIG. 8.

A user may use route inspection data for a given route to create adjustment scenarios for that route in order to determine the most efficient route. A user may want to evaluate an alternate scenario, for example, in the event of new construction along a route. To create a new scenario (e.g., by moving a particular street from one route to another route), the user can enter a ZIP code™ and each route within that ZIP code™ can be displayed along with its office time, street time, allied time (i.e., time when the carrier is on the street but not delivering mail, for example, refilling mail between loops), possible deliveries, and other factors. The user can evaluate and adjust office, street, and allied time, and can assign a given amount of time to a route. Street information can be displayed, for example, by block range.

A route adjustment may be formal, special, or minor. A special route adjustment request can one made by a carrier. A supervisor need not accompany the carrier on the route, but may instead use predetermined calculation to make the adjustment using the volume of mail and the historical time data for that route. In one embodiment, for a formal or special adjustment, the user manually enters the adjustment. In another embodiment, if the user identifies a minor adjustment, no data need be entered because there is no normal inspection process associated with a minor adjustment.

A user of the route adjustment system 500 can enter, edit, or view adjustment details from multiple delivery facilities including, for example, the route, carrier, adjustment type, duration, and whether the adjustments are implemented or pending. A user may also enter comments for an adjustment. A user may analyze data such as DPS volume impact, and edit office time, select and edit street time, and add or remove delivery points. A user may manually enter or edit mail volume information, or modify the step-by-step travel pattern a carrier follows to deliver a route. A user may adjust details relating to a route by identifying the route and the carrier, along with the adjustment type, duration, and status (implemented or pending). A user may also enter or modify comments related to an adjustment.

The system 500 may also allow a user to view a listing of adjustments that have been implemented or are currently pending, for example, by ZIP code™. A user may also input a delivery unit and display a summary of adjustments made for the entire unit. Further, a user may add or remove delivery points from a route. The system 500 can be configured to automatically calculate and display changes to office time and street time based on the addition or removal of the delivery point. The user may also add, edit, or remove non-delivery points, non-delivery point attributes, and non-delivery point sector segment association.

A user of the route adjustment system 500 may also add, edit, or remove non-delivery point attributes, and non-delivery point sector segment association. Non-delivery point attributes include the non-delivery point type (e.g., collection point, relay box, park and loop point), time the carrier arrives at the non-delivery point (daily, on Saturday, and on holidays), possible deliveries (per relay, loop, swing), location ID (for collection boxes having ID numbers), street corner, street number, a pre-directory designation (e.g., "north" for North Elm Street), street name, suffix, etc. The non-delivery points sector segment association breaks down the sector segments and displays them.

A user may also insert an allied time or sector segment. This can allow the user to make a change to a route such as adding a collection box. This can also allow the user to identify delivery zone changes (moving a route among delivery zones). A user may adjust allied times (e.g., relay time, travel to time, vehicle load time, and vehicle unload time). Relay time is understood to be the time it takes a carrier to prepare for a relay at his vehicle. Travel to time is understood to be the time it takes the carrier to travel to and from lunch, to and from the route, etc. Vehicle load time understood to be is the time it takes the carrier to put his mail in his vehicle. Vehicle unload time is understood to be the time it takes the carrier to unload his vehicle.

With the route adjustment system 500, a user can enter or edit information relating to new construction, such as when the construction began, when it is expected to end, location information, the anticipated number of deliveries to the new construction. The system 500 can be configured to designate a factor created from the route inspection adjustment and calculate the time the new construction will add to a route.

Further, a user may generate and display a random time card analysis data, and print an appropriate report. The system 500 can randomly select a carrier and display the week number for the specific accounting period and the week date. The system 500 can also display any "abnormal conditions" that would suggest a user select a previous or later week to avoid any SPLY impact that may distort the data for that week. The system 500 in one embodiment can perform an automatic week adjustment such that, if the regular carrier was not working his route on the chosen week, the system 500 can skip to the next week. A user may also check for any abnormalities during the chosen weeks. A user may also see when a carrier is given auxiliary assistance to deliver mail.

A user can, in one embodiment, print reports from this system 500. The reports can relate to, for example, route performance, route inspection, unit recap, non-delivery point changes, calendars of events that must take place in order to meet contractual requirements, adjustment analysis, mail counts, and inspection summaries.

A user may generate a weekly schedule for a delivery unit by entering a service week start date into the system 500. The user can select a route number and can then also select a replacement carrier. If no replacement carrier is selected, the system 500 can default to the regular carrier.

The route adjustment system 500 can also allow a user to add a new delivery unit, and related information such as for example the new delivery unit's area ID, district ID, facility ID, group ID, and assigned finance number. This information can be used to link delivery units to other units and facilities within their district. In one embodiment, data can be gathered for creating a new delivery unit by pulling in data from the AMS database and other interfacing databases that have relevant information about routes, etc.

In one embodiment, a method is provided for managing delivery of articles. The method comprises the steps of developing a database that identifies routes for delivery of articles, wherein each route comprises locations for article delivery, providing a display screen selectively showing the routes for delivery, modifying the locations for article delivery, and saving the modification to the database.

A system for managing delivery of articles can also be provided. The system can include a database that identifies routes for delivery of articles, wherein each route comprises locations for article delivery, a display screen for selectively showing the routes for delivery, a component for using the display screen to modify the locations for article delivery, and a component for saving the modification to the database.

Although the system of the present invention has been described for use with mail or package delivery service providers, it is understood that the system can easily be implemented by any type of delivery service provider. For example, the system can be utilized by any delivery service provider that would benefit from a high-tech matchmaking application that pairs up deliveries to be made with the carriers available to perform the deliveries, such as the food delivery industry.

To use the delivery operations information system 100 of the present invention, a user may be required to enter a user identification and a password on a login screen. If the user identification is recognized and the password accepted, the user may enter the DOIS program and be given access to the mainframe. Preferably, each user has a unique identification and a password, so that the system can track who is doing what within the system. The login screen can allow the user to change his password if desired.

In one embodiment of the present invention, once the user has logged onto the mainframe, he sees a screen confirming that the application is loading. The user may then see a screen indicating that the system is secure and unauthorized use is prohibited.

FIG. 9 illustrates an embodiment of the Workload Status window of the present invention. In an exemplary embodiment, a user will only be given access to information in the system that concerns the delivery unit(s) that he supervises. Within the Workload Status window is a "Routes" tab for individual routes. This tab lists all of the routes for the user's delivery unit(s), the carrier assigned to each route, and whether the route is over or under eight hours on a given day, based on the systems calculated workload. In the center of FIG. 9 are fields that tell the supervisor the total overtime and under time for the total of the delivery unit's routes, so that the supervisor can try to reassign workload to get those two numbers to zero. In the bottom portion of the Routes tab are listed any route vacancies. Vacancies are when a route is not covered by an individual carrier. This can be used to plan vacancies or to inform the supervisor of vacancies that occur on a particular day as a result of a call-in.

Figure 10:
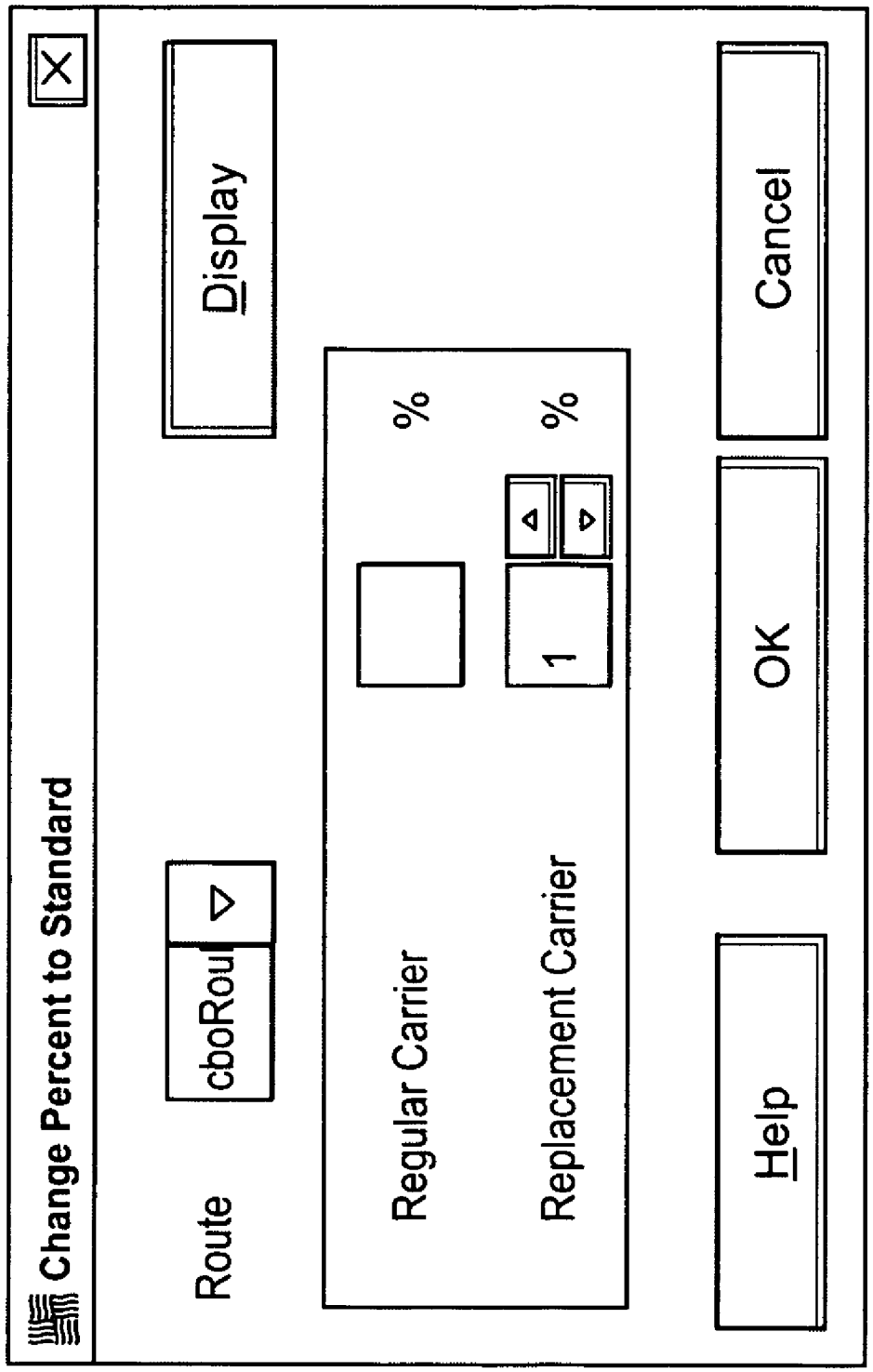

FIG. 10 illustrates a "Change Percent to Standard" window. Within any of the DOIS windows, a right click with the mouse will give the user certain abilities that are not explicitly listed in the window. Preferably, Workload Status is a window that the user can right click to get the Change Percent to Standard window, which sets forth a carrier's ability to handle a given workload. Once the user selects the route in the Change Percent to Standard window, he can click on the display button and the system will identify the regular carrier's percent to standard as established through a count and inspection. If a replacement carrier is handling a route, the user can change the percentage to standard using the up and down spinner box to determine the replacement's ability to handle that route's workload. Once the user makes a selection in the Change Percent to Standard window, he can press "save" to process any changes made or press "cancel" to leave the window without saving any changes.

FIG. 11 illustrates a Carrier Information List that allows the user to assign assistance from scheduled and unscheduled carriers. This windows includes fields for the duration of the assistance, whether it be covering the whole route or just a portion of the route. It also has a button on the right side that the user can view the unscheduled carriers and call them in if he needs them, for example, to cover a full route. If the user needs to cover a portion of a route or split a route up in some way, the carriers' names that are assigned on that date will show up in the carrier information list, along with what type of employee they are—whether they are regular, part-time flexible, or an unassigned regular carrier. The list also tells the user the number of days a carrier has physically worked on the route, the last day the carrier worked the route, the days they worked on the route in the office, and the last day they worked the route on the street. Preferably, the Carrier Information List also sets forth the carrier's overtime preference. There may additionally be a Record Overtime Exception button that can record a carrier's reasons for refusing to accept overtime.

Figure 12:
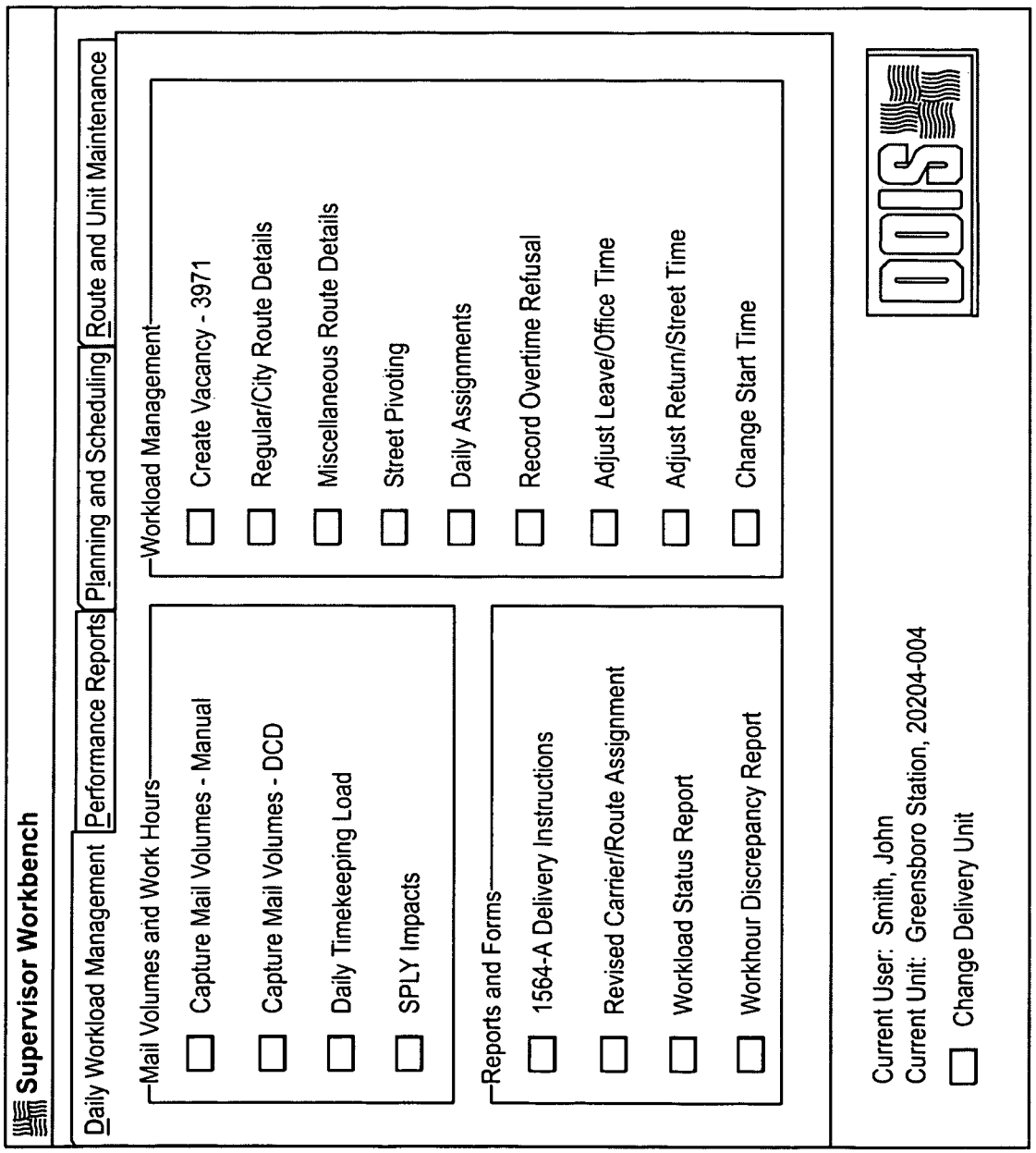

FIG. 12 illustrates a Supervisor Work Bench screen of an embodiment of the present invention, having a series of tabs across the top to separate each individual section. The sections may include, for example: Daily Workload Management; Performance Reports; Planning and Scheduling; and Route and Unit Maintenance. The Daily Workload Management tab is chosen and displayed in FIG. 8. As illustrated, this tab is divided into subsections covering every system function that the user needs to manage workload. Workload management involves the function of volume recording which is covered in the Mail Volumes and Work Hours section. This section allows the user to capture mail volumes manually by pressing a designated button. Pressing the button produces another window that shows or allows the supervisor to input volumes. The user may also capture mail volumes using a mobile data collection device ("DCD"). The DCD is an automated way of recording mail volume. As the supervisor counts the mail volume, he uses the DCD to enter the mail volume by route after which the DCD is uploaded into the system.

The next button in this section is a Same Period Last Year ("SPLY") impact entry function that records anomalies occurring on a given day, such as a major snowstorm. SPLY information is used for future planning.

The next section in the Daily Workload Management tab is Reports and Forms. The first form, "1564A Delivery Instructions," identifies key information about a given route including, for example, the carrier assigned, the replacement carrier, relay points, the number of deliveries on each relay point, park points, where the carrier goes to lunch, and how the carrier travels back and forth to lunch. The next form is the Revised Carrier/Route Assignment that ensures customers will get their mail at the same approximate time each day. The next button is for the Workload Status Report, which is an expansion of the workload status window. Preferably, it gives all the basic information for every route and every assignment that's made for a given day. The report can have several sections, including the carrier, the route, the status of the carrier, the type of carrier, the demonstrated performance of the carrier, the volume the carrier has for the day, projections based on the carrier's workload, the carrier's leave time, projections of the carrier's return time, and projections of the carrier's total time for the day. The last button is for the Workhour Discrepancy Report, which identifies deviations from expected work.

The next section of the illustrated embodiment of the Daily Workload Management tab is the Workload Management section. "Create Vacancy" is the first button and includes documentation for carrier leave requests. "Regular/City Route Details" includes information that identifies everything about a route, for example, the base route information, including office time, street time, how many deliveries the carrier has, the carrier's begin time, leave time, and return time. "Miscellaneous Route Details" includes basic information for such routes as combination routes, collection routes, and relay routes. The "Street Pivoting" button assists the user in breaking a route up into small segments (e.g., by hour) that can be given to other carriers for delivery. The "Daily Assignments" button provides the user with a quick snapshot of each carrier's assignment that day and the expected total work time.

This section may also include a "Record Overtime Refusals" button that performs the same function as the Record Overtime Exception button on the Carrier Information List. The next button is "Adjust Leave/Office Time" that can be used by a supervisor to adjust the carriers' time when he has, for example, a service or safety talk with the carriers. If the supervisor spends twenty minutes giving the talk, he can then adjust all of the routes by twenty minutes. The "Adjust Return/Street Time" button is used to adjust a carriers time when a carrier has to deviate from his planned route, for example, due to construction. The "Change Start Time" button is used to adjust a carrier's schedule if his start time deviate, for example, due to lateness.

Figure 13:
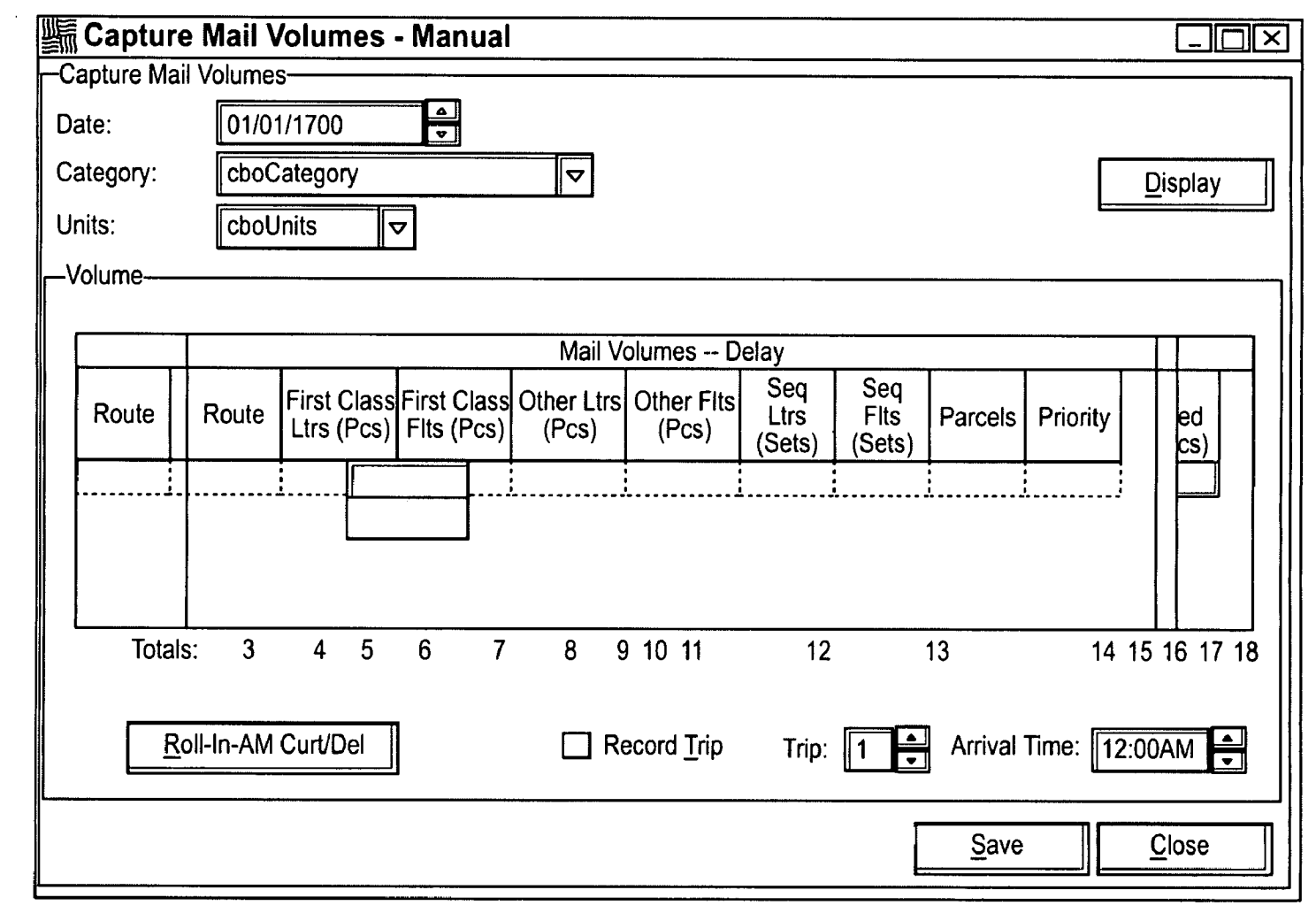

FIG. 13 shows the "Capture Mail Volume" window discussed above with respect to FIG. 12 for manual recording of mail volume. This window captures and displays mail volume for each route, preferably by category such as first class letter mail, first class flat mail, parcels, etc. It also preferably provides the user with running totals. Mail can preferably be measured in pieces or in linear measurement. This feature of the system preferably also allows the user to "roll in" undelivered mail from the previous day or, if evening mail volume is being captured, the user can roll in undelivered mail from the morning.

In a scenario where mail is received by individual post offices from a central sorting facility, the system of the present invention allows the user to record the amount of mail that comes in for each delivery from the sorting facility, and the time of the delivery. In this way, the user can track inflow of mail.

Figure 14:
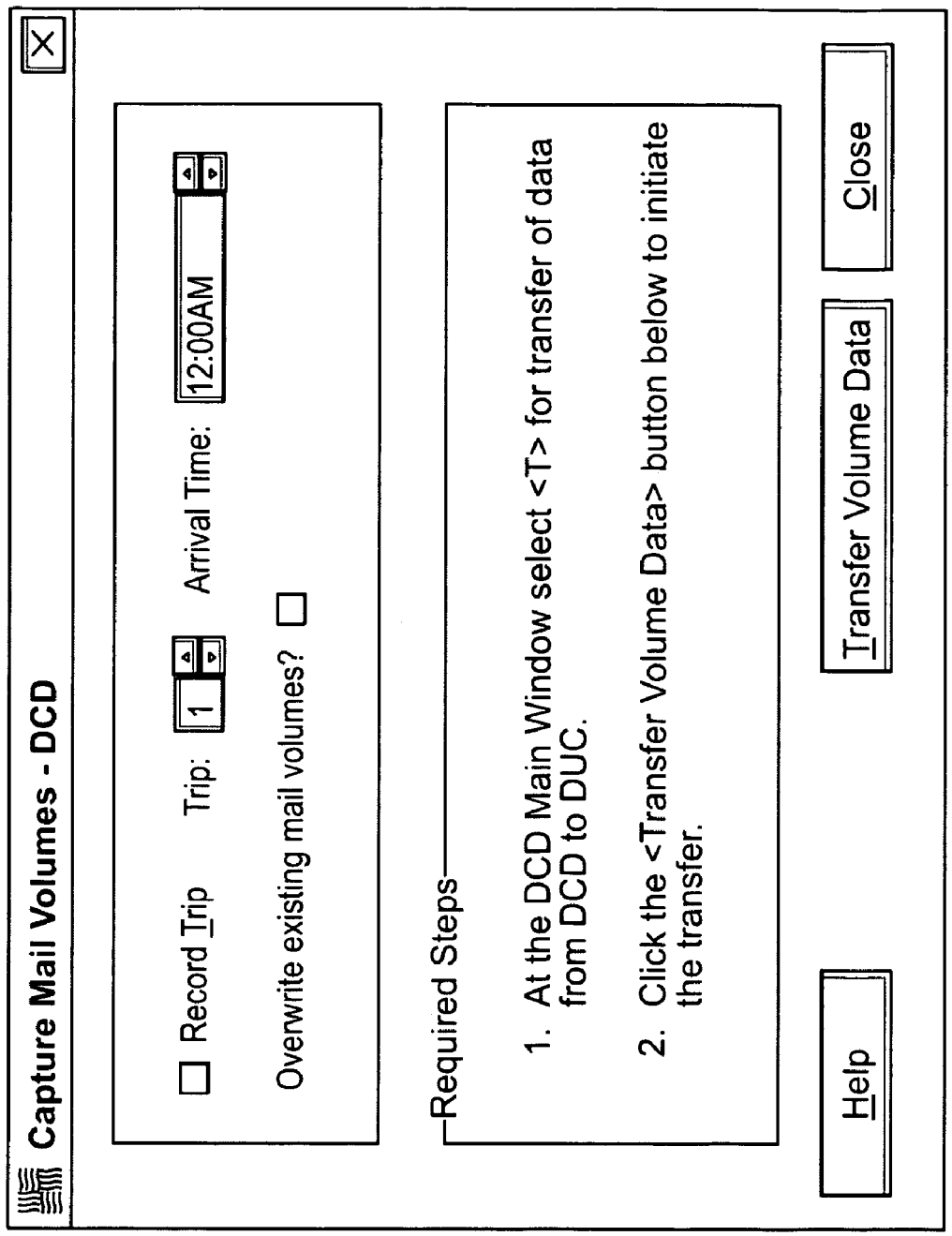

FIG. 14 shows a Capture Mail Volume window discussed above with respect to FIG. 12 for automated recording of mail volume using a DCD. Once the user counts the mail with the DCD, he can record the volume and upload the data. The system preferably includes a set of instructions for the data upload.

In the exemplary embodiment of the invention, the system can be used to configure the DCD for mail volume recording. The DCD is a device capable of performing two functions: it can record mail volume and it can be used during a supervisor's route inspection process. If a single DCD is used to perform both functions the system 100 can be used to configure the DCD for the different functions. For example, the system 100 can include a "DCD Configuration-Mail Volume" function which, when initiated, gives a specific set of instructions on how to configure the DCD. The system 100 can also include a "DCD Burn-In" function for configuring the DCD for a route inspection.

Figure 15:
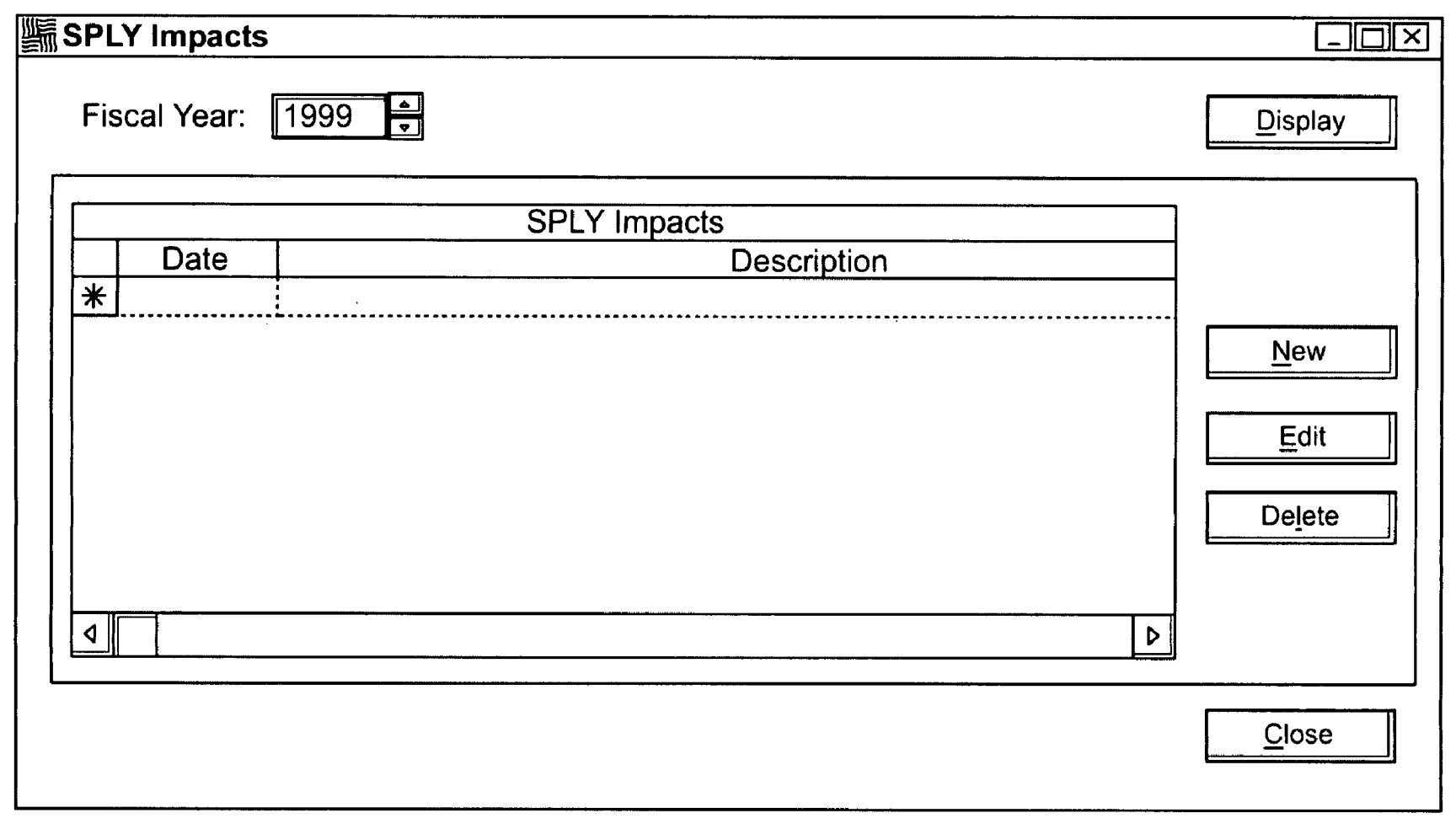

FIG. 15 illustrates a SPLY Impacts window. Entering this window can allow the user to record special events, such as snow storms, so that supervisors pulling data for that day at a later time will be alerted to the special event.

Figures 16, 17:
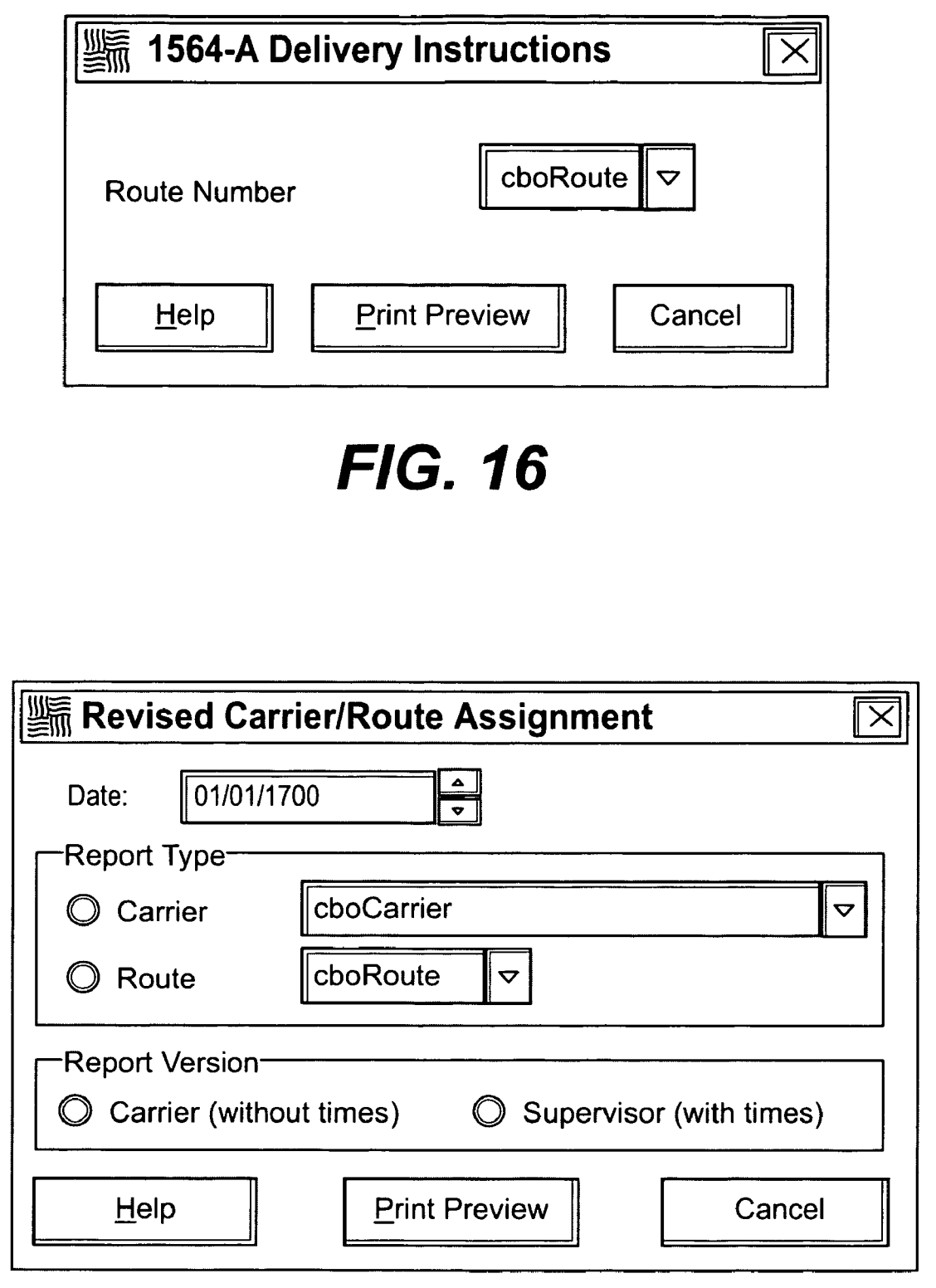

FIG. 16 illustrates a 1564A Delivery Instructions window from the Supervisor Workbench screen. This window is retrieved when the user right clicks the mouse button. The user identified the route number and presses the Print Preview button for a visual copy of the PS Form 1564A in form flow.

FIG. 17 illustrates a Revised Carrier/Route Assignment window, which produces a report that shows a carrier or his supervisor the carrier's revised route. The report can be printed either by carrier or by route for a given date. In one embodiment the report can be printed with or without route times.

FIG. 18 illustrates a Work Hour Discrepancy report window. The report produced by this window shows a carrier's performance over a period of time and its difference from expectations.

FIG. 19 illustrates a Create Vacancy window of the present invention. The user can choose a carrier's name using a drop-down list, and can then create a vacancy type such as sick leave and annual leave. This window preferably also allows the user to indicate whether the carrier is taking a full or partial day of leave and, for a partial day, the window may further record the number of hours of leave taken. The user can identify a date range for a carrier's multi-day leave in the "Date From" and "Date To" fields. The system may be designed to print the appropriate leave form automatically upon saving vacancy information.

Figure 20:
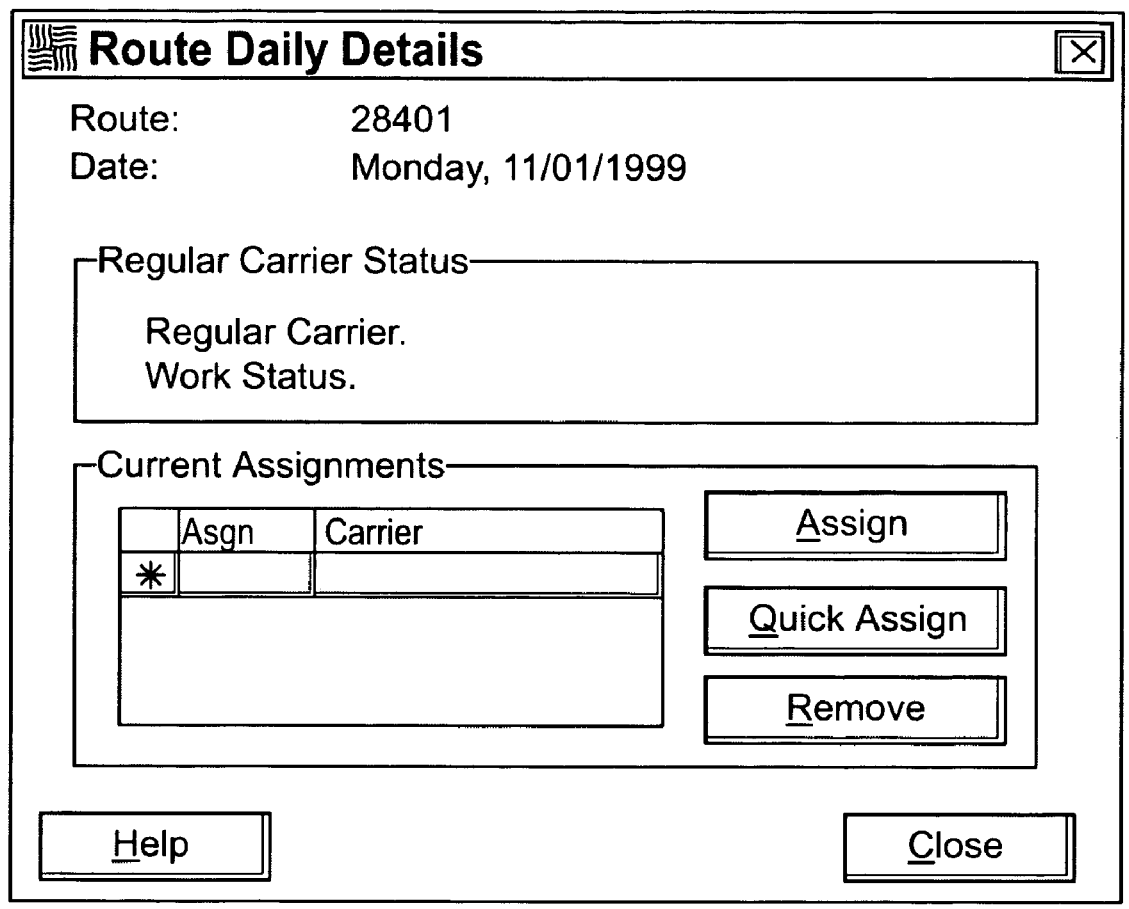

FIG. 20 illustrates a Route Daily Details window, which is used to assign a carrier to a route. The Route Daily Details window displays, for a given route and day, whether the regular carrier is assigned to the route, absent, or on leave. In this window, the user can preferably press an appropriate button to assign another carrier to the route, or quick assign a carrier or remove a carrier.

A Miscellaneous Route Details windows is shown in FIG. 21 and is used to assign carriers to miscellaneous routes such as collection routes or combination routes. This window preferably also allows the user to assign assistance to the miscellaneous routes.

Figure 22:
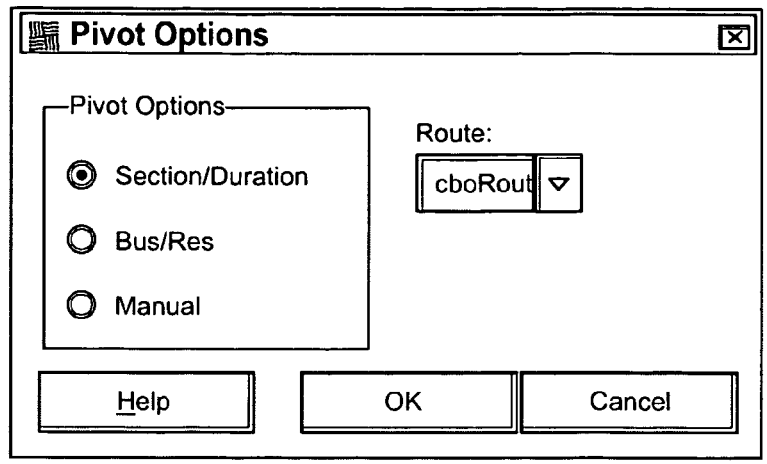

FIG. 22 illustrates a Pivot Option window, which appears when the user elects to "pivot" a route. "Pivoting" is reassigning a portion of a route. The system preferably allows the user to pivot by section or duration—section being a given street on the route and duration being time to deliver the street. The system may also allow the user to pivot the route by business deliveries or residential deliveries.

A Street Pivoting window can appear if the user selects a given route from the window of FIG. 22. This Street Pivoting window allows the user to choose a pivot option, for example, by section, and then allows a user to select the number of sections that he wants (e.g., one, two, ten, or twenty sections). Alternatively the user can pivot by duration (e.g., one-hour, two-hour, or three-hour increments). In one embodiment, the system will then break down the route being pivoted into every delivery, and the mode and method of delivery for all the streets, broken down into individual sections called logical groups. The system will give the user start and end times, how long it takes to deliver each logical section, the type of delivery (e.g., business or residential), and the delivery method (e.g., mounted or park and loop).

Figure 23:
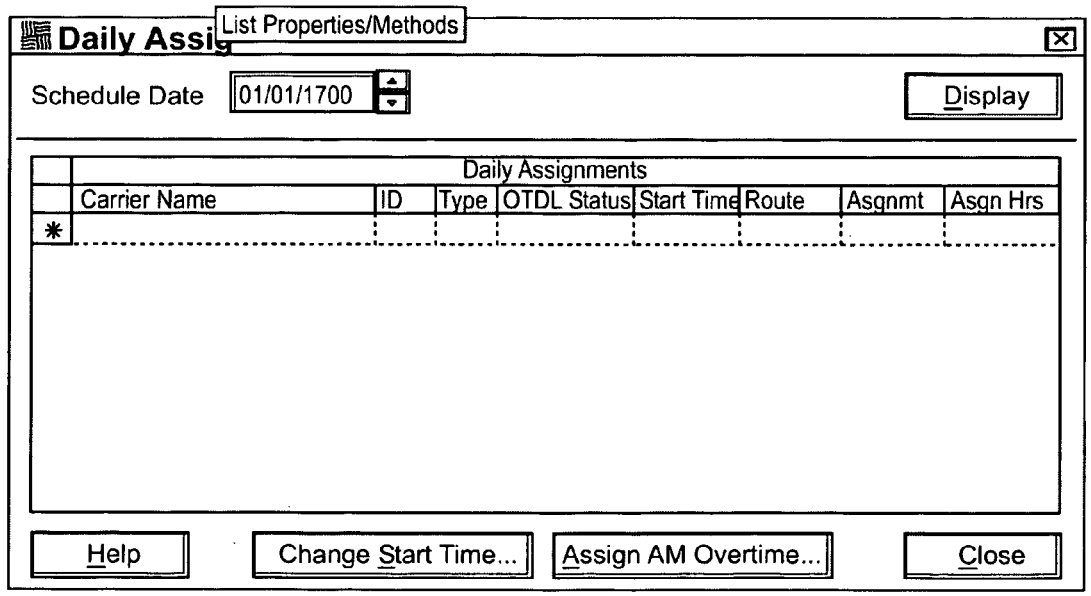

FIG. 23 illustrates a Daily Assignments window that displays the route each carrier is assigned to. In one embodiment, the fields displayed include: carrier's name, type of carrier; if the carrier desires overtime; the carriers overtime status; the carrier's start time that day; the route the carrier is assigned to; the carrier's assignment type; and the carrier's assigned hours.

FIG. 24 illustrates a Record Overtime Exception window of one embodiment of the invention, as discussed above. If a carrier is offered overtime and elects not to take the overtime, his reason can be recorded.

Figure 26:

FIG. 25 illustrates a Adjust Leave/Office Time window, which allows the user to adjust leave time for a given date and carrier, as discussed above. An Adjust Return/Street Time window of one embodiment of the invention is shown in FIG. 26, which allows the user to input time added to a carrier when the carrier is providing assistance to another route.

Figure 27:

FIG. 27 illustrates a Change Start Time window allowing a user to change carriers' begin time for a given day, as discussed above. The system 100 can also include an Assign Carrier Start Time window allowing the user to set a carrier's scheduled start time.

Figure 28:
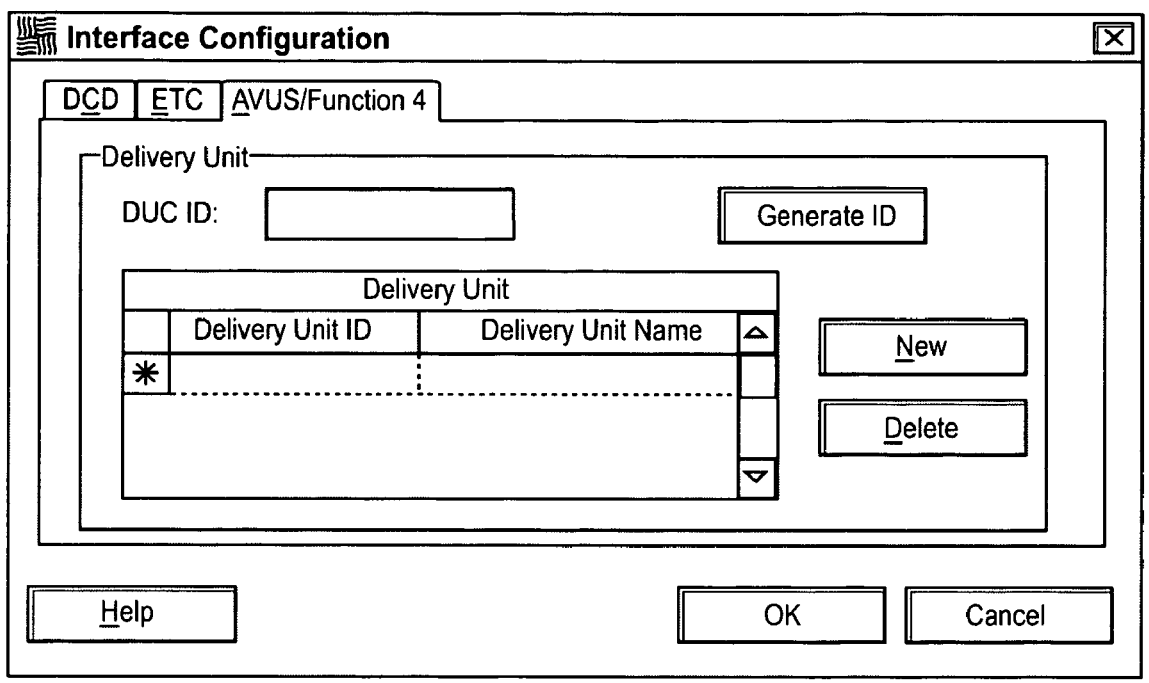

FIG. 28 illustrates a window for an Interface Configuration function of an embodiment of the invention. The system of the present invention allows connectivity to other applications for which the system must be configured, and this window allows the user to perform the configuration.

Figure 29:
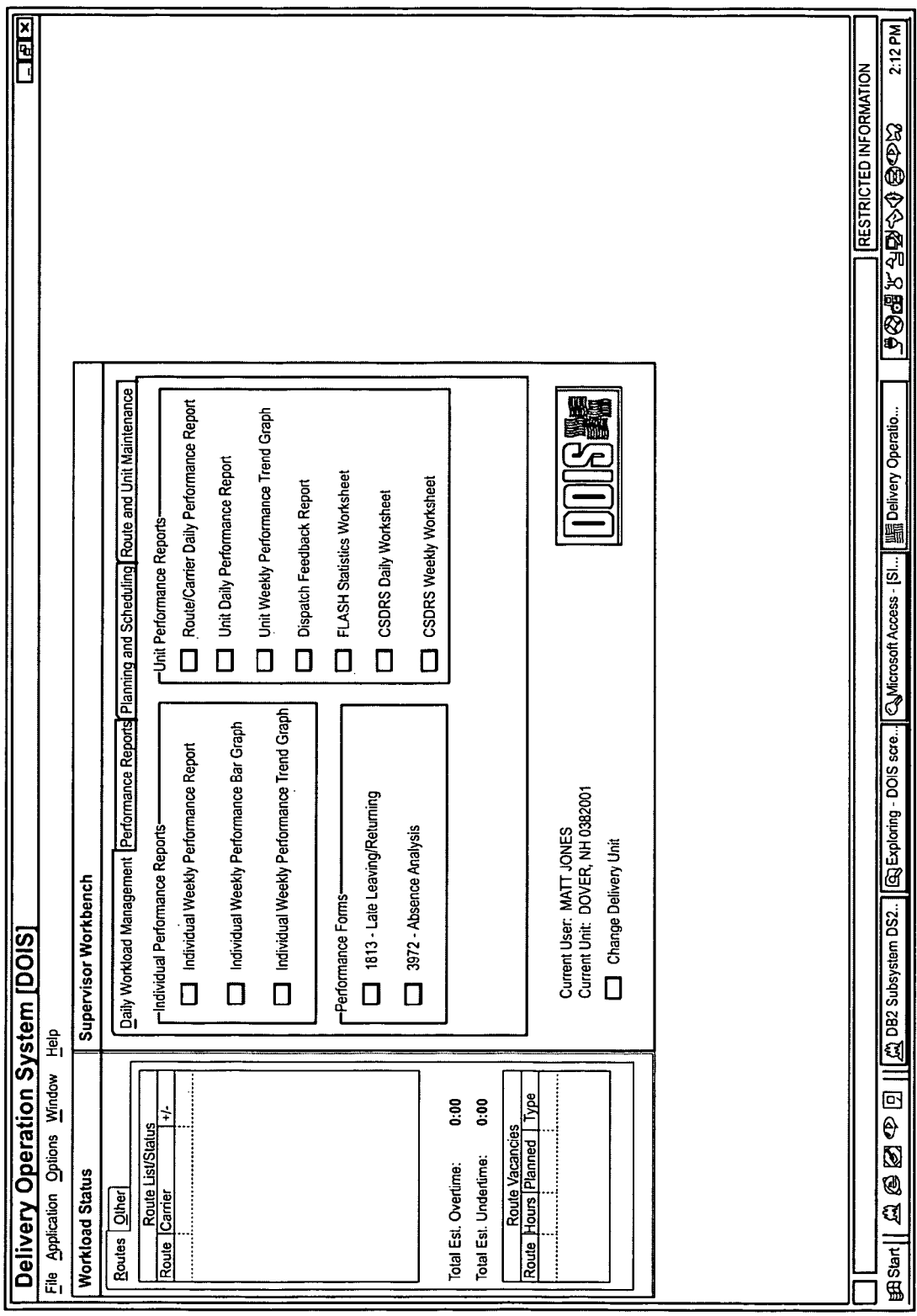

FIG. 29 illustrates an embodiment of a user's screen on a daily basis with both the Workload Status and Supervisor Workbench windows open. In addition to the Routes tab in the Workload Status window, there is also an Other tab where, for example, miscellaneous routes can be listed. As shown, the Performance Reports tab of the Supervisor Workbench, can include, for example, the following sections: Individual Performance Reports, Performance Forms, and Unit Performance Reports.

In one embodiment of the invention, the Individual Performance Reports section includes individual weekly performance reports, bar graphs, and trend graphs for a carrier. A week generally denotes a "service week," which runs from Saturday through Friday. However, it is understood that a week can be defined in the system to include any consecutive set of days. The Performance Forms section may include, for example, a late-leaving/late-returning report that can be used in conjunction with the time keeping system to determine whether a carrier left on time and returned on time as projected. The Performance Forms section may also include an absence analysis that identifies a carrier's leave taken by pay period for a given year.

The unit performance reports may include, for example, a Route/Carrier Daily Performance Report, a Unit Daily Performance Report, a Unit Weekly Performance Trend Graph, a Dispatch Feedback Report, and a FLASH Statistics Worksheet. The Route/Carrier Daily Performance Report compares a supervisor's projections from the previous day to carriers' actual clock rings to determine and display any variance between the two. The system is preferably set up for a carrier to have four clock rings a day: (1) when he begins work; (2) when he leaves the office to begin his route; (3) when he returns from his route to the office; and (4) when he leaves the office for the day. However, any known method can be used to record each carrier's time worked. The FLASH Statistics Worksheet is a report that displays mail volume totals.

The Unit Daily Performance Report and Unit Weekly Performance Graph consolidate the unit's performance on a daily and weekly basis, respectively, based on a number of performance factors, such as individual carrier performance and the amount of mail that was delivered. The Dispatch Feedback Report lists the amount of mail volume (in terms of percent of the delivery unit's total mail volume for a day) coming in from its sorting facility. Tracking the percent of the daily mail volume arriving in each delivery unit from the sorting facility allows a supervisor to improve the delivery unit's mail flow.

Figure 30:
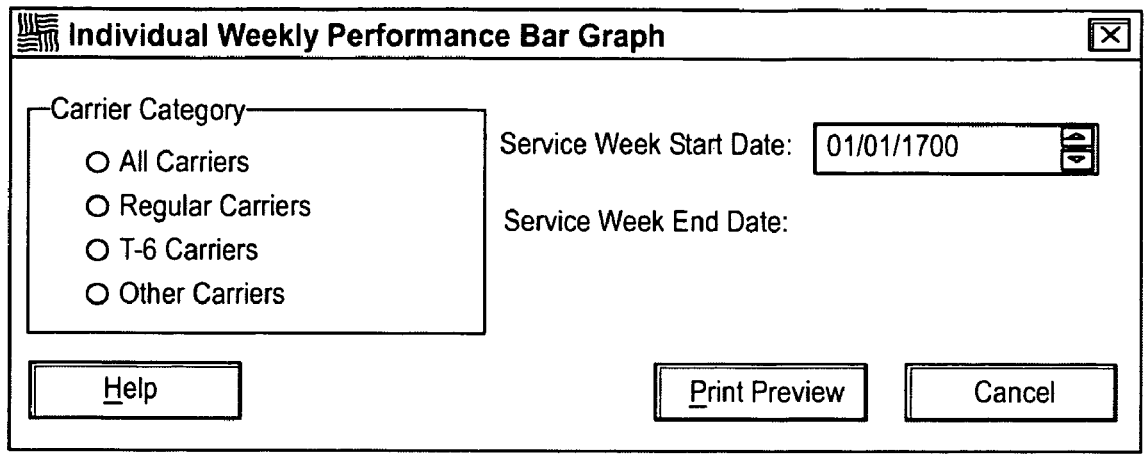

FIG. 30 illustrates an Individual Weekly Performance Bar Graph window that allows the user to select, for a given week, either all carriers, regular carriers, and T6 carriers. (Carriers usually assigned five routes to carry and when the regular carriers have a day off they replace them on that particular day) and PTFs (people that do not have regular routes assign to them). Then a service week can be selected and a preview of this report can be printed for those individual group of carriers. This program accesses Form Flow software and produces a report for the user. Users can view this window after selecting Individual Weekly Performance Report or Individual Weekly Performance Bar Graph button.

Figure 31:
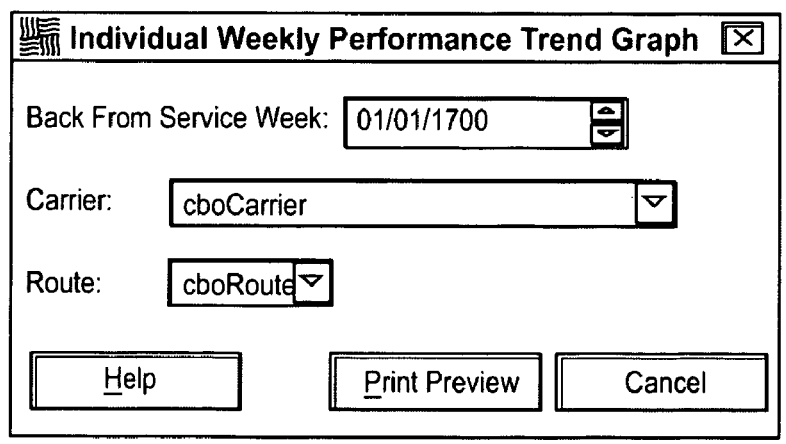
Figure 32:
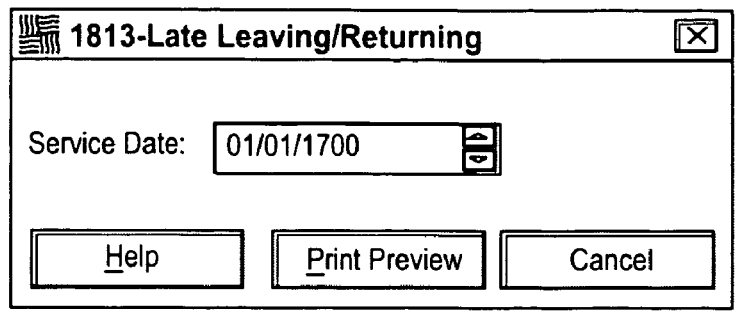
Figure 33:
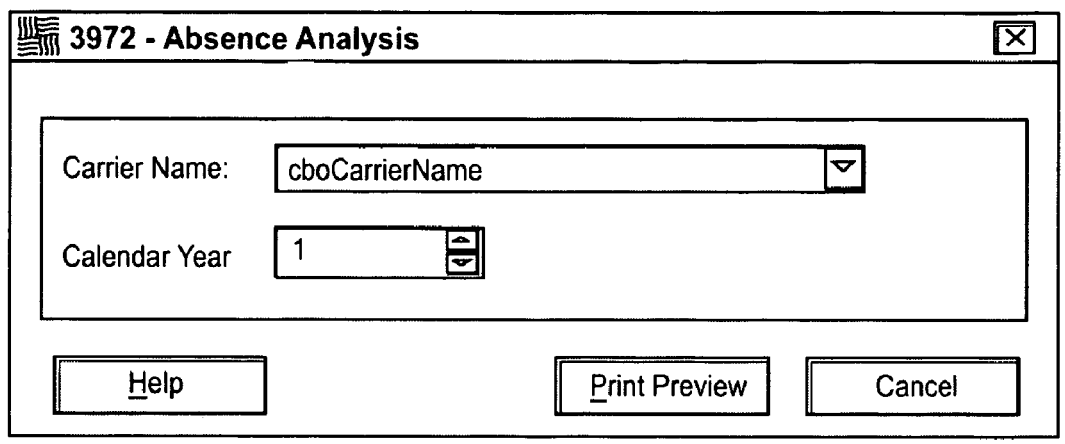

FIG. 31 illustrates an Individual Weekly Performance Trend Graph window that allows the user to display a Performance Trend Graph for a given week either by carrier or by route. In one embodiment, drop down menus identify all of the carriers or routes within a given delivery unit. FIG. 32 illustrates an embodiment of a window that allows the users to print a Late Leaving/Returning Form as discussed above. FIG. 33 illustrates a window that allows the user to print an Absence Analysis, as discussed above, by carrier and calendar year. If the calendar year chosen is not yet complete, the system provides all of the data populated up to that point.

Figure 34:
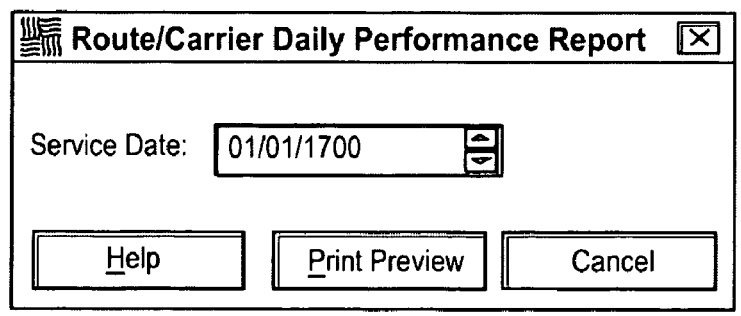
Figure 35:
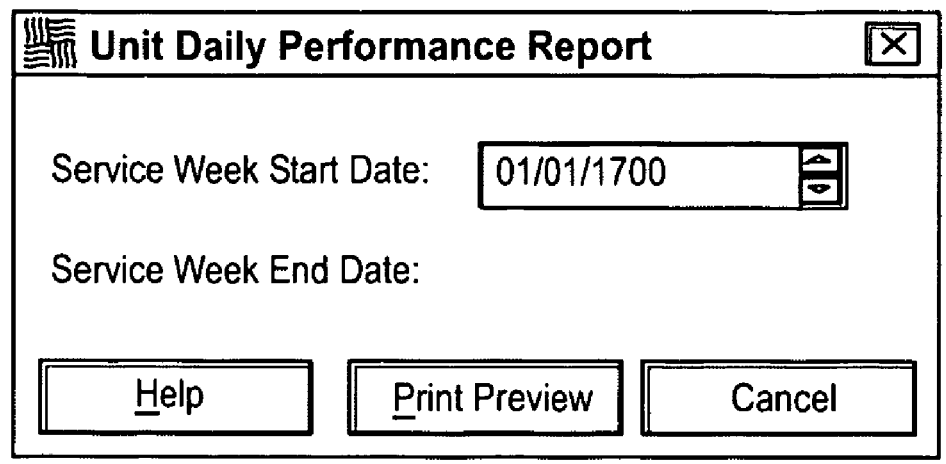
Figure 36:
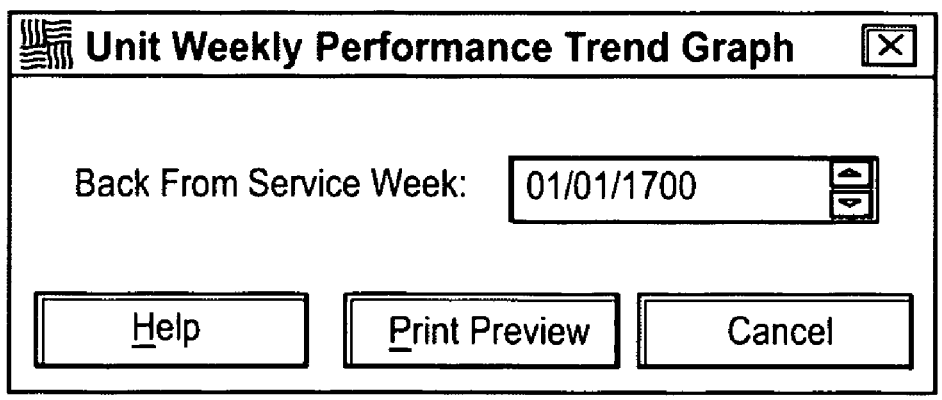

FIG. 34 illustrates a window that allows the user to print a Route/Carrier Daily Performance Report for a particular week. From a Unit Performance Menu window, the user can select either a daily performance report or a weekly unit performance trend graph, as discussed above. If the user presses the button for the daily performance report, he is taken to FIG. 35 where he selects a week for which to print the report. If the user presses the button for the unit performance trend graph, he is taken to FIG. 36 where he can select a week using the up and down arrow spinner box.

Figure 37:
Figure 38:
Figure 39:

FIG. 37 illustrates a window that allows the user to print a dispatch feedback report, as discussed above, for a given fiscal year. FIG. 38 illustrates a window that allows the user to print a FLASH statistics worksheet, as discussed above, for a given week. FIG. 39 illustrates a CSDRS Daily Worksheet window that allows the user to print a Customer Service Daily Recording System (CSDRS) report after selecting a service date. This report can be generated and printed on a weekly basis by selecting the CSDRS Weekly Worksheet button from the Performance Reports menu, as shown in FIG. 29.

Figure 40:
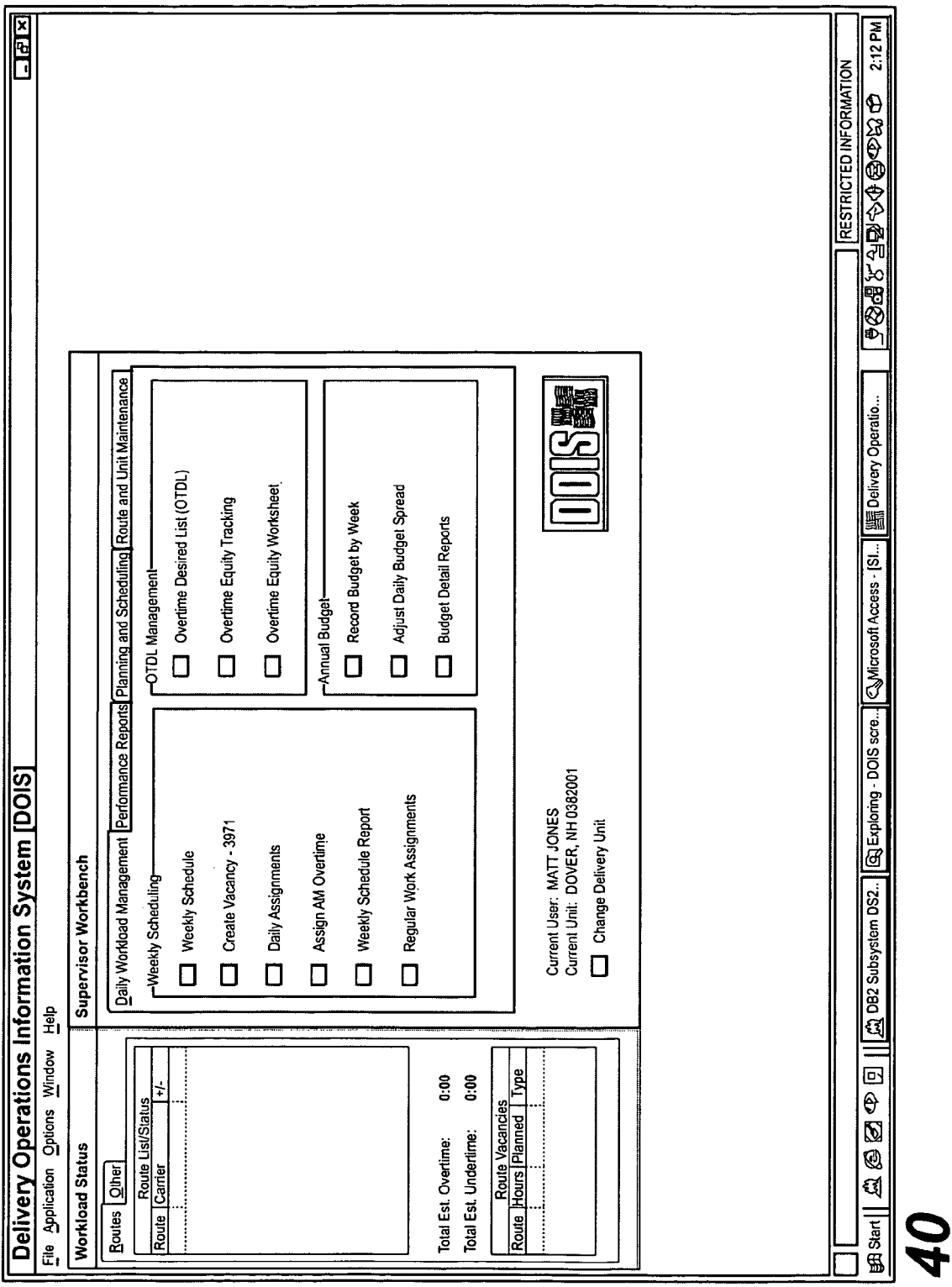

FIG. 40 brings us back to the Supervisor Workbench with a view of one embodiment of a Planning and Scheduling tab, which includes three sections: Weekly Scheduling; OTDL Management; and Annual Budget. The Weekly Scheduling includes buttons as described below. A Weekly Schedule button allows the user to make assignments for the next week. The weekly schedule can be available, for example, on Monday morning, to aid the supervisor in managing the workforce for the upcoming week. A Create Vacancies button allows the user to create vacancies, as discussed above. The Daily Assignments button allows the user to change daily assignments as discussed above. The fourth button allows the user to assigned AM overtime by bringing a carrier in early with expectations of having them work their overtime in the morning versus the evening. The fifth button allows the user to print a weekly schedule report allowing him to identify which regulars are scheduled to work and what routes they are assigned to.

The OTDL Management section facilitates management of an overtime desired list. The Overtime Desired List button allows the user to display a list of each employee that desires overtime. The Overtime Equity Tracking button tracks overtime hours and opportunity by each employee on the overtime desired list and preferably produces a report for the user. The Overtime Equity Worksheet button identifies employees that have refused overtime on a given day and sets forth the reasons.

The Annual Budget section records a delivery unit's budget by week. An interfacing system inputs a budget to the system of the present invention as a weekly total. This total budget is recorded when the user presses the Record Budget by Week button. The system allows users to allocate that weekly budget by day by pressing the Adjust Daily Budget Spread button. The user can display budget details by pressing the Budget Details Report button.

Figure 41:
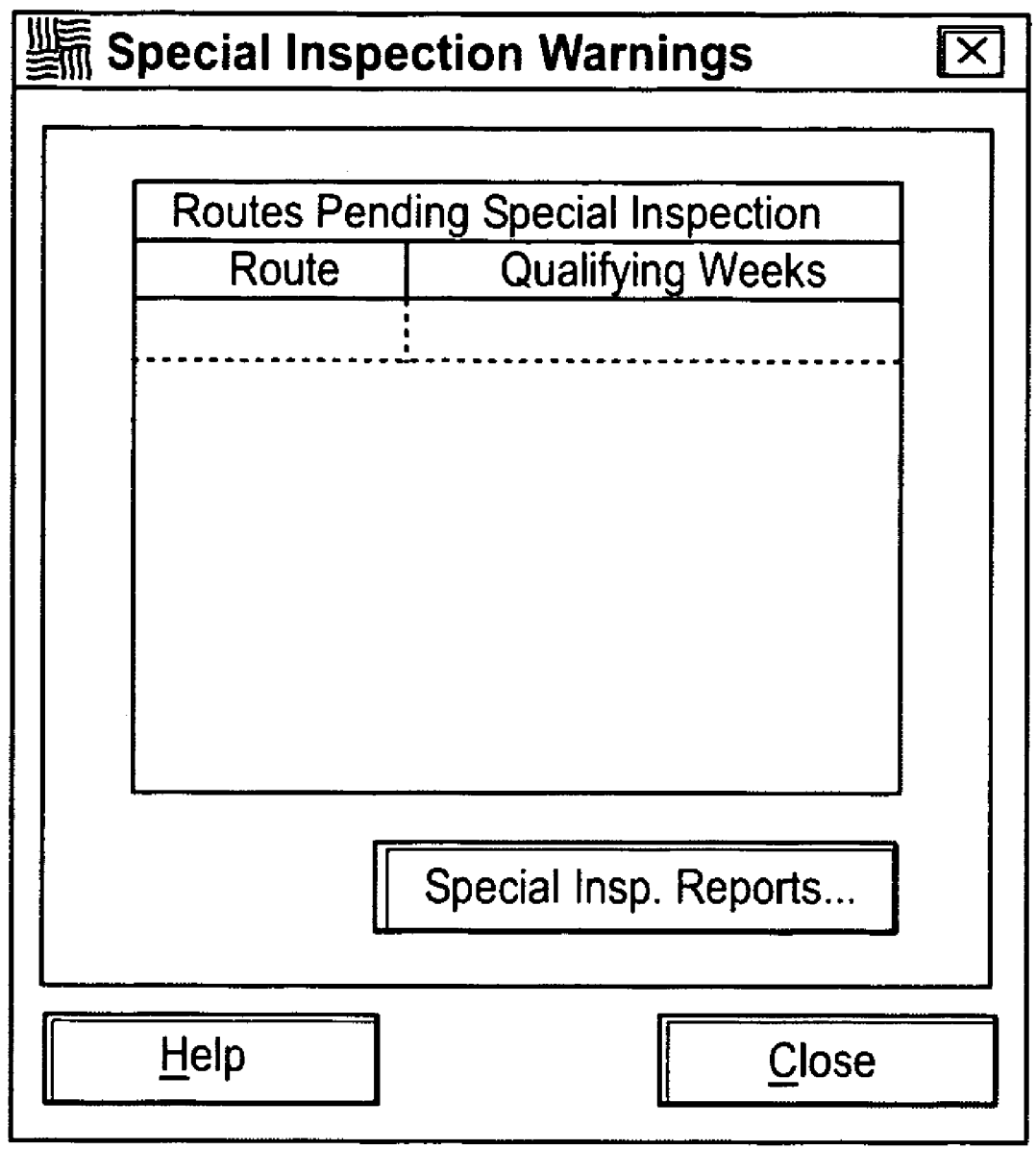

FIG. 41 illustrates a Special Inspection Warning window that displays any route that uses a predetermined amount and or occurrences of overtime that the system designers have identified as calling into question whether the route requires permanent assistance or should be downsized.

FIG. 42 illustrates a Weekly Schedule window that is displayed when the Weekly Schedule button is pressed. This window may display, for example, the carrier's name, the type of carrier, and his assignment for each day of the week. Budget information can also be displayed on the screen. This window may also display projected workload based on volume from last year, and any SPLY impact that occurred last year.

FIG. 43 illustrates an Assign Carriers window that displays assignment details for a given route number, such as the particular section that is assigned to a carrier whether it is an office or street section. The window also gives the date range for that assignment and displays available carriers along with certain information about each available carrier.

Figure 44:
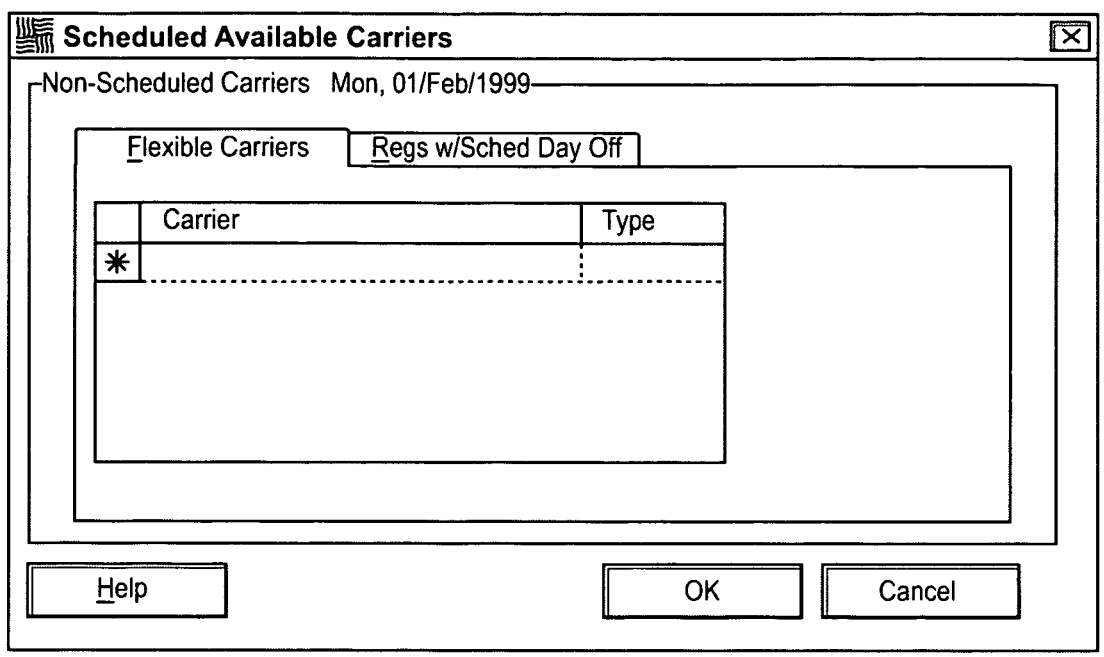
Figure 45:
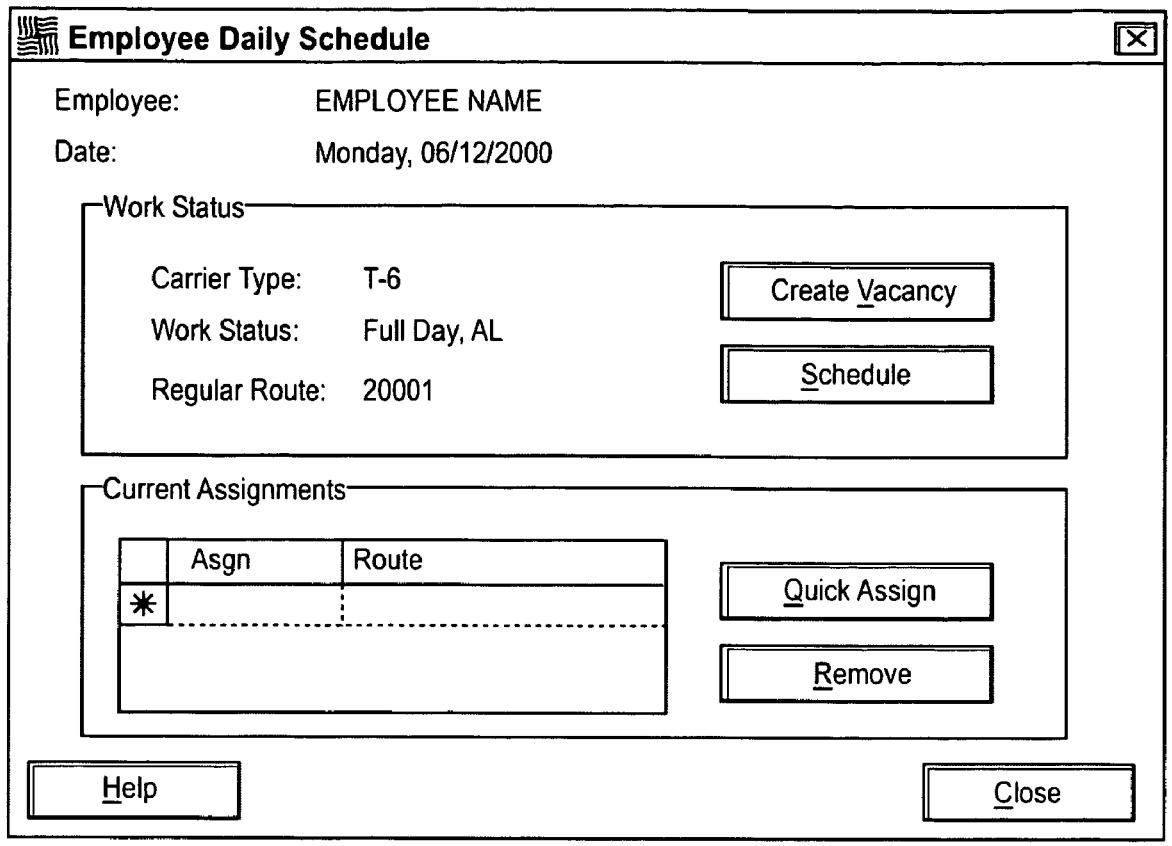

FIG. 44 illustrates a Schedule Available Carriers window allowing the user to view and assign work to carriers that are available. FIG. 45 illustrates an Employee Daily Schedule screen that displays, for a given carrier, information including his carrier type, work status, etc. The system allows the user to create a vacancy in this window or schedule the displayed carrier by pressing the appropriate buttons. This window can also illustrate a carrier's current assignment and the user can change that assignment by pressing the Quick Assign button.

Figure 46:
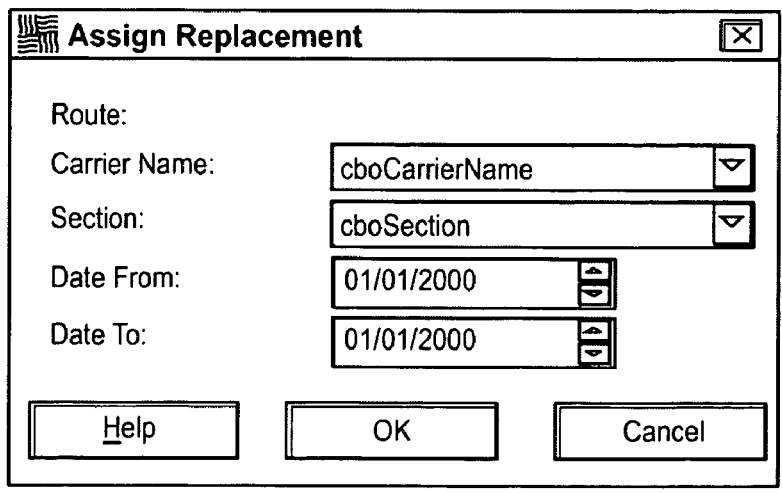

FIG. 46 illustrates an Assign Replacement window allowing the user to select a route and pick a carrier to assign from a drop down list. The user can also assign a particular section of a route and set a range of dates for the assignment.

Figure 47:

FIG. 47 illustrates a Confirm Assignment window that informs the user whether the system has detected any overlapping or conflicting assignments. It can also inform the user whether any assignments will place an employee into "penalty overtime" where the carrier will work more than ten hours a day, or will work overtime more than four days a week.

Figure 48:
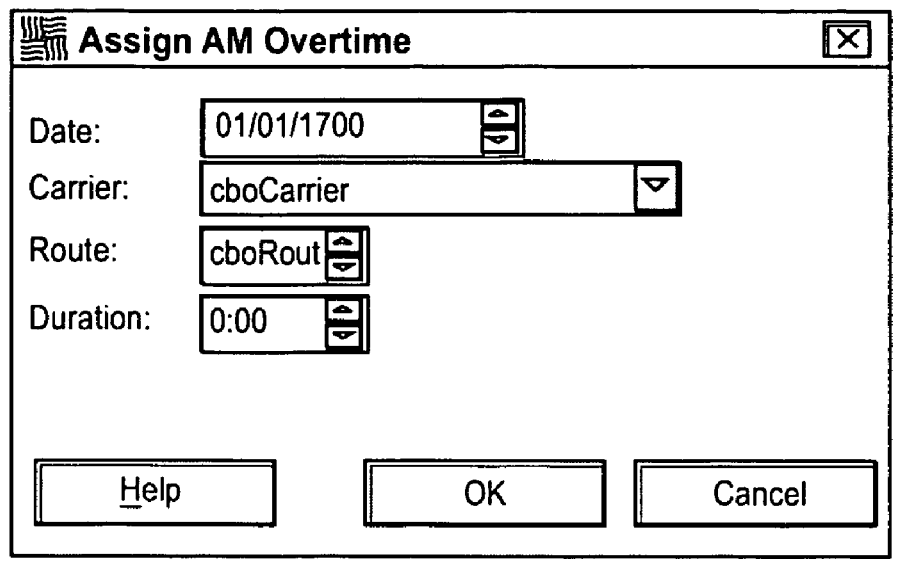
Figure 49:
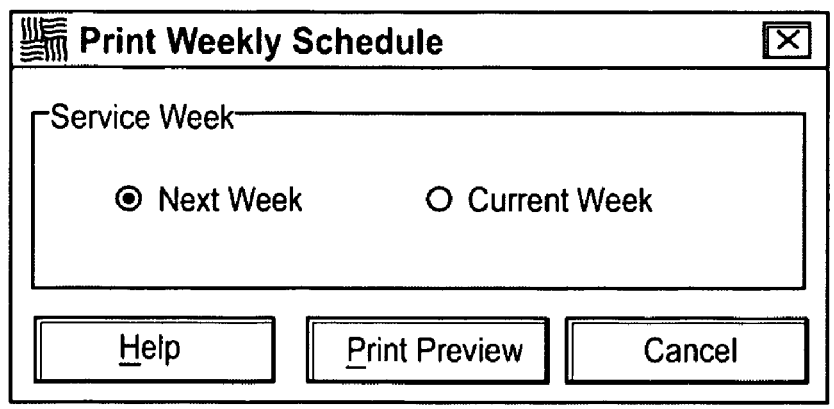
Figure 51:
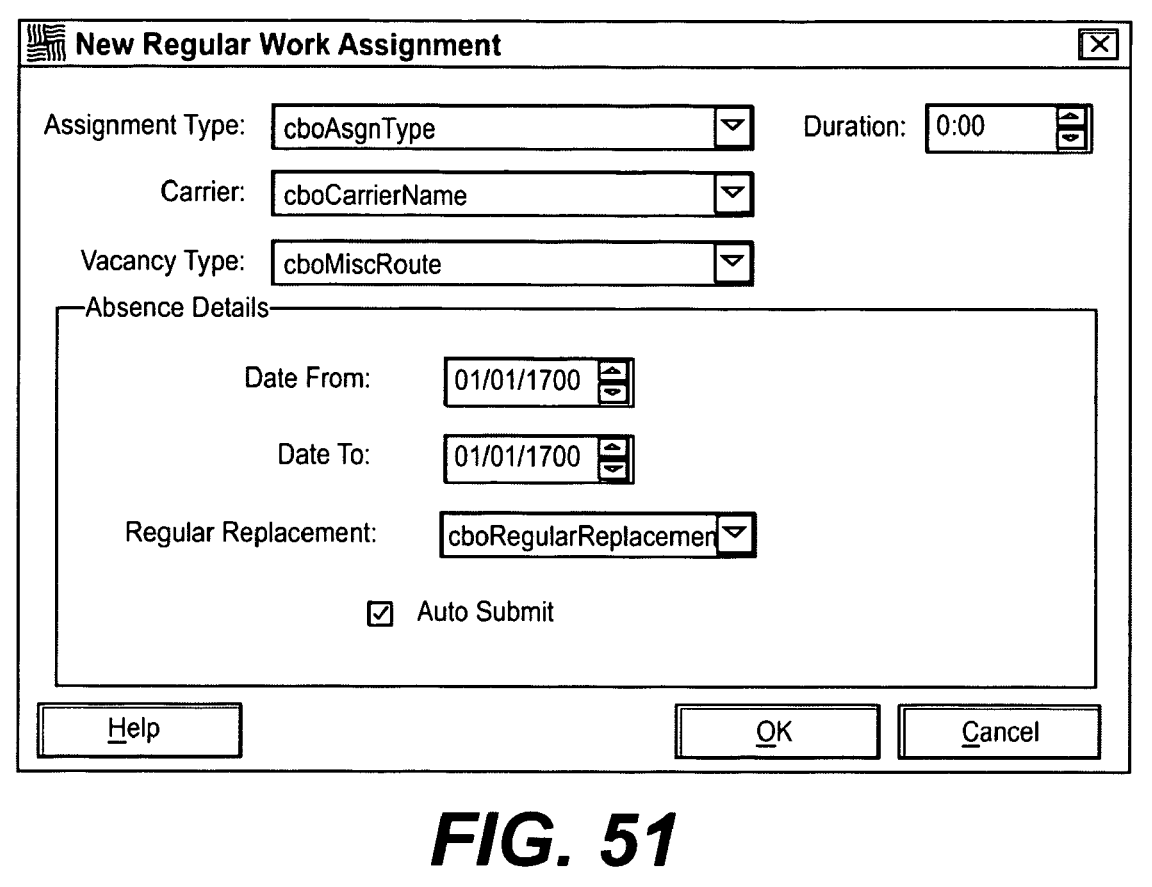

FIG. 48 illustrates an Assign AM Overtime window, which allows the user to input the date, carrier, route, and number of hours. FIG. 49 illustrates the Print Weekly Schedule window allowing the user to print the current week or the next week. This window appears when the user selects the Weekly Schedule Report button from the Planning and Scheduling tab. FIG. 50 illustrates a Regular Work Assignments window listing the work assignments of the carriers. This window can list, for example, the carriers' assignment type, the route, and a day-by-day schedule. FIG. 51 illustrates a New Regular Work Assignment window where a user can reassign a carrier to a route that the carrier has requested. Also, if a carrier is taking multiple days of leave, this window allows the user to replace the regular carrier for that route for a given period of time.

FIG. 52 illustrates an Overtime Desired List window. In this window, the user selects a year quarter and the system display information for all the carriers desiring overtime that quarter. The system may also display each carrier's overtime status and the amount of overtime he is willing to work. Carriers can be added to the list by pressing the New button and can be removed from the list by pressing the Remove button. The Roll In OTDL button allows the user to roll in overtime list from the previous quarter to avoid re-entering the entire list.

Figures 53, 54:
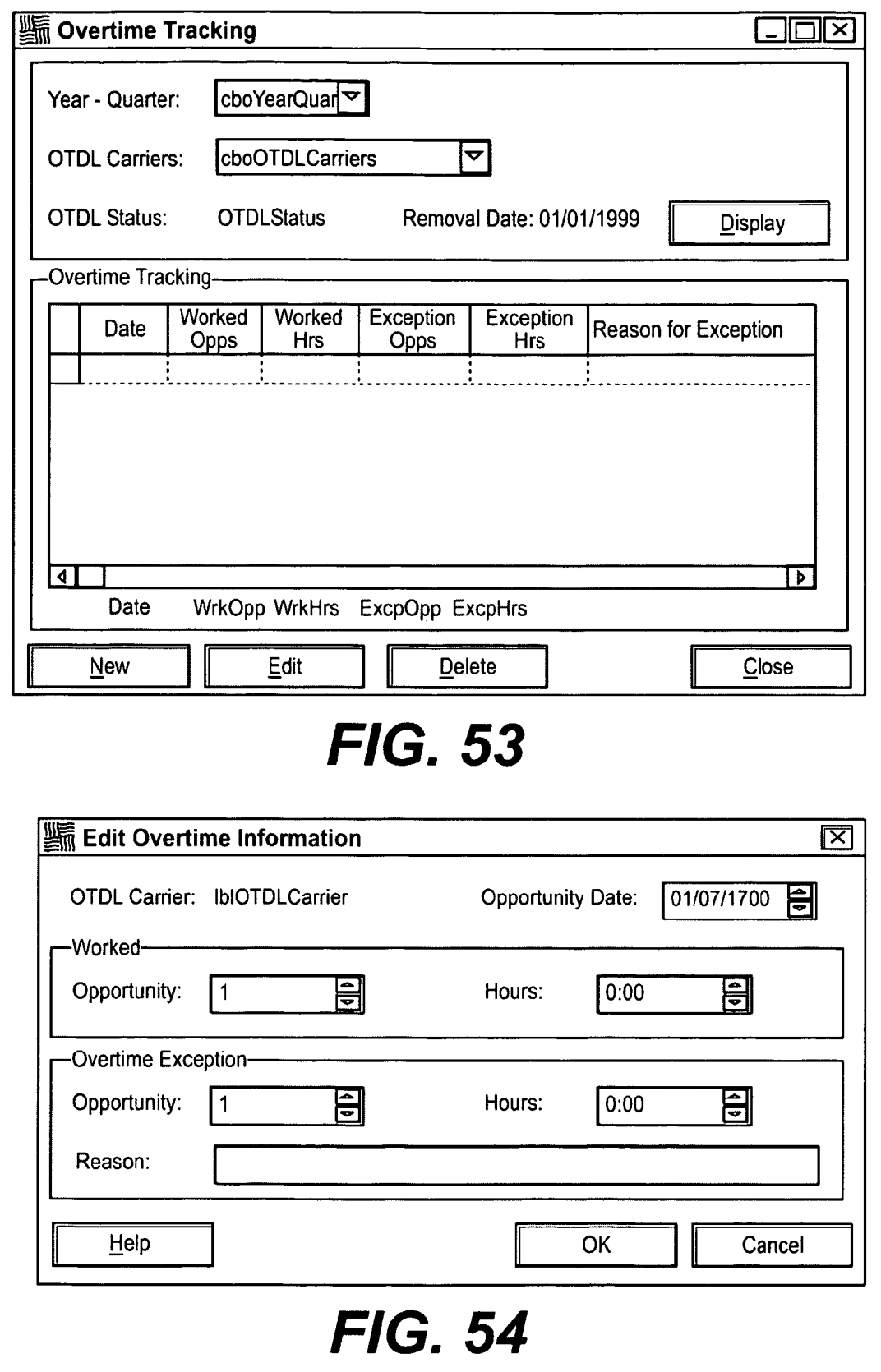

FIG. 53 illustrates an Overtime Tracking window to track overtime by carrier by quarter. The window displays the carrier's status (how much overtime he is willing to work). If a carrier was removed from the overtime desired list, the system displays the date of removal. FIG. 54 illustrates an Edit Overtime Information window, which allows the user to override any system overtime calculations that were done incorrectly or not done at all. The system 100 can also include an Overtime Worksheet window allowing the user to display an overtime worksheet for a given quarter.

Figure 55:
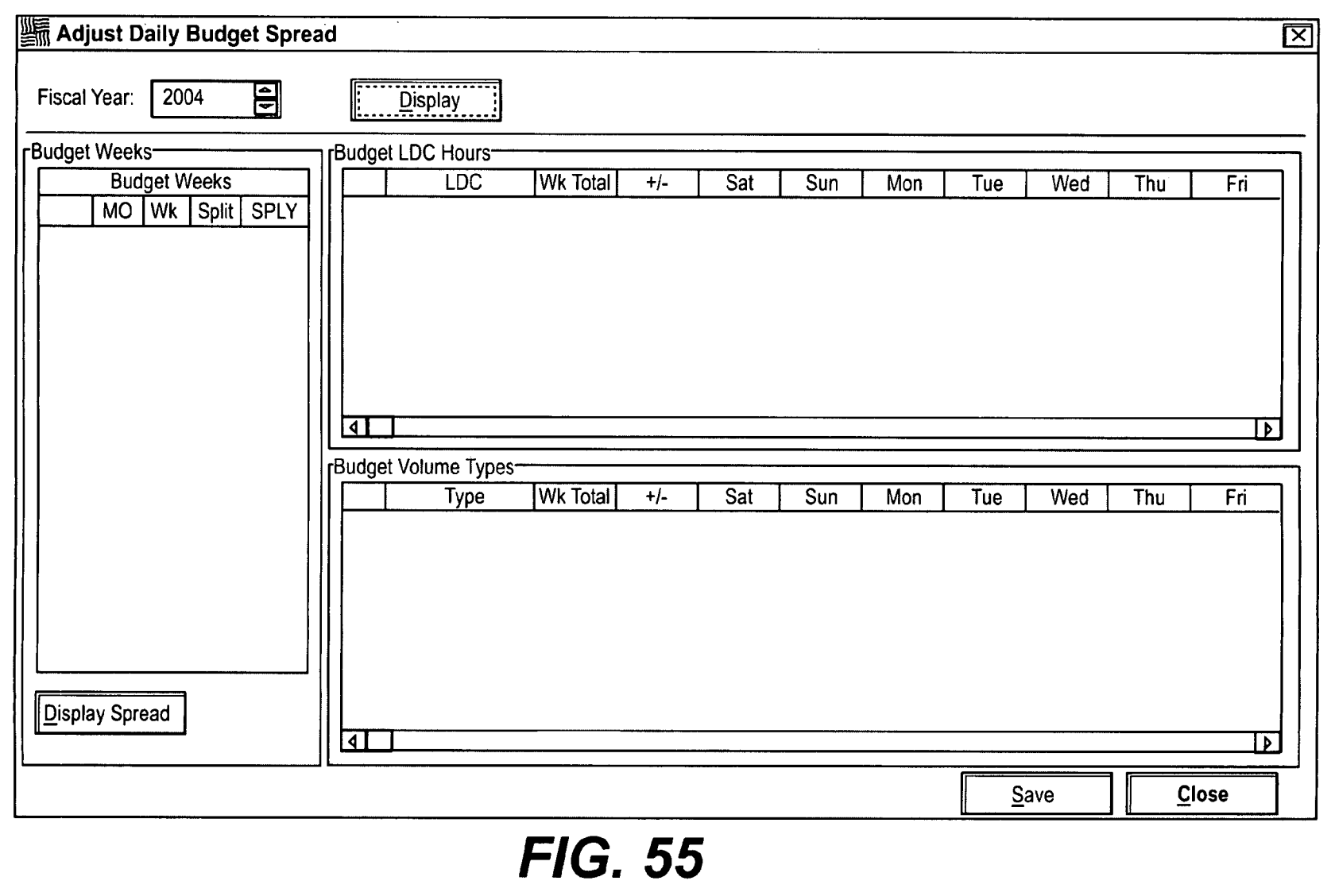
Figure 56:

FIG. 55 illustrates an Adjust Daily Budget Spread window allowing the user to break down his budget by day to plan for work hours and mail volume. FIG. 56 shows a Budget Detail Reports window that allows the user to display a weekly summary by month or a daily summary by week. The user selects a print range of fiscal year and month(s).

Figure 57:
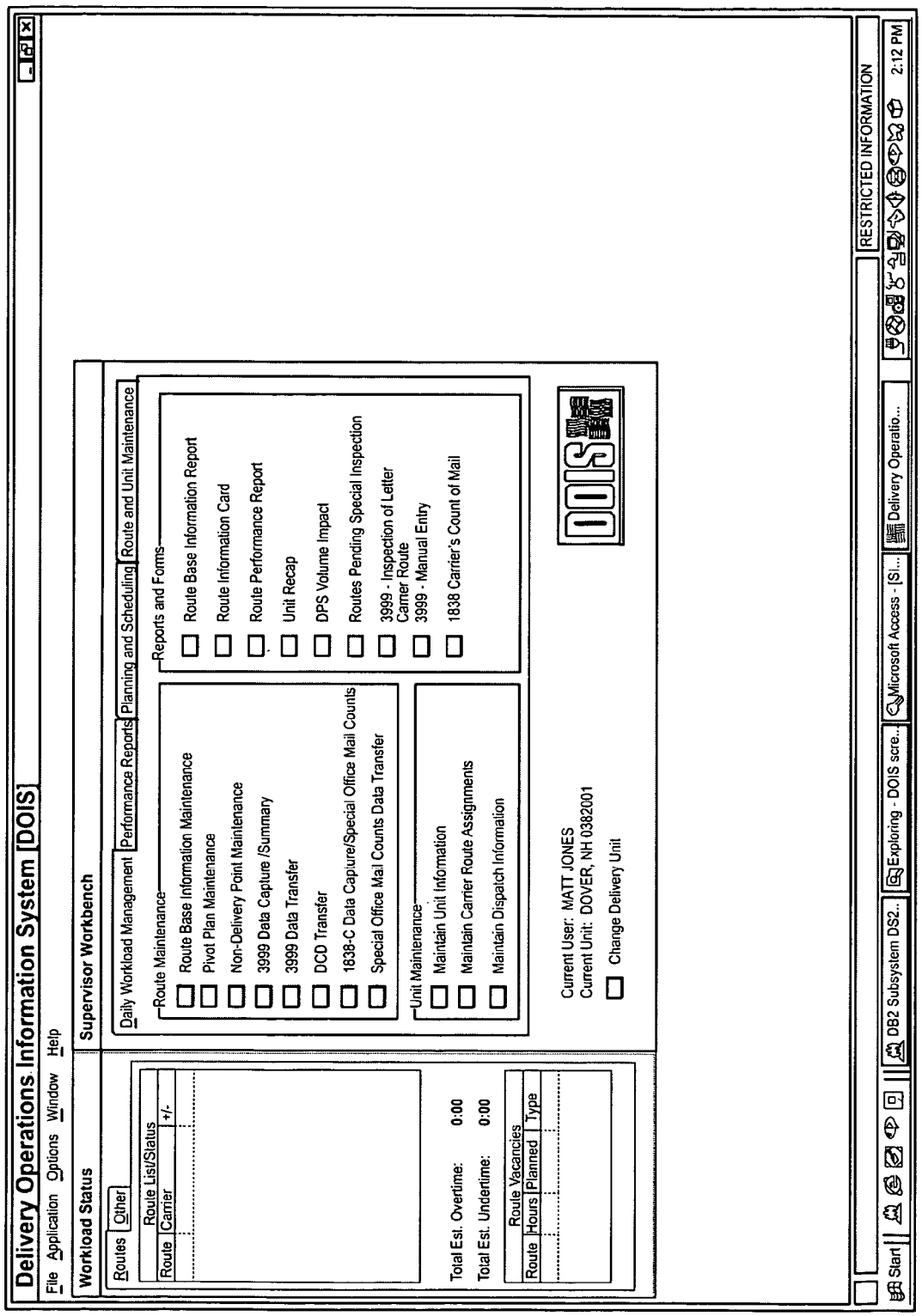

FIG. 57 brings us back to the Supervisor Work Bench, with a view of one embodiment of a Route and Unit Maintenance tab, including three sections: Route Maintenance; Unit Maintenance; and Reports and Forms. The Route Maintenance section includes buttons for Route Base Information Maintenance, Pivot Plan Maintenance, Non-Delivery Point Maintenance, 3999 Data Capture/Summary, 3999 Data Transfer, DCD Transfer, 1838-C Data Capture/Special Office Mail Counts, and Special Office Mail Counts Data Transfer. The Route Base Information Maintenance allows the user to view and adjust information related to a route, for example, travel times and begin times. The Pivot Plan Maintenance button that allows the user to establish a pivot plan for a route, as discussed above. The Non-Delivery Point Maintenance button allows a user to change, for example, a route's park points, relay points, and collection boxes. Park points are where a carrier parks his vehicle to make a loop on foot. A relay point is basically the same thing, where the carrier returns to the vehicle between multiple loops. A collection box is where carriers pick up mail to be processed. The 3999 Data Capture/Summary button allows the user to modify the step-by-step travel pattern a carrier follows to deliver a route.

The 3999 Data Transfer window preferably allows the user to download information from a DCD that was used during a route inspection, street management, or a mail count. The 1838-C Data Capture/Special Office Mail Counts button is used for a one-day office mail count for an individual carrier. This information allows the system to determine the carrier's daily performance. The Special Office Mail Counts Data Transfer button allows the user to transfer the one-day office mail count for an individual carrier into the application.

The Unit Maintenance tab is where the user identifies the delivery unit, its location, and gives general information about the delivery unit by pressing the Maintain Unit Information button. The Maintain Carrier Route Assignments button allows the user to identify the carriers for each route. The Maintain Dispatch Information button allows the user to integrate an operating plan (a plan that the post office and the sorting facility have to coordinate mail sent between the two facilities) and update information regarding when deliveries will arrive from a sorting facility and how much mail will be in each delivery.

In one embodiment, the Reports and Forms section includes a number of buttons that perform the functions set forth below. Route Base Information Report button displays general information for all routes in a delivery unit. The Route Information Card button displays specific information about a route including reporting time, leave time, return time, end time (carrier leaves the office to go home), and projected morning and evening mail volumes. The Route Performance Report button displays carrier assignments and performance for a given period of time. The Unit Recap button displays assignments and performance for a delivery unit. The Delivery Point Sequence ("DPS") Volume Impact Button allows the user to measure the impact the automated DPS sorter has on the total number of letters the carrier has to sort, so that the saved time can be subtracted from the carriers allowed sorting time. The Routes Pending Special Inspection button allows the user to display the routes pending special inspection. The PS Form 3999 Inspection of a Letter Carrier Route button allows the user to get a history of the carrier's performance. The 3999-Manual Entry button allows the user to manually enter inspection information. The 1838 Carrier's Count of Mail button allows the user to print a one-day office mail count for an individual carrier.

FIG. 58 illustrates an embodiment of a Route Base Information Maintenance window, which provides information for a route that the user selects. The displayed information may include the type of route (e.g., residential, business, mixed), the type of delivery (e.g., foot, dismount, curb line motorized, park and loop, etc.), and whether the route is a full route or auxiliary, whether the route has Saturday delivery or not. This window may also display the route's begin time, leave time, return time, and end time on a daily basis, and the route's last inspection date and statistics, and fixed office time (the amount of fixed office time that has been established for the route, which is not driven by workload). This window may further display morning and evening mail volume information, percent-to-standard, and carrier information such as the regular carrier assigned to the route, his hire date, date assign to the route, and the replacement carrier.

Figure 59:
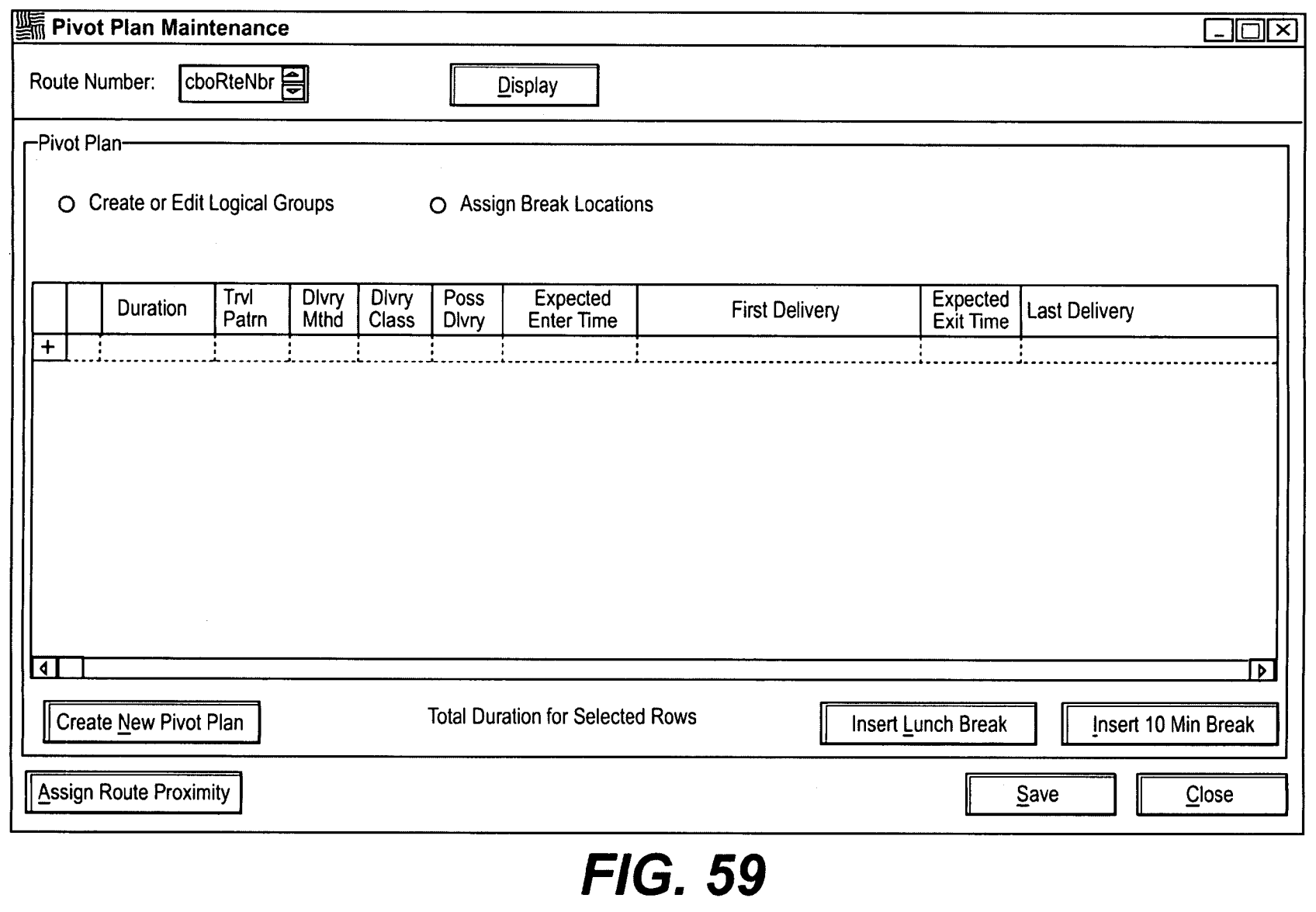

FIG. 59 illustrates an embodiment of a Pivot Plan Maintenance window, where the user can create a pivot plan and logical groups, as discussed above, or assign route break locations. This takes the step-by-step travel pattern a carrier follows to deliver a route and combines that information with an interfacing Address Management System ("AMS") database to identify the address of every delivery on a particular route so that those deliveries can be split into logical groups. Once the user creates logical groups of addresses, the system assigns an amount of time for delivery, a travel pattern, a delivery method, possible points for mail delivery (e.g., number of houses), the carrier's expected enter time and exit time for a particular logical group, and his first delivery. A block with no breaks is called a sector segment. Sector segments are already set up in the AMS database and are linked together by the user to create a logical group. In one embodiment, the system receives data from the AMS database weekly.

Figure 60:
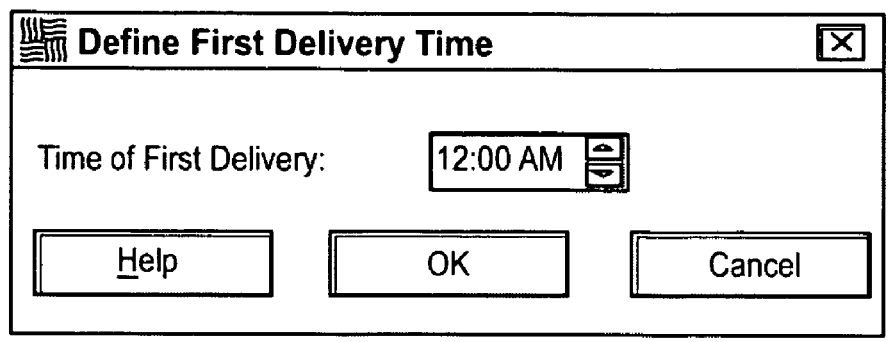
Figure 61:
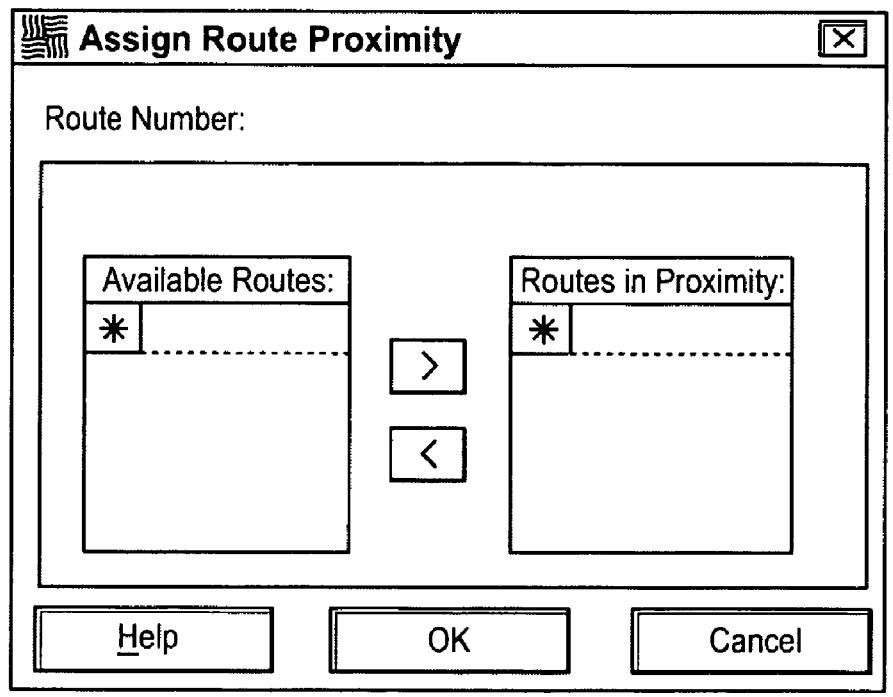

FIG. 60 illustrates an embodiment of a Define First Delivery Time window that allows a user to set the time when he expects the carrier to drop mail in the first delivery box on his route. FIG. 61 illustrates an Assign Route Proximity window, allowing the user to identify all of the routes in close proximity to the route being pivoted. Assigning route proximity helps the user reassign a section to another carrier having a proximate route and therefore lessen the time it takes the assisting carrier to travel to assist with the route section. Assigning route proximity is preferably only done once, but can be adjusted with this same window.

Figure 63:

FIG. 62 illustrates an embodiment of a Non-Delivery Point Maintenance window. Non-delivery points include park points, relay points, and collection boxes. This window displays the location of non-delivery points for a route selected by the user. FIG. 63 illustrates an embodiment of a 3999 Data Capture Record Selection window. The user inputs a route number and the window displays the available 3999 forms that were created to modify the step-by-step travel pattern a carrier follows to deliver a route. The user can choose to edit any 3999 form or add a new 3999 form.

FIG. 64 illustrates an embodiment of a 3999 Data Transfer window, as discussed above. The system lists all of the routes stored on the mainframe, and the user can select certain of those routes to be downloaded to the workstation. FIG. 65 illustrates an embodiment of a 1838-C Data Capture and Maintenance window, allowing the user to manually enter or edit mail volume information. The mail volume is broken down by route and day, and identifies morning or evening volume. The window breaks mail volume down by type of mail. An optional expansion of the 1838-C Data Capture and Maintenance window can be provided having fields for entering mail volumes.

Figure 66:
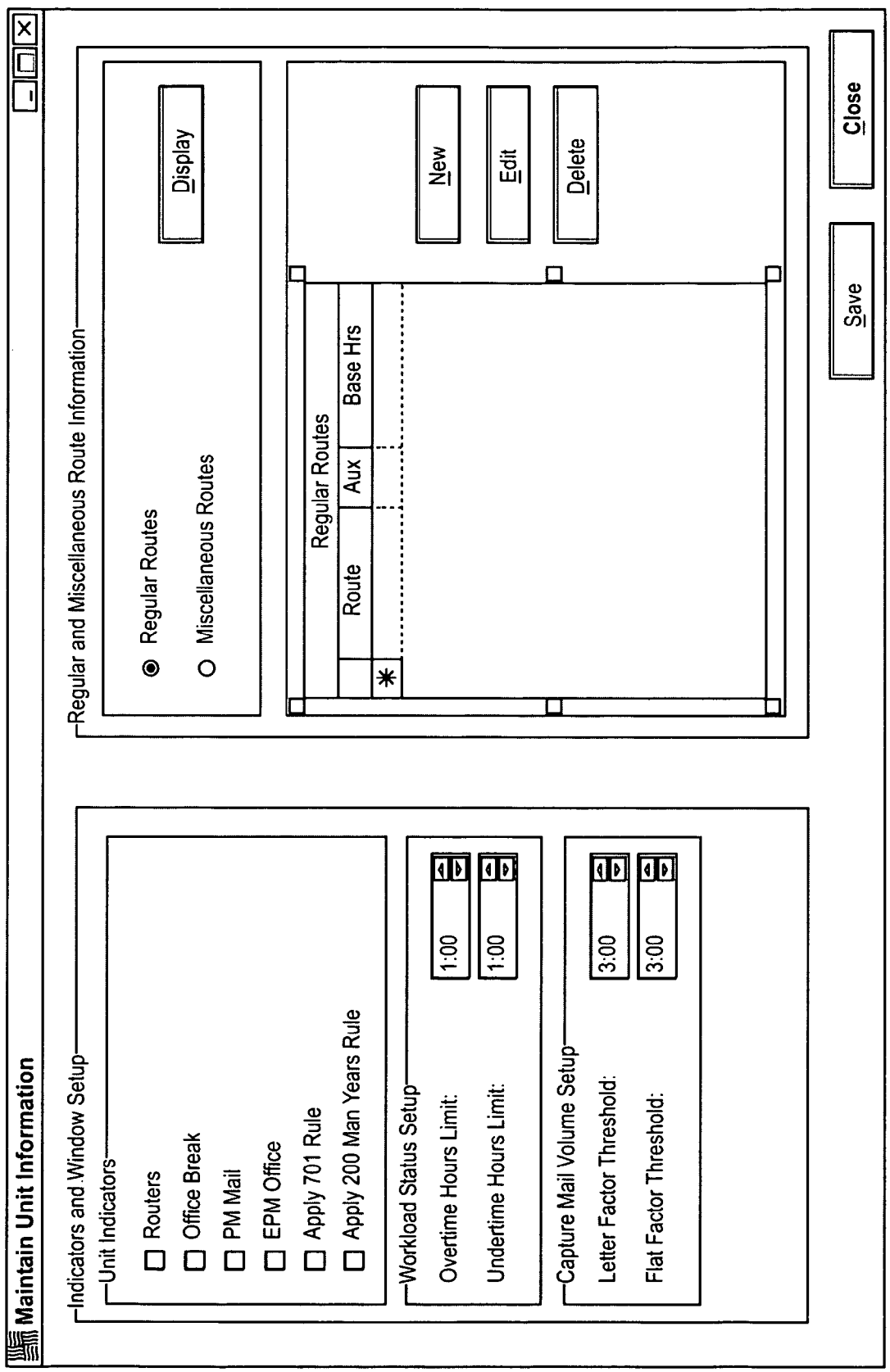

The Unit Maintenance Menu feature can include a Unit Maintenance Menu window having buttons for the following functions: Maintain Unit information; Maintain Carrier Route Assignments; and Maintain Dispatch Information. FIG. 66 illustrates an embodiment of a Maintain Unit Information window that appears when the corresponding button is pressed. This window includes the following sections: Unit Indicators (e.g., router, office break, and evening mail), Workload Status Setup, Capture Mail Volume Setup, and Regular and Miscellaneous Route Information. Workload Status setup allows the user to input what threshold of overtime and under time he wants to be alerted to. For example, if the user selects to view thirty minutes, only routes that have 30 minutes or more of overtime or under time will be displayed. Capture Mail Volume Setup allows the user set thresholds for one or more types of mail. If the mail volume of a type of mail exceeds the entered threshold (which is entered as a percentage), the system highlights the mail volume field to alert the user of a possible mistake. The highlighting may include turning the field yellow, bolding it, flashing it, or another method to draw the user's attention. Regular and Miscellaneous Route Information displays route base hours for the type of route (regular or miscellaneous) chosen by the user.

Figure 67:
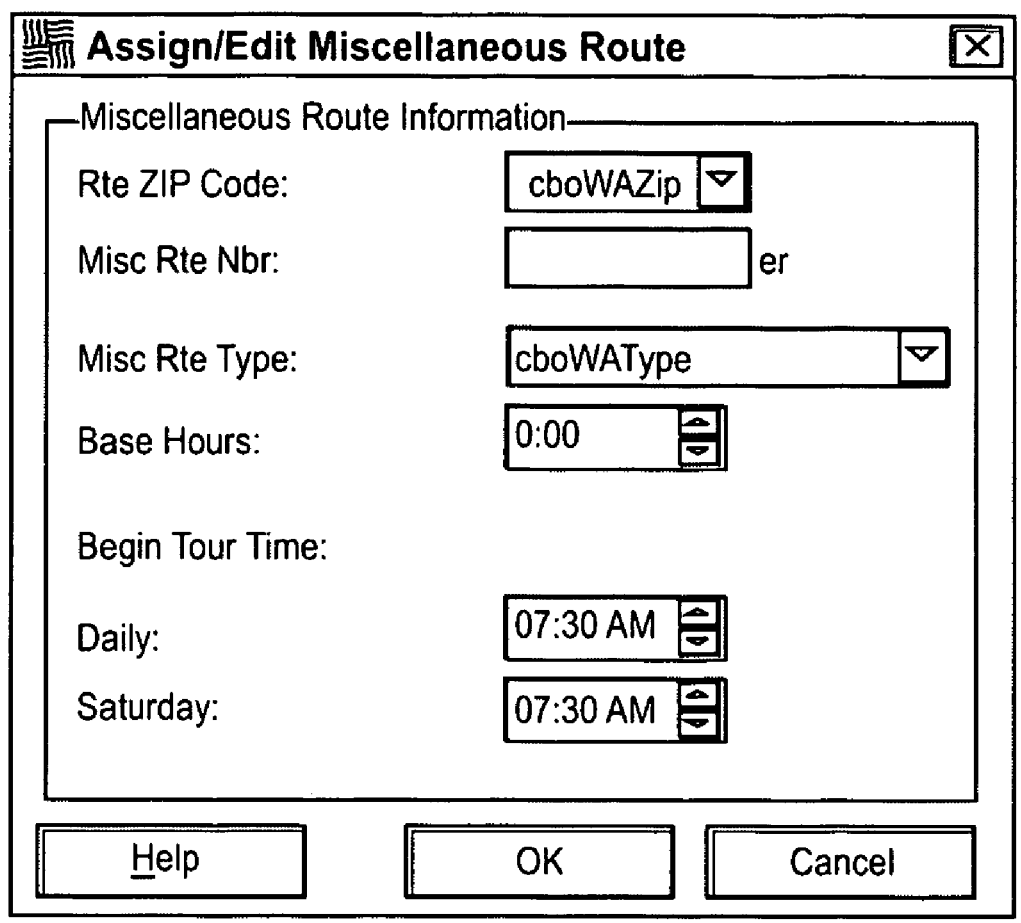

In one embodiment, the system can include a window allowing the user to remove a route from a delivery unit. This might be done, for example, when a new ZIP code™ is created and routes are therefore moved to a new unit. FIG. 67 illustrates an embodiment of an Assign/Edit Miscellaneous Route window that displays, for a given miscellaneous route number, its ZIP code™, type (e.g., collection route, relay route, or combination route), base hours, daily begin tour time and Saturday begin tour time. One or more confirmation windows may also appear asking the user to confirm by selecting "Okay" prior to deleting a route from the system.

FIG. 68 illustrates an embodiment of a Maintain Carrier Route Assignments window that lists all carriers, their type, and their assignment. Carriers can be added, edited, or deleted. If the user is adding a carrier, the right side of this window allows him to enter information for that individual carrier.

Figure 69:
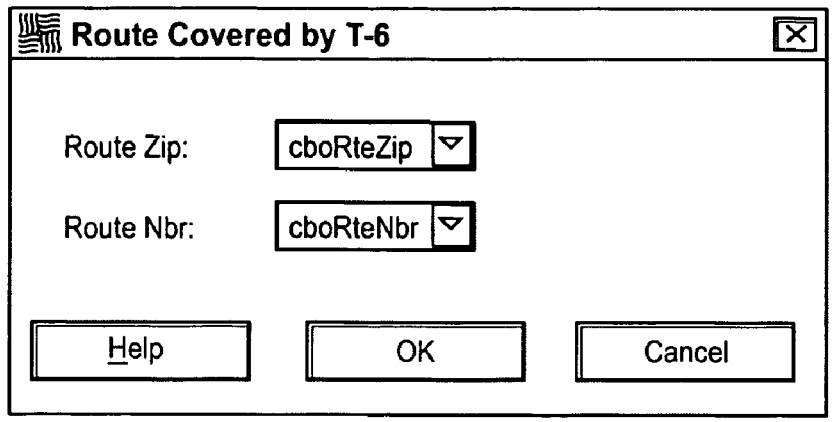
Figure 70:
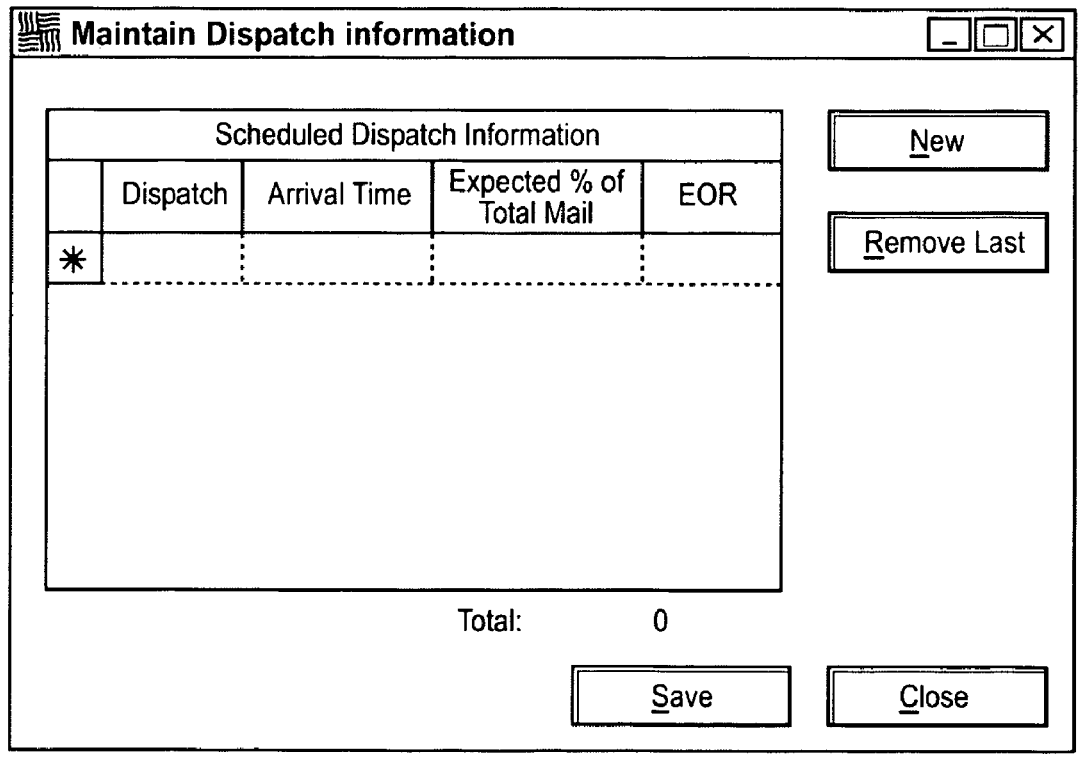
Figure 71:
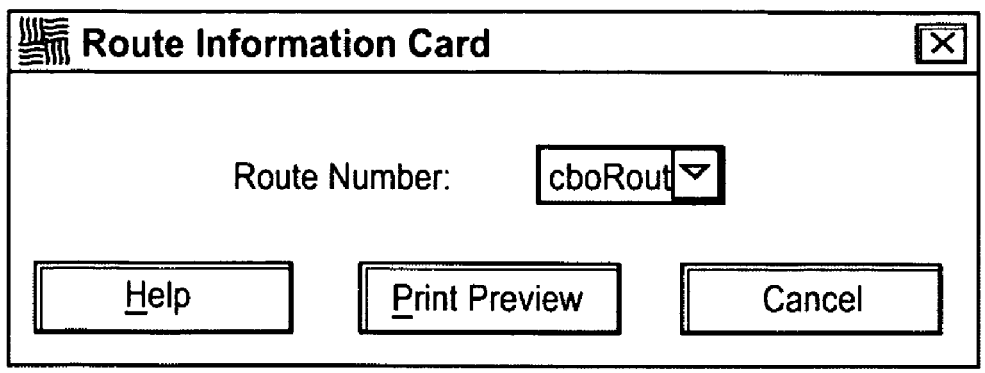
Figure 72:

FIG. 69 illustrates an embodiment of a Route Covered by T-6 window. The user inputs the ZIP code™ and route number, and can then assign a T-6 to that route. FIG. 70 illustrates an embodiment of a Maintain Dispatch Information window allowing the user to display a list of dispatches (deliveries from the sorting facility, as discussed above), their arrival time, and the percentage of the day's mail that is expected from the plant. FIG. 71 illustrates an embodiment of a Route Information Card window allowing the user to display a chosen route and then print information about the route. FIG. 72 illustrates an embodiment of a Unit Recap window that displays what the delivery unit has done (e.g., a route inspection, a minor adjustment, etc.) with routes over a period of time, type of route, start date, end date, route status, and date implemented.

Figure 73:
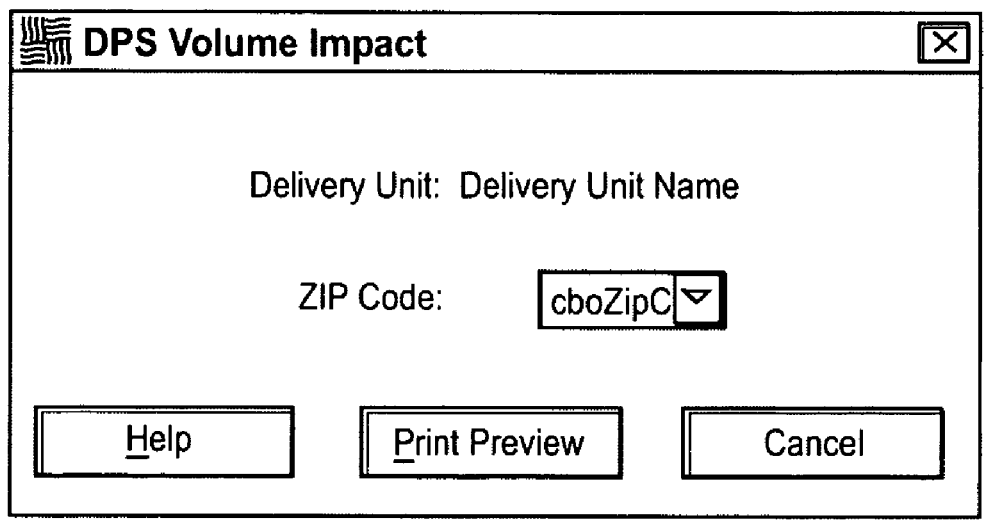
Figures 74, 75:
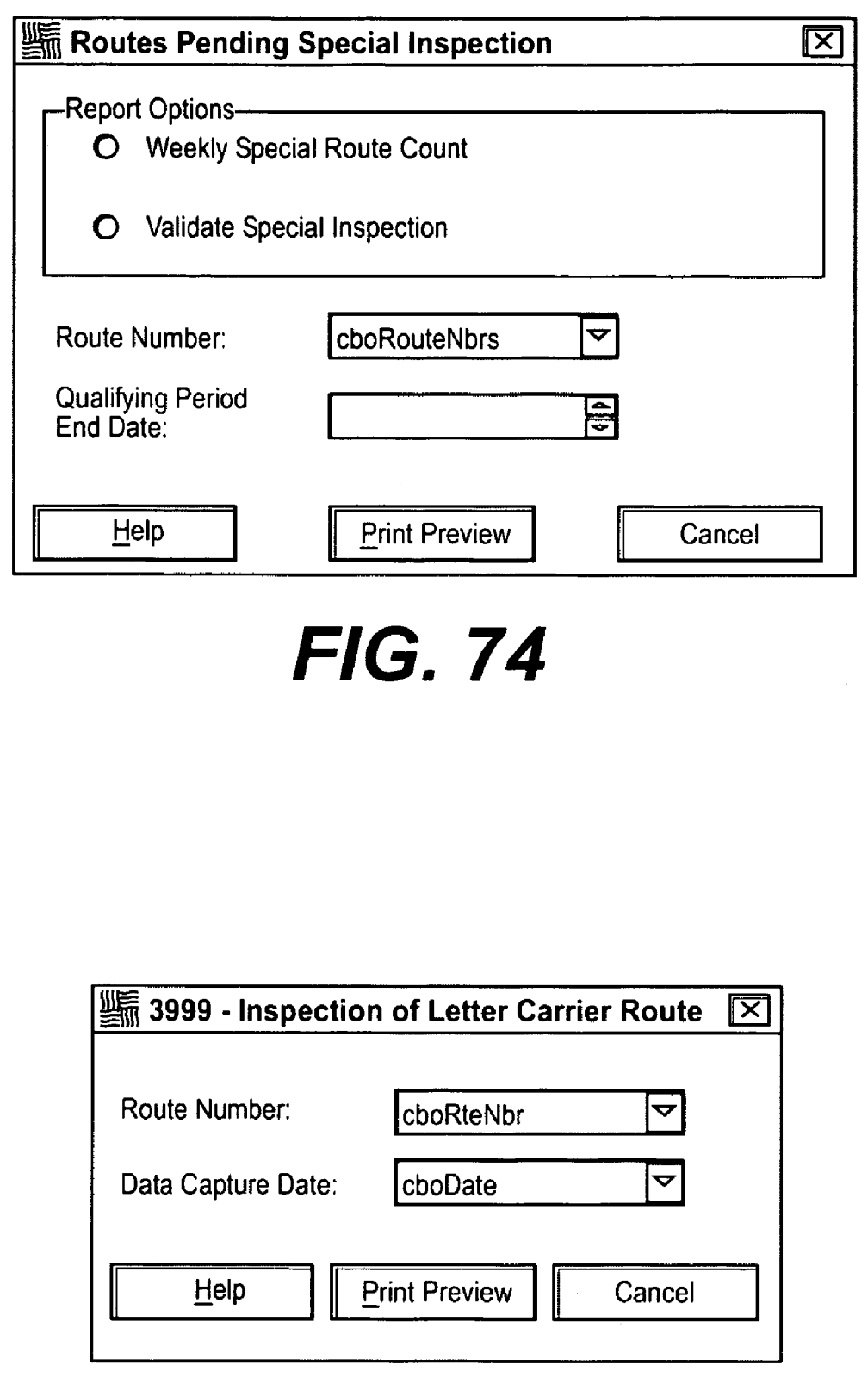

FIG. 73 illustrates an embodiment of a DPS Volume Impact window. The user selects a ZIP code™ to display, by route, the impact of having DPS sorted mail. FIG. 74 illustrates an embodiment of a Routes Pending Special Inspection window allowing the user to display routes pending inspection for a particular week, or the user can schedule an inspection by selecting a route number and a qualifying period end date. FIG. 75 illustrates an embodiment of a 3999—Inspection of Letter Carrier Route window. The user identifies the route number and the data capture date, and can display inspection results. A Street Activity Start Time window can be provided for entering a start time for a particular route.

Figure 76:
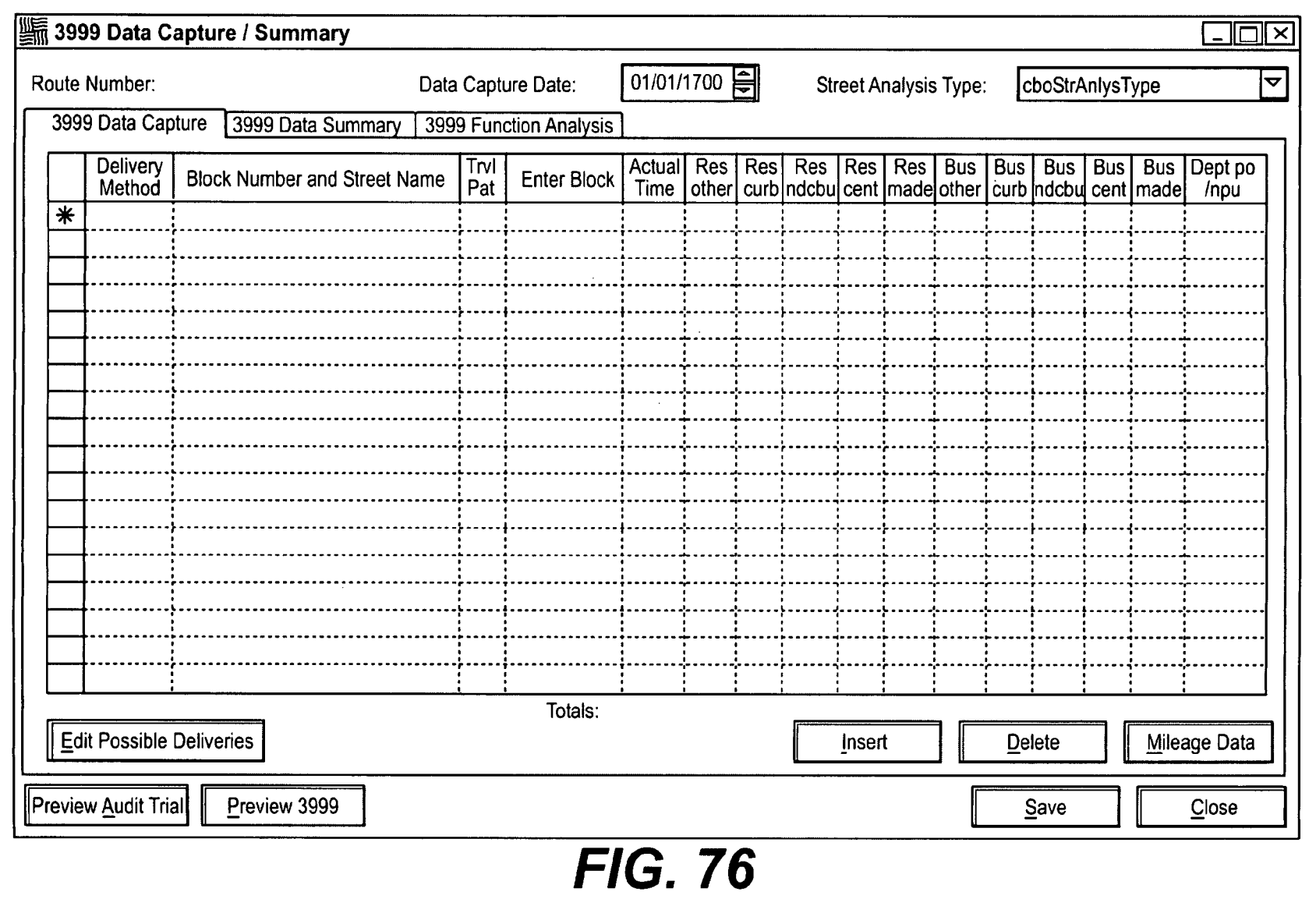
Figure 77:

FIG. 76 illustrates an embodiment of a 3999 Data Capture/Summary window, allowing the user to manually enter route inspection information which appears after the user selects the 3999—Manual Entry button. A Mileage Breakdown window can be provided for inputting vehicle odometer readings at various points in a carrier's workday, for example, when he reports to the office, leaves the office, makes his first delivery, etc. during an inspection period. FIG. 77 illustrates an embodiment of a Carrier's Count of Mail window that displays a carrier's volume of mail for a given date and route number during an inspection period.

Figure 78:

In one embodiment of the present invention, the delivery operations information system of the present invention includes a second module for Route Inspections and Adjustments. FIG. 78 illustrates an embodiment of a Route Inspections and Adjustments window. It is the first window that opens in the second module. It displays whether the route adjustment will be formal, special, or minor. A special route adjustment request is one made by a carrier. In a minor route adjustment, the supervisor need not accompany the carrier on the route but may instead use predetermined calculation to make the adjustment using the volume of mail and the historical time data for that route. The window displays start and end dates for the route adjustment. The user can press buttons to view adjustment details, edit an adjustment, change the status of the adjustment from formal to minor to special, to define a new adjustment, to select an ongoing adjustment, or to change to view information for a different delivery facility (assists a user who supervises multiple delivery units).

Figure 79:
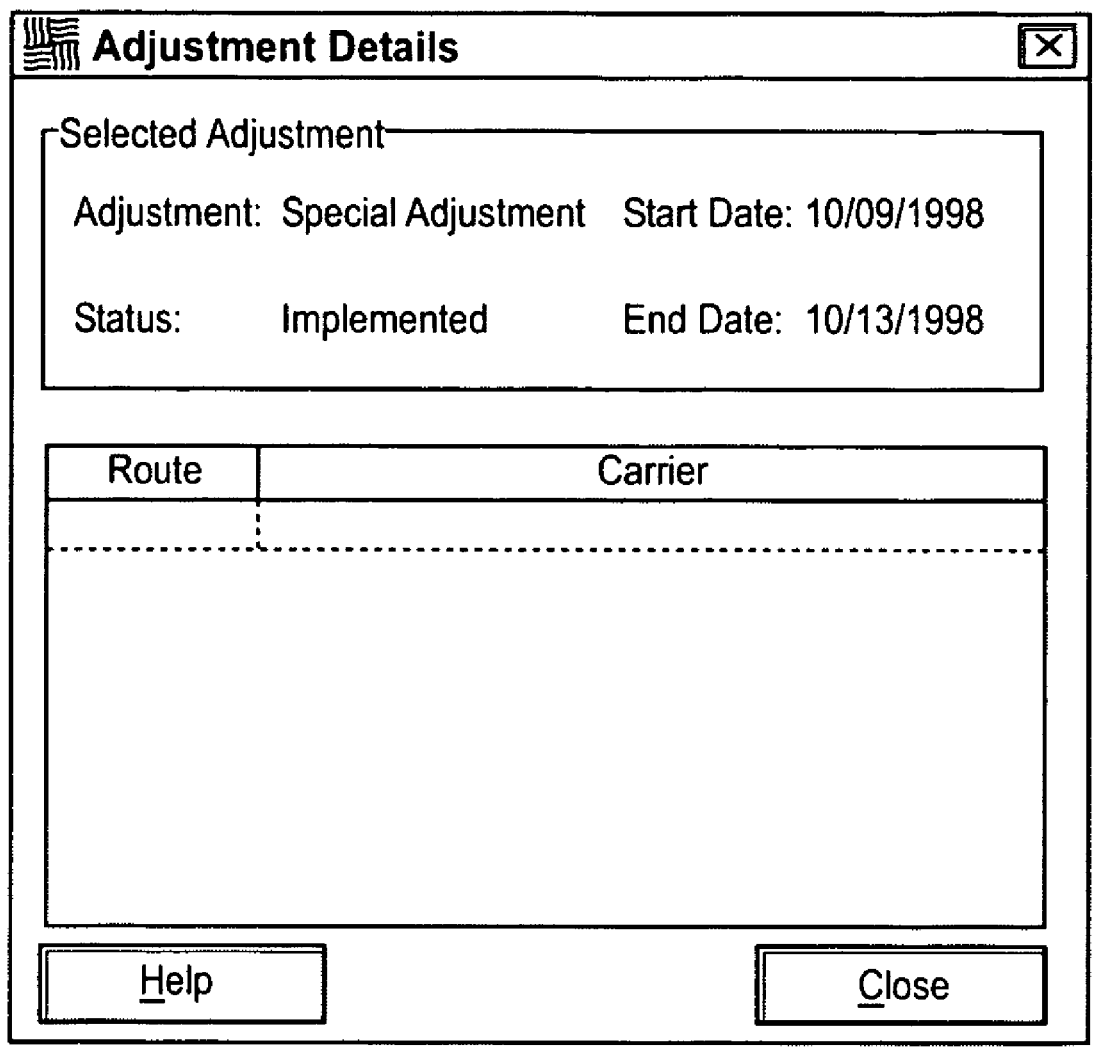
Figure 80:
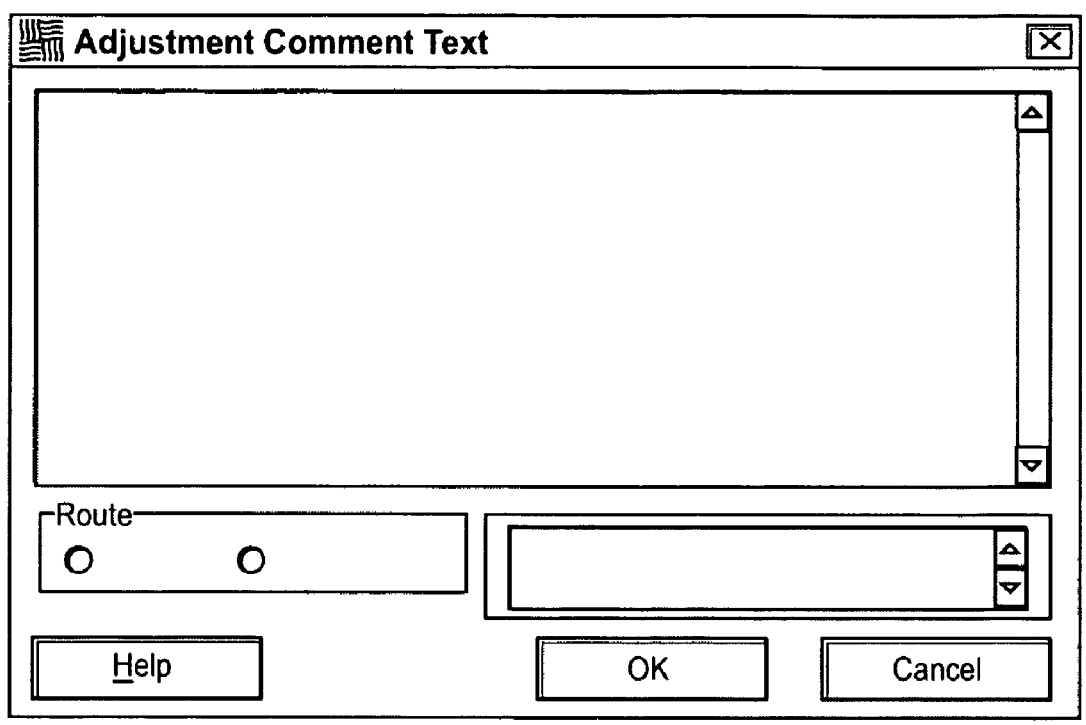
Figure 81:
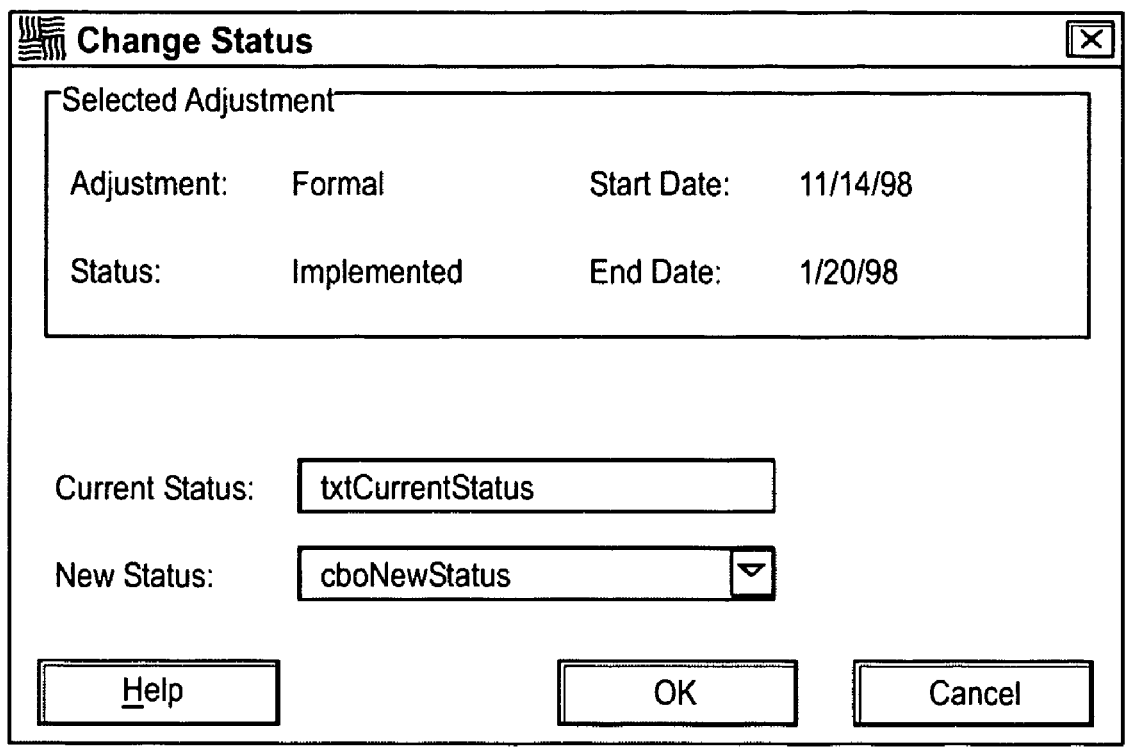

FIG. 79 illustrates an embodiment of a Adjustment Details window that you get when you press the Adjustment Details button on the Route Inspections and Adjustments window. It identifies the route and the carrier, along with the adjustment type, duration, and status (implemented or pending). FIG. 80 illustrates an embodiment of an Adjustment Comment Text window that is displayed when the user enters adjustment comments. This window allows the user to enter comments for an adjustment. FIG. 81 illustrates an embodiment of a Change Status window that you get when you press the Change Status button on the Route Inspections and Adjustments window. It allows the user to change the adjustment status.

FIG. 82 illustrates an embodiment of a Define Adjustment window that you get when you press the Define New Adjustment button on the Route Inspections and Adjustments window. This is the user's first step in creating a new adjustment to a route. The user first identifies the type of adjustment (formal, special, or minor). If the user identifies formal or special, the Routes to Adjust section to the right accepts data entry. In one embodiment, if the user identifies a minor adjustment, no data can be entered in the Routes to Adjust section because there is no normal inspection process associated with a minor adjustment. The user then identifies a ZIP code™ and the routes in that ZIP code™ are listed. Once the user selects a route from that list, the system adds that route to the Routes to Adjust section.

Figure 83:
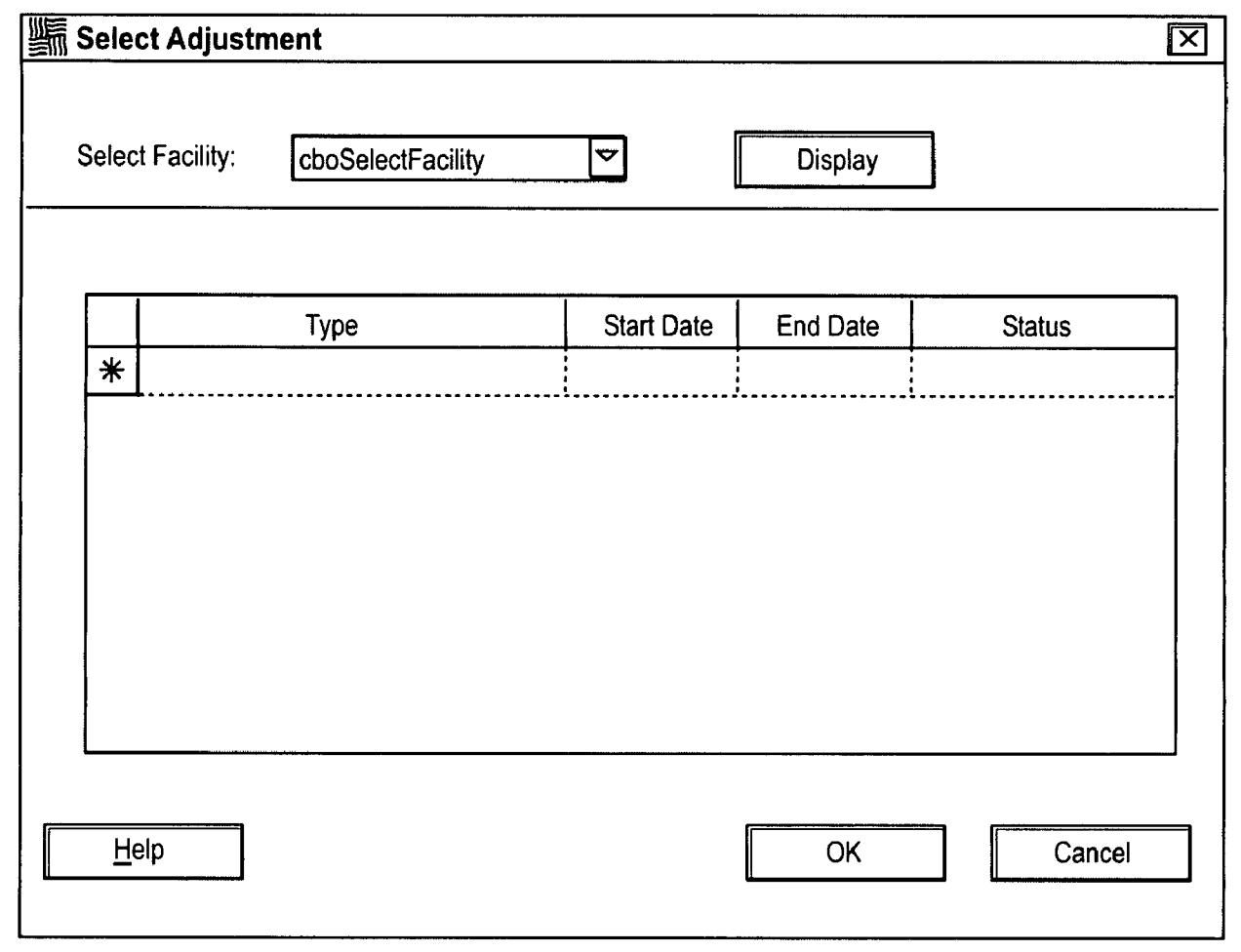

FIG. 83 illustrates an embodiment of a Select Adjustment window that you get when you press the Select Adjustment button on the Route Inspections and Adjustments window. This window gives the user a listing of the adjustments that are currently in the works, and the adjustment status (implemented or pending).

Figure 84:

FIG. 84 illustrates an embodiment of a Route Inspection and Adjustments Workbench window that is displayed when the user presses the Workbench button from FIG. 78. Once an adjustment has been selected, the details of the adjustment are entered in this window. The window displays information about the selected adjustment and has a Reports/Forms Menu section along with an Adjustment Functions section that includes five subsections: Advance Preparation; Analyze Data; conduct Inspection; Make/Implement Adjustments; and Data Transfer. The Reports/Forms Menu button allows the user to produce reports and forms related to a count inspection. The Advance Preparation subsection's Random Timecard Analysis button allows a user to display a random time card analysis data.

The Analyze Data subsection allows the user to analyze data such as DPS volume impact, and to edit office time, select and edit street time, and add or remove delivery points. The Conduct Inspection subsection allows the user to manually enter or edit mail volume information by pressing the 1838-C Data Capture and Maintenance button (discussed above), modify the step-by-step travel pattern a carrier follows to deliver a route by pressing the 3999 Data Capture/Summary button (discussed above), and record Examiner Observations and Comments after an inspection. The Make/Implement Adjustments subsection allows the user to create adjustment scenarios, maintain route base information once he has identified his desired scenario, and perform non-delivery point maintenance.

The Data Transfer subsection performs many electronic transfers and configures the user's workstation. Configuring the workstation involves identifying the delivery unit, the routes, etc. The user can perform a 3999 Data Transfer after a route inspection, as discussed above.

Figure 85:

FIG. 85 illustrates an embodiment of a Route Inspection and Adjustment Laptop Workbench window. The laptop version of this window has many of the same features as the PC version of FIG. 84, but is not as comprehensive.

FIG. 86 illustrates an embodiment of a Random Timecard Analysis-Summary window that can be accessed from the Advance Preparation subsection of the Route Inspections and Adjustments Workbench. Once the user has made the random draw, the system displays the week number for the specific accounting period and the week date. The system will also display whether that week was used and give the user the option to either go up or down a week. The system displays any "abnormal conditions" that would cause a user to go up or down a week to avoid any SPLY impact that distorted the data during that week. The system preferably performs an automatic week adjustment such that, if the regular carrier was not working his route on the chosen week, the system will skip to the next week. If the user wants to view any abnormalities during the chosen weeks, he presses the Abnormality Check button. If the list is acceptable to the user, he can press the Submit button and print an appropriate report.

Figure 87:
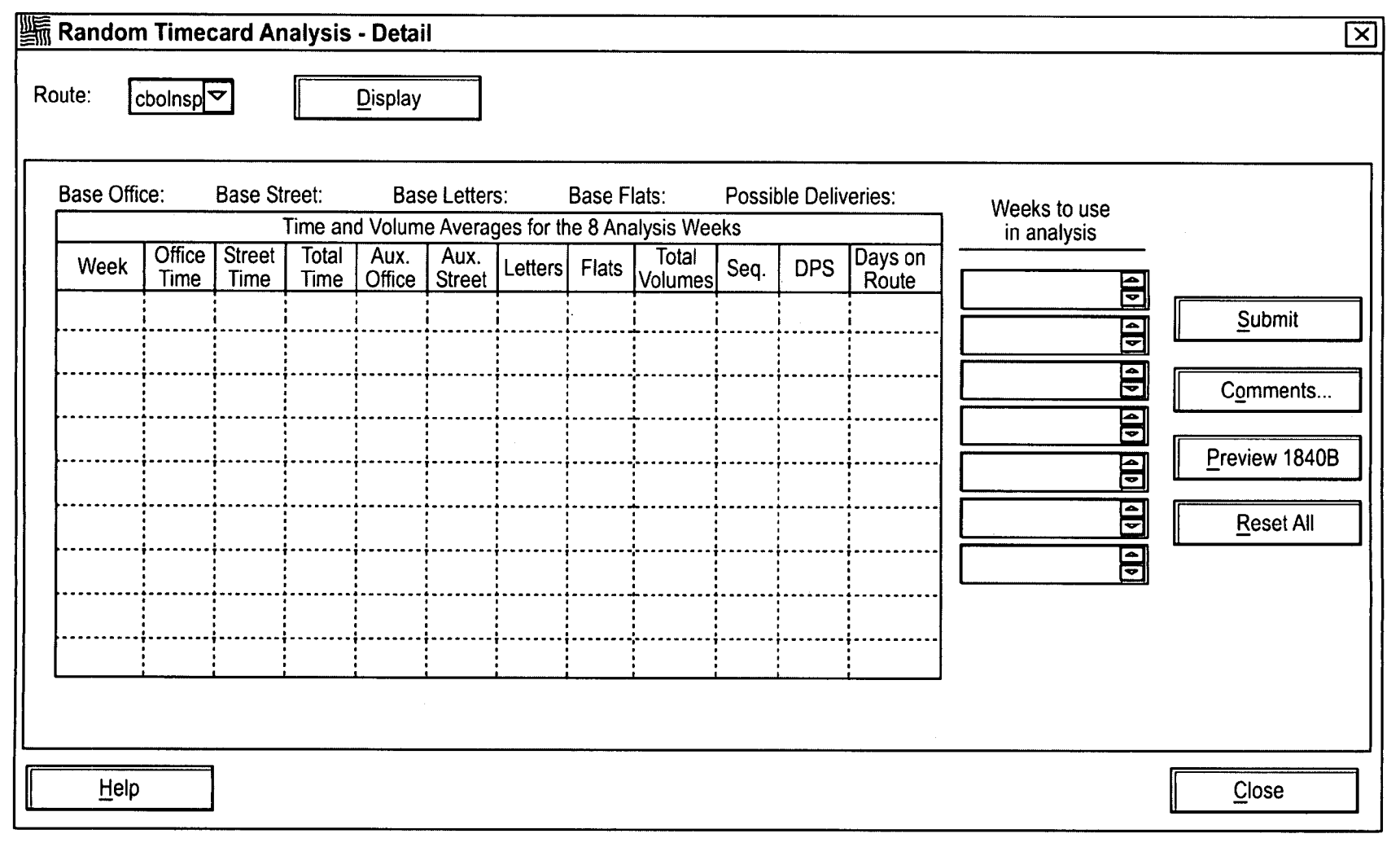

FIG. 87 illustrates an embodiment of a Random Time Card Analysis Detail window that is displayed when the user presses the Analysis Detail button of the Random Timecard Analysis-Summary window. The user selects the route number and presses Display, and the system populates the fields of information from its own database. A Random Timecard Analysis ("RTA") Comment window can be displayed when the user presses the Comments button of the Random Timecard Analysis-Summary window, providing an empty text field for the user to enter comments and selecting "Okay" to save them into the system.

Figure 88:
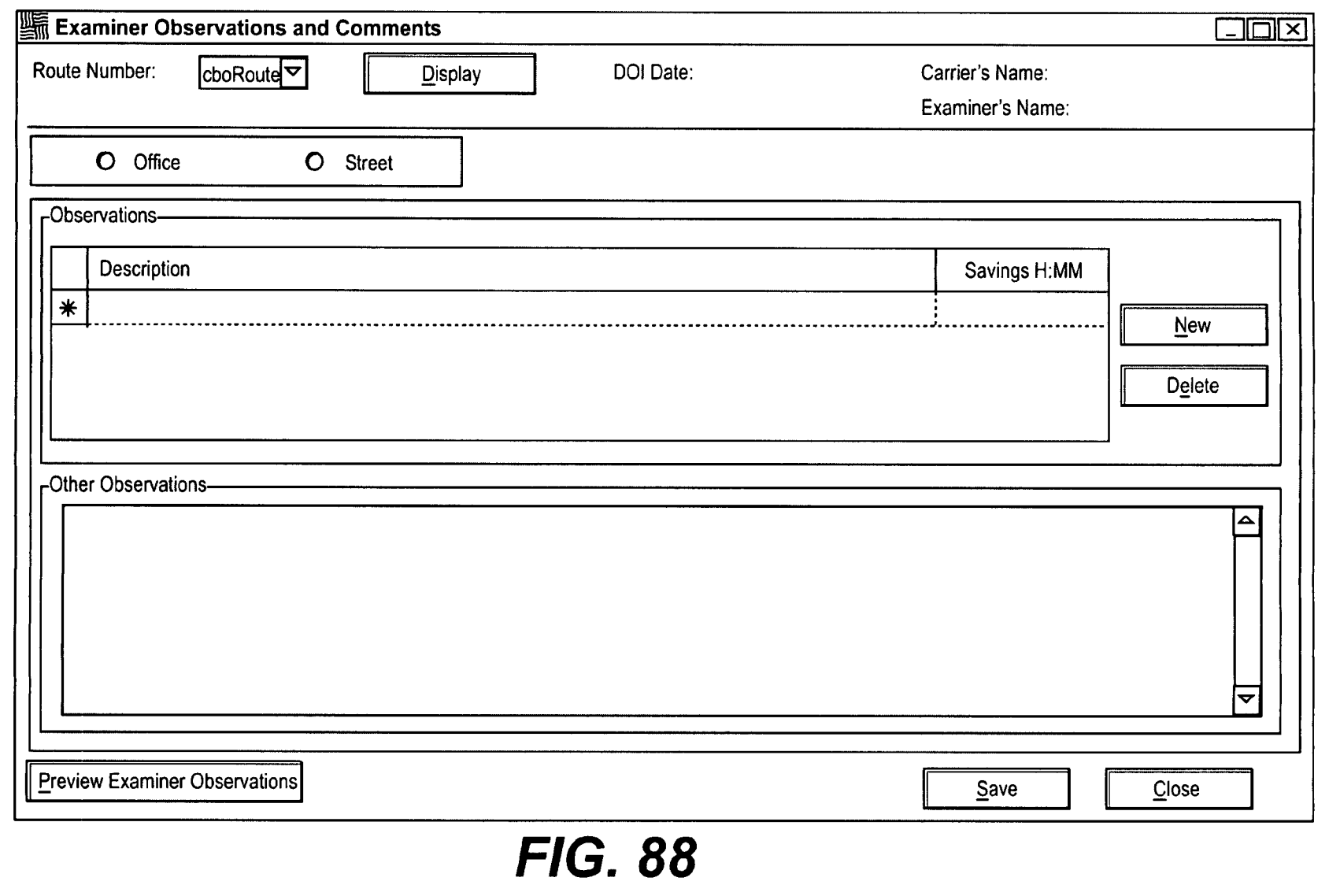

FIG. 88 illustrates an embodiment of an Examiner Observations and Comments window that is displayed when the user presses the Examiner Observations and Comments button in the Conduct Inspection subsection of the Route Inspections and Adjustments Workbench. The user selects a route and the system, displays information including the examiner's comments. The user can add new comments, and can select whether the inspection was performed in the office or on the street. A View Observations and Comments window can be displayed when the user presses the Preview Examiner Observations button from the Examiner Observations and Comments window, providing an empty text field for the user to enter comments for a particular route.

Figure 89:
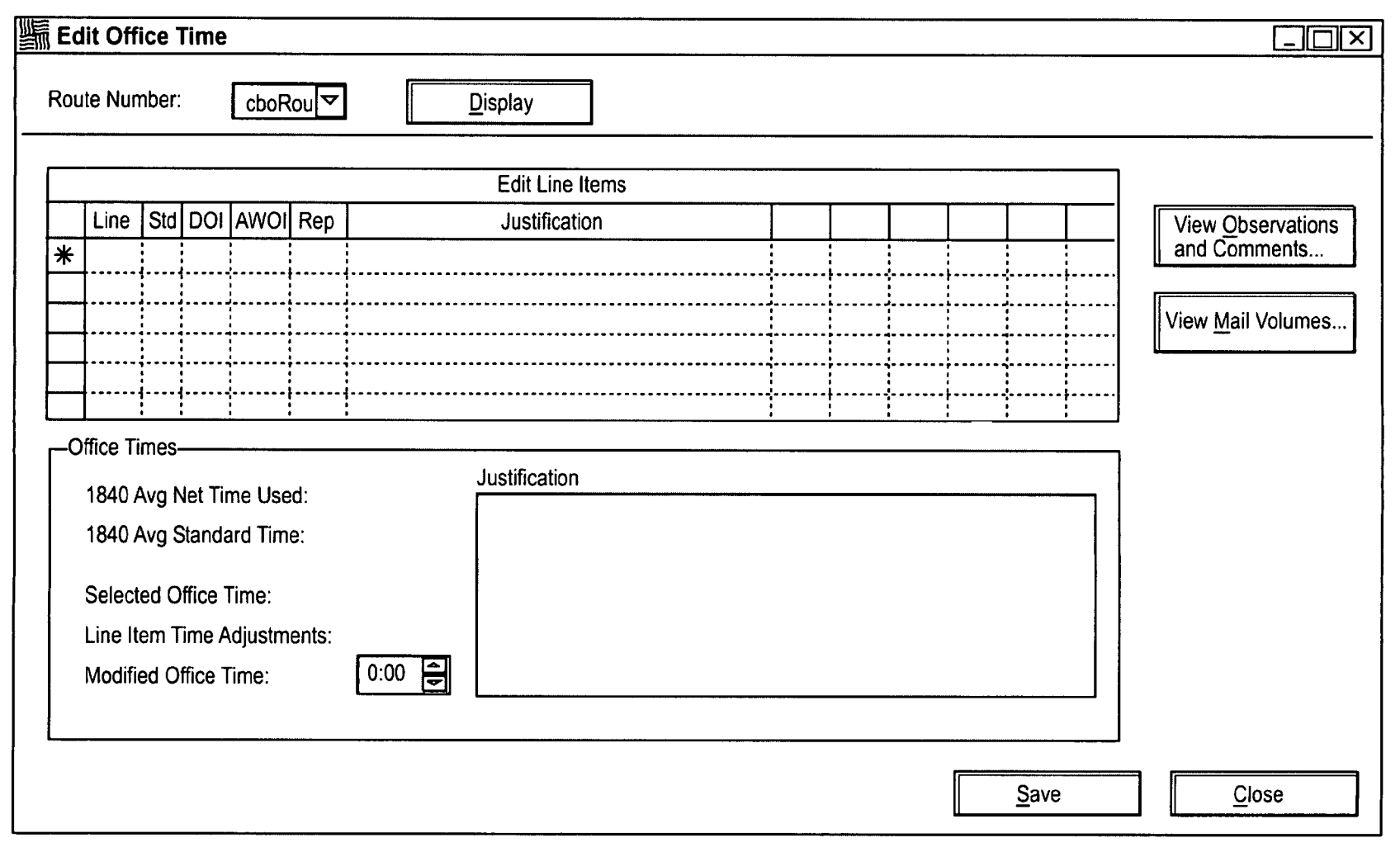

FIG. 89 illustrates an embodiment of an Edit Office Time window that is displayed when the user presses the Edit Office Time button of the Analyze Data subsection. The user selects a route number and the system displays information about Line Items (e.g., includes breaks) from the count and inspection, including the line item number, the standard time (time previously agreed to for performing certain functions), the day of inspection ("DOI"), the after week of inspection ("AWOI") time (time carrier demonstrated he needed to perform those functions), and a representative time (what supervisor determines the carrier actually needs). If the user changes any information displayed, he must enter justification before saving.

Figure 90:
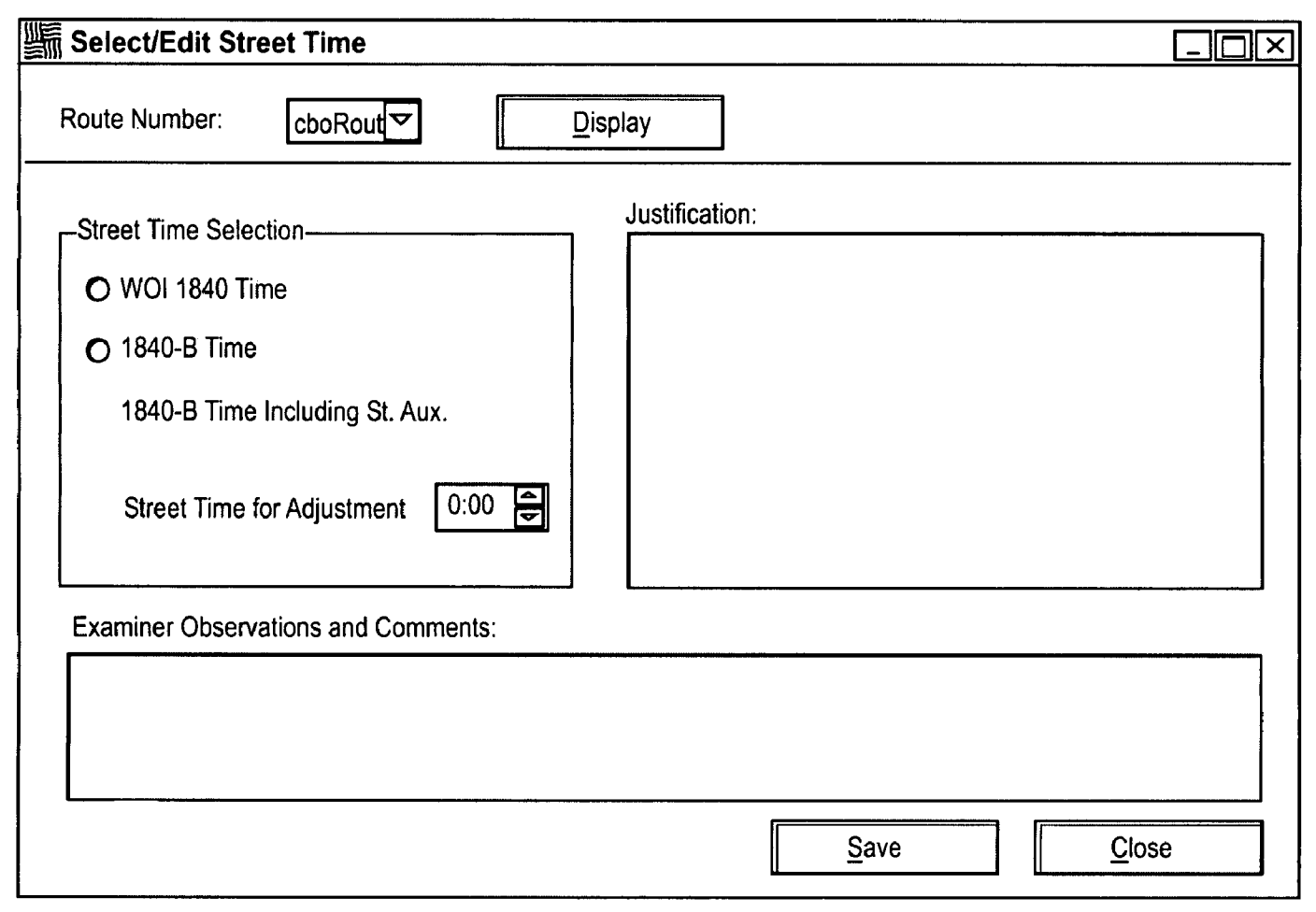

FIG. 90 illustrates an embodiment of a Select/Edit Street Time window that is displayed when the user presses the Select/Edit Street Time button of the Analyze Data subsection. It has basically the same features as the Edit Office Time window except that it displays time spent out of the office delivering mail. If the user changes any information displayed, he must enter justification before saving.

Figure 91:
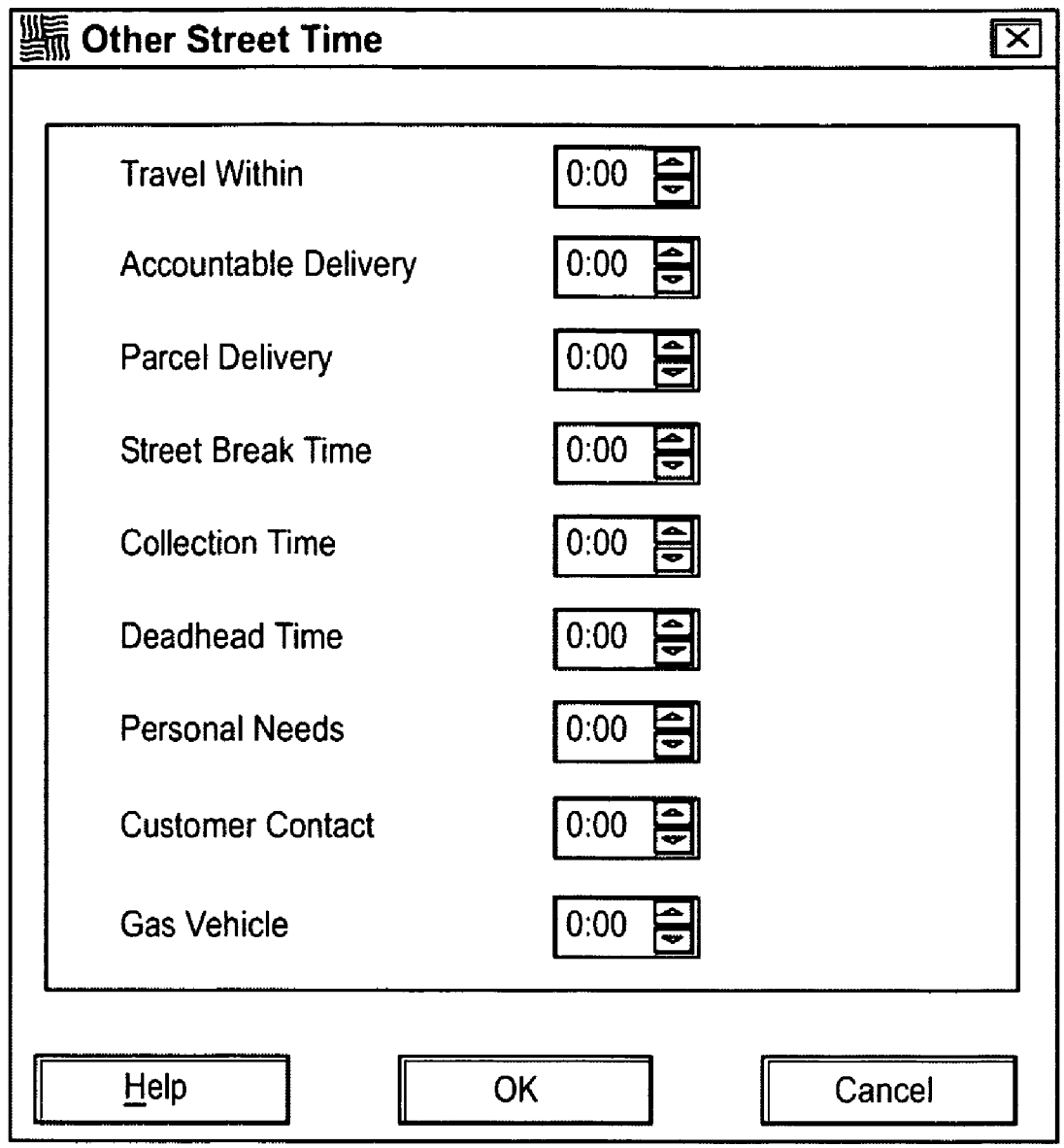

FIG. 91 illustrates an embodiment of an Other Street Time window allowing the user to enter information about a special activity occurring on the street (e.g., a comfort stop) where the carrier leaves his route. Accountable Delivery covers delays occurring when the carrier is delivering a piece of express mail and has to wait a long period of time for the customer to come to the door. Other fields may include Parcel Delivery, Street Break Time, Collection Time, Deadhead Time (the amount of time it takes a carrier to walk from one delivery point to another), Personal Needs (e.g., a comfort stop), Customer Contact, and Gas Vehicle.

Figure 92:
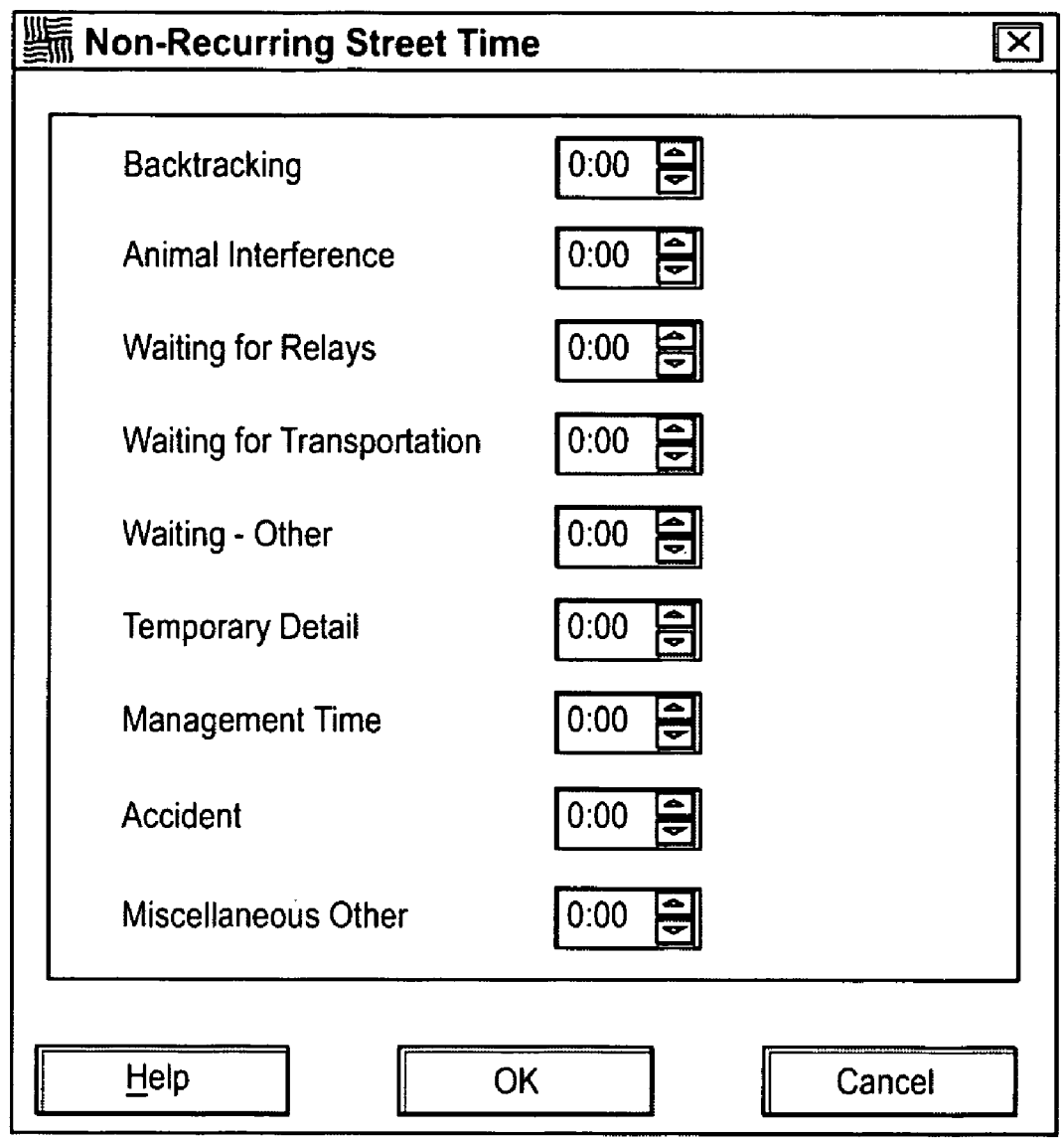

FIG. 92 illustrates an embodiment of a Non-Recurring Street Time window allowing the user to enter information about a special activity occurring on the street that the carrier should not be doing on a daily basis. For example, Backtracking, Animal Interfere, Waiting for Relays, Waiting for Transportation, Waiting-Other, Accident, and Miscellaneous. Temporary Detail is when someone goes on a different route during inspection. Management time is when the supervisor talks to the carrier while the carrier is delivering his route.

FIG. 93 illustrates an embodiment of a DPS Volume Impact window that is displayed when the user presses the DPS Volume Impact button of the Analyze Data subsection. This window is also disclosed in FIG. 73 and is discussed above.

FIG. 94 illustrates an embodiment of an Add/Remove Delivery Points window that is displayed when the user presses the Add/Remove Delivery Points button of the Analyze Data subsection. This window allows the user to add and remove delivery points from a route. The system automatically calculates and displays changes to office time and street time based on the addition or removal of the delivery point.

Figure 95:
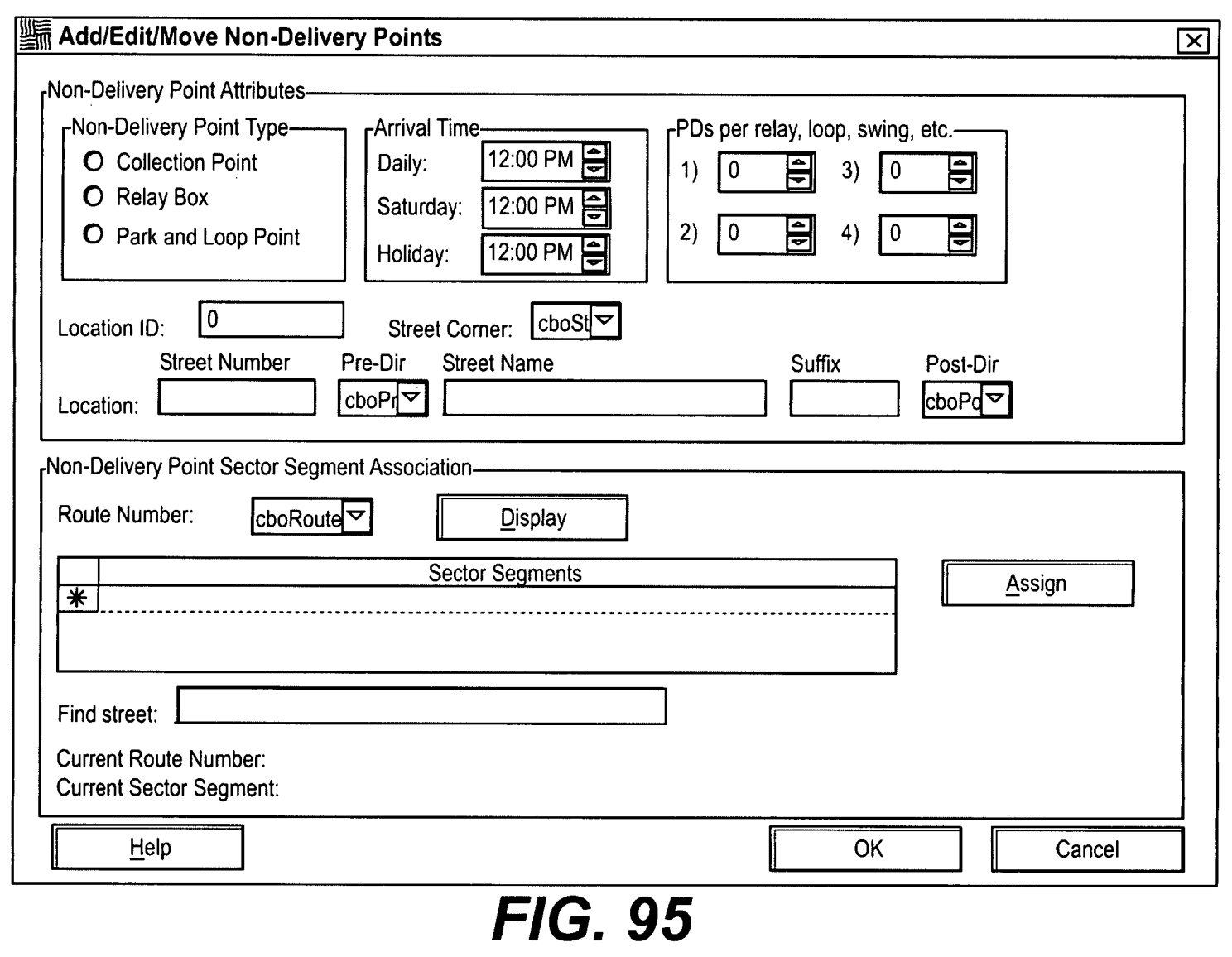

FIG. 95 illustrates an embodiment of an Add/Edit/Remove Non-Delivery Points window that is displayed when the user presses the Non-Delivery Point Maintenance button of the Make/Implement Adjustments subsection. This window has two sections: Non-Delivery Point Attributes and Non-Delivery Point Sector Segment Association. The user sets the non-delivery point attributes by selecting the non-delivery point type (e.g., collection point, relay box, park and loop point), the time the carrier arrives at the non-delivery point daily, on Saturday, and on holidays. The user also inputs the possible deliveries per relay, loop, and swing, and a Location ID (for collection boxes having ID numbers). The user further inputs the Street Corner, Street Number, a pre-directory designation (e.g., "North" for North Elm Street), Street Name, Suffix, etc. When the user presses the Display button in the Non-Delivery Point Sector Segment Association, the system breaks down the sector segments and displays them.

Figure 96:
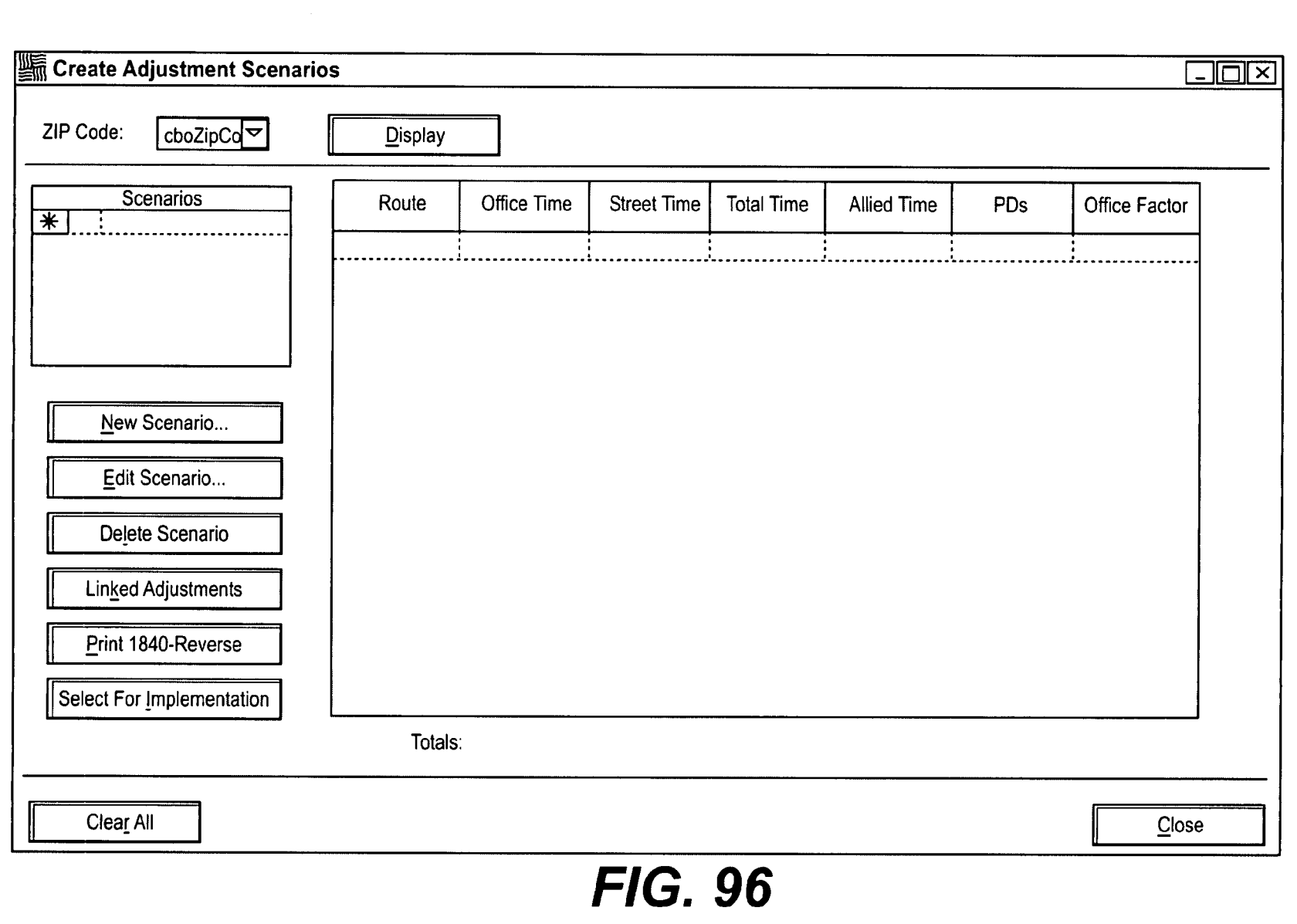

FIG. 96 illustrates an embodiment of a Create Adjustment Scenarios window that is displayed when the user presses the Create Adjustment Scenarios button of the Make/Implement Adjustments subsection. Once the user has performed a route inspection and has the associated data, he can create certain scenarios to determine the most efficient route. To create scenario 1, the user enters a ZIP code™ and each route within that ZIP code™ is displayed along with its office time, street time, allied time (time when the carrier is on the street but not delivering mail (e.g., refilling mail between loops)), possible deliveries, and other factors. One example of a scenario is: what if I took this particular street off of one route and moved it to another route.

Figure 97:
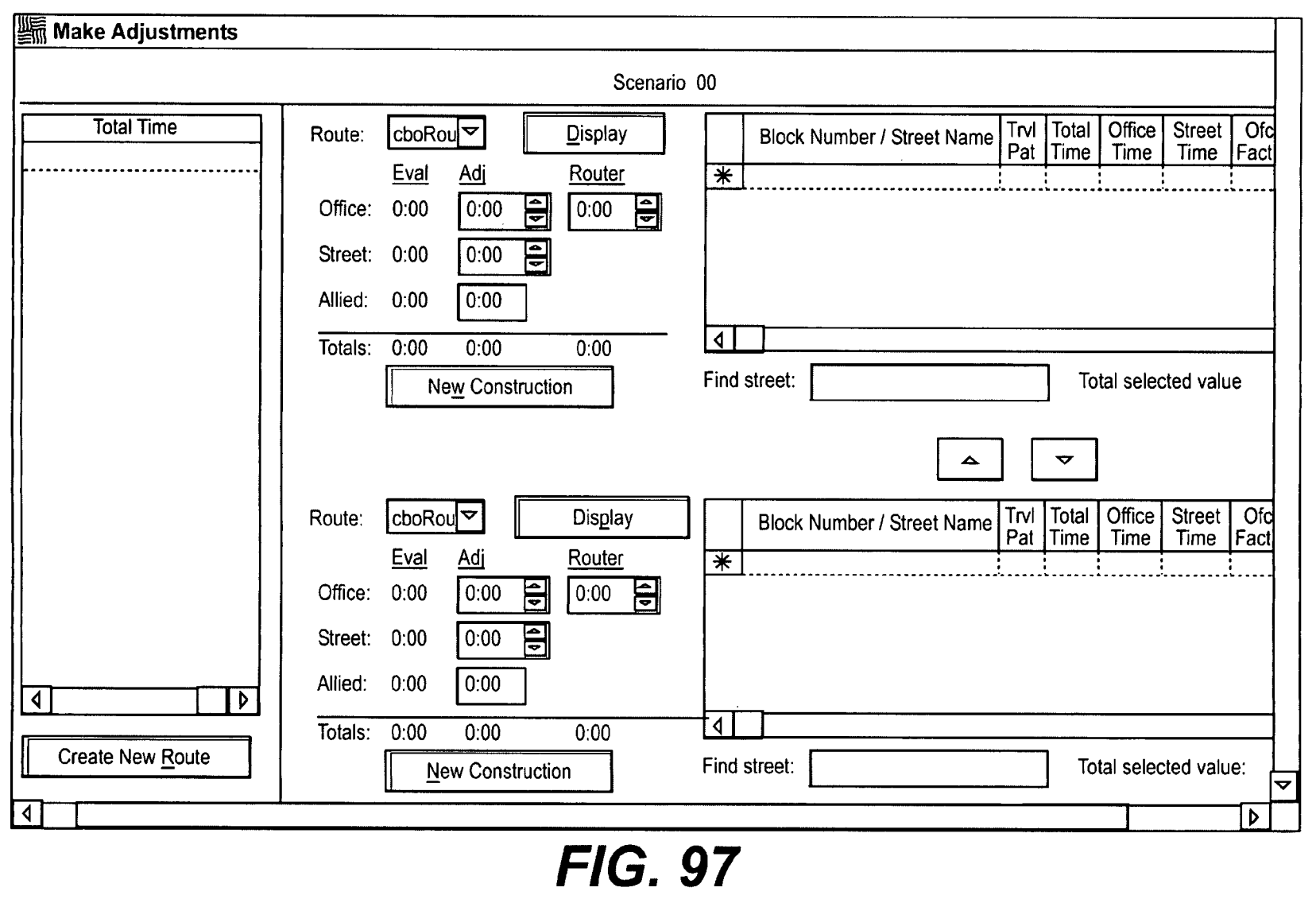

FIG. 97 illustrates an embodiment of a Make Adjustments window that allows the user to adjust a scenario. The user can get to this screen, for example, by pressing the edit scenario button on FIG. 96. This window displays all of the time for a particular route and identifies the scenario being adjusted. The user can evaluate and adjust office, street, and allied time, and can assign a given amount of time to a router. Street information is displayed by block range. New construction can be identified. In one embodiment of the invention, the user can search for a street by typing its name into the Find Street window. The user can move a block range from the route identified in the top Route field to the Route identified in the bottom route field by highlighting the desired block range and pressing the down arrow, and vice versa. The information on the top will move to the bottom and the system will adjust the time fields accordingly.

Figure 98:
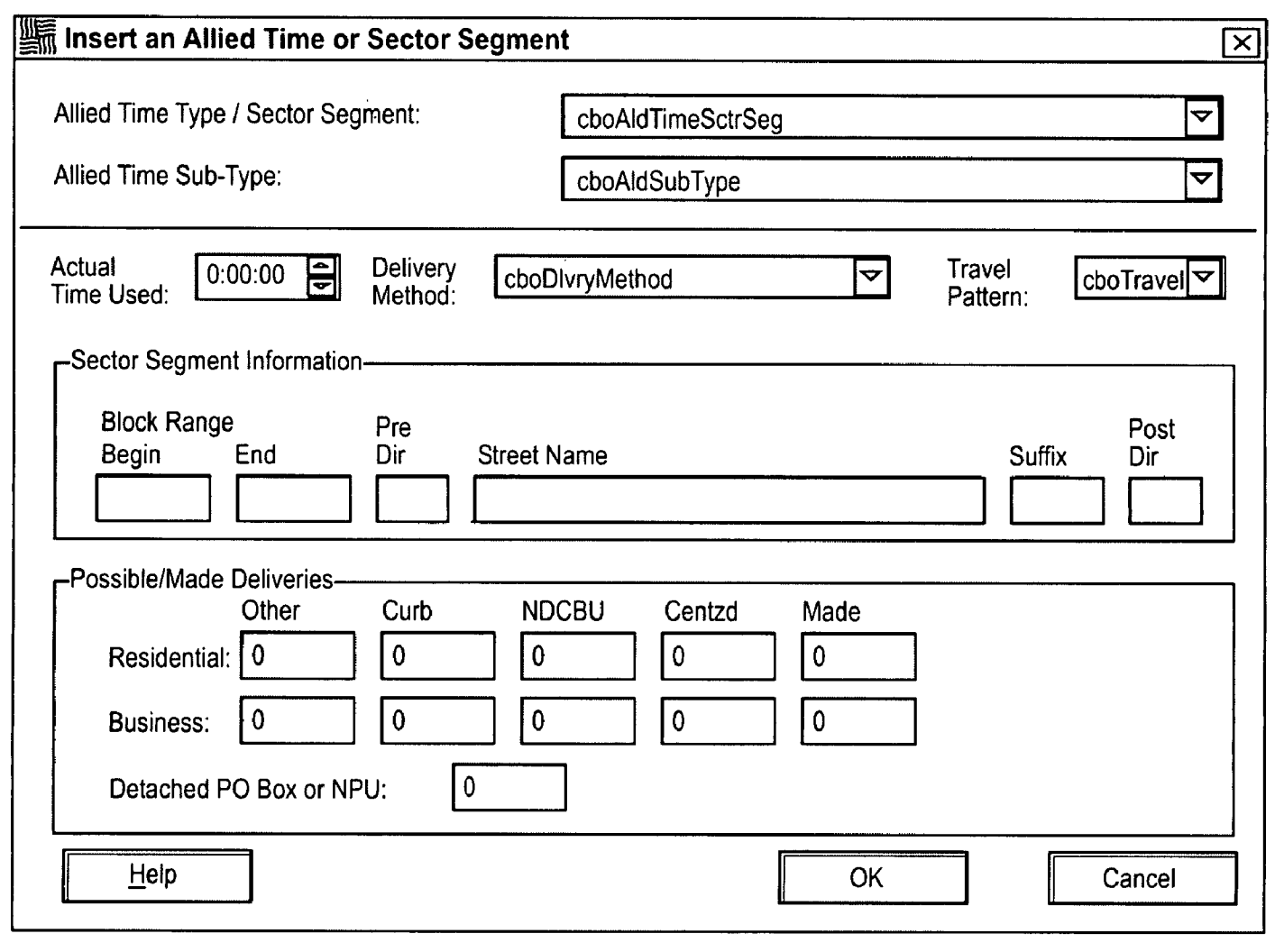

FIG. 98 illustrates an embodiment of an Insert an Allied Time or Sector Segment window. This window allows the user to make a change to a route such as adding a collection box. This window also allows the user to identify delivery zone changes (moving a route among delivery zones).

Figure 99:

FIG. 99 illustrates an embodiment of an Allied Time window allowing the user to adjust allied times. Relay Time is the time it takes a carrier to prepare for a relay at his vehicle. Travel To is the time it takes the carrier to travel to and from lunch, to and from the route, etc. Vehicle Load is the time it takes the carrier to put his mail in his vehicle. Vehicle Unload is the time it takes the carrier to unload his vehicle.

Figure 100:
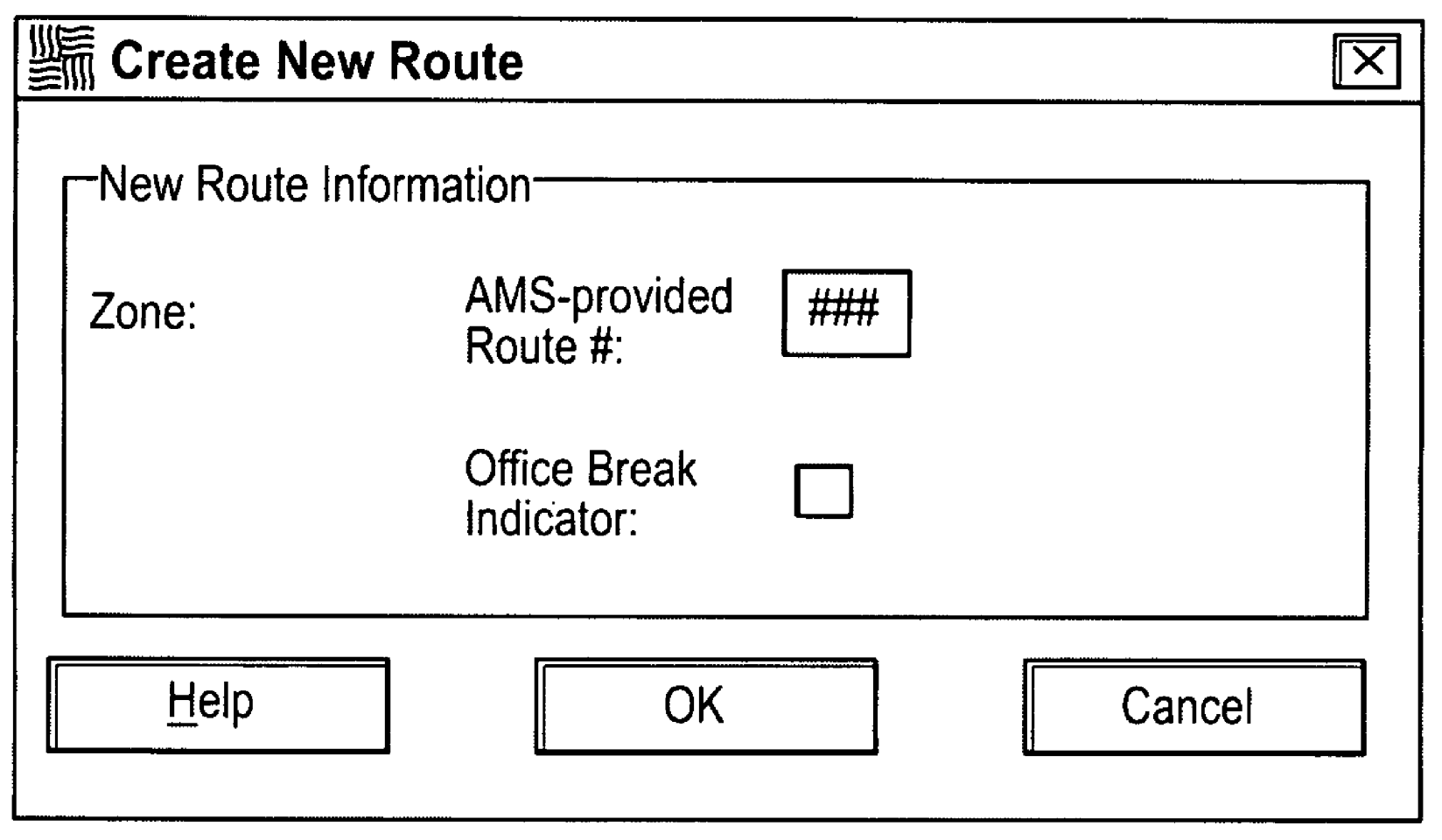

FIG. 100 illustrates an embodiment of a Create New Route window that allows the user to create a new route. The AMS database automatically provides the new route number. After pressing OK, the user can make adjustments to the new route.

Figure 101:
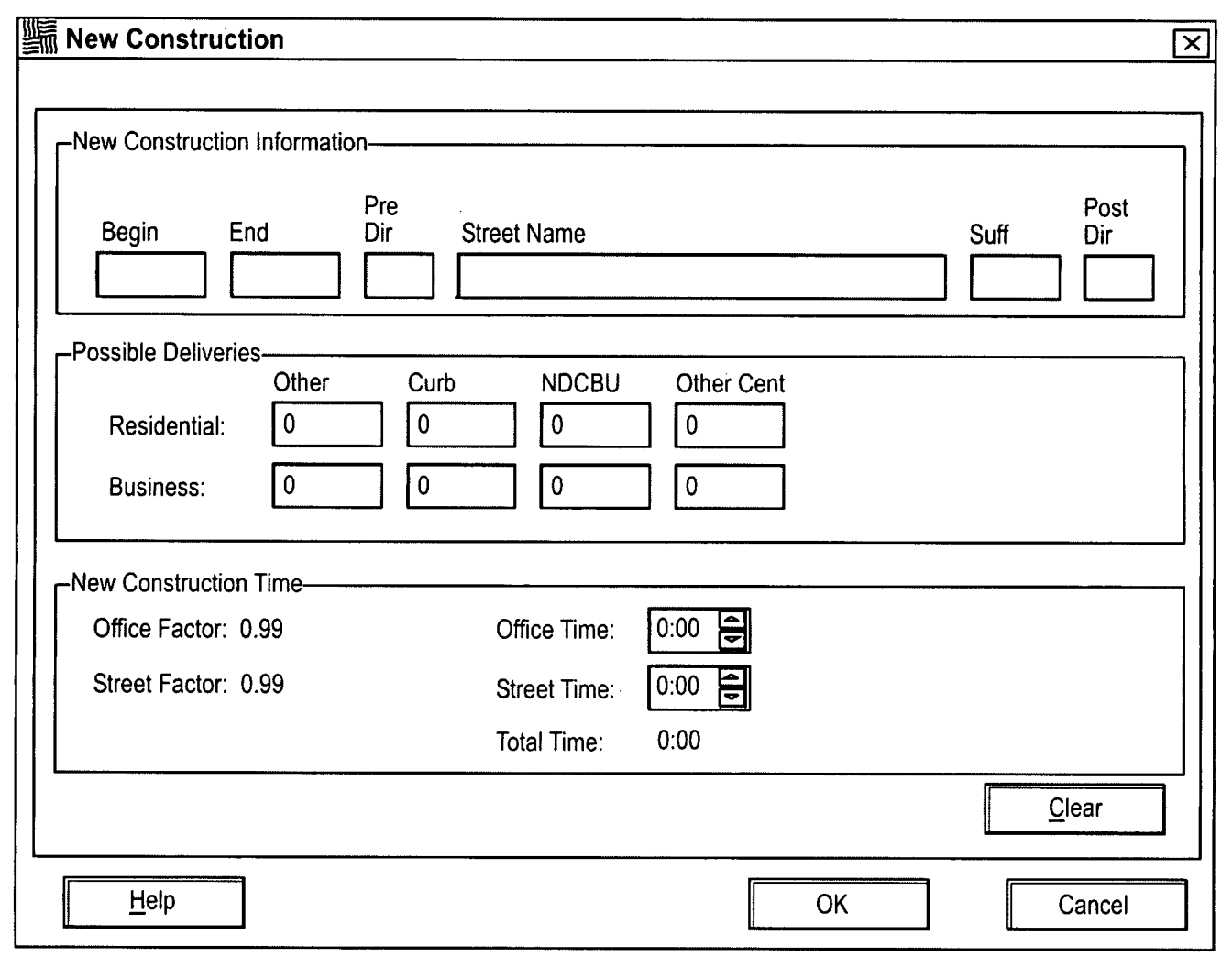
Figure 102:
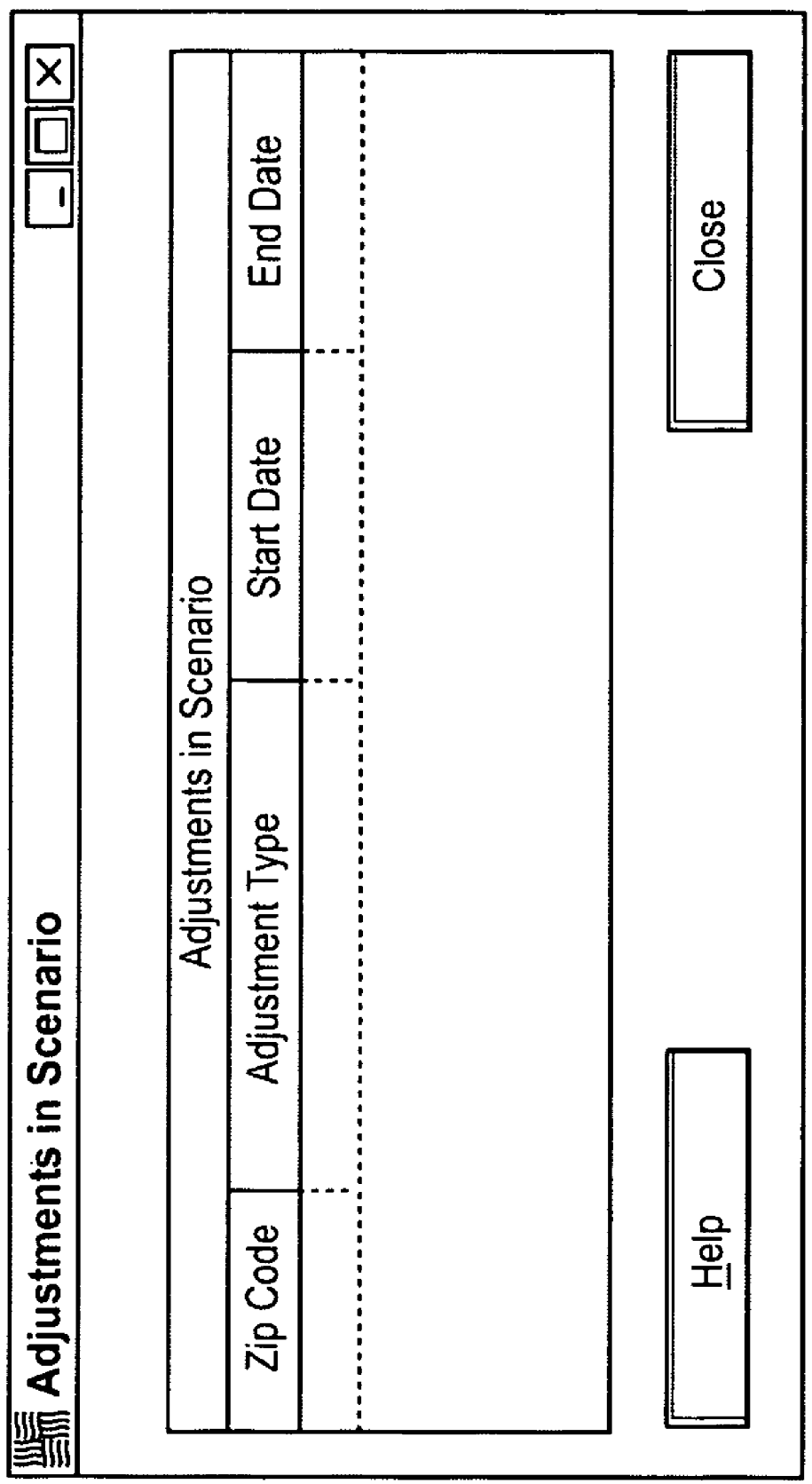

FIG. 101 illustrates an embodiment of a New Construction window that is displayed when the user presses the New Construction button of FIG. 98. The user inputs when the construction began, when it is expected to end, location information, the anticipated number of deliveries to the new construction. The system uses a factor created from the route inspection adjustment and determines the time the new construction will add to a route. FIG. 102 illustrates an embodiment of an Adjustments In Scenario window that displays adjustments made to a scenario created by the user. A window can be displayed by the system to inform the user the workstation is being configured.

Figure 103:
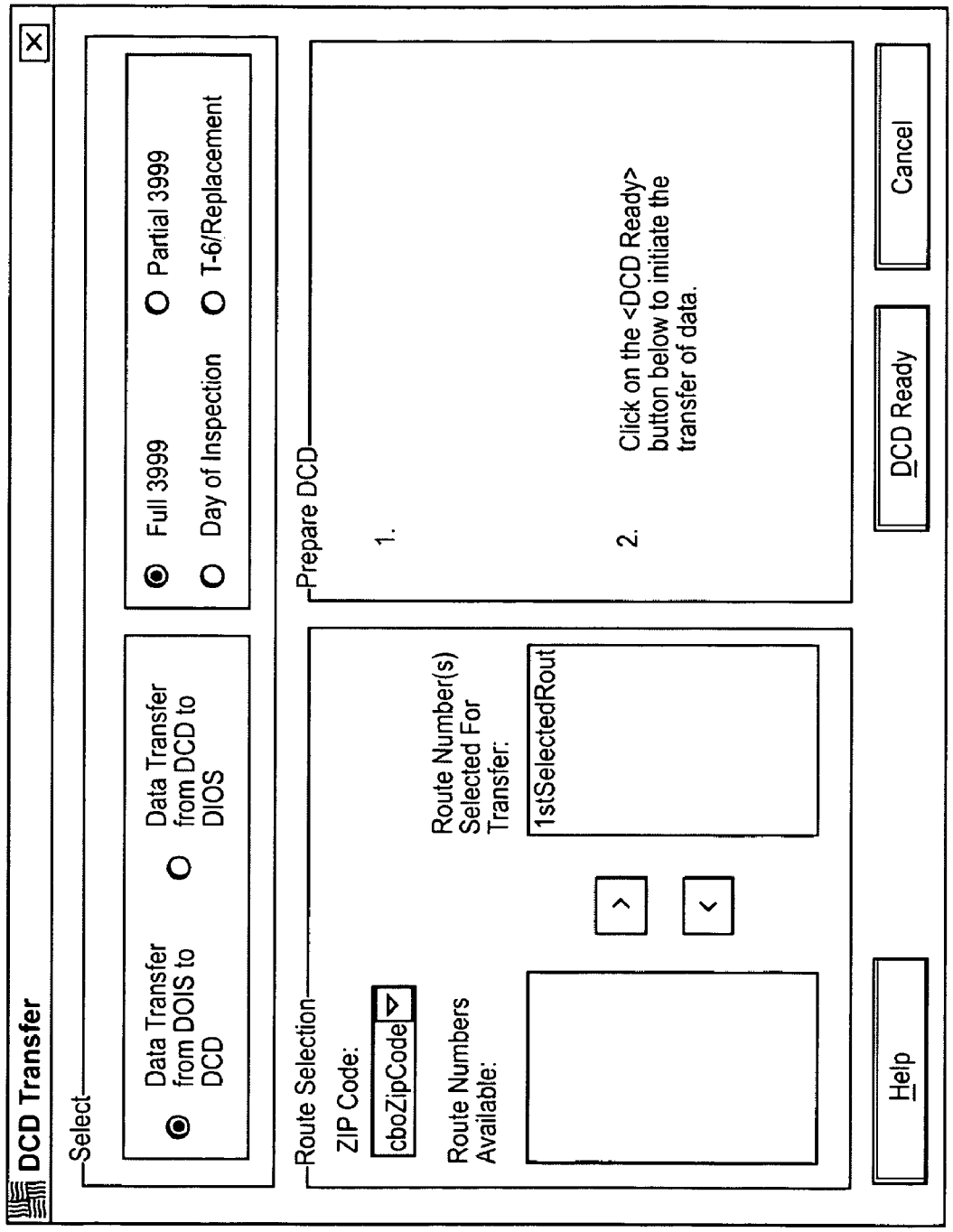

FIG. 103 illustrates an embodiment of a DCD Transfer window that is displayed when the user presses the DCD Transfer button on the window of FIG. 57 or FIG. 84. When the user is transferring information to and from a DCD, this window is displayed. The user selects the type of data transfer (e.g., mail count or route inspections) and whether the transfer is from the system of the invention to the DCD, or from the DCD to the system. The user also inputs the ZIP code™ and selects a route that the transfer pertains to. When the user presses DCD Ready, the system performs the data transfer.

Figure 104:
Figure 105:
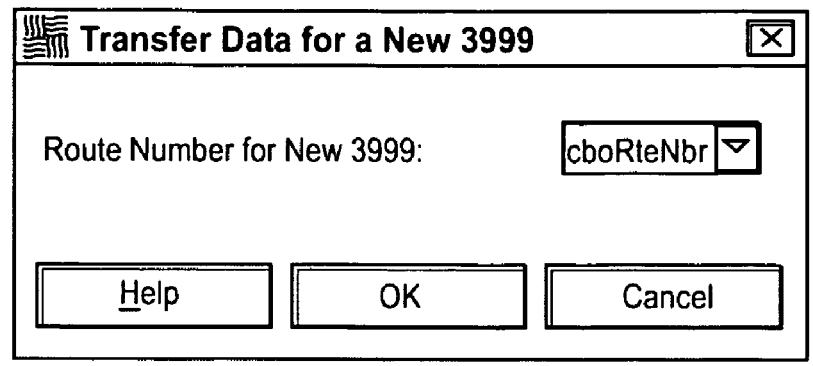

FIG. 104 illustrates an embodiment of a 1838-C/Examiner Observations and Comments window that is displayed when the user presses the appropriate button in the Data Transfer subsection of the Route Inspections and Adjustments Workbench. The window displays route records on the mainframe and the workstation and the user can press the appropriate button to transfer route data between the mainframe and the workstation. FIG. 105 illustrates an embodiment of a Transfer Data for a New 3999 window that is displayed when the user presses the 3999 Data Transfer button in the Data Transfer subsection. If the user has created a new 3999, he identifies the route number that the system should transfer the 3999 data to.

Figure 106:
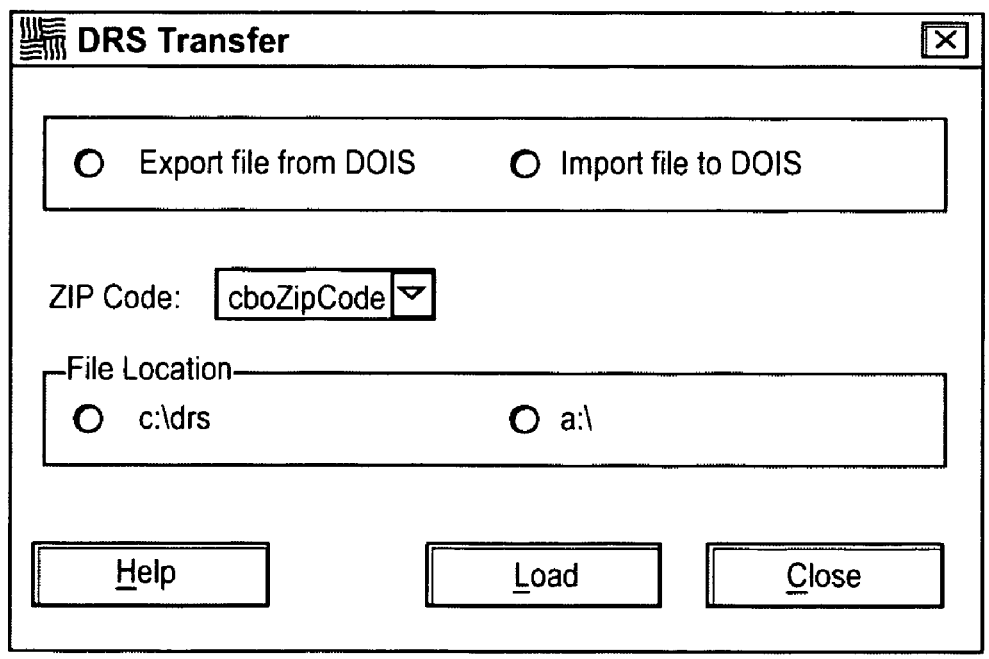

FIG. 106 illustrates an embodiment of a DRS Transfer window that is displayed when the user presses the DRS Transfer button in the Data Transfer subsection. Whether the user is importing DRS data to the system of the present inventions, or exporting it, the user inputs the ZIP code™ and the file location. The Data Transfer Status window is preferably displayed when the DRS data is transferring. The user can cancel the data transfer process from this window.

Figure 107:
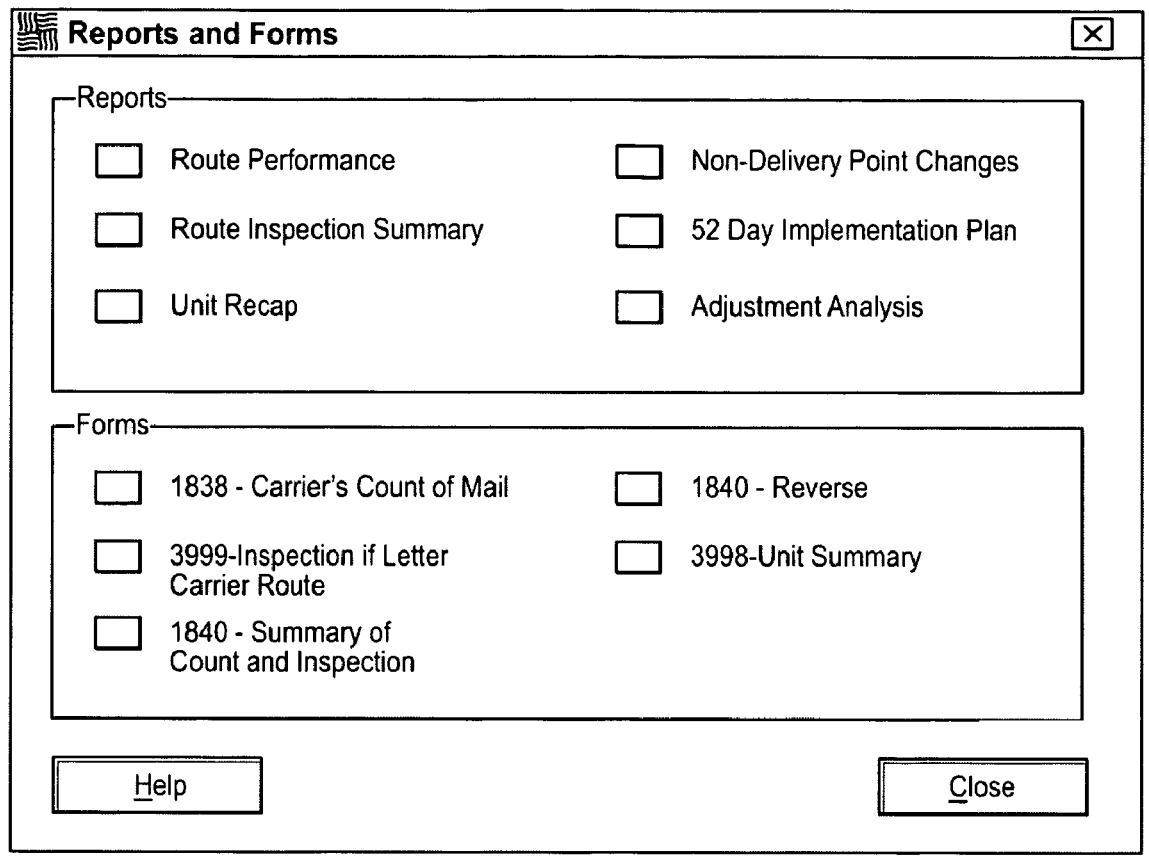

FIG. 107 illustrates an embodiment of a Reports and Forms window that is displayed when the user presses the Reports/Forms Menu button of FIG. 85. The user can preferably print the following types of reports from this window: Route Performance; Route Inspection Summary; Unit Recap; Non-Delivery Point Changes; 52 Day implementation Plan (a calendar of events that must take place in order to meet contractual requirements); and Adjustment Analysis. In addition, the user can preferably print out the following types of forms: 1838—Courier's Count of Mail; 3999—Inspection of Letter Carrier Route; and 1840—Summary of Count and Inspection.

Figures 108, 109:
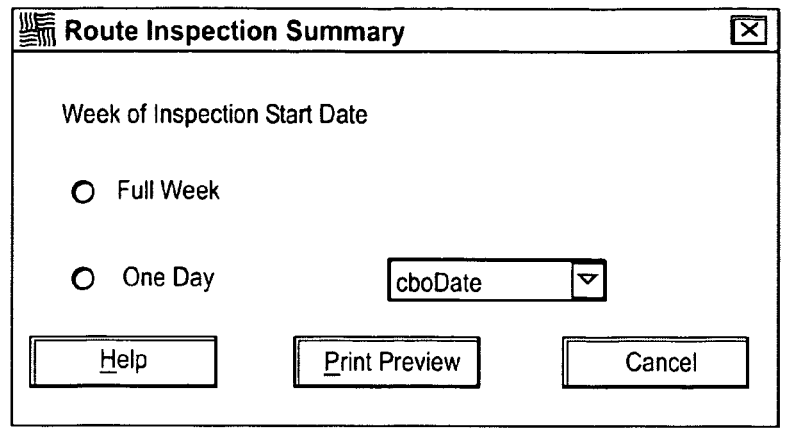

FIG. 108 illustrates an embodiment of a Route Inspection Summary window that is displayed when the user presses the appropriate button on the Reports and Forms window. The user selects whether he want a report of a full week or one day and then enters the date.

FIG. 109 illustrates an embodiment of a 1840 Auxiliary Assistance window. When, during an inspection, the user gets assistance to be able to deliver his mail, that information is displayed here.

FIG. 110 illustrates an embodiment of a 1840—Summary of Count and Inspection window that is displayed when the user presses the appropriate button on the Reports and Forms window. The user selects a route number and can then also select a T-6 (replacement) carrier. If no replacement carrier is selected, the system defaults to the regular carrier. The user presses the button to display the form.

Figure 111:
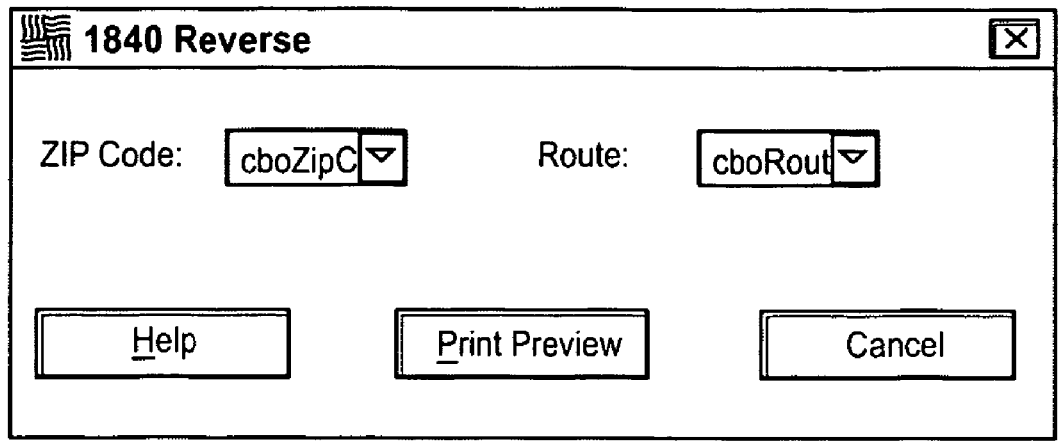

FIG. 111 illustrates an embodiment of a 1840 Reverse window that is displayed when the user presses the appropriate button on the Reports and Forms window. The user enters the ZIP code™ and route, and all adjustments made to that route are displayed.

Figure 112:
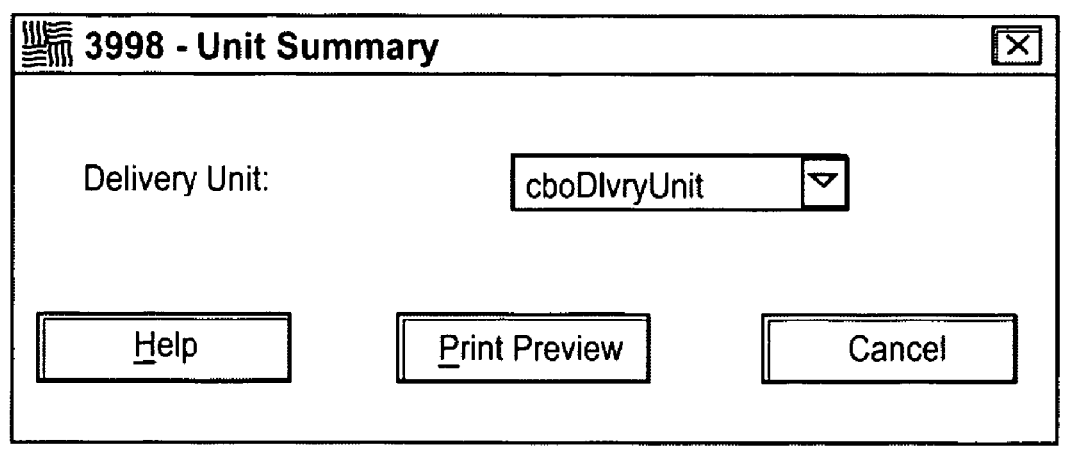

FIG. 112 illustrates an embodiment of a 3998—Unit Summary window that is displayed when the user presses the appropriate button on the Reports and Forms window. The user inputs a delivery unit and presses the button to display a summary of adjustments made for the entire unit.

Figure 113:
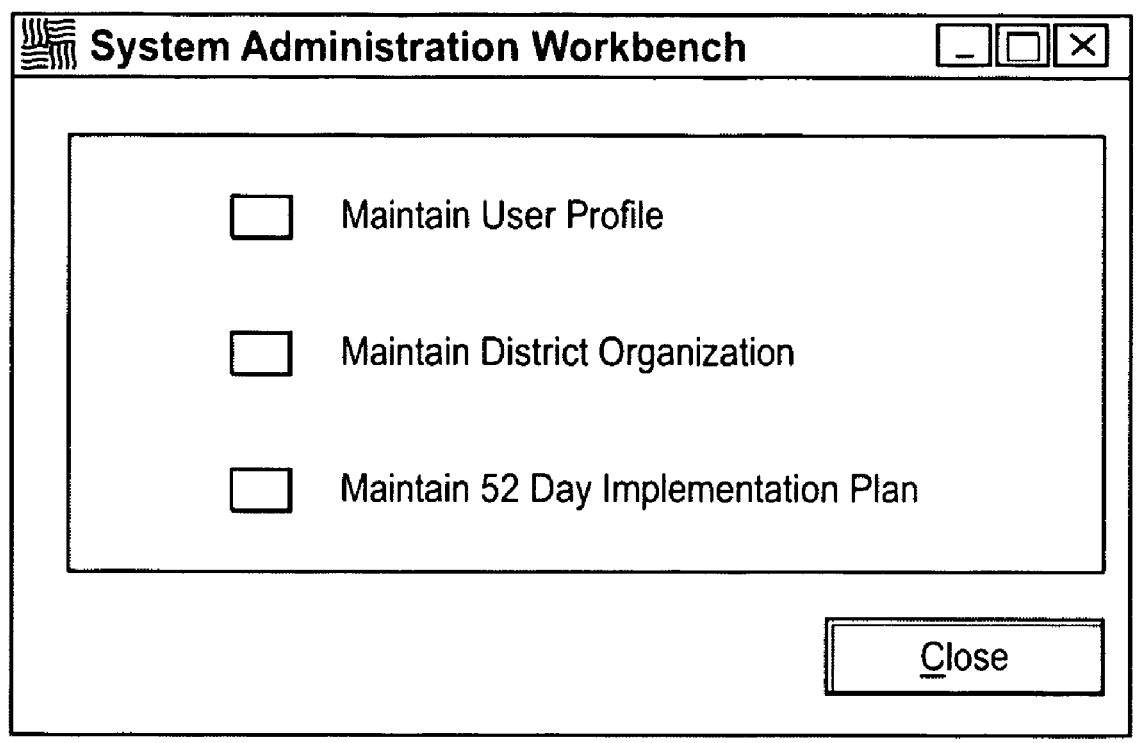

FIG. 113 illustrates an embodiment of a System Administration Workbench window that is displayed when certain types of users log on. This window has buttons for maintaining user profiles, maintaining district organizations, and maintaining 52-day implementation plans. The system includes several different levels of access to these functions. The user must be mapped to a particular level to perform them.

Figure 114:
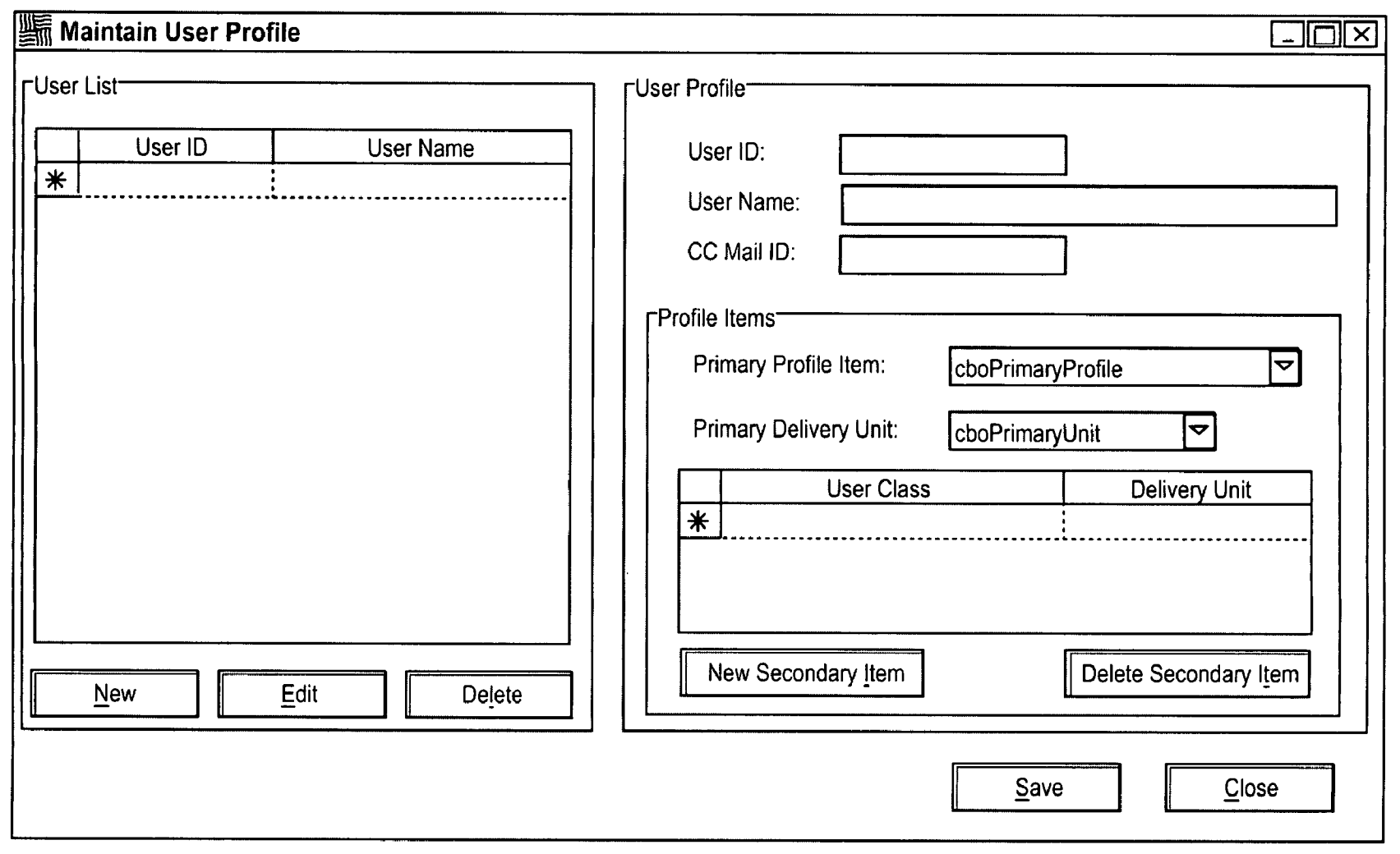

FIG. 114 illustrates an embodiment of a Maintain User Profile window that is displayed when the user presses the appropriate button on the Reports and Forms window. The user identifies, for a given ID and user name, the user's primary delivery unit and class (e.g., supervisor, manager, system administrator, etc.).

Figure 115:
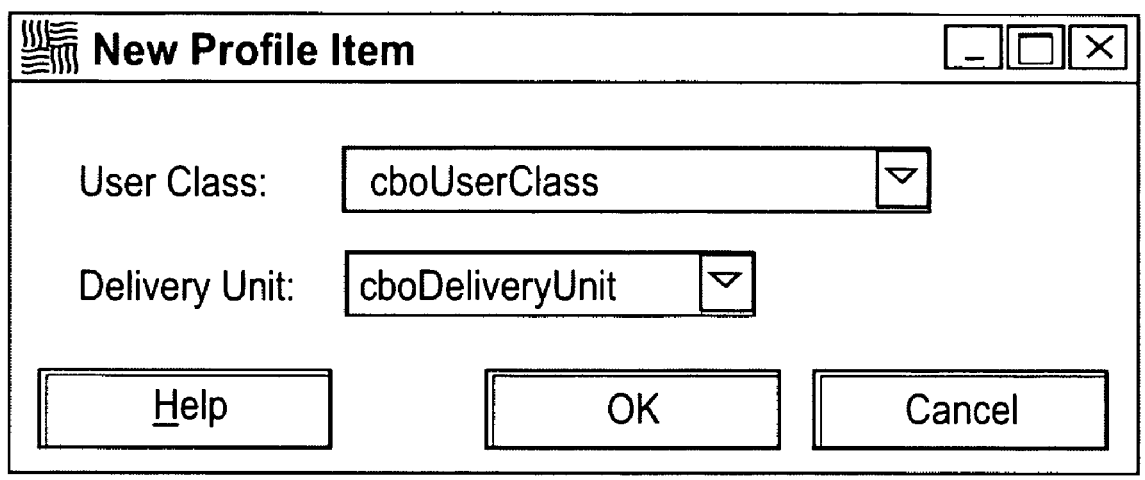

FIG. 115 illustrates an embodiment of a New Profile Item window. This window allows the user to create a new profile for a user or a new user class (e.g., supervisor, manager, route inspector, etc.) and the delivery unit for that particular user class.

Figure 116:
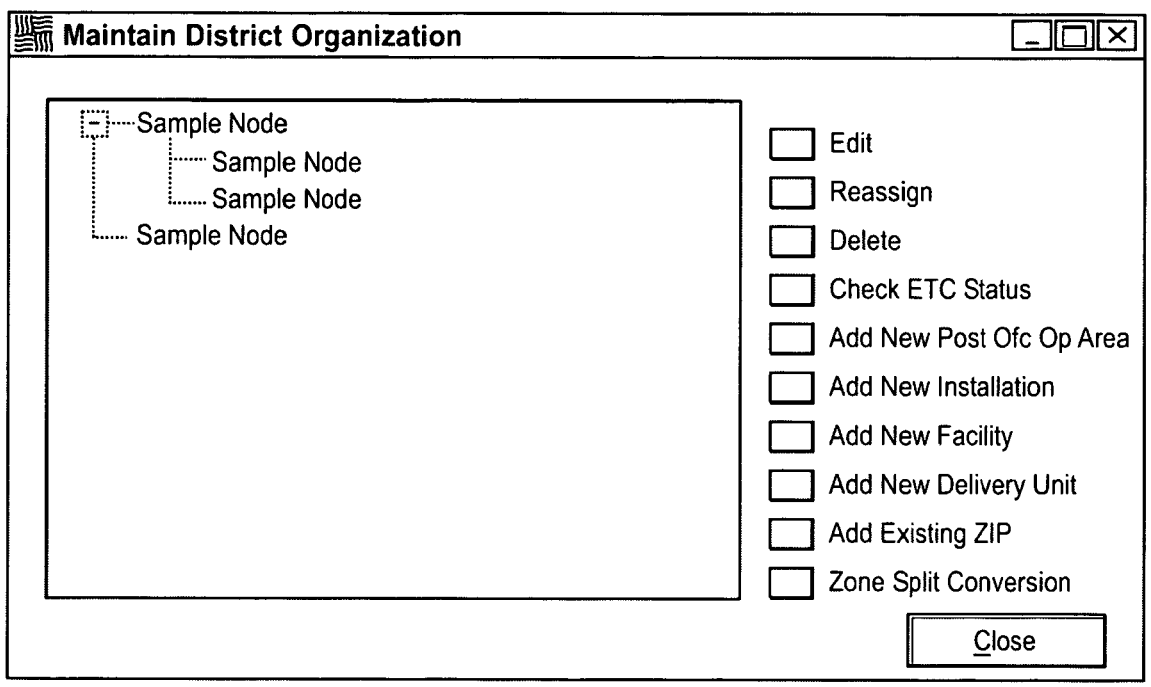

FIG. 116 illustrates an embodiment of a Maintain District Organization window where the district organization is displayed in a tree format. This window allows the user to view, edit, reassign, delete, and add to the district, its facilities, and its management areas.

Figure 117:
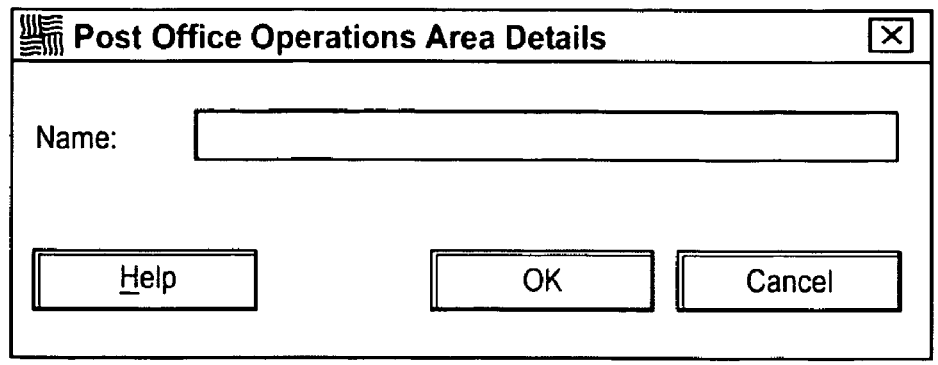
Figure 118:
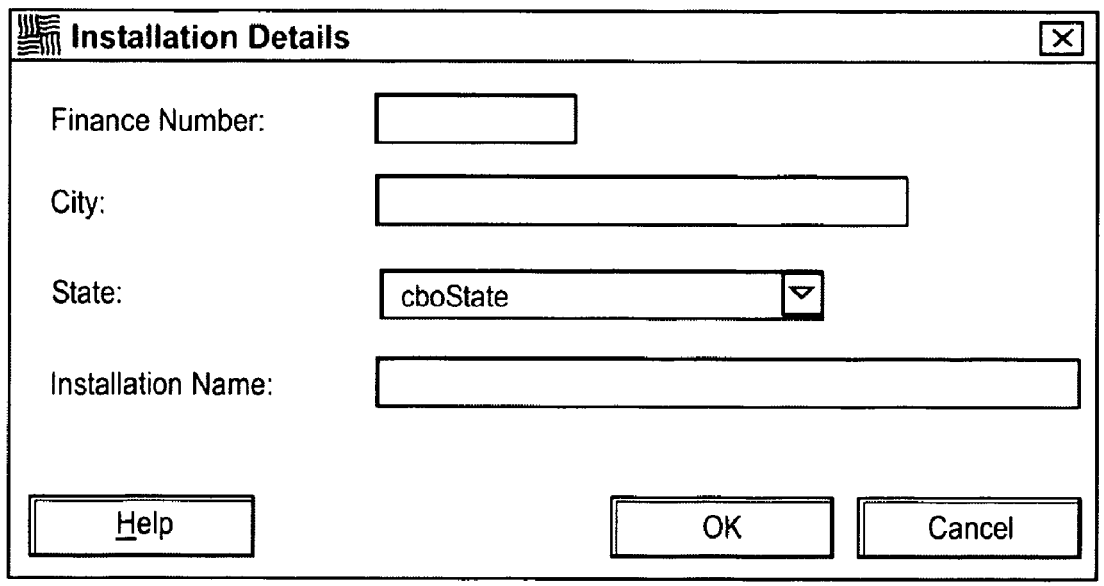

FIG. 117 illustrates an embodiment of a Post Office Operation Area Details window that is displayed when the user presses the appropriate button from the Maintain District Organization window to add a new post office operation area. The user selects the name of the post office that he will be adding. FIG. 118 illustrates an embodiment of a Installation Details window that is displayed when the user presses the appropriate button from the Maintain District Organization window to add a new installation. The user assigns a finance number, city, and state to the new installation. An installation can consist of an individual building, or it can consist of multiple facilities.

Figure 119:
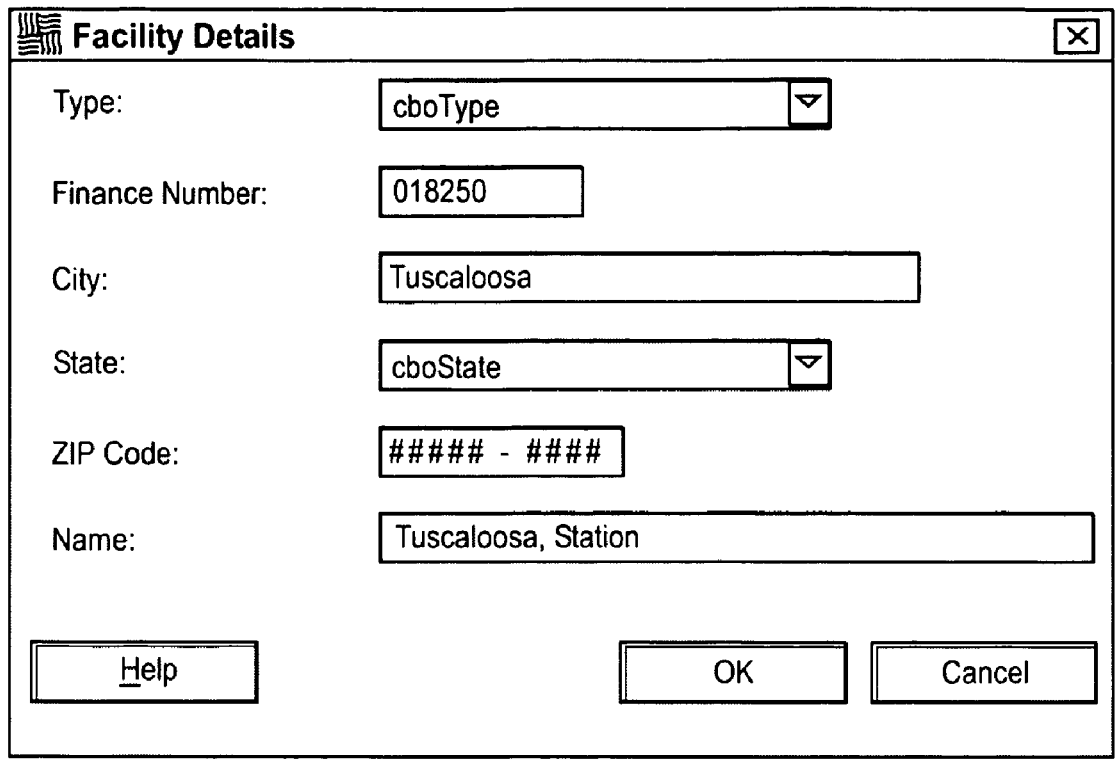
Figure 120:
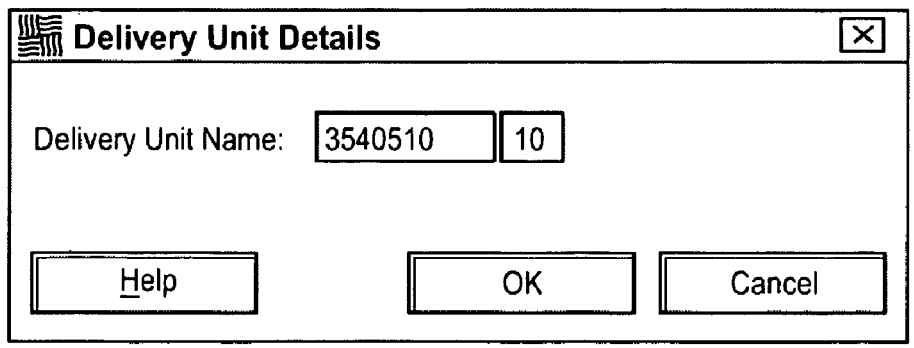

FIG. 119 illustrates an embodiment of a Facility Detail window that is displayed when the user presses the appropriate button from the Maintain District Organization window to add a new facility. The user enters certain information about the facility. FIG. 120 illustrates an embodiment of a Delivery Unit Detail window that is displayed when the user presses the appropriate button from the Maintain District Organization window to add a new delivery unit.

Figure 121:
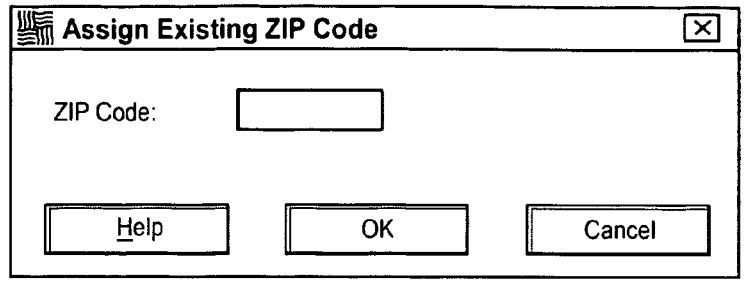
Figure 122:
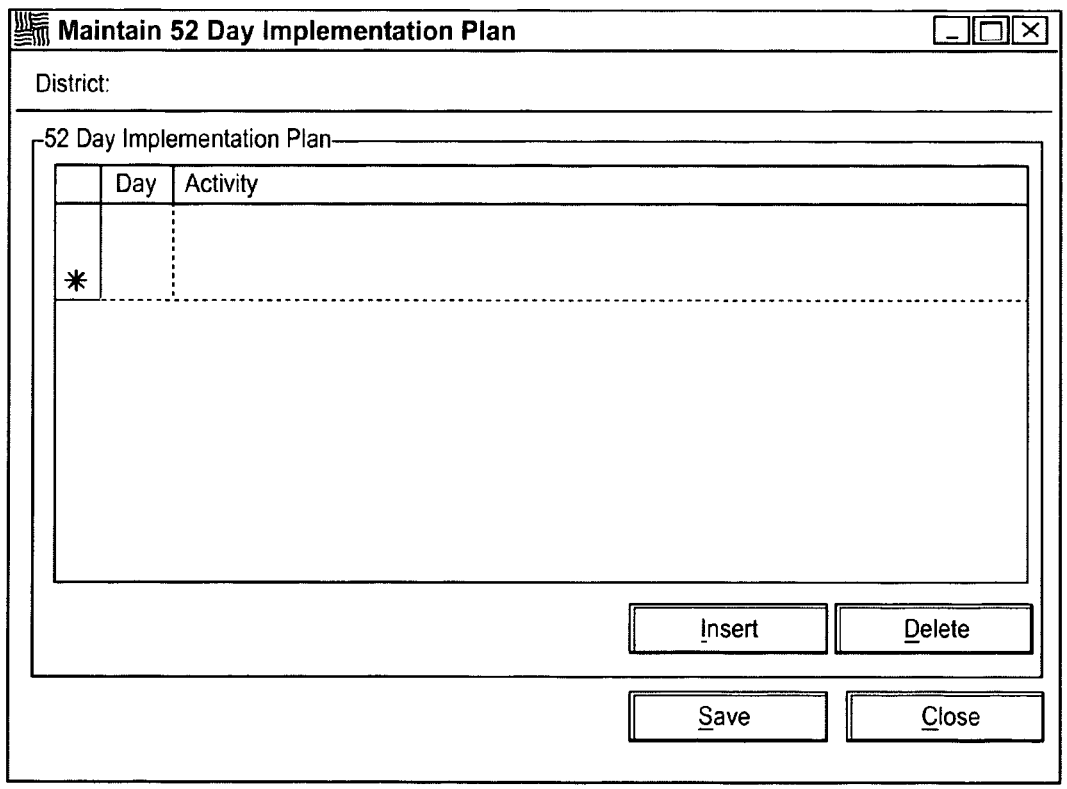

FIG. 121 illustrates an embodiment of an Assign Existing ZIP Code™ window that is displayed when the user presses the appropriate button from the Maintain District Organization window to add an existing ZIP code™. FIG. 122 illustrates an embodiment of a Maintain 52 Day Implementation Plan window that allows a user to add an activity to his 52-day plan. The user can get to this screen by pressing the appropriate button on the System Administration Workbench window discussed above.

Figure 123:
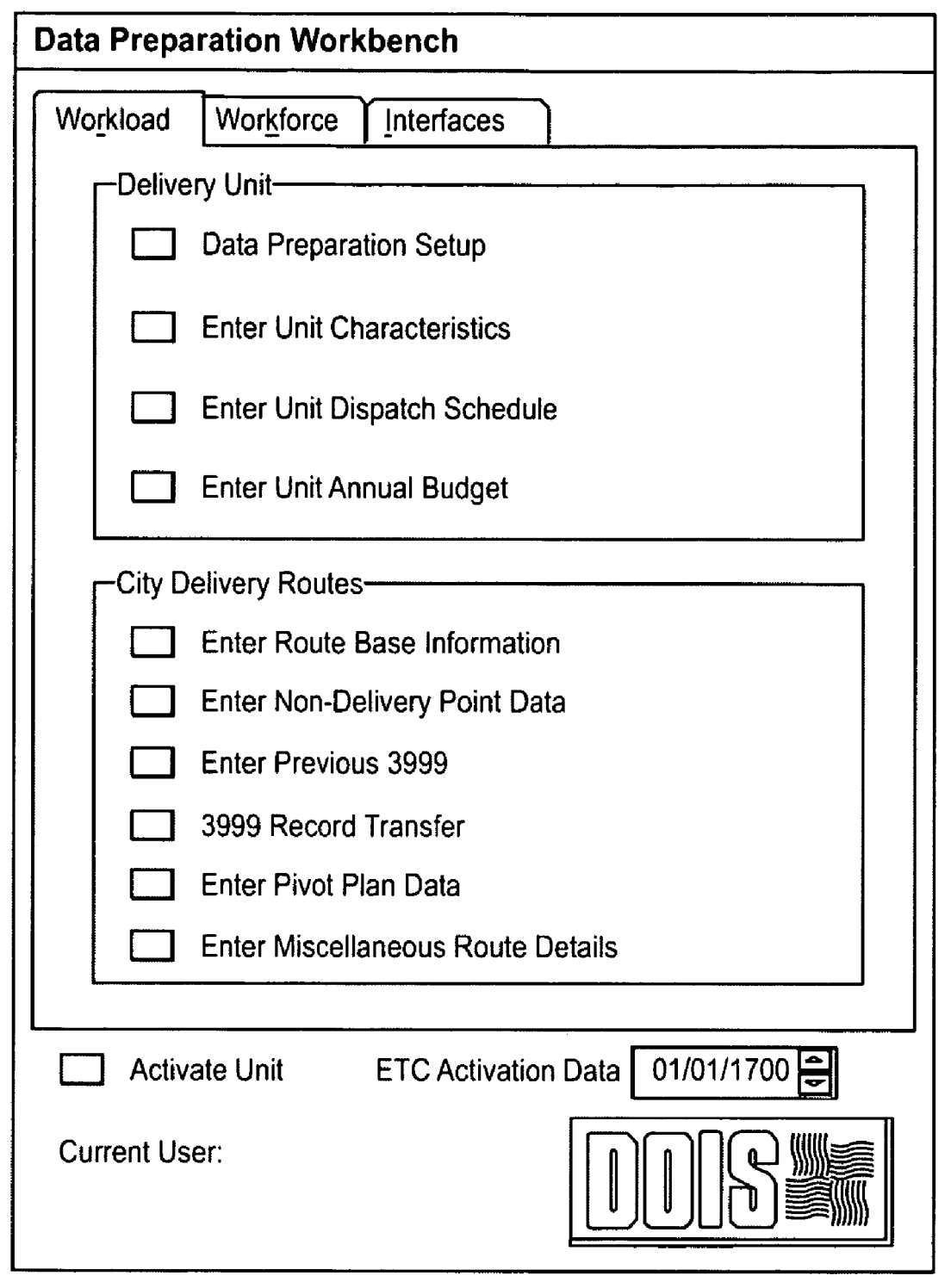

FIG. 123 illustrates an embodiment of a Data Preparation Workbench window. The window preferably has three tabs: Workload, Workforce, and Interfaces. This screen allows the user to activate a delivery unit by inputting the delivery unit's initial base data. The Workload tab preferably includes a Delivery Unit and a City Delivery Routes sections. The Delivery Unit section preferably includes buttons for Data Preparation Setup, Enter Unit Characteristics, Enter Unit Dispatch Schedule, and Enter Unit Annual Budget. The City Delivery Routes section preferably includes buttons for Enter Route Base Information, Enter Non Delivery Point Data, Enter Previous 3999 (the step-by-step travel pattern a carrier follows to deliver a route), 3999 Record Transfer, Enter Pivot Plan Data, and Enter Unit Miscellaneous Route Details.

Figure 124:

FIG. 124 illustrates an embodiment of a New Delivery Unit window that can be accessed from the Maintain District Organization Window. In this window, the user identifies the new delivery units area ID, district ID, facility ID, group ID, and assigned finance number. This information links delivery units to other units and facilities within their district (see FIG. 116).

In one embodiment of the invention, data is gathered for creating a new delivery unit by pulling in data from the AMS database and other interfacing databases that have relevant information about routes, etc.

Figure 125:

FIG. 125 illustrates an embodiment of a Generate Weekly Schedule window that allows the user to generate a weekly schedule for a delivery unit by inputting a service week start date. The user accesses this screen from the Workforce tab of the Data Preparation Workbench.

Figure 126:
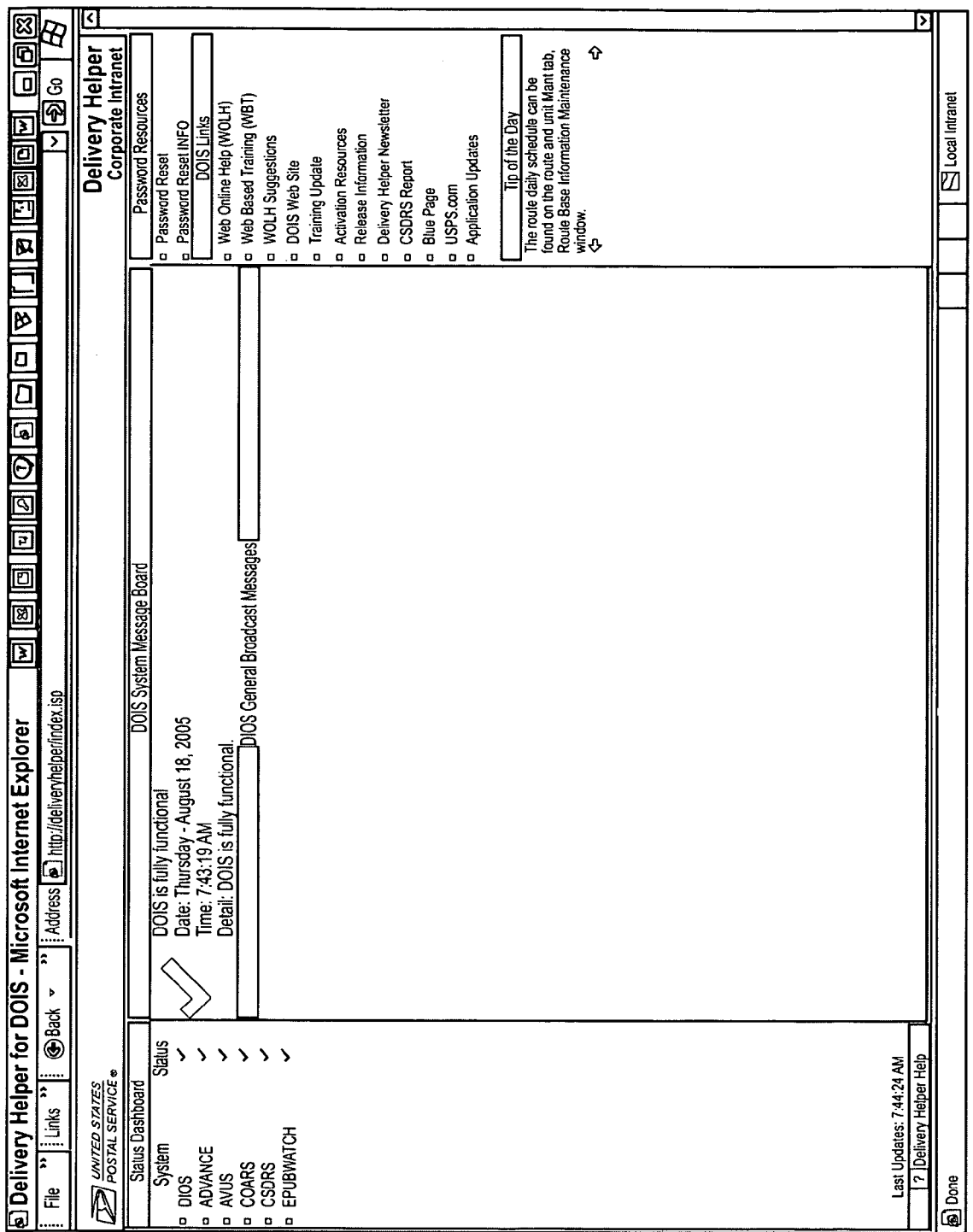

FIG. 126 illustrates another facet of the present invention. It is a web page that can be viewed online that allows users of the delivery operations information system of the present invention to view the system status. In one embodiment, the web page informs the user of the system's availability. For example, the user can be informed that the system is fully functional, slow, or unavailable. This can be achieved, for example, by the web page sending a communication to the delivery operations information system and tracking whether and when the system to returns a communication. By refreshing the web page, the system status is updated. In the illustrated embodiment, the availability determination is accompanied by an easily viewable symbol of traffic signal that is green when the system is fully functional, yellow when the system is slow, and red when the system is unavailable. This web page can provide additional online support for the user, such as a "Tip of the Day" or the ability to reset system passwords or view certain information online.

Figure 127:
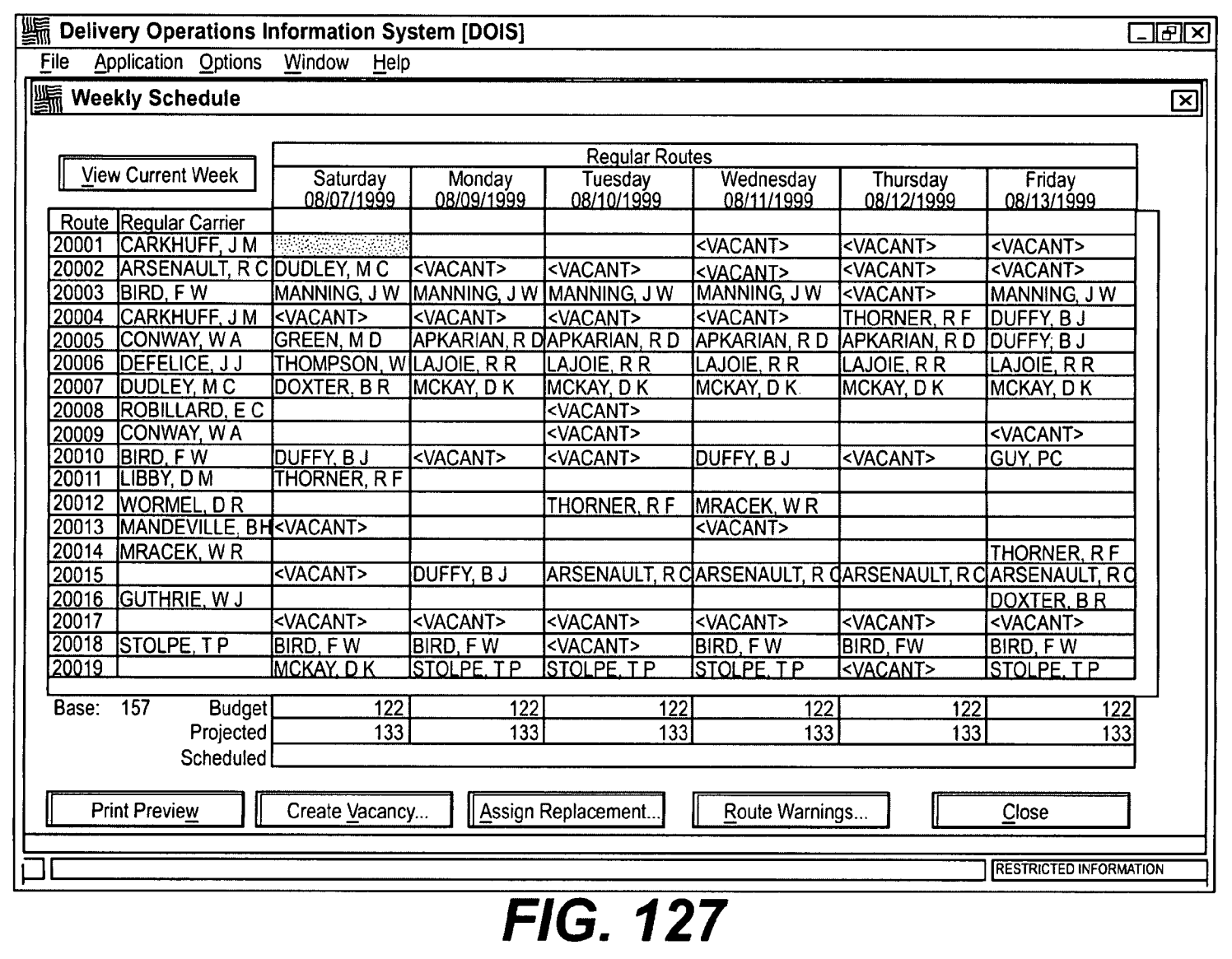
Figure 130:
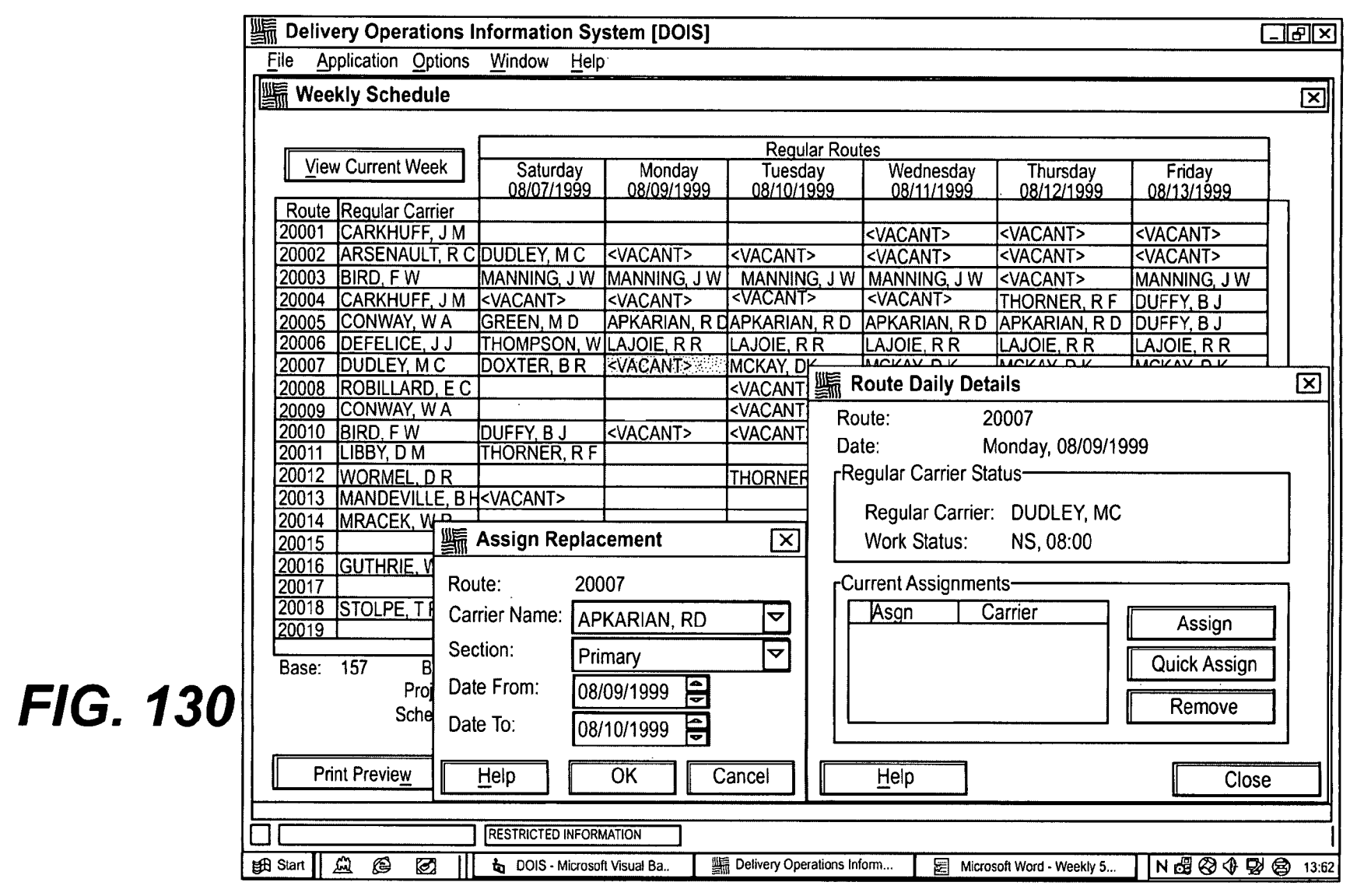

In one embodiment, the delivery operations information system of the present invention can also provide a function for adjusting a carrier's weekly schedule. From the office function, a Weekly Schedule window can be open. By right clicking on a selected field, the user can select from a number of different functions, such as: Quick Assign, Assignment Details, Create Vacancy, and Show. For each of these options, the user can select from: Regular Routes, Miscellaneous Routes, Carrier Work Status, Absence List, Sunday, or Vacant Routes. The Weekly Schedule window can allow a user to insert a replacement carrier, as shown in FIG. 127. The Weekly Schedule window can also show absence status, as shown in FIG. 128. Of course, it is also possible to view regular routes of carriers in the Weekly Schedule window, as shown in FIG. 129. From this window, it is also possible for a user to assign a replacement carrier. For example, FIG. 130 shows a Weekly Schedule window in which the user can also view the Route Daily Details window and the Assign Replacement window.

Figure 131:
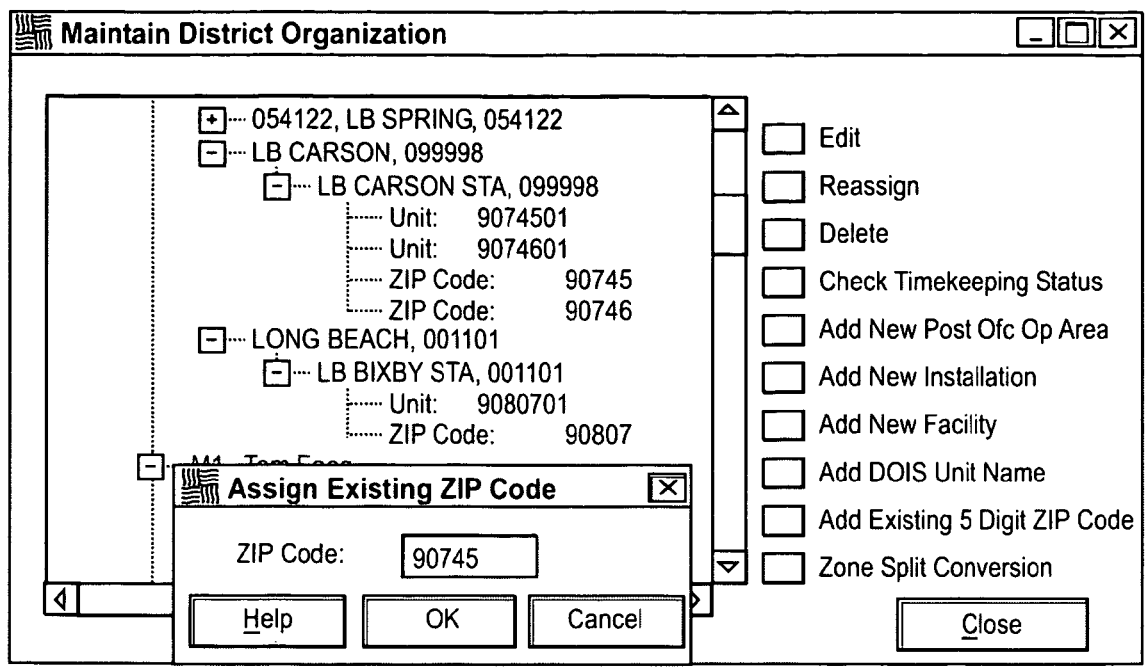

Turning back to the Maintain District Organization function, in an exemplary embodiment the system can allow the user to share ZIP codes™ across one or more facilities. FIG. 131 illustrates an embodiment of a Maintain District Organization window including this feature. After the user presses the Add Existing 5 Digit ZIP Code™ button, the user is presented with a window called Assign Existing ZIP Code™ into which he can enter the new code for a selected facility or location. This feature enables the new ZIP code™ to be shared across facility or installation boundaries. Thus, multiple ZIP codes™ can be assigned to a single delivery facility.

Figure 132:
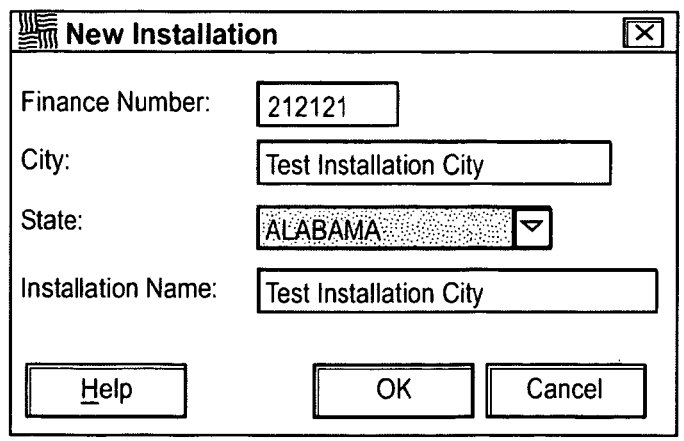

FIG. 132 illustrates an embodiment of a window that is presented to the user after selecting the New Installation button from the Maintain District Organization window. This window displays the finance numbers for the installations or facilities and the facility name in the Installation Name field. After entering the appropriate finance number, the display can appear in a tree format with the finance number following the name of the installation or delivery facility name.

With the present features of the system, the user is able to reassign a delivery facility without having to change the Facility Name field. Further, it is possible to sort alphabetically the installation or facility names, as the drop down lists are based on installation names or facility names. Also, by displaying the finance number for installation and facilities on the Maintain District Organization screen, it is easier for the user to gather station data based on finance number.

The preferred embodiment is configured to make the process of changing installation names easier. FIG. 133 illustrates an embodiment of a window that is presented to the user after selecting an installation from the tree chart off the Maintain District Organization window and hitting the Edit button. The Edit Installation window includes fields for Finance Number, City, State, and Installation Name. For example, if the Installation Name is the same as the City which is shown in the field, then the user can delete the entry in the Installation Name field and simply correct the entry for the City field. By hitting the tab button, the Installation Name field will automatically be filled out to reflect the change to the City field. The auto-populate field feature of the present system, as exemplified here, reduces the number of keystrokes and the possibility of typographical errors. In addition, the system will recognize the change to the City field and change the Finance Number field accordingly. On the Maintain District Organization screen, the installation now reflects the new finance number, though the facility does not. If the user closes the Maintain District Organization screen and then reopens it, the facility now shows the changed finance number. If the user were to highlight the facility and hit the Edit button, a window such as shown in FIG. 134 would appear that allows the user to be able to edit the station or facility information on the Edit Facility window, but not the finance number.

Figure 135:
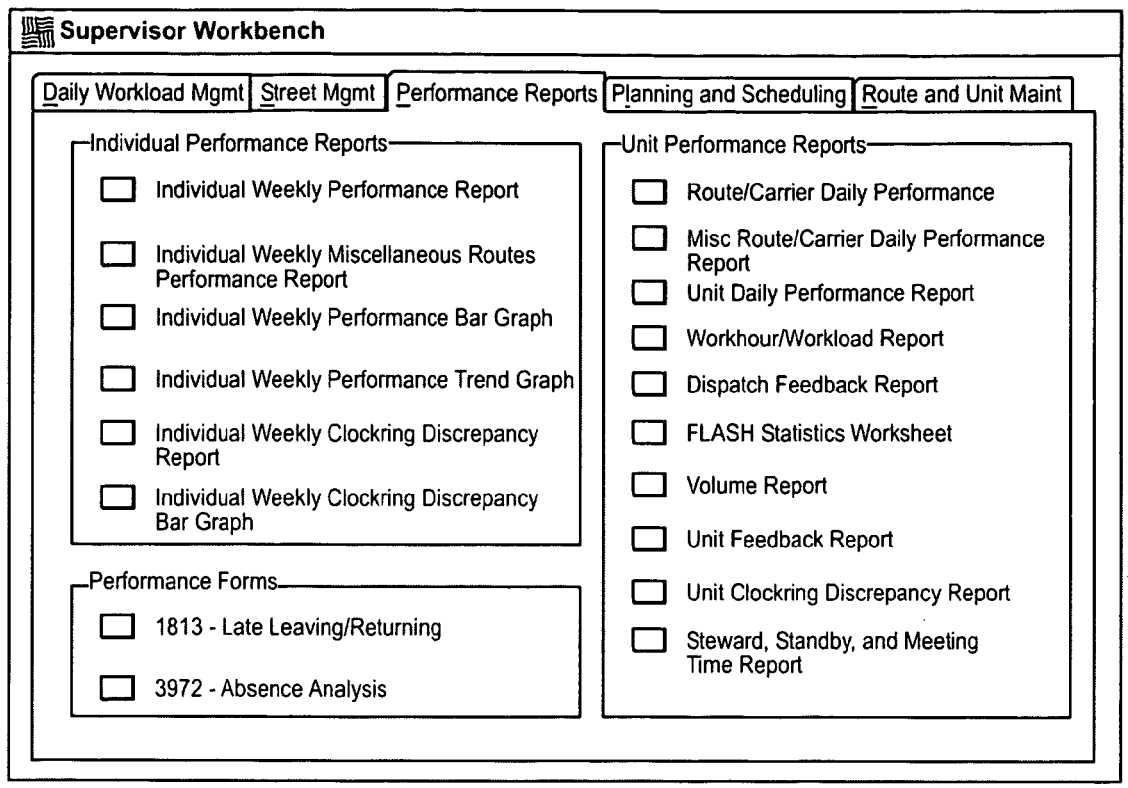
Figure 136:
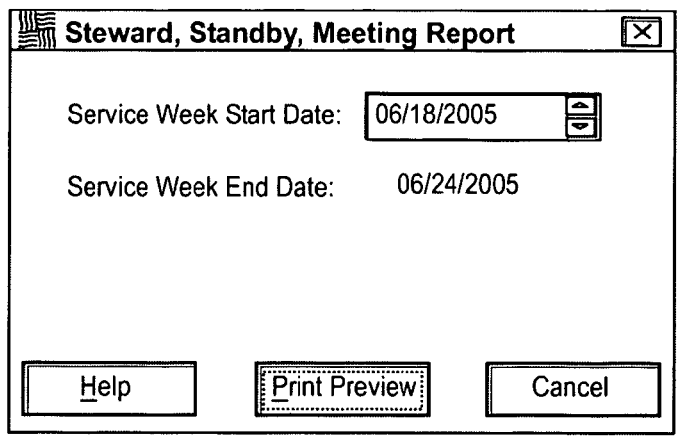

FIG. 135 illustrates a Supervisor Workbench screen of another exemplary embodiment of the present invention. The Supervisor Workbench has a series of tabs across the top to separate each individual section. The sections may include, for example: Daily Workload Management; Street Management; Performance Reports; Planning Scheduling; and Route and Unit Maintenance. The Performance Reports tab is chosen and displayed in FIG. 136. This tab also includes the function button entitled Steward, Standby, and Meeting Time Report under the section Unit Performance Reports. Selecting this button presents the user with a Steward, Standby, Meeting Report window similar to the one shown in FIG. 137. The user can enter the start date of the service week, and by selecting the Print Preview button, is able to generate a report for that week which provides the details of each of the types of time (e.g., steward, standby, and meeting) by operation code for the particular delivery unit of interest.

Figure 137:
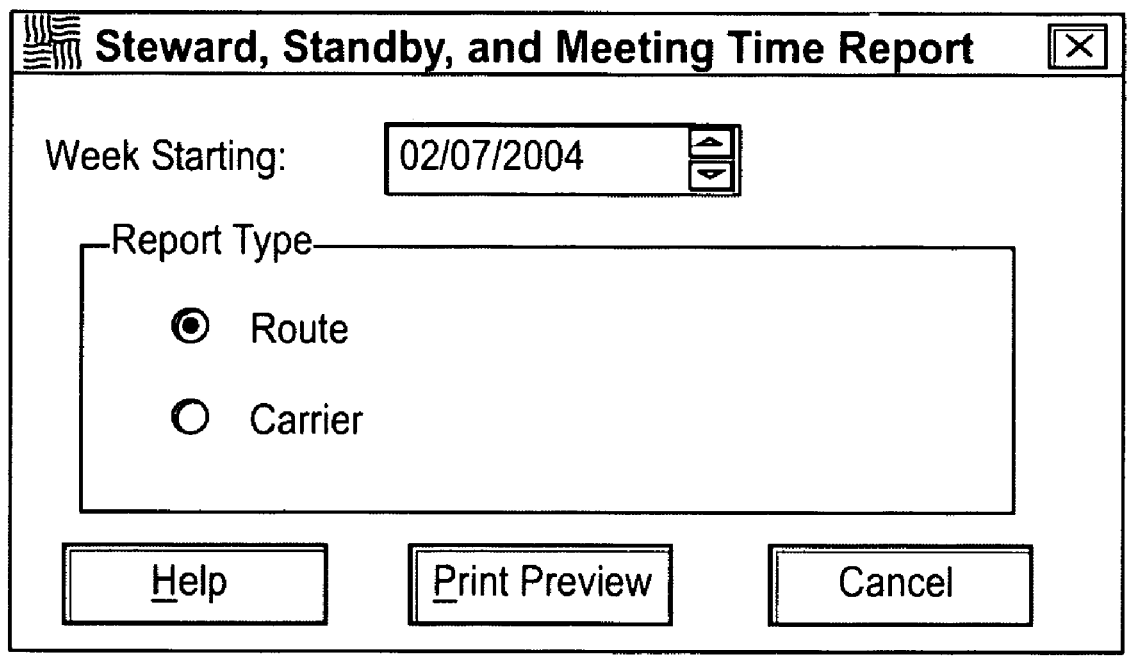

A report displaying steward, standby and meeting time that can be generated using the system of the present invention. A user can generate this report by selecting the Unit Feedback Report button from the Performance Report tab from the Supervisor Workbench. The report can include information about a deliver unit's identity (ID), the begin date, end date, and service week, the carrier's name and route ID, the type of carrier (e.g., part time, full time), the dates with beginning and end times telling exactly when time was recorded for steward, standby or meeting times, the duration of the time for each instance where steward, standby or meeting time was recorded, and the total weekly durations for the various types of time. This information can be displayed separately by the type of time that is being recorded. Such a report can be generated for a unit by either the route or by the carrier. For example, the Steward, Standby and Meeting Time Report window can allow the user to select a report based on route or by carrier, as shown in FIG. 137.

Steward, standby and meeting times are a subset of the general office time that is being monitored. Tracking the steward, standby and meeting times can provide delivery unit supervisors with more information on how office time is being used. Hence, the display of steward, standby and meeting time can assist supervisors in their ability to effectively and efficiently manage delivery units. For example, where a delivery truck is delayed in getting to the receiving dock and the receiving dock employee has some down time before the truck arrives, this down time can be captured in the system. If that employee's manager has a discussion with the receiving dock employee, that time can be captured as meeting time. Then, by preparing the report the supervisor can determine how the total work time has been spent.

Another useful feature of the system is the ability to generate a Unit Feedback Report from the Supervisor Workbench. The Unit Feedback Report allows users to view the previous day's overall performance for a delivery unit. This daily performance/analysis report outlines the following: usage, quality practices, and effectiveness data.

The usage section of the report allows users to track how their delivery units are using the main functions of the system, including logon, capture of mail volumes (manual and with data collection device), EOR transfer, and application version. The quality practices section allows users to track how they are managing quality practices of the system. These quality practices can include, for example, timeliness of reports, allocation of miscellaneous time, daily statistics, a summary of the steward, standby and meeting times, and additional miscellaneous times. The effectiveness data can include effectiveness indicators such as overtime percentage, adjusted office effectiveness, adjusted street effectiveness, and adjusted workload effectiveness.

The Performance Report tab of the Supervisor Workbench window of FIG. 132 can also include a Unit Daily Performance Report button which, when selected, can generate a daily performance report for a select unit. This report lists daily performance information over the course of one week for a delivery unit. The report can include several sections of interest, such as work hour analysis and productivity analysis. The work hour analysis and the productivity analysis can be displayed by daily section and/or weekly section. The report can include a section summarizing breakdown of mail volumes for select types of deliverable articles, such as letters, flats, DPS, delayed, curtailed, sequenced, and parcel and priority articles.

The unit daily performance report can also include information such as a comparison of actual deliveries to budget, as well as a percent variance for possible deliveries. Also included with the report is an analysis of the unit's work hours. These can include projected and actual values for the office, street, and route times; and variances and percent variances for office and street times, including router time. In addition, the report can include a comparison of LDC's 21, 22 and 29 projected, actual and budgeted hours, and total and budgeted variance hours.

The report can also include an analysis of productivity indicators for the office and for the street. The office efficiency indicator (OEI) designates the average amount of time spent in the office on each possible delivery in the unit. The adjusted office effectiveness indicator (OE) designates how the unit performed versus projected office time. The total efficiency indicator (TEI) designates the overall efficiency of the unit. The workload effectiveness (WE) designates the overall effectiveness of the unit. All of the efficiency indicators (OEI, OE, TEI, WE) can be adjusted for steward, standby and meeting times. The report can be broken down to display OEI and adjusted OEI, as well as effectiveness (OE) calculations, for AM and PM office data.

Further, the report can include an AM/PM breakdown of office and router time, including miscellaneous time such as steward, standby and meeting times. The report can also include a weekly totals section containing a summary of the figures for the week to date.

Figure 138:
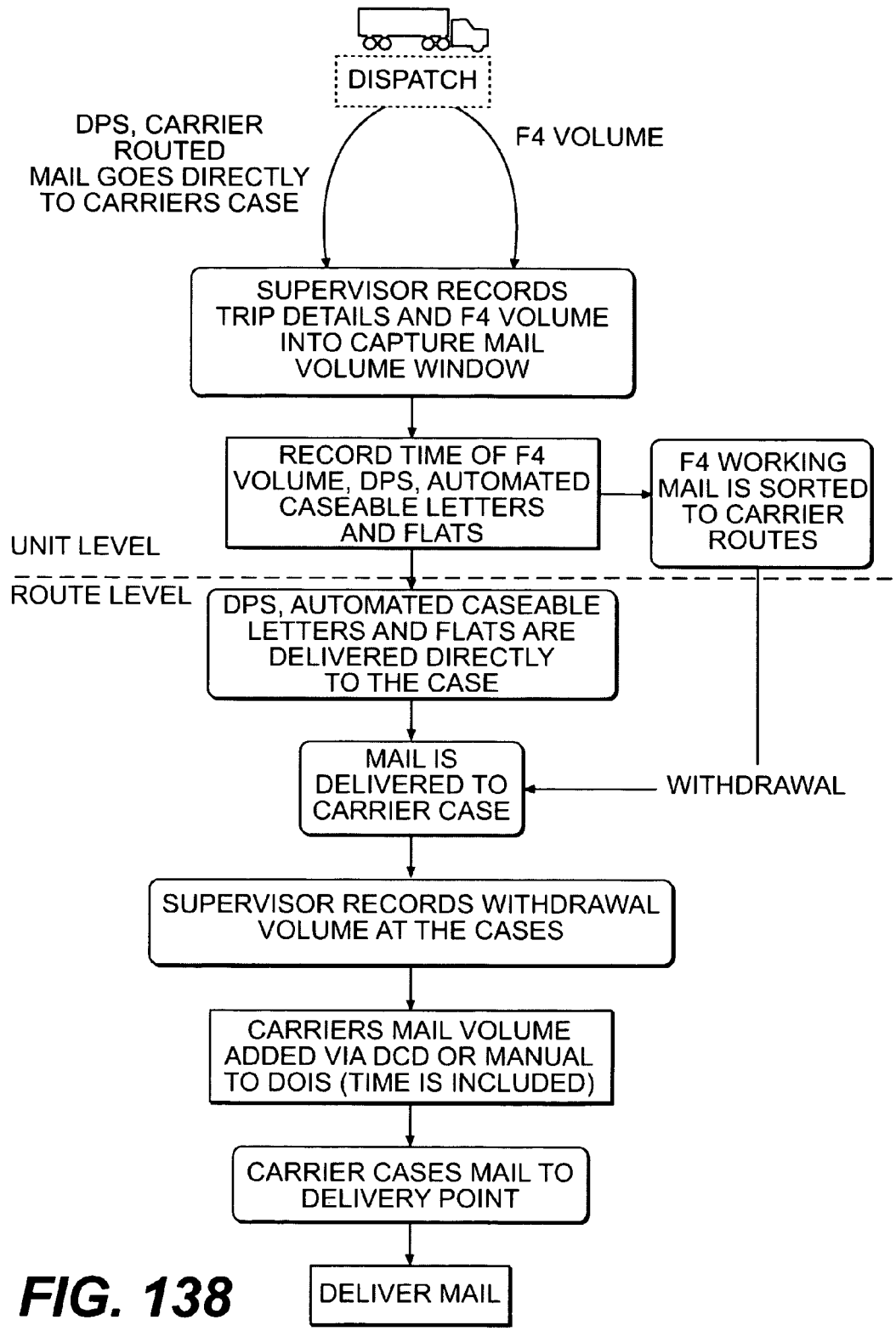

FIG. 138 illustrates a diagram of an exemplary mail delivery process for which the present system can be utilized to capture and record information relating to the delivery. From this information, the Unit Daily Performance report can be prepared.

Figure 139:
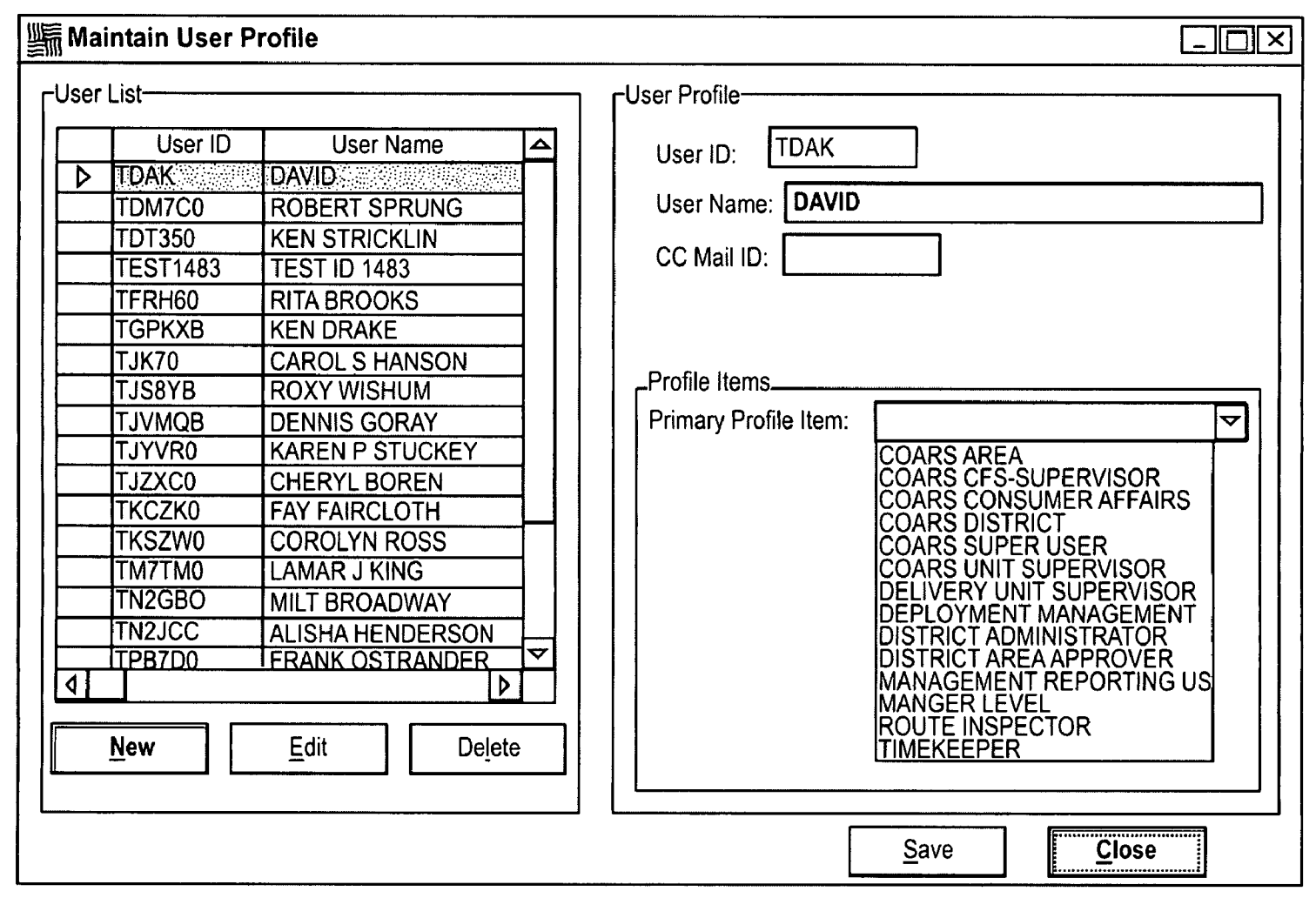

The delivery operations information system (DOIS) of the present invention can also be integrated with a change of address request system (COARS) in order to provide maximum flexibility to the user of the system. Using DOIS, it can be possible to validate user access to requested ZIP codes™. As shown in FIG. 139, in one exemplary embodiment the Maintain User Profile window can include a list of profiles, which can include a number of COARS user classes, such as COARS Area User, COARS Computerized Forward System (CFS) Supervisor, COARS Consumer Affairs, COARS District User, COARS Super User, and COARS Unit Supervisor. Only valid combinations of primary and secondary profiles can be accepted to gain access to the system. This security feature ensures that only certain authorized users can gain access to determine where a particular customer has moved or is now residing.

In another exemplary embodiment, the DOIS can also be integrated to the facility data base (FDB), so that a link is created between the DOIS facility database and the FDB facility database. In this way, it is possible to generate reports to help manage DOIS facility data against FDB facility data. Thus, a DOIS user can gather information on a particular facility, such as the street address, the number of doors available to accept delivery trucks, whether it has a gate, runs on gas or electric, etc. The information between both databases is thus shared so that congruency between the databases can be maintained.

In one exemplary embodiment, a user can access the facility detail by selecting an installation from the tree chart of the Maintain District Organization window and hitting the Edit button. As previously discussed, the Maintain District Organization window can be accessed through the System Administration Workbench. In the Edit Facility Detail window, the user will be presented with a series of warning messages. The values coming from the DOIS database are validated before the window is opened. FIG. 140 illustrates an exemplary Edit Facility detail window that opens after the user has accepted the last warning message. As shown, the window includes both the existing DOIS facility data as well as an area for FDB information. A Browse FDB button is also provided in this window. By selecting the Browse FDB button, the user can compare the finance number of the facility with the finance numbers listed in the Facility Selection window of the FDB database that pops up. Once in the Facility Selection window, the user can select a particular facility from the FDB grid (FIG. 141). If the user selects an inactive facility, the system will show a warning message and ask the user if he or she wishes to proceed. After this message, the system displays the Edit Facility window with the DOIS information and the updated FDB information. The user can save the link between the FDB and DOIS databases by selecting the OK button from the Edit Facility window (FIG. 142). To abort the changes, the user would select the Cancel button instead.

If the user wishes to add a new facility to the DOIS database and include FDB information, he or she would select an installation from the tree chart of the Maintain District Organization window and select the Add New Facility button. A New Facility window would then open, with the finance number from the selected installation filled in. After the user enters the appropriate information for the Type, City, State, ZIP Code™, and Name fields, he or she can select the OK button to create a new facility record. This facility record will be saved in the DOIS database, without a link to the FDB database. To complete the newly created record, the user would repeat the above-discussed steps.

Figure 144:
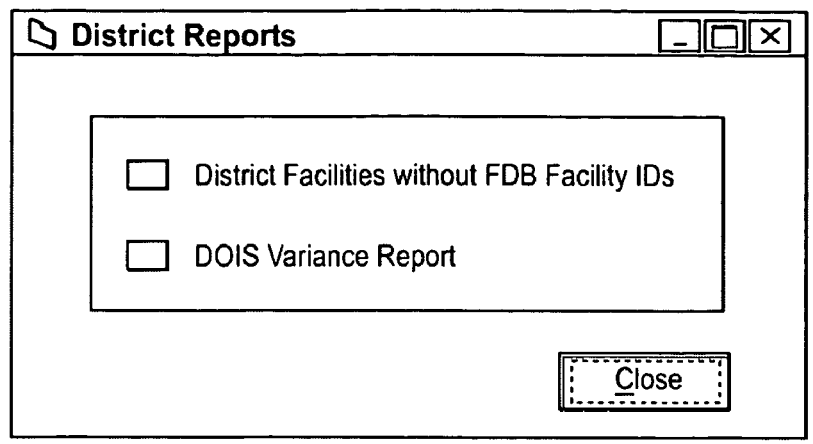

It is also possible to generate district reports with FDB and DOIS database information using the present system. As shown in FIG. 143, the user can select the District Report button from the System Administrator Workbench window. The user would then be presented with the District Report window, from which he or she can select District Facilities without FDB Facility IDs or DOIS Variance Report buttons (FIG. 144). Selecting the District Facilities without FDB Facility IDs button would generate a district report for facilities without FDB facility ID, while selecting the DOIS Variance Report button would generate a district report for FDB variances whereby any difference in finance number, state, ZIP code™, sub type, or status would result in an entry on that report. These report would thus enable the user to maintain data congruency between the DOIS and FSB databases.

Figure 145:
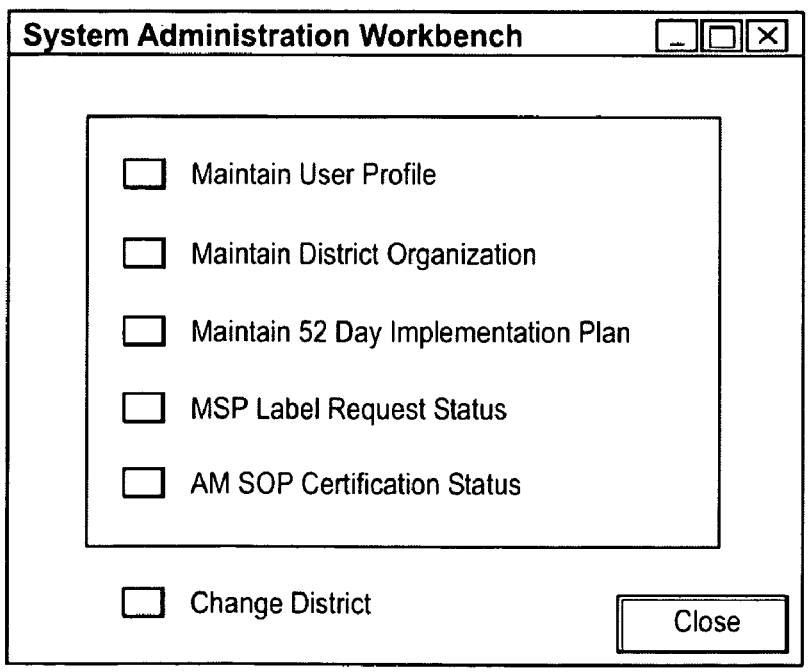

Additionally, in an exemplary embodiment the system of the present invention can provide a function that tracks an office's compliance with the AM Standard Operating Procedures (AM SOP). From the data gathered, AM SOP certification team members will have the ability to edit and view the AM SOP certification status of DOIS. This function can be accessed by selecting the AM SOP Certification Status button from the System Administration Workbench window, as shown in FIG. 145. By selecting this button, AM SOP team members will be able to access, edit and view AM SOP certification status information for DOIS sites. FIG. 146 illustrates an AM Standard Operating Procedures Certification Status window. This window allows the team members to record and view the certification status of an office. As shown, components such as the following can be tracked: date the AM SOP certification was completed; TOP audit results in the delivery section; TOP audit results overall; date the IOP was implemented; date the case configuration was completed; date the unit layout was approved; date the carrier schedule was approved; date the area review was conducted; and unit pass review results.

Upon entering the AM SOP window for the first time, the user may notice that the date fields are empty. After the user selects the type of certification status desired by checking the box next to the entry type (e.g., IOP, Case Configuration, Unit Layout, or Carrier Schedule), then the date field associated with that certification type can be populated with the current date or the date last entered in the system for that certification. An empty date field would indicate that the milestone or certification was not yet complete for that item. A user could change the date if needed by using the up and down arrows in the box next to the date field, or by manually entering the numbers. Selecting the Save button would save the information while selecting the Close button would close the window and discard any changes that were made. Once the AM SOP information has been recorded for a unit, the changes would appear upon entering the AM SOP window. Users would have the ability to revise the AM SOP information for any particular unit.

In yet another exemplary embodiment, the system can include a function to record volumes of mail (letters and flats) by trip. The method includes the ability to track the actual receipts of mail and to be able to track the volumes (letters and flats) by dispatch compared to the IOP. In one example, the method would require a supervisor to enter the source of the mail and arrival time prior to saving mail volumes. PM dispatches would also be recorded similar to AM dispatches. Further, miscellaneous route volumes would also be recorded. The method would also allow the recording of unit distribution, P.O. box, and rural route volumes for the delivery unit. With this function, DOIS would be able to calculate what time mail arrives at the carrier's cases, and be able to identify the time a carrier has, for example, 80% of their AM caseable mail and, for example, 100% of their flats for the day.

FIG. 147 illustrates a Capture Mail Volume window adjacent to a Workload Status window of one embodiment of the present invention. The Workload Status window shows the route, carrier, and the amount of time that carrier was over or under the expected time. The Capture Mail Volume-Manual window shows a list of the routes and the total volume of mail for those routes. By viewing the two windows side by side, a user is able to make business decisions based on the data shown in the displays.

FIGS. 148 and 149 illustrate a Capture Mail Volumes-Manual window of another embodiment of the present invention, for withdrawal and roll-in sources, respectively. As shown in FIG. 148, if withdrawal is chosen as a source, then the arrival time is recorded prior to saving the information. If roll-in is the source chosen, as in FIG. 149, then the display button shows a roll-in button instead. This feature enables the system to record a time at which the volume of mail changes at the carriers' cases.

Figures 150, 151:
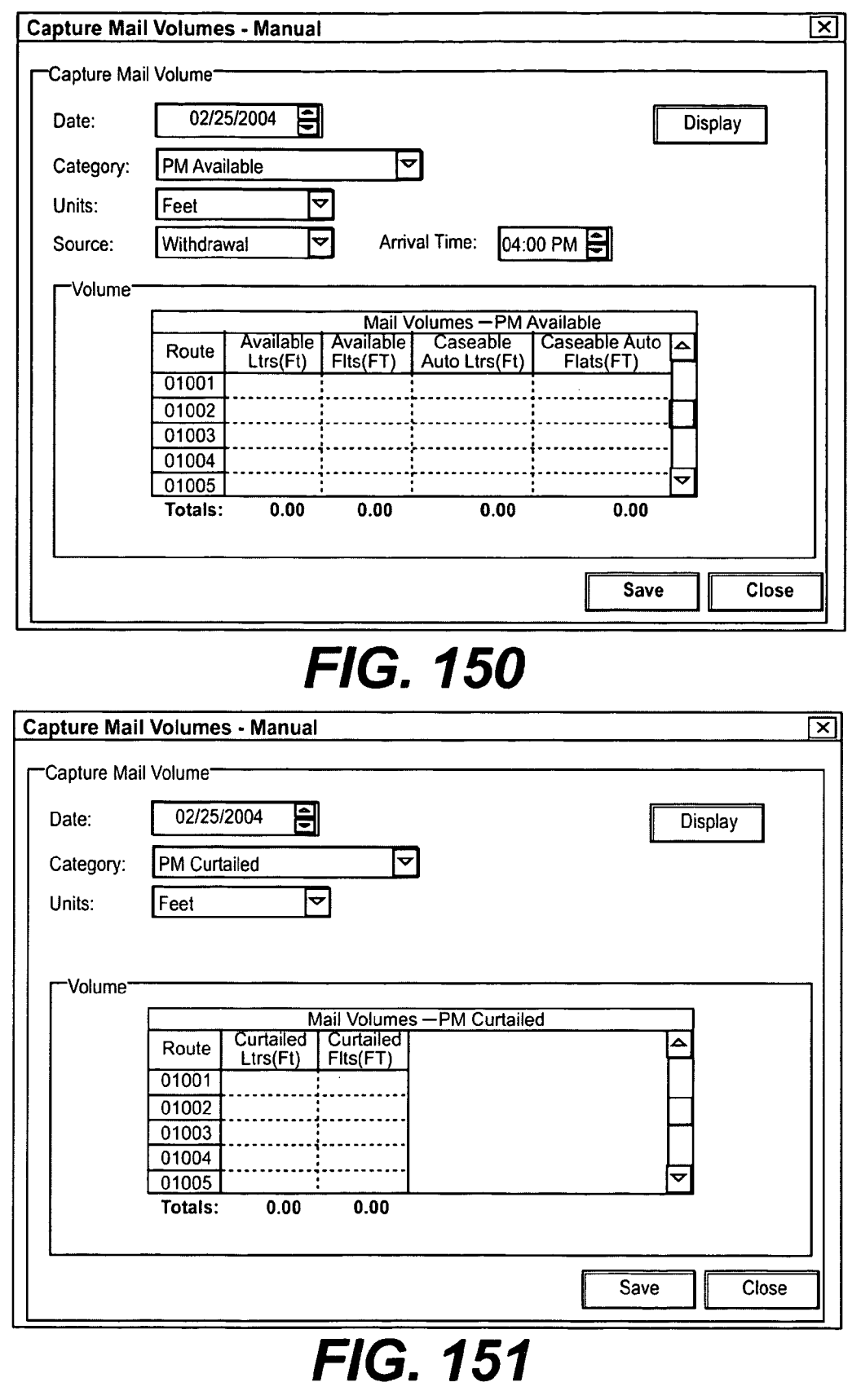

FIGS. 150 and 151 illustrate a PM Available window and a PM Curtailed window, both of which are accessed through the Capture Mail Volume-Manual window. After choosing the date, the PM Available category field, and the Units field, the Display button can be enabled, showing a window similar to FIG. 150. If the user chooses the date, the category PM Curtailed in the category field, and the Units field, then a window similar to the one shown in FIG. 151 will appear after selecting the Display button. These windows allow for the addition of recording dispatches, unit distributions, and automated caseable letters and automated caseable flats for PM dispatch arrivals.

Figure 152:
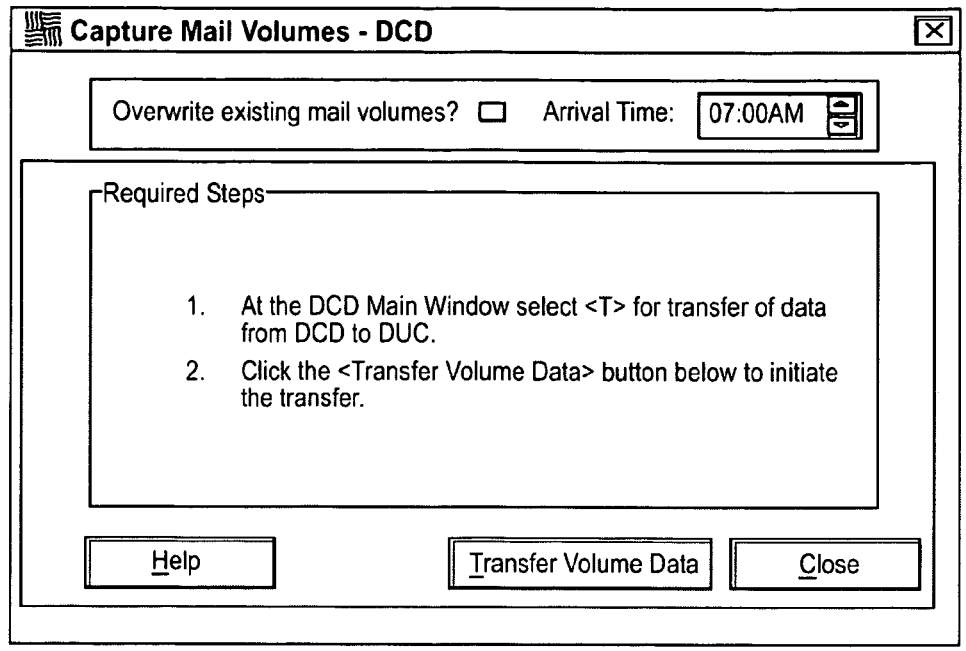
Figure 153:
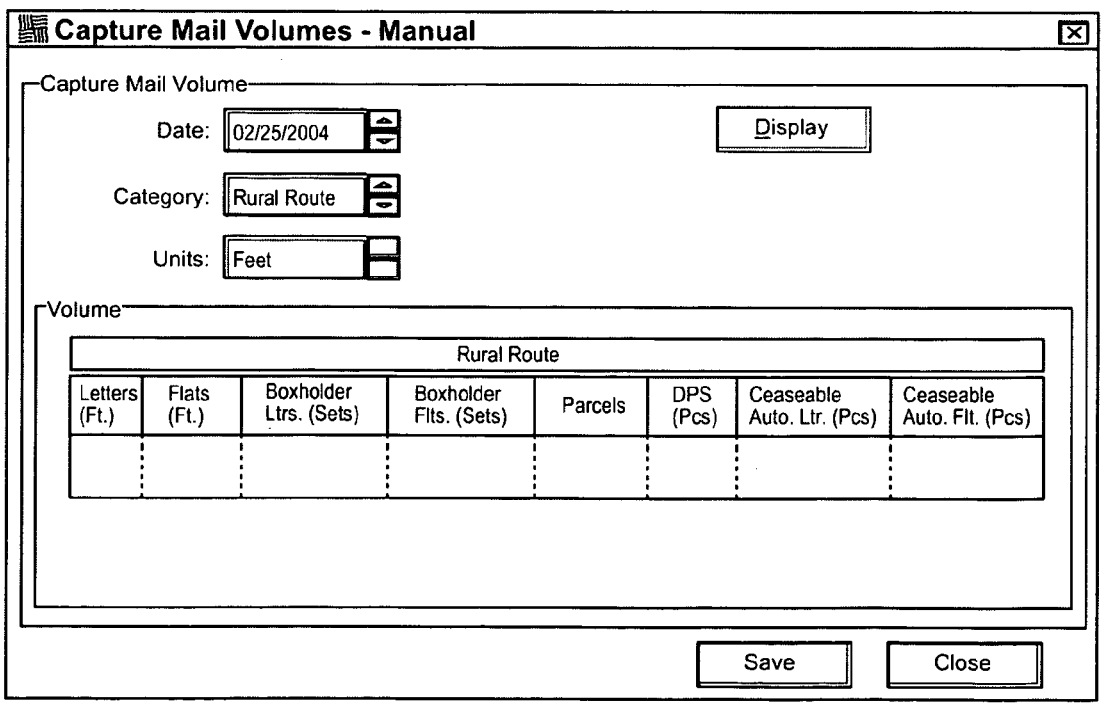

FIG. 152 illustrates an embodiment of a Capture Mail Volumes-DCD window. As shown, the user is asked to enter an arrival time for any withdrawal, thereby allowing the system to record a time at which the volume of mail changes at the carrier's case. The Transfer Volume Data button is enabled after the user enters a withdrawal time. Of course, the Capture Mail Volumes can also be manually entered, as previously discussed. For example, Capture Mail Volumes-Manual windows can be provided allowing the user to select the date, the category of route (i.e., rural, PO Box, or miscellaneous), and the units of mail volume field. FIG. 153 illustrates such a window for a rural route. These windows enable the user to enter mail volumes specific to these types of routes, thereby providing a system that can capture more detailed information relating to the carrier's route.

FIG. 154 illustrates a Maintain Dispatch Information window of the present embodiment, which can include columns for AM Dispatch, Arrival Time, Automated Letters, and Automated Flats. This information tells the user if the Dispatch trip is scheduled for the morning.

From the Capture Mail Volume window, a user can click on a route and access a Detailed Route Volume window similar to that shown in FIG. 155. This window can display the details of how the mail volumes were recorded for the day. The user can edit this screen, which would update the mail volumes for the day. If the user wishes to record or adjust a dispatch, he or she could use the Capture Daily Dispatch Information window, similar to the one shown in FIG. 156. From this window, the user can record a dispatch by pressing the Record Dispatch Trip button. A Record Dispatch Trip window similar to the one shown in FIG. 157 would appear, allowing the user to enter the details about the trip that has arrived. The information would then be displayed on the Capture Daily Dispatch Information window after the user selects the Save button.

With this capture volume feature of the present embodiment of the invention, a user is also able to generate several reports with the captured data. For example, it is possible to generate a Volume Feedback Report by selecting that button. The report can be based on route detail, unit, or unit distribution. In the Unit Daily Performance Report, the Mail Volumes section can be broken down to include unit distribution of letters, flats, and parcels. The P.O. box entry would be broken down to include letters, flats, and parcels, and rural routes would include subcategories of DPS, letters, flats and parcels. This information can be displayed in a Mail Volume section of a unit daily performance report. A Unit Distribution Volume Feedback Report can also be generated using the present system to display unit distribution letters, flats, and parcels by day, including weekly totals for the selected unit. A representative Unit Distribution Volume Feedback Report is shown in FIG. 158.

Another report that can be generated is the Unit Volume Feedback Report, which can display the time when, for example, 80% of the carrier's mail to be cased is available for a selected week for all routes in the selected unit. The report can also display the time when, for example, 100% of the carriers flats to be cased are available for a selected week. A summary can be provided which would represent the totals for non-compliance, unscheduled trips and to the unit, and number of trips that were at least a certain time, such as 15 minutes, late, for the selected unit. A representative Unit Volume Feedback Report is illustrated in FIG. 159.

A Route Detail Volume Report can also be generated using the present system. The Route Detail Volume Report can display the time that, for example, 80% of the carriers' mail to be cased is available and when, for example, 100% of the carriers' flats to be cased are available. The report can provide a detailed view of roll-ins, dispatch trips and withdrawals for a route in one day. A representative Route Detail Volume Report is illustrated in FIG. 160.

FIG. 161 illustrates one embodiment of the Route Adjustment System function of the DOIS. The route adjustment system is a tool that can be provided to help supervisors determine the value of a particular route. The route adjustment system also allows supervisors to be able to maintain a carrier's route time as close to 8 hours as possible. The system involves evaluation of the route at both the office and the street level. Data such as time allocation from both levels is collected and entered into the system, where the supervisor can analyze the data to detect inefficiencies and make determinations on how to improve and maintain an efficient route and carrier workforce.

FIG. 161 illustrates a route details window of the Route Adjustment System of the present invention. All options for adjusting (approving) projections are available from the Workload Management menu. Selecting the Accountables Over Base option opens the Projection Adjustment window. Under Mail Volume, a user can click the Curtail or Delay Mail button and this would open the Save Mail Volume Manual Window. By highlight a row under Description, a user can click the Adjust Projection button and this would open the Project Adjustment window for that selected row. Further, the user can save any changes or entries after the requested time is adjusted. By "total projected time" what is meant is the sum of all the projected time for this route. This time can be used in the calculation of the "approved route time," which is calculated based on a regular route time (projected at eight hours) and any auxiliary route time.

The Approval or Disapproval buttons, as well as the Save and Cancel are enabled only after the requested time has been adjusted. When the Disapproved check button is checked a Comments box can be visible and enabled. In one embodiment, the Comments field is always required if the Disapproval box is checked.

FIG. 162 illustrates an exemplary Route Projection Adjustment window provided by the present invention. This window allows a user to adjust the standard street projection for a particular route, and to enter comments for the reason for the adjustment, such as for example construction deviation as shown in FIG. 163. FIG. 164 illustrates an Assignment Details window which allows a user to adjust an office time of a route. FIGS. 163 and 164 illustrate particular Assignment Details windows that appear when the assignment type is an AM Office Auxiliary or a Street Auxiliary. The AM Office Auxiliary assignment type may also lead the user to a Scheduled Carrier List window, as previously described, while the Street Auxiliary assignment type may further lead the user to pivot options similar to the features in the Pivot Route menu from the Supervisor's Workbench.

Figure 165:
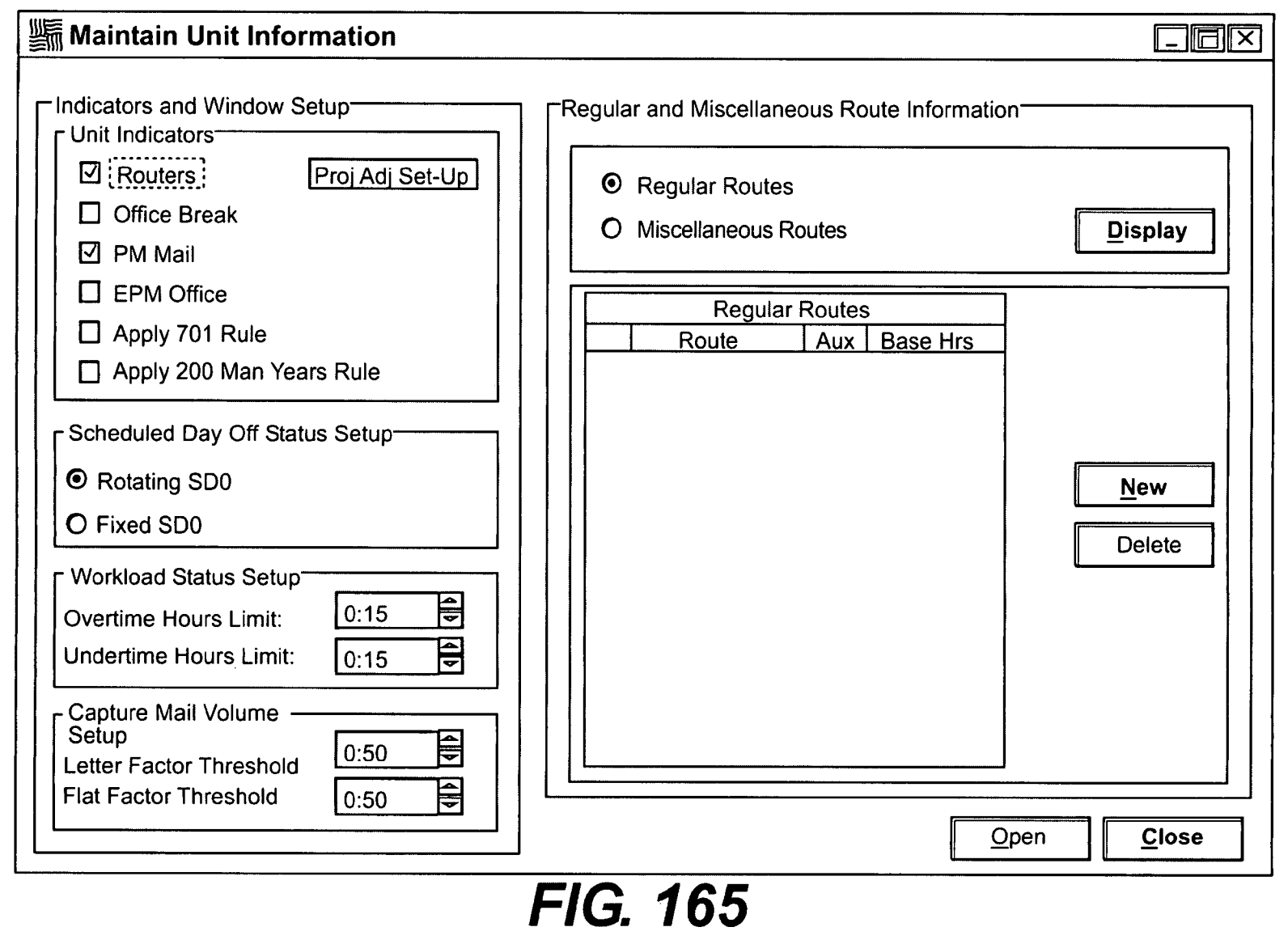

FIG. 165 illustrates an exemplary Maintain Unit Information window. As shown, the window includes a Projection Adjustment Set-Up button that would allow the user to open a Unit Projection Adjustment Set-Up window similar to the one shown in FIG. 166. By providing an automated inclusion feature, a district administrator can automatically include any of the projection adjustments for all of the routes in a delivery unit, on a daily basis. The supervisor would not be required to manually approve each projection for every route, as some would be automatically recognized or approved. The supervisor would have the option to remove or adjust any projection adjustments on a daily basis to reflect current workloads through the Route Details window, however. Further, the system is configured such that a supervisor can retroactively enter adjustments for previously worked days. This option is beneficial where a supervisor has made, for example, an oral adjustment the previous day and did not enter that adjustment into the system due to time constraints or simply forgot to do so. By allowing the supervisor to retroactively record that adjustment into the system, a more accurate report and accounting can be made of the actual work performed for any given day or period.

Preferably, each of the system's windows has a help button. The help button is window-sensitive and includes extensive online help, including a brief description of the purpose of the window.

This delivery operation information system of the present invention can be used for both city letter carriers and rural carriers. The embodiment of the system described above is tailored to city carriers, but could be used, preferably with appropriate alterations, for rural carriers. The system may also include an automatic budgeting feature allowing the user to tap into a national budget system for local downloads or data.

The system of the present invention can include several security features to prevent unauthorized access to the system and also to protect the privacy of the identities within the system's database. For example, it is understood that access to the system of the present invention can be controlled by granting selective access to authorized users only. For example, the Unit Feedback Report can be available to users with Manager access and Managers with National User access. Also, the system can be configured so that reports, such as for example the PS Form 3999, which include a carrier's ID number (usually the carrier's social security number) masks the first five characters and identifies only the last four digits of that ID number. Further, the system is configured to allow only users with a recognized profile to log on. If a user tries to log on to the system, and he or she does not have a recognized profile or the profile information is incorrect (i.e., no access to that level of the system), then a DOIS warning window similar to the one shown in FIG. 202 will appear. This DOIS window notifies the user that he or she must contact a DOIS coordinator to set up a user profile before proceeding further. Upon hitting the OK button, the application closes and prevents further access of the system by the unauthorized user.

In an exemplary embodiment, the Managed Service Points and Street Management System 380 can be divided into two subcomponents: Managed Service Points Maintenance and Managed Service Points Performance Reports. From the Managed Service Points Maintenance menu, a user can access features such as MSP Base Information Maintenance, MSP Location Report, MSP Label Request Status, and MSP Conversion. From the Managed Service Points Performance Reports menu, a user can access reports such as an MSP Overview Report, MSP Route Report, MSP Carrier Report, Missed Scan Report, Invalid Route Report, and Invalid Scan Report.

In one embodiment, the Route Inspections and Adjustments Workbench window can include an MSP Base Information Maintenance window in the Make/Implement Adjustments frame. The window allows route inspectors to maintain MSPs during a route inspection. Additionally, the System Administration Workbench can include a button for an MSP Label Request Status window. This window enables system administrators to print, reject, request, or view the status of MSP barcode labels for the district. The MSP Base Information Maintenance window allows MSPs to be added, edited, and deleted from a DOIS route. The base information displayed includes the MSP Type, Address, Label Location, Scheduled Scan Time, Scheduled Interval, and a Saturday Non-Delivery Indicator. The MSP Label Request window is also accessible via this window. The MSP Label Request window allows users to request Office, Street, and Mailing Labels from system administration. System administrators can make requests for every facility in the district, whereas, delivery unit supervisors can only request labels for their unit. The label information displayed on the window includes the Delivery Unit, Route Number, MSP Type, Address, Label Location, Number of Labels Previously Requested, and a New MSP Indicator.

The MSP Label Request window can be accessible via the MSP Label Request Status window or the MSP Base Information Maintenance window. Both windows are located on the Street Management Tab of the Supervisor Workbench. The MSP Label Request Status window can also be accessed from the System Administration Workbench.

The System Administration Workbench, as well as the Street Management tab on the Supervisor Workbench, can also include an MSP Label Request Status window. The MSP Label Request Status window allows users to view the status of existing label requests. System administrators can view the status of all label requests in the district, and delivery unit supervisors can view the status of all label requests in the unit. Labels can have a status of Submitted, Printed, or Rejected. From this window, users also have access to the MSP Label Request window.

The MSP Print Label window can be accessed via the MSP Label Request Status window, if opened from the System Administration Workbench. The MSP Print Label window allows system administrators the ability to print requested labels. The user will first display the outstanding label requests. The information displayed for each label request includes: Delivery Unit, Route Number, MSP Type, Address, Label Location, Date Requested, Number of Labels Previously Requested, New MSP Indicator, and Status. Once the label requests are displayed, the user can select the labels to print or reject. If a label is being rejected, a comment must be entered describing the reason for rejection.

Also accessible from the Street Management tab on the Supervisor Workbench is an MSP Location Report function. This new MSP maintenance report displays MSP base information for a selected route. The report outlines the following for each route in the delivery unit: Regular Carrier, MSP Type, Address, Label Location, Scheduled Scan Time, and Scheduled Interval.

The present system can also generate an MSP Overview Report. This new report displays MSP performance data for an entire delivery unit. The following fields are displayed for each route in the delivery unit: Assigned Carrier, Actual On-Time Scan Percentage, Load Time (Scheduled, Actual, and Variance), Travel To Time (Scheduled, Actual, and Variance), Travel From Time (Scheduled, Actual, and Variance), Total Street Time (Scheduled, Actual, and Variance), and Keyed Entry Indicator. Delivery Unit Totals are also displayed for each of the above fields. Users can generate a Daily or a Weekly Summary of the report. If a Weekly Summary is generated, the report will display route and unit averages, instead of actuals, for each of the displayed fields. The MSP Overview Report can be viewed/printed the following day after MSP performance information has been uploaded into DOIS. It is accessible from the Street Management tab on the Supervisor Workbench.

Another report that can be generated using the present system is an MSP Route Report. This new report displays MSP performance data for one or all routes in a delivery unit. The following fields are displayed for each route: MSP Type, Address, Assigned Carrier, Scan Time (Scheduled, Actual, and Variance), and Keyed Entry Indicator. Users can generate a Daily or a Weekly Summary of the report. If a Weekly Summary is generated, the report will display the Average Scan Time, instead of the Actual Scan Time. The MSP Route Report can be viewed/printed the following day after MSP performance information has been uploaded into DOIS. It is accessible from the Street Management tab on the Supervisor Workbench.

Yet anther report that can be generated is an MSP Carrier Report. This new report displays MSP performance data for one or all carriers in a delivery unit. The following fields are displayed for each carrier: Route Number, MSP Type, Address, Scan Time (Adjusted Scheduled, Scheduled, Actual, and Variance to Scheduled), Scan Interval (Adjusted Scheduled, Actual, and Variance to Adjusted Scheduled), and Keyed Entry Indicator. The MSP Carrier Report can be viewed/printed the following day after MSP performance information has been uploaded into DOIS and can be generated for a single service date. It is accessible from the Street Management tab on the Supervisor Workbench.

The system can also generate a Missed Scan Report. This new report displays missed scan statistics for each route in the delivery unit. The following fields are displayed for each route: Assigned Carrier, Possible Office Scans, Actual Office Scans, Office Scan Percentage, Possible Street Scans, Actual Street Scans, and Street Scan Percentage. Delivery Unit Totals are also displayed for each of the above fields. The Missed Scan Report can be viewed/printed the following day after MSP performance information has been uploaded into DOIS. It can be generated for a service date or for a service week. The report is accessible from the Street Management tab on the Supervisor Workbench.

Another report that can be generated with the present system is an Invalid Route Report. The Invalid Route Report identifies the carriers in the delivery unit that have logged into the Mobile Data Collection Device (MDCD) using an invalid route number. An invalid route number is defined as one that is not recognized by DOIS. The report displays the following fields for each invalid route: Carrier Name, Invalid Route Number, DOIS Assigned Route Number, and Hot Case Route Number. The Invalid Route Report can be viewed/printed the following day after MSP performance information has been uploaded into DOIS and can be generated for a single service date. It is accessible from the Street Management tab on the Supervisor Workbench.

Still a further report that can be generated is an Invalid Scan Report. This new report displays MSP performance data for each invalid scan during the selected service date. The following fields are displayed on the report: Route Number, Actual Carrier, Address, and Actual Scan Time. The Invalid Scan Report can be viewed/printed the following day after MSP performance information has been uploaded into DOIS and can be generated for a single service date. It is accessible from the Street Management tab on the Supervisor Workbench.

For the Carrier/Route Assignment Report menu, in one embodiment the Service Date field can be removed. Since the Revised Carrier/Route Assignment Report is a planning report, it will only be generated for the current service date. Further, in this embodiment the Report Type frame can be removed. The user can only select a carrier since the report focuses specifically on the selected carrier's line of travel for the current service date. In addition, the Revised Carrier/Route Assignment Report can be configured to focus specifically on a carrier's line of travel. MSP functionality has also been added to the report. The Carrier/Route Report can be generated for any carrier with a street or street assistance assignment. This report can be accessible from the Daily Workload Management tab on the Supervisor Workbench.

In one embodiment, the Unit Feedback Report can display MSP functionality. The MSP Overview Report can be added to the Timeliness of Reports sub-section of Quality Practices. Users can view the First Use, Last Use, and Times Used statistics for this report. In addition, MSP Management data can be added to the Effectiveness section. The following values can be displayed under this sub-category: Possible Office Scans, Missed Office Scans, Office Scan Percentage, Possible Street Scans, Missed Street Scans, Invalid Street Scans, Street Scan Percentage, and On-Time Street Scan Percentage. This report can be accessible from the Performance Reports tab on the Supervisor Workbench.

Additionally, the Non-Delivery Point Maintenance window can be accessible from the Route Inspections and Adjustments Workbench and the Route and Unit Maintenance tab on the Supervisor Workbench. An Add Non-Delivery Point window can be accessible from the Route Re-sequencing window in the Route portion of DOIS. Further, an Edit Non-Delivery Point window can also be accessible from the Non-Delivery Point Maintenance window and the Route Re-sequencing window. Also, a 3999 Data Capture/Summary window can be accessible from the 3999 Data Capture Record Selection window on the Route Inspections and Adjustments Workbench and the Route and Unit Maintenance tab on the Supervisor Workbench. And, a Route Re-Sequencing window providing access to the MSP Base Information Maintenance window can be accessible from the Create Adjustment Scenarios window on the Route Inspections and Adjustments Workbench.

Other embodiments of the invention will be apparent to those skilled in the art from consideration of the specification and practice of the invention disclosed herein. For example, the entire system could be made available to users online. It is intended that the specification and examples be exemplary only, with a true scope and spirit of the invention being indicated by the following claims.

What is claimed is:

1. A computer-implemented method for managing delivery routes comprising:
   identifying, by a delivery system computer in conjunction with a first database of the delivery system computer, a plurality of routes for delivering articles within a delivery unit, each route comprising segments having delivery points;
   identifying, by the delivery system computer in conjunction with a second database of the delivery system computer, a quantity of articles to be delivered along each route;
   identifying, by the delivery system computer in conjunction with a third database of the delivery system computer, estimated times for completing the segments of the identified routes, wherein the estimated times for completing the segments of the identified routes are determined based on the quantity of articles to be delivered at the delivery points of the segments;
   identifying, by the delivery system computer in conjunction with a fourth database of the delivery system computer, carriers assigned and assignable to at least a portion of said plurality of identified routes, the availability of said carriers, and a workload capacity for each carrier, the workload capacity including a total number of available work hours for that carrier;
   generating, by the delivery system computer, selective data from said first, second, third, and fourth databases for display in a graphical user interface, wherein the graphical user interface is configured to receive an assignment to a particular route for at least one carrier;
   determining, by the delivery system computer, that the at least one carrier does not have a full days work for a particular day; and
   assigning, by the delivery system computer, the at least one carrier to a segment of another route of said plurality of identified routes, wherein the another route differs from the particular route, it is determined that a carrier assigned to the another route for the particular day is unavailable to complete the segment of the another route, and the at least one carrier is assigned a delivery schedule for the segment of the another route reflecting a delivery schedule associated with the segment of the another route.

2. The computer-implemented method of claim 1, further comprising: enabling a user to identify that the particular route is in proximity to the segment of the another route.

3. The computer-implemented method of claim 1, further including identifying one or more carriers of the plurality of carriers that has requested to work overtime.

4. The computer-implemented method of claim 1, wherein the delivery system computer is configured to adjust a route assignment for the at least one carrier based on the received route assignment, wherein at least one carrier is assigned to work for about eight hours.

5. The computer-implemented method of claim 3, wherein the delivery system computer is configured to adjust a route assignment for the at least one carrier based on the received route assignment, wherein the at least one carrier has requested to work overtime and is assigned to work for more than eight hours.

6. The computer-implemented method of claim 1, wherein the estimated times for completing one or more of the identified routes includes an amount of office time allocated for a respective route.

7. The computer-implemented method of claim 1, wherein the estimated times for completing one or more of the identified routes includes an amount of route time allocated for a respective route.

8. A system for managing delivery routes, the system comprising a processor, a memory, and a display unit, the system further comprising:
- a first database that identifies a plurality of routes for delivering articles within a delivery unit, each route comprising segments having delivery points;
- a second database that identifies a quantity of articles to be delivered along each route;
- a third database that identifies estimated times for completing one or more of the identified routes, wherein the estimated times for completing the routes are determined based on the quantity of articles to be delivered along the route;
- a fourth database that identifies carriers assigned and assignable to at least a segment of said plurality of identified routes, the availability of said carriers, and a workload capacity for each carrier, the workload capacity including a total number of available work hours for that carrier; and
- a graphical user interface configured to selectively display, on the display unit, identified data from said first, second, third, and fourth databases, identify at least one carrier assigned to a particular route who does not have a full days work for a particular day, identify a carrier assigned to another route for the particular day who is unavailable to complete a segment of the another route, and receive an assignment of the at least one carrier to the segment of the another route from said plurality of routes, wherein the another route differs from the particular route, and the at least one carrier is assigned a delivery schedule for the segment of the another route reflecting a delivery schedule associated with the segment of the another route.

9. The system of claim 8, wherein the graphical user interface is configured to enable a user to identify that the particular route is in proximity to the segment of the another route.

10. The system of claim 8, wherein the graphical user interface is further configured to identify one or more of the plurality of carriers that has requested to work overtime.

11. The system of claim 8, further comprising a route adjustment apparatus configured to adjust route assignments for the at least one carrier based on the received route assignment, wherein at least one carrier is assigned to work about eight hours.

12. The system of claim 10, further configured to adjust route assignments for the at least one carrier based on the received route assignment, wherein the at least one carrier has requested to work overtime and is assigned to work for more than eight hours.

13. The system of claim 8, wherein the estimated times for completing one or more of the identified routes includes an amount of office time allocated for a respective route.

14. The system of claim 8, wherein the estimated times for completing one or more of the identified routes includes an amount of route time allocated for a respective route.

15. The system of claim 8, wherein the graphical user interface includes a plurality of graphical user interfaces.

16. The system of claim 15, wherein the graphical user interface is further configured to display the plurality of graphical user interfaces at one time.

* * * * *